US012212491B2

(12) United States Patent
Atwal et al.

(10) Patent No.: US 12,212,491 B2
(45) Date of Patent: Jan. 28, 2025

(54) METHODS, SYSTEMS, KITS AND APPARATUSES FOR PROVIDING END-TO-END, SECURED AND DEDICATED FIFTH GENERATION TELECOMMUNICATION

(71) Applicant: Q NETWORKS, LLC, Arlington, VA (US)

(72) Inventors: Peter Atwal, Longwood, FL (US); Richard Hoyt Currier, Jr., Toms River, NJ (US); Robert S. Spalding, III, Arlington, VA (US)

(73) Assignee: Q Networks, LLC, Arlington, VA (US)

( * ) Notice: Subject to any disclaimer, the term of this patent is extended or adjusted under 35 U.S.C. 154(b) by 270 days.

(21) Appl. No.: 17/674,399

(22) Filed: Feb. 17, 2022

(65) Prior Publication Data

US 2022/0247678 A1 Aug. 4, 2022

Related U.S. Application Data

(63) Continuation of application No. PCT/US2020/046949, filed on Aug. 19, 2020.
(Continued)

(51) Int. Cl.
*H04L 29/08* (2006.01)
*G06T 7/30* (2017.01)
(Continued)

(52) U.S. Cl.
CPC ........... *H04L 45/645* (2022.05); *H04B 7/195* (2013.01); *H04L 63/0428* (2013.01); *H04L 65/1104* (2022.05)

(58) Field of Classification Search
CPC ............... H04L 45/645; H04L 41/0803; H04L 41/0895; H04L 69/06; H04L 63/0428;
(Continued)

(56) References Cited

U.S. PATENT DOCUMENTS 9,763,167 B2 9/2017 Gopal et al.
11,463,160 B2 * 10/2022 Mendelsohn ...... H04B 7/18515
(Continued)

FOREIGN PATENT DOCUMENTS

JP 2011244193 A 12/2011
JP 2013502123 A 1/2013
(Continued)

OTHER PUBLICATIONS

Boero, L. et al., "Satellite Networking Integration in the 5G Ecosystem: Research Trends and Open Challenges," IEEE Network, Sep./Oct. 2018, pp. 9-15.
(Continued)

*Primary Examiner* — Edan Orgad
*Assistant Examiner* — Vanneilian Lalchinthang
(74) *Attorney, Agent, or Firm* — RMCK Law Group PLC

(57) ABSTRACT

A method and system for configuring a fifth generation (5G) network may include utilizing software-defined networking (SDN) for separating a data plane from a control plane of a 5G network. The separated control plane may be run across a low earth orbit (LEO) system between an edge network and a core network of the 5G network such that the LEO system exclusively directs the control plane. A pathway for the data plane may be determined and generated by the LEO system exclusively using the control plane. In some examples, SDN control may be established exclusively on a LEO system based on a service request. A pathway for the data plane from a first location to a second location may be determined and generated based on the service request and the control of the control plane on the LEO system.

14 Claims, 23 Drawing Sheets

Related U.S. Application Data

(60) Provisional application No. 62/937,601, filed on Nov. 19, 2019, provisional application No. 62/888,742, filed on Aug. 19, 2019.

(51) Int. Cl.

| | |
|---|---|
| ***H04B 7/185*** | (2006.01) |
| ***H04B 7/195*** | (2006.01) |
| ***H04L 9/40*** | (2022.01) |
| ***H04L 45/645*** | (2022.01) |
| ***H04L 65/1104*** | (2022.01) |

(58) Field of Classification Search

CPC . H04L 65/1104; H04L 45/64; H04B 7/18504; H04B 7/18515; H04B 7/18519; H04B 7/18521; H04B 7/18556; H04B 7/18565; H04B 7/195; H04W 12/033; H04W 16/24; H04W 24/02; H04W 84/06; H04W 40/02; G06T 7/30

USPC .......................................................... 370/316

See application file for complete search history.

(56) References Cited

U.S. PATENT DOCUMENTS

| | | | | |
|---|---|---|---|---|
| 2009/0003231 | A1* | 1/2009 | Hawbaker | H04L 45/00 370/252 |
| 2012/0144056 | A1 | 6/2012 | Stokking et al. | |
| 2013/0070666 | A1* | 3/2013 | Miller | H04B 7/2041 370/326 |
| 2015/0256134 | A1* | 9/2015 | Arcidiacono | H03F 1/32 330/2 |
| 2017/0054770 | A1 | 2/2017 | Wells et al. | |
| 2017/0251515 | A1 | 8/2017 | Altman et al. | |
| 2017/0295409 | A1* | 10/2017 | Simon | H04W 28/10 |
| 2017/0374028 | A1* | 12/2017 | Oliver | H04L 63/1416 |
| 2018/0041905 | A1* | 2/2018 | Ashrafi | H04W 16/10 |
| 2018/0302770 | A1* | 10/2018 | Bhaskaran | H04W 76/14 |
| 2018/0359337 | A1* | 12/2018 | Kodaypak | H04W 72/00 |
| 2019/0158505 | A1 | 5/2019 | An et al. | |
| 2019/0191305 | A1* | 6/2019 | Dowlatkhah | H04W 76/10 |
| 2020/0007421 | A1* | 1/2020 | Bridges | H04L 43/0876 |
| 2020/0328803 | A1* | 10/2020 | Cooke | H04W 36/304 |
| 2021/0036772 | A1* | 2/2021 | Miranda | H04B 7/18513 |

FOREIGN PATENT DOCUMENTS

| | | | |
|---|---|---|---|
| JP | 2019520755 | A | 7/2019 |
| KR | 20100073527 | A | 7/2010 |
| WO | 2016038611 | A1 | 3/2016 |
| WO | 2018075930 | A1 | 4/2018 |
| WO | 2019149574 | A1 | 8/2019 |

OTHER PUBLICATIONS

Du, P. et al., "Multipath TCP in SDN-enabled LEO Satellite Networks," Milcom 2016—2016 IEEE Military Communications Conference, IEEE, Nov. 2016, 6 pages.

Extended European Search Report dated Aug. 18, 2023 for EP Application No. 20853898.3, 8 pages.

Hu, H. et al., "LEO Software Defined Networking Based On Onboard Controller," 2018 IEEE Global Conference on Signal and Information Processing (GLOBALSIP), IEEE, Nov. 2018, pp. 1068-1071.

Kodheli, O. et al., "Integration of Satellites in 5G through LEO Constellations," Jun. 30, 2017, https://arxiv.org/pdf/1706.06013.pdf, 6 pages.

PCT International Search Report and Written Opinion dated Jan. 12, 2021 for International Application No. PCT/US2020/046949, 11 pages.

ITmedia Enterprise CIO/Cloud Strategy NEC, "NEC, Development of virtual mobile core for 5G capable of corresponding to various traffics," Jul. 31, 2019, 4 pages.

Rosenberg, J. et al., "An Offer/Answer Model with the Session Description Protocol (SDP)," Network Working Group, Request for Comments: 3264, Jun. 2002, 25 pages.

* cited by examiner

200

500

600

Data Security

Data is restructured into secure, unbreachable, subcomponents and further protected by the Containerized 5G Core together with additional layers of security

METHODS, SYSTEMS, KITS AND APPARATUSES FOR PROVIDING END-TO-END, SECURED AND DEDICATED FIFTH GENERATION TELECOMMUNICATION

CROSS-REFERENCE TO RELATED APPLICATIONS

This application is a bypass continuation of PCT International Application No. PCT/US2020/046949 filed Aug. 19, 2020, which claims the benefit of U.S. Provisional Pat. App. Nos. 62/888,742 filed Aug. 19, 2019, and 62/937,601 filed Nov. 19, 2019. Each of the above-identified applications is hereby incorporated by reference in its entirety as if fully set forth herein.

FIELD

The present disclosure relates to methods and systems for enabling a fifth generation (5G) telecommunication network and computing platform to provide secure and dedicated end-to-end communication.

BACKGROUND

Fifth Generation technology, more commonly known as 5G, will transform many daily activities. Advances in autonomous vehicles, complex surgeries, global logistics, and artificial intelligence will be realized with 5G as it will provide suitable infrastructure for product improvement and refinement capable of changing the breadth of digital experiences for both consumers and enterprises. This infrastructure change will significantly improve current systems and services by offering increased data rates, lower latency, and better mobility, providing the opportunity to fundamentally change many computing processes. 5G uses radio waves to transmit and receive voice and data and incorporates several foundational technologies such as network slicing, network function virtualization, software-defined networking, and multi-access edge computing. 5G moves computing, data, and application intelligence into the network and transforms the network from a transactional transport pipe to a robust and dynamic computing platform. In 4G networks, it may take six minutes to download a movie. With 5G, the download time may drop to three seconds. 4G networks may support only 4,000 devices per square kilometer while 5G may support up to one million.

The base of the 5G network core utilizes open standards that address all aspects of signaling, session, access, subscriber, data and radio access management, and all aspects of multi-media and 5G application services. A 5G core may easily approach tens of millions of lines of code, with millions of lines of open source code developed by third party companies and developers. In many instances, it is hard to police and check the security implications of open source, which is expanded daily and at an exponential rate. Many open source standards generally encapsulate third party libraries containing other functions and services that may never be exercised but may result in increasing an overall malware attack surface. Even if a particular release of the software is made secure, there may be no guarantee that future versions will not have security holes. Within 5G network cores, access and session management functions involve a lot of microservices and may be running a large volume of calls on virtual machines that may be susceptible to manipulation, authentication, authorization, subscriber management and home serving functions that hold both network and user data and have many points of egress and ingress and, therefore, may be open to security compromises. In 5G, packet gateways handle data packets for control information and for data transport these may contain and carry malware. Also, these gateways support application-level control and may be more accessible than past networks. This combination of factors creates additional security vulnerabilities, especially in the management and orchestration aspects of home serving system, authentication, authorization, session management and packet gateway installation, maintenance, and operations. Policy control functions such as charging contain billing data and may have exploitable gaps, especially as part of the data collection and storage process. Applicant has identified many needs for developing secure and dedicated 5G architecture as current vulnerabilities expose critical infrastructure and data to increased attacks.

Typical 5G core networks are mobile core platforms that process device-to-network, network-to-device, and network-to-network requests for paging, signaling, control, data processing/handling, and media services without entirely securing the message source or destination, and without sufficient protection against spoofing, message alteration, false base stations, incorrect or deliberately altered intercarrier and interexchange information. These attacks may be amplified when considering the new 5G technologies such as network slicing, massive IoT, network function virtualization, and software-defined networking. Examples of attack vectors may include authentication attacks such as forgery, verification spoof, partial message collision attacks, and password compromises, and the like; integrity attacks such as message blocking, spam, message and data cloning, message modification; message insertion, and message tampering, and the like; and attacks against availability such as man in the middle, impersonation, spoofing, eavesdropping, replay, session spoofing, and the like.

Many of the key changes introduced with 5G networks are instrumental to the architectural approach for these platforms and may include the following. (A) About a one millisecond response time between the edge devices and the network. In 4G, the typical response time is 50 milliseconds. With near real-time response times, a new wealth of applications and services may be enabled on 5G networks. (B) 5G is one of the first network architectures designed specifically with the Internet of Things in mind. It may provide a ten-times improvement over 4G for connection density, which may be required to support the rapidly growing number of IoT devices. (C) 10-100 times faster than current 4G networks. (D) Network Slicing provides the ability for network bandwidth to be divided into multiple logical networks enabling private network use on a 5G network. (E) Mesh Networking support enables the extension of the 5G network and related services over different radio environments such as WiFi and Bluetooth, which may boost coverage, range and address capacity issues at peak times. (F) Intelligent Networking Capabilities. The core of 5G network may leverage the latest advances in expert systems to understand what is happening on the network and to be able to identify potential issues or requirements.

Some telecommunication networks utilize satellite technology. An example satellite technology uses low Earth orbiting (LEO) satellites which are typically deployed as a constellation of satellites since a single LEO satellite provides a relatively small coverage area that moves as the satellite travels at high angular velocities needed to maintain orbit. This is why several LEO satellites are typically needed to maintain continuous coverage. In contrast, geostationary satellites move at same angular velocity as the rotation of Earth providing permanent coverage over a relatively large area. LEO satellites provide relatively low-latency between ground to satellite at about 1-4 milliseconds compared to about 125 milliseconds with geostationary satellites.

LEO satellites have been used with telecommunication networks that typically have no separation of a control plane and a data plane. LEO satellites typically treat all communication as belonging to a data plane. Most LEO systems are predominantly used for backhaul. For example, LEO satellites do not usually include any telephone processing system in backhaul because processing is not done on LEO satellites.

With respect to 5G technology, LEO satellites are expected to use same communications architecture path that the geostationary satellites (e.g., geo commercial satellites) have also been using. Accordingly, current and near future LEO satellites are not able to process any particular traffic type or any particular application, but rather the LEO satellites, like existing geostationary satellites, serve as a path or a conduit to move bandwidth (e.g., moving bandwidth from one place to another). LEO satellites, like existing geostationary satellites, could transport bandwidth such as television, internet access, Wi-Fi to planes, maritime traffic, 5G traffic, etc. For example, with 5G traffic, all data is going to be transported together along the control plane and data plane. This is because these LEO satellites are built to be agnostic to and transparent to type of traffic and whether or not a communication is 5G, 4G, television streaming, Wi-Fi, or other forms of communication.

SUMMARY

In embodiments, methods, systems, kits, and apparatuses may include improving data security of platform data in a dedicated 5G telecommunications platform. In embodiments, a method may include separating platform data into three separate object constructs of data, metadata, and behavior. The method may include defining the data of the first object construct by its abstract syntax notation (ASN); transforming the data of the first object construct into data objects based on the ASN of the data; transforming the metadata of the second object construct into metadata objects; and transforming the behavior of the third object construct into behavior objects. The method may include disentangling the data objects, the metadata objects, and the behaviors objects while the platform data is at rest; and reassembling the data objects, the metadata objects, and the behaviors objects while accessing the platform data.

In embodiments, the data object and metadata object may be related by inheritance. In embodiments, the data object and metadata object may be related by a strict parent-child relationship. In embodiments, the data object and metadata object may be related by association. In embodiments, the data object and metadata object may be related by a pointer relationship. In embodiments, the data objects and metadata objects may be related to each other through their behavior based on code on which they execute, and wherein the code is kept in a separate object that relates to the metadata object by inheritance. In embodiments, the data objects and metadata objects may be related to each other through their behavior based on code on which they execute, and wherein the code is kept in a separate object that relates to the metadata object by association. In embodiments, the data objects, the metadata objects, and the behavior objects may be kept in one of separate databases, separate data stores, and different clouds.

In one example implementation, a computer-implemented method for configuring a fifth generation (5G) network may include but is not limited to utilizing software-defined networking (SDN) for separating a data plane from a control plane of a 5G network. The separated control plane may be run across a low earth orbit (LEO) system between an edge network and a core network of the 5G network such that the LEO system exclusively directs the control plane. A pathway for the data plane may be determined and generated by the LEO system exclusively using the control plane.

One or more of the following example features may be included. The LEO system may be configured to provide sole control and management of routing of data on the data plane based on the control plane running on the LEO system. The LEO system may be software running on one or more LEO satellites. In an example, data may be blocked from being transferred along the control plane based on a type of data being transmitted across the data plane. At least a control portion of one or more applications may executed by utilizing the SDN on the LEO system.

In another example implementation, a computer-implemented method for providing low earth orbit (LEO) directed fifth generation (5G) telecommunication may include but is not limited to receiving a service request from a first location via a 5G network for transmitting data from the first location to a second location. Software-defined networking (SDN) control of a control plane of the 5G network may be established exclusively on a LEO system based on the service request. A pathway for the data plane from the first location to the second location may be determined and generated based on the service request and the control of the control plane on the LEO system. The data may be transmitted from the first location to the second location based on the generated pathway of the data plane.

One or more of the following example features may be included. The LEO system may be software running on one or more LEO satellites. Session initiation protocol (SIP) may be utilized for protecting communications at signaling and at the control plane. Session description protocol (SDP) may be utilized for providing at least one of dissemination of call model information, adaptation of call models in real time, and addition of services during a call. In an example, a mid-trigger event may be initiated during a call between a first user device at the first location and a second user device at the second user location such that session initiation protocol (SIP) and session description protocol (SDP) may be used for providing security for the mid-trigger event (e.g., conferencing, add-ons, mid-call invites, etc. as relating to call selection and handling for 5G call setup and described in the disclosure). The pathway may be determined based on at least one of a white list of approved terrestrial network VIAs and a blacklist of not approved (e.g., unauthorized) terrestrial network VIAs. In examples, the white list may include at least one of a common language facility identifier (CLFI), a common location language identifier (CLLI), LEO satellite identification information, and/or terrestrial network device identification information. The data transmitted from the first location to the second location may be encrypted.

In another example implementation, a computer-implemented method for providing fifth generation (5G) telecommunication using backhaul over one or more satellites may include but is not limited to receiving a service request via a 5G network. Software-defined networking (SDN) control may be established for deploying a virtual network function based on the service request. Encrypted data may be communicated across a data plane based on the service request between one or more of the satellites supported by the virtual network function. A control plane may be configured based on the service request with one or more cores providing compute resident on one or more satellites independent of the one or more satellites used for communicating the encrypted data across the data plane.

One or more of the following example features may be included. A pathway for the data plane may be determined and generated for the data plane from a first location to a second location based on the service request and a control of the control plane by the one or more satellites. The control plane may use an SDN controller for establishing the SDN control for deploying the virtual network function based on the service request.

In another example implementation, a low earth orbit (LEO) system for providing fifth generation (5G) telecommunication may include but is not limited to one or more control plane nodes connected by free space optical links forming a control plane of a 5G network across the one or more control nodes. The LEO system may also include a software-defined networking (SDN) controller used by the one or more control plane nodes to direct the control plane in selecting one or more data plane nodes that form a data plane of the 5G network across the one or more selected data plane nodes. The one or more control plane nodes may use the SDN controller to determine and generate a pathway for data across the one or more selected data plane nodes.

One or more of the following example features may be included. The one or more control plane nodes may be one or more LEO satellites. The one or more selected data plane nodes may include at least one of a LEO satellite, a terrestrial network device, and a combination thereof. The SDN controller may utilize network function virtualization (NFV) for using the control plane. The LEO system may further include at least one database associated with routing such that user identification information in the at least one database may be used to eliminate handshaking processes. The LEO system may further include one or more encryption keys for decrypting information related to communication and transactions for a user device.

In another example implementation, a system for configuring a fifth generation (5G) network may include but is not limited to a low earth orbit (LEO) system for utilizing software-defined networking (SDN) to separate a data plane from a control plane of a 5G network; and an edge network connected to the LEO system via the control plane such that LEO system exclusively directs the control plane between the edge network and a core network of the 5G network. The LEO system may determine and generate a pathway for the data plane by using the control plane.

One or more of the following example features may be included. The LEO system may be software running on one or more LEO satellites. At least a control portion of one or more applications may utilize the SDN on the LEO system to execute the one or more applications with respect to directing the control plane.

In another example implementation, a system for providing low earth orbit (LEO) directed fifth generation (5G) telecommunication may include but is not limited to a first user device sending a service request from a first location via a 5G network for transmitting data from the first location to a second user device at a second location; and a LEO system for establishing software-defined networking (SDN) exclusive control of a control plane of the 5G network based on the service request. The LEO system may determine and generate a pathway for the data plane from the first location to the second location based on the service request and the control of the control plane on the LEO system. The data may be transmitted from the user device at the first location to the user device at the second location based on the generated pathway of the data plane.

One or more of the following example features may be included. The LEO system may be software running on one or more LEO satellites. In examples, the system may further include home serving information for a classified group of users for activating one or more services. A first user of the first user device and a second user of the second user may be part of the classified group users such that when the first user device connects with the second user device, the one or more services are activated. The LEO system may include a session initiation protocol (SIP) virtual server and a session description protocol (SDP) virtual server for providing security for the transmission and other transmissions between the first user device and the second user device. The LEO system may be configured to execute at least control portions of one or more applications by using the SDN exclusive control. The data transmitted from the user device at the first location to the user device at the second location may be encrypted.

A more complete understanding of the disclosure will be appreciated from the description and accompanying drawings and the claims, which follow.

BRIEF DESCRIPTION OF THE DRAWINGS

The accompanying drawings, which are included to provide a better understanding of the disclosure, illustrate embodiment(s) of the disclosure and together with the description serve to explain the principle of the disclosure. In the drawings.

Like reference symbols in the various drawings indicate like elements.

DETAILED DESCRIPTION

Figure 1:
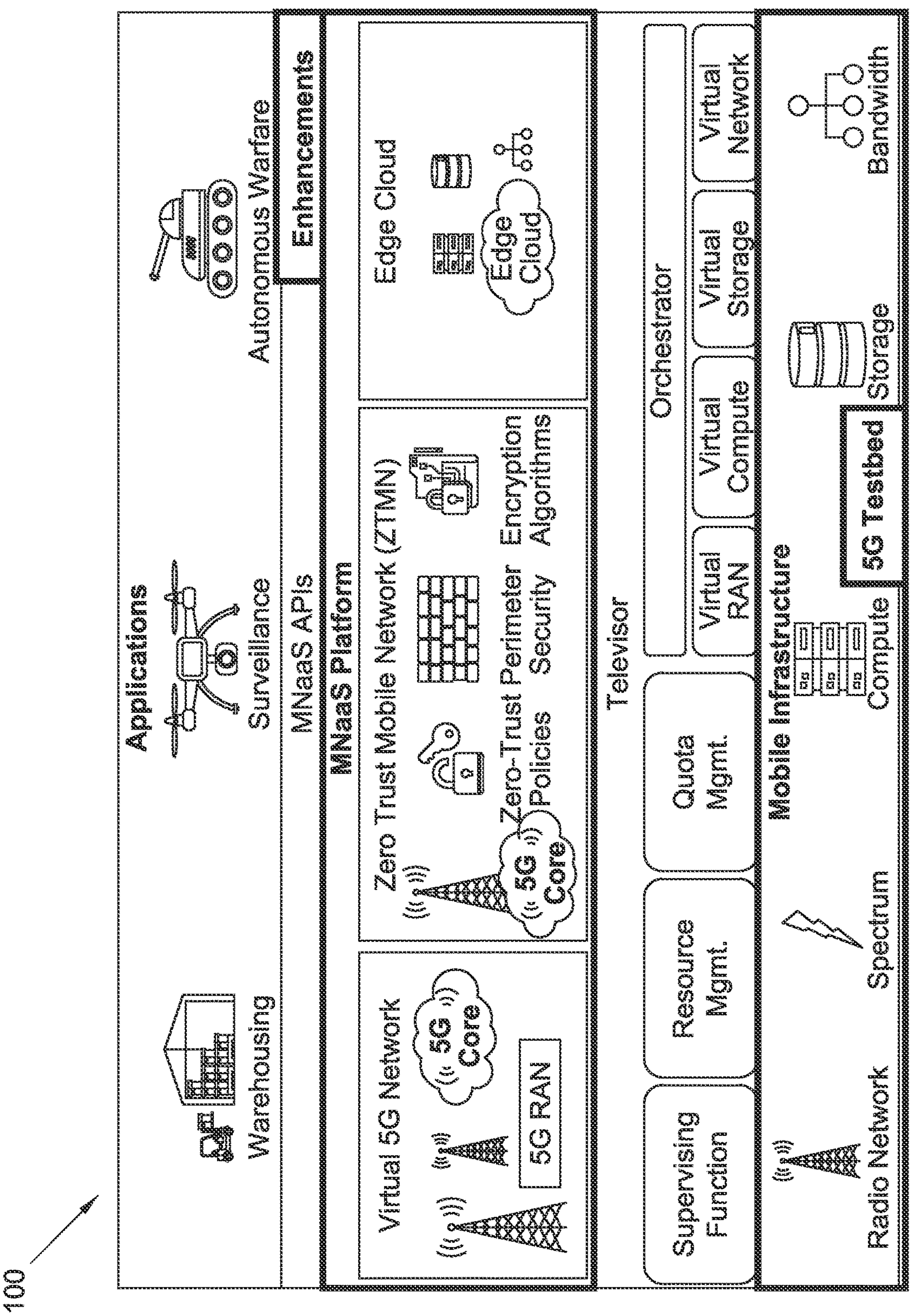
FIGS. 1, 2, 3, and 4 are diagrammatic views that depict enhancements to the platform including mobile network-as-a-service platform features, zero trust mobile network features, and portions of an integrated edge compute platform in accordance with one or more example implementations of the present disclosure.

In the various methods and systems, the network and computing platform of the present disclosure may provide a highly secure, standalone, and dedicated fifth generation technology (5G) telecommunication network and computing platform with significantly reduced surface vulnerabilities and with significantly enhanced end-to-end security. In embodiments, the 5G telecommunication network and computing platform of the present disclosure may incorporate a decentralized data model using a differentiated approach to creating trusted and resilient networks by securing the entire technology stack from applications, services, and data down to the physical infrastructure. In embodiments, the platform may provide various features, functionalities, components and user and enterprise experiences for defense, government, and enterprise customers where security and reliability are of paramount importance. In embodiments, the platform provides connectivity for rural portions of one or more countries, for low connectivity and poor line of sight regions, and the like.

In embodiments, the 5G telecommunication network and computing platform incorporates one or more combinations of standalone 5G architectures, integrated network and cloud architectures, minimized surface attack architectures, architectures that purposefully drive pervasive security at every level, and the like. In embodiments, the network and computing platform may be architected with a standalone architecture configuration in contrast to many non-standalone architectures employed by many U.S. operators. In embodiments, the network and computing platform may provide an end-to-end secure 5G network that includes new radio access networks, transport networks, 5G mobile cores, edge networks, and the like. By way of these examples, the standalone architecture of the platform may be fully virtualized, cloud-native architecture with efficient ways to develop, deploy, and manage services.

In embodiments, the 5G telecommunication network and computing platform may provide an integrated network and cloud. In these examples, edge-computing may be deployed in the field, or close, to the device that is controlled. In embodiments, the architecture of the platform may integrate a seamless, distributed, and secure cloud at the network edge. In examples when coverage for radio or edge computing may not be available in a location that is deemed necessary by a customer, the customer of the platform may seamlessly provision and integrate a mobile edge with radio, compute, and backhaul to the network and computer platform all in one. In many examples, the platform may be deployed with the edge compute and network architecture that may be either statically or dynamically provisioned or auto-provisioned without manual intervention and operated by the platform. In many examples, the platform may be deployed with the edge compute and network architecture that may be controlled (wholly or partially) by one or more customers of the platform.

In embodiments, the methods and systems of the present disclosure may include a 5G-enabled connectivity platform deploying native defense-grade security. The platform may be purpose-built to handle critical communications and data by addressing what Applicant appreciates to be serious security and architectural issues inherent in existing telecommunications infrastructure and software.

The platform may be well-suited given the range of applications and use cases around the world to fully realize the benefits of 5G technology. In embodiments, the features of the platform may include being designed from the ground up with principles of enterprise virtual private cloud (VPC) architecture. The platform may also include a Mobile Network-as-a-Service (MNaaS) features that may provide full control of the entire mobile network lifecycle to dynamically enable multiple mobile networks on a pay-as-you-go, subscription basis, or combinations thereof. The platform may also include Zero Trust Mobile Network (ZTMN) features built on an architecture that accommodates key security enhancements, usually not possible in traditional 3GPP-only networks. If desired, each application or use case may be configured with its own highly customizable network architecture that meets its specific needs, resulting in greatly improved timelines, accuracy, security, and operations.

In embodiments, the platform may also include cloud-native, standalone 5G architecture that may provide improved scalability, fault isolation, and efficient use of resources while improving total cost of ownership; dynamic extension of enterprise security to mobile assets and mobile core; and agile and open framework and use of advanced development, security, and operations (DevSecOps) paradigm resulting in a rapid innovation environment and faster delivery of features.

In embodiments, the platform may provide the Zero Trust Mobile Network (ZTMN) features for its customers seeking defense-grade security in private 5G networks. The ZTMN and its features may have been developed based on virtual private cloud (VPC) principles and may be offered as part of its cloud based MNaaS platform with integrated edge capability. In embodiments, the Platform MNaas and the ZTMN may offer critical security and architectural enhancements that may extend the capabilities of traditional 3GPP 5G networks. The architectural enhancements may include being developed from inception with proven enterprise VPC principles; and multi-tenant capability that may offer any number of discrete, secure, and highly customizable private 5G networks, and trust verification and encryption between every network function and network element. The architectural enhancements may also include meta-data, subscription data, and log data encryption with customer-generated keys that ensure maximum security dynamic extension of enterprise perimeter security to mobile assets and core; multi-factor authentication and authorization for every mobile asset; and advances the mission to re-build supply chains and lessen the supply chain risk to various entities.

In embodiments, the platform may include an ability to create any number of 5G networks that may be individually created and customized to the exact needs of, for example, augmented reality/virtual reality (AR/VR) and other applications requiring a 5G network. The platform may include a cloud-native implementation that allows scalability, resiliency, and efficient resource use. The platform may include the Zero Trust Mobile Network (ZTMN) built on an architecture that provides key improvements in the areas of security and service level guarantees well beyond a standard 3GPP 5G network. By way of these examples, the platform may dynamically provision edge computing into a ZTMN per application that may adhere to the security model of the application and the customized mobile network.

Applicant appreciates that the enterprise mobile network market is evolving rapidly as governments' allocation of unlicensed mobile spectrum has enabled large organizations to shift away from traditional telecom operator-controlled public networks that were built for consumers to private networks that they may control and maintain. It will be appreciated in light of the disclosure that enterprise mobile networking will likely deploy hybrid mobile networks that may consist of a private 5G wireless infrastructure in enterprise-controlled areas; and public LTE/5G networks that may provide roaming coverage where private networks may not be available.

Applicant appreciates that there may be critical security issues that should be addressed in any 5G network architecture designed to support critical data or communications such as significant existing LTE vulnerabilities when 5G networks are deployed in non-standalone (NSA) network configurations; expanding (and multiplying) attack surfaces due to the use of microservices based architecture; enterprises that lack visibility and control over security policies of centrally managed and/or operator controlled 5G networks; and all 5G network slices that may share a control plane that may expose organizations that use a network slice to every compromise and issue generated in other slices.

In embodiments, the platform may offer a new class of wireless network service that seeks to foster innovation by extending the cloud model of dynamically provisioned and controlled computing and network resources to the mobile network itself. The platform may solve numerous architectural deficiencies and security gaps inherent in the 5G standards, some of which are detailed herein, which may be system requirements for defense and enterprise customers but may also maintain compatibility and interoperability with those networks. In embodiments, the platform may extend and enhance the basic 5G network by offering several enhancements. In embodiments, the 5G network may be enhanced with platform MNaaS features. In embodiments, the MNaaS features may integrate with the RAN network that may be deployed as part of the 5G testbed and may extend it with an ability to create any number of highly customized "tenant" mobile networks—potentially one per application, which may be similar to virtual private cloud concepts. Each "tenant" mobile network created on the MNaaS may be a highly secure ZTMN. In embodiments, the ZTMN may be a 3GPP Release 16 compatible private 5G network that may follow the zero-trust security architecture to extend enterprise security controls over mobile networks. In embodiments, an edge compute platform may be part of the ZTMN that may be secured in the same security paradigm and configuration that are established to protect the ZTMN.

In example embodiments, a low Earth orbit (LEO) method and system may be offered that may address security issues while maintaining, and in some cases improving, network speed. In some examples, the LEO system may be part of the platform and in other examples, the LEO system may be a separate system from the platform. In examples, where the LEO system may be integrated with the platform, for example, It is appreciated in light of the disclosure that integrating the LEO system into the data governance, network management, and security envelope of the platform, LEO system may become an integrated portion of the entire platform. This may be achieved by uniquely designing the LEO satellites (i.e., LEO system) to operate as a dedicated component of the platform rather than employing conventional LEO communication satellites that may be intended to serve a variety of missions. Whereas some LEO satellites may act generically with any and all traffic from different types of networks, the proposed LEO system may be setup to function specifically with 5G networks. For example, the LEO system may be specific to 5G networks by being technically capable of carrying primarily 5G traffic through the operation of 5G interfaces. The LEO system may be run on one or more LEO satellites. In some examples, the one or more satellites may be part of only one constellation of satellites and in other examples, the one or more satellites may be part of one or more constellations of satellites. In some examples, each satellite may provide functionality of the LEO system as described in the disclosure. In other examples, multiple satellites may be used together to provide functionality of the LEO system as described in the disclosure.

The proposed LEO system may provide for separation of a control plane from a data plane of a 5G network such that the control plane may be moved to the LEO system (e.g., on one or more LEO satellites). By moving the control plane to the LEO system (e.g., on one or more LEO satellites), security risks associated with control plane management may be addressed. These management security risks relate to the security of typical control planes that run across terrestrial systems and devices with little to no oversight in most telecommunication networks. Specifically, there are security risks of multiple enterprises or multiple applications within an enterprise sharing a single control plane. With minimal oversight of the control plane, there is also limited to no control of the data plane routing. By moving the control plane to the LEO system, these security risks may be addressed and resolved with management of the control plane being exclusive to the LEO system (e.g., exclusive LEO satellite control) which allows for control of the data plane routing. This may eliminate some of these security risks and also reduce exposure of all networks. The control plane on the LEO system may also provide versatility by allowing for software applications to be developed that direct the control plane on the LEO system. For example, various software applications (e.g., interactive voice response applications and broadcasting applications) may be developed with the control plane on the LEO system providing new opportunities. For example, broadcasting internationally may be difficult to setup terrestrially (e.g., from New York to Tokyo). However, with the control plane on the LEO system, LEO satellites (e.g., via applications) over Tokyo and over New York may be directed to broadcast data.

In example embodiments, the LEO system may utilize software defined networking (SDN) to provide desired functionality such as separating the control plane from the data plane. SDN may enable dynamic, efficient network configuration for improving network performance and monitoring (e.g., similar to cloud computing). SDN may dissociate a forwarding process of network packets (e.g., may be referred to as the data plane) from a routing process (e.g., may be referred to as the control plane). The control plane may include one or more SDN controllers for using or directing the control plane with respect to the data plane (e.g., using or directing the control plane to route the data plane). In general, use of SDN may relate to an evolving, continually updated set of protocols, procedures, and algorithms. For example, a programming update may allow for the LEO system to stay current and not be fixed with regard to what is implemented. For example, the LEO system may be dedicated to a specific application of traffic type 5G that may be updated using core SDN capabilities, protocols, and other software to stay current.

Most existing LEO satellite systems may be focused on moving user communication traffic via a communication pipe or nailed up channel for establishing path for data from one location to another location. As a result, local compute may be minimized to enjoy maximized throughput. Movement of communication traffic (e.g., streamed content) may have become commoditized. The onset of 5G nevertheless may introduce many more planes of attack raising new possible security vulnerabilities. 5G network functions may provide comingled resources supportive of the control plane and the data plane when operating satellite backhaul that can expose organizations to compromises and issues that could jeopardize security of the control plane. An unsecured control plane may run the risk of man in the middle attacks and security risks that can jeopardize delivery of encrypted data across the data plane. Accordingly, the proposed LEO system may provide the platform with an ability to separate and isolate the control plane from the data plane (or user plane) on 5G networks and support the control plane with dedicated compute resident on satellites not providing for the encrypted data communication across the data plane. Separating and isolating the control plane provides control of all aspects of the virtual infrastructure to the application, including supporting development and operations (DevOps) processes and functional capabilities.

MNaaS Capabilities

In embodiments, the platform and virtualized infrastructure may go beyond just acting as a single, static network by allowing multiple customizable instances of its network (e.g., potentially one per application) as well as the integration of edge computing platforms, and the capability to add platform features as needs evolve. FIG. 1 depicts the enhancements to the platform that include examples of the MNaaS platform, the ZTMN, and the integrated edge compute platform that may operate within the security configuration of the ZTMN at 100. In embodiments, the MNaaS features may provide complete programmatic control of the network, enabling defense, sovereign, and municipal forces to rapidly create custom networks to test different applications and technologies with different requirements.

In embodiments, the platform may provide an ability to create highly customizable 5G mobile network instances (or tenants) per application similar to the virtual private cloud architecture of cloud platforms. A tenant may be very broadly based (e.g., a single tenant network for a global enterprise) or very narrowly focused on a single application (e.g., a custom mobile network for the smart warehousing application only).

In embodiments, the platform may provide an ability to separate a physical layer (radio network, spectrum, compute, storage, etc.) from the networks that consume physical layer resources and may dynamically modify them without affecting network operations. In embodiments, the platform may provide cloud-native implementation that provides scalability, better fault isolation, and efficient resource use resulting in a lower operational cost. In embodiments, the platform may provide an agile framework and make use of advanced development, security, and operations (DevSecOps) paradigms, which may be shown to result in a rapid innovation environment and faster delivery of features.

In embodiments, the platform may provide stateless services architecture and built-in georedundancy that may permit the respawning and replacement of failed services in a new infrastructure or a new location, which may be shown to result in higher availability of service.

In embodiments, the platform may provide flexible architecture that may allow for interoperability with 4G networks without compromising security to support scenarios that need backward compatibility. By way of these examples, the uncompromised security may shield applications and networks from various forms of espionage such as foreign country interception, man-in-the-middle, spoofing attacks, and the like.

In embodiments, the platform may provide a relatively future proof, cloud-based, platform with integrated security, privacy, and scalability. In embodiments, the platform may deploy a decoupled physical infrastructure from virtualized infrastructure that applications use.

In embodiments, the platform may separate control and data planes and may provide control of all aspects of the virtual infrastructure to the application, including supporting development and operations (DevOps) processes and functional capabilities. In embodiments, the platform may integrate security practices with development and operational practices (DevSecOps) to deliver secure new features within an agile framework.

In embodiments, each tenant network may be a ZTMN and each ZTMN may be an entire private 5G network with its own private 5G packet core, which may be shown to eliminate the security risks of multiple enterprises or multiple applications within an enterprise sharing a single control plane by reducing exposure of all networks to a single control plane exposure. In embodiments, zero trust security architecture may apply principles such as micro-segmentation of assets, least privilege access, encryption, analytics, and strong authentication for maximum security. This zero-trust architecture may drive the design and operations of the ZTMN. Beyond designing the ZTMN itself based on zero-trust policies, the ZTMN's architecture may also enable an enterprise to extend its own zero-trust security policies to each tenant network including an entire private version of the 5G packet core and all the mobile assets connected to it. In embodiments, this may allow the enterprise to have full visibility and control over the security of the mobile network. By way of these examples, the ZTMN may be designed to drastically minimize the impact of any security compromise. In embodiments, the ZTMN architecture deployed in the platform may extend and enhance the concepts of the MNaaS (Mobile Network-as-a-Service) features of the platform.

Secure Edge Computing Capabilities

In embodiments, the MNaaS features may allow customers to create an edge computing cloud, to connect the edge computing cloud to the data plane of the ZTMN, and to extend the ZTMN's security to protect the edge computing cloud as well.

In embodiments, the platform may provide the ability for its customers to have their own radios and radio area networks (RANs) installed in the coverage areas required to create a "virtual private mobile network" or "tenant" that may be highly customizable to the customers' needs.

In embodiments, the platform may provide a "public" platform offered as a service from a public cloud (e.g., AWS/Azure GovCloud, milCloud 2.0 or JEDI) as well as a "private" version for those customers (such as for sovereign or municipal forces) that may require more physical control over their infrastructure and would prefer to deploy the platform in their own private cloud or data center.

In embodiments, the platform may provide a network modeling interface with the ability to model, create, modify and tear-down "tenant" mobile networks, which may be deployed for example in one or more IoT applications in real time. In embodiments, the platform may provide access to methodologies used to create and manage one or more of the tenant networks on the physical infrastructure, similar to how virtual private clouds may be created on public clouds. In embodiments, the platform may provide each tenant mobile network with its own entire virtual network compatible with 3GPP 5G (or 4G if the customer desires) standards and its own private packet core and shared RAN infrastructure across a specified set of physical RANs that have been deployed for one or more of the customers.

By way of these examples, each tenant network may maintain its own private control and data planes, which may be shown to result in extraordinary control, privacy, data sovereignty and customizability for the application owner. As such, this architecture may be shown to have distinct advantages including the following: complete control over specification and customization of the infrastructure to an application's particular needs; an application's control of its own network as compared to centralized command and control; custom security profiles that may include differing classification levels and varying encryption algorithms; the ability to provide only cleared and vetted personnel with access to operate and administer the network; and a capacity for custom service level agreements. When compared with other standard 5G offerings, the MNaaS features of the platform may provide significant architectural, scalability, security, and operational benefits which are further detailed herein.

Applicant appreciates that standard 5G service-based architecture may provide statically created networks with predefined consumption of network resources and a single control plane with different shared data planes statically constructed per consumption type.

In embodiments, each application of the platform may have its own "tenant" mobile network with private control and data planes customized for each of the many needs of each application. In embodiments, modules of the platform may virtualize and supervise the entire physical infrastructure creating a fully orchestrated mobile network environment. In embodiments, platform mobile networks may be operated more akin to software objects, in turn, allowing them to become an orchestrated part of the application process. In embodiments, platform applications may integrate network creation with "infrastructure-as-code" DevOps scripts for full control and automation.

In embodiments, the platform may be purposefully configured to no longer be a "one size fits all" approach to network architecture. As such, control may shift from the telecom operator to the application owner. By way of example, physical resources may be conserved as development and testing phases are only created for the duration of test runs. Deployment may create versioned networks that may be "rolled back" with the application to the extent there are errors in production. As such, focus may be shifted to developing innovative applications that may take advantage of the flexibility the mobile networking provides, similar to some examples deployed in the public/hybrid cloud model.

In the evolution from legacy architecture, Applicant appreciates that OEMs are evolving their NSA core software to 5G while carrying forward legacy code and design flaws that are now being wrapped with SBA interfaces.

In embodiments, the platform may embrace a de novo development effort with no legacy code, which in many examples, may be based on modern Go language similar to Kubernetes. In doing so, the platform may eliminate legacy architecture and known security issues and may be developed with cloud-native scalability in mind from inception. Applicant appreciates that when 4G backward compatibility is required, current 3GPP deployments may bring legacy implementation issues and LTE security flaws with them.

Sandboxed LTE Interoperability

In embodiments, the platform may deploy and create standalone 5G and 4G tenants when 4G is required. By way of these examples, 4G tenants may interoperate with 5G tenants based on a secure, "home-routed" architecture. As such, the platform may deploy cleanly separated 5G security and, in doing so, the 4G tenants may run in their own and separate sandboxed environment.

Applicant appreciates that new 5G network functions may be created to be "cloud native" microservices. Some implementations may, however, use decades-old code and defeat the purpose of the cloud native concept.

Truly Cloud Native

In embodiments, every applicable component of the platform may be cloud native. In these examples, all code may be "born in the cloud" and in doing so, a microservice and may run in any public, private, or hybrid cloud environment. Moreover, cloud native horizontal scalability and the ability to "scale out" rather than scaling up may be shown to result in lower operational costs. In embodiments, the platform may also deploy with the ability to dynamically and instantaneously scale-out to maintain operations during times of peak demand. It is appreciated in light of the disclosure that scalability is built for web applications and legacy architectures that may be designed to scale to the millions of subscribers.

IoT Scale

Applicant appreciates that there is tremendous scalability for the world of connected devices, especially when deployed as completely stateless scale-out architecture. In these examples, each microservice may be started and stopped independently to scale up to incoming requests. In some examples, a no-SQL horizontally scalable database may be deployed.

The IoT further provides opportunities for clean horizontal scalability to handle traffic without bottlenecks and scalability limited only by the physical resource availability. In these examples, components including virtual versions thereof may be scaled out (e.g., add more of a component rather than replace with a larger component) as needs expand without affecting service availability.

Micro-Service Architecture Internal to 5G Core

In embodiments, the platform may be deployed with a 5G's microservices architecture intended as an internal scaling mechanism to benefit the telecom operator that is trying to optimize service.

Declarative Network Model

In embodiments, architecture of the platform may be configured to expose network services externally to application. In these examples, Applicant appreciates that applications and the support therefor may determine and drive network requirements and interfaces may be based on "declarative network models".

Applications, rather than central command and control infrastructure, may determine classification level controls security for each network. As such, model-driven paradigms may result in consistent network design and performance.

Applicant appreciates that some 5G focuses have been on consumers with static "services" created and sold to customers and more heavyweight service creation infrastructure. In this, there may be a "few" sizes fit all model of network services.

In embodiments, the platform may be deployed with no static "service definitions" and declarative models may drive custom tenant networks. These features may be meant for rapid integration with enterprise applications without the need for large typical infrastructure overhead from usual telecommunications players. These features may provide an ability to drive rapid innovation similar to a cloud business model; a lightweight and flexible architecture; and customized tenant networks able to be configured and scaled for every need. As such the customer, not the operator, may have full visibility and control of its own wireless infrastructure and security.

Network Slicing

Applicant appreciates that in many examples, network slicing may be the only customizable concept in 5G specifications. This customization may be deployed in service level agreements for either industry verticals or specific customers' needs and, in doing so, may be centrally provisioned and managed by telecom operators.

Private Networks

In embodiments, examples of private networks may support standards-based network slicing in conjunction with each tenant having access to its own customizable private network. Private tenant networks may behave similar to enterprise wide-area networks but may nevertheless be integrated with existing enterprise policies and provide: a flexible platform for innovation; superior customizability that exceeds features and controls of network slicing; no central command and control; and federated responsibility.

User Control Based on World Class Security

In embodiments, features of the platform may be focused on security commensurate with sovereign military applications and use cases in mind; separate control, data, and management planes per individual tenant network; security policies may be set on a per tenant basis with PKI and encryption algorithms that may be customized per tenant network (i.e., to allow NC3 networks where required, etc.); tenant mobile network may be managed, controlled, and secured using enterprise LAN/WAN policies with signed binaries; and open-source components may be updated to fix security holes.

Tenant-based private networks result in significantly higher levels of security that may be built into network architecture itself. Such networks may include distributed control of granular network security policies; and an ability to create separate networks for each application and each classification level for complete separation of traffic and management/security responsibilities.

Built-In Network Reliability

In embodiments, network architecture may be configured to re-spawn failed services in new infrastructure or location ensuring reliable service; to support georedundancy via CouchDB for stateless infrastructure reliability; to improve reliability built into the architecture itself to increase reliability with highly available applications; to avoid requiring overhead to engineer reliability as part of the deployment; to provide highly reliable individual tenant networks; and to provide faster innovation by freeing developers from reliability engineering.

Zero Trust Security Architecture

Applicant appreciates that a common control plane across all customers and networks may expose big security risks. In embodiments, zero-trust security architecture, which is currently recognized as the state-of-the-art in security principles, may drive the platform's ZTMN architecture. In this, separate control plane, user plane (may also be referred to as the "data plane" throughout the disclosure), and management plane per tenant may provide isolation. Each tenant network may be based on micro-segmentation (e.g., segmentation of control plane, user plane, and management plane), least privilege access, analytics and artificial intelligence, strong biometric, as well as hardware based authentication.

Customer Zero Trust Policies Extend to Protect the Mobile Network

Applicant appreciates that central command and control of common networks neither provides enterprise visibility of security, nor enterprise control over mobile network security. In embodiments, the platform may provide enterprise-wide visibility and control over tenant network's security. As such, customer's zero-trust policies may seamlessly extend to the mobile network. Customer data may be encrypted with customer owned keys. Mobile assets may be micro-segmented and enterprise perimeter security may be applied to the mobile network. The platform may deploy strong authentication and log integration with enterprise security information and event management. User plane functions may be protected by dynamically provisioned enterprise security policies and edge computing platforms that may connect to the user plane function may be within the enterprise security perimeter.

The platform may be configured to adhere to an enterprise security policy that the customer controls and enterprise security personnel may have visibility and control over tenant networks' security.

Minimized Impact of Security Compromise

Applicant appreciates that a break in security of the network operator may result in an entirely exposed network—including every customer, their subscriber data, meta-data and usage-data. In embodiments, the platform tenant architecture may be configured to isolate every tenant's exposure and to protect. Protection may be against user data exfiltration, attack propagation, and impersonation.

In embodiments, the platform may deliver enhancements to provide platform-oriented architecture for highly secure 5G networks and edge computing 5G environment that may enable tens of billions of devices that are always connected. As such, the convergence of traditional network design with cloud computing may require a new approach that may enable rapid advancement of the most advanced features of 5G technology.

In embodiments, the platform may incorporate two beneficial standards. First is a platform level enhancement that brings the virtual private clouds to mobile networks to provide MNaaS. Moreover, the secure mobile networks that customers may create on the MNaaS platform may all be a ZTMN, which provides the Zero Trust architecture for the platform.

In embodiments, the MNaaS features of the platform may be capable of providing the 5G zero trust mobile networks and edge computing platforms configured with on-demand per tenant networks. In examples, the MNaaS platform may be extended to provide a variety of additional services to meet future needs. Examples may be LTE networks that are capable of NB-IoT or LTE-M that may interoperate with the platform ZTMN for identity, authentication, secure data plane and policy control. Another example may be a mobile network with custom DoD Radio Access Technologies (RAT) rather than only LTE or 5G RATs. In these examples, the PaaS architecture of cloud platforms may be extended to add capabilities as the needs of the applications evolve. The platform ZTMN may apply the following core principles of zero trust network architecture to protect mobile networks: micro-segmentation of assets, network, segment users and machines that need access to each micro-segment; zero trust security policies that may enforce least-privilege access such that users have the minimal access required to perform their tasks; multi-factor authentication that may be shown to reduce authentication vulnerabilities and ensure there is always another method to permit a user to enter the network; continuous authentication, instead of "front door" security, which only checks the identity of the user at the time of first entry into the network; device security that may deploy agents on devices to control and monitor activities from each device connected to the network; encryption and data-loss prevention that may protect both data at rest and data in motion; and analytics and machine learning models that may monitor the network constantly and detect anomalies that could indicate security breaches.

Figure 2:
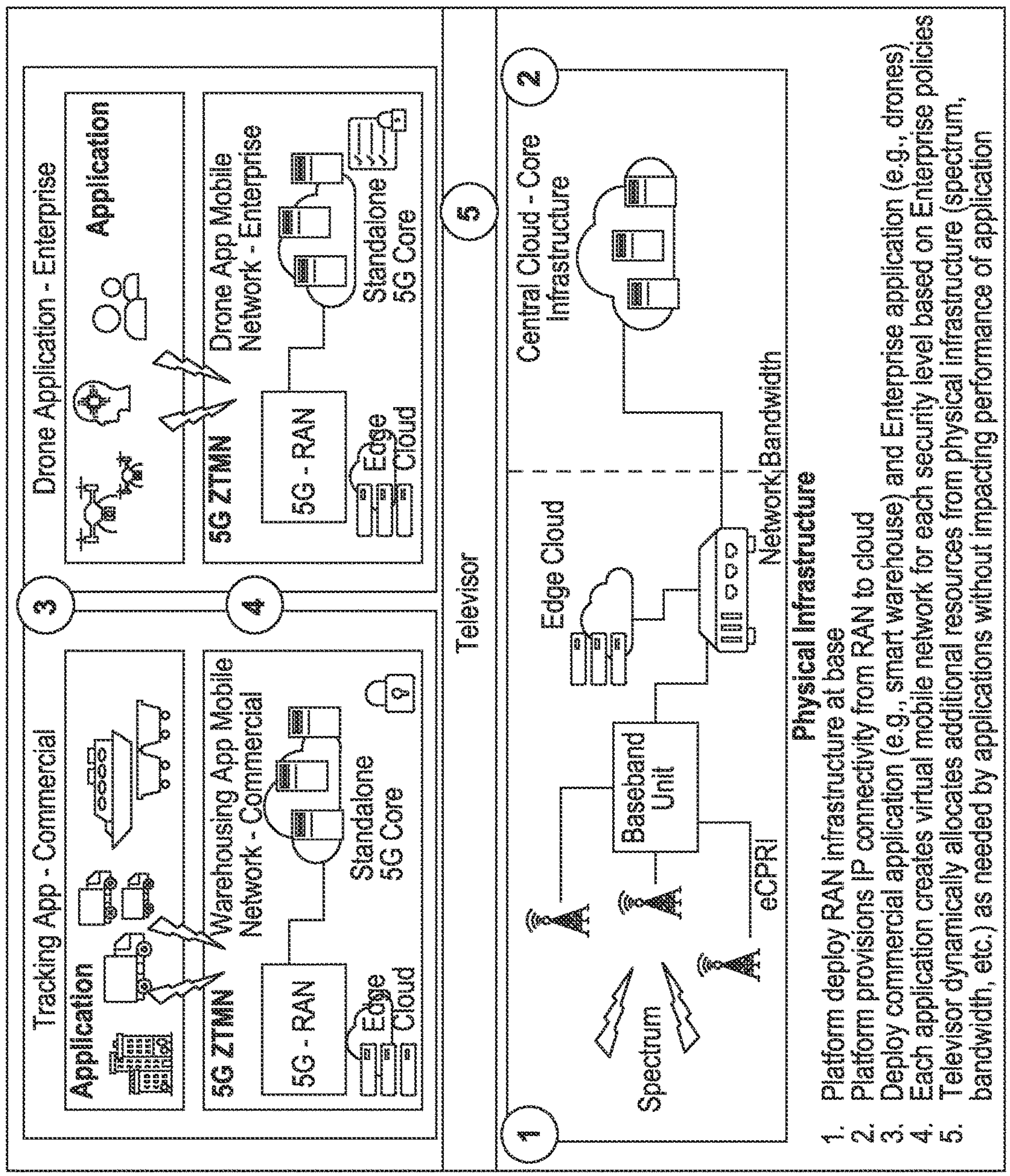

In embodiments, the MNaaS features may have a component that may decouple the physical layer (e.g., RAN, spectrum, servers, network, storage, etc.) from the networks that consume it virtualizing the physical layer of 5G networks (spectrum, RAN, compute, storage, networking, etc.). Examples of collections of such components and functionality may be included in the Televisor technology of the platform. The MNaaS feature may provide an ability to model zero trust mobile networks using a declarative paradigm and create these managed virtual mobile networks on the physical layer. In embodiments, applications may use the MNaaS features to create, manage and tear-down one or more zero trust mobile networks based on their own needs as shown in FIG. 2 at 200. As shown in FIG. 2, a physical infrastructure process may be implemented. This process may include a platform to deploy RAN infrastructure at a base, the platform may provision IP connectivity from RAN to cloud, a commercial application (e.g., smart warehouse) and enterprise application (e.g., drones) may be deployed, each application may create a virtual mobile network for each security level based on enterprise policies, and the platform including some Televisor functionality may dynamically allocate additional resources from physical infrastructure (spectrum, bandwidth, etc.) as needed by application without impacting performance of application.

In embodiments, each ZTMN that is created with the MNaaS features may be its own self-contained mobile network that may apply a variety of security enhancements. In examples, it may have its own dedicated Release 16 packet core or as needed (Release 15), its own user plane and management plane, along with a network configuration that integrates the mobile network into the enterprise's own wide-area network (WAN) architecture. Each ZTMN may use enterprise private IP addresses within a dedicated software-defined network, which, in turn, may connect it to the enterprise network and the enterprise's zero-trust network architecture.

In embodiments, the MNaaS features of the platform may also allow an application to model and provision its own edge cloud, connect it to the user plane of the tenant ZTMN, and wrap the edge cloud with the same security blanket that protects the ZTMN.

The following subsections provide exemplary technical detail of the architecture of the platform including physical infrastructure. This solution may enable multiple mobile networks aligned with each application's requirements, which in turn, may provide for testing and validation of a variety of applications.

Figure 3:
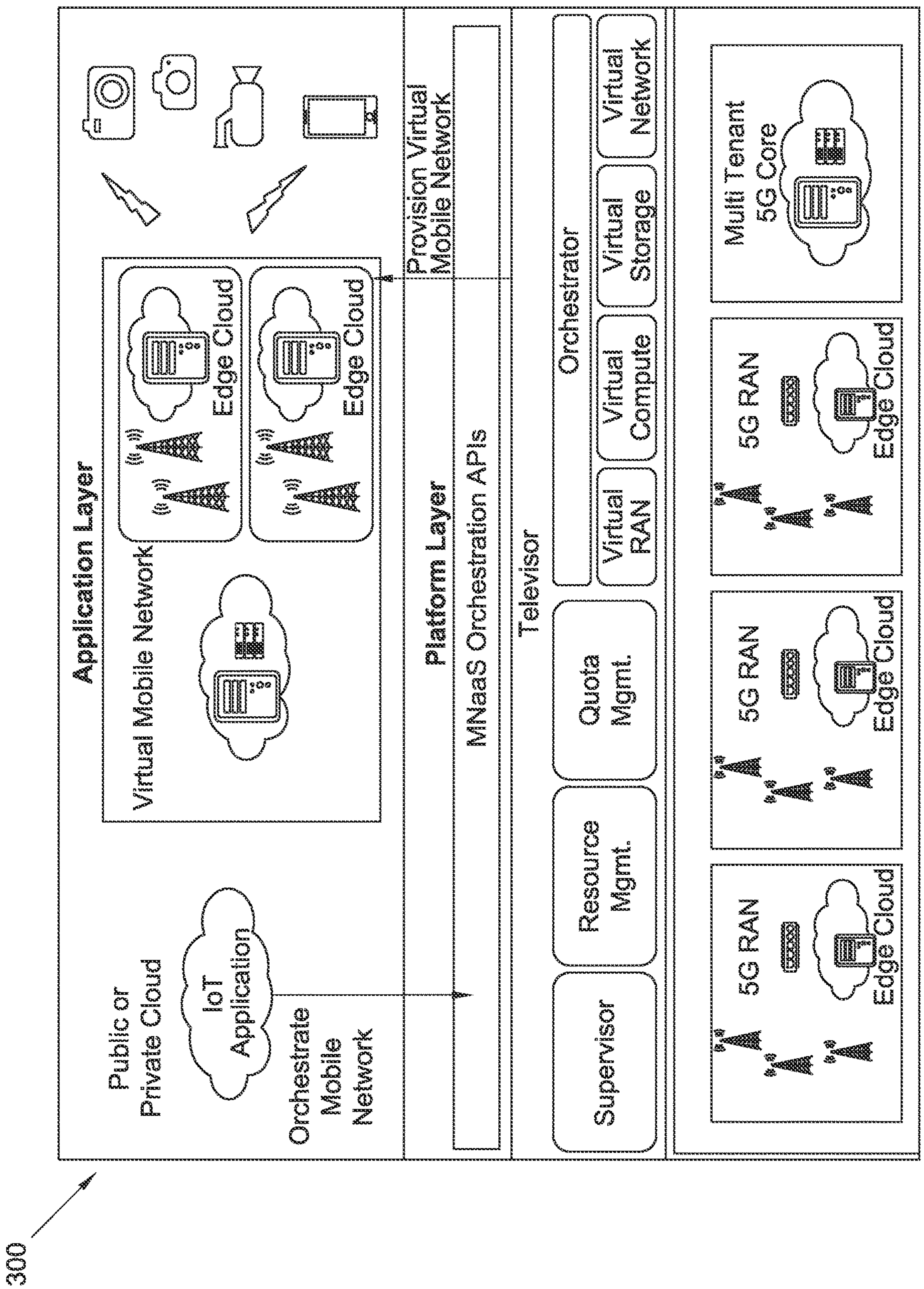

In embodiments, the architecture of the MNaaS platform may include the layers shown in FIG. 3 at 300.

Physical Layer Architecture

5G Radio Access Network (RAN) such that the 5G radio access network sites may be interconnected to an Edge Cloud. The 5G RANs and radios may be utilized as a part of these enhancements.

In embodiments, the platform may include an edge infrastructure that may use the servers for user-plane functions to accelerate user-plane internet protocol (IP) traffic, handle software defined networking (SDN) processing, and run components of the supervising function. In examples, such components and supervising functionality may be included in the Televisor technology of the platform.

In embodiments, the MNaaS infrastructure and the 5G cores per tenant network may be located in a public cloud (e.g., AWS Government Cloud, Joint Enterprise Defense Infrastructure), a private cloud (e.g., milCloud), or a private data center. Each of the 5G cores may be orchestrated in the cloud using Kubernetes technology. In many examples, more than one instance of the core may be instantiated per tenant across any cloud which may provide geo-redundancy and scalability.

In embodiments, the platform may include management and network operations (MANO) in that the management layer may be used to expand, contract, change, and monitor the physical layer. Components of the management layer may be distributed across all other elements of the physical layers (e.g., RAN, Core, Edge, etc.). In embodiments, an exemplary architecture that deploys the MNaaS features on the platform may include the layers shown in FIG. 3 at 300.

Platform Layer

In embodiments, applications on the platform may use a declarative model to specify customized network configurations. In examples, the platform may create the one or more "tenants" of the virtual mobile network on the physical infrastructures. In embodiments, the platform may include a software layer that may execute both in the core, as well as in the edge cloud. Functions of the software layer may include maintaining a complete inventory of physical and virtual resources; providing orchestration functionality for all virtual mobile networks; creating the virtual infrastructure layer during the formation of a tenant and installing an instance of a private 5G core with complete customizability and control plane separation; providing lifecycle management for each tenant; and providing management and monitoring functionality for the platform layer and all the virtual networks and instantiated services.

Application Programming Interface (API) and Management Layer

In embodiments, the platform may include an API layer that provides network orchestration capability based on a declarative model as well as RESTFUL APIs for managing tenant networks. The platform may include a UI-driven management layer for platform and physical layers as well as tenant networks. In embodiments, the platform may include an access for API and management layers that are multi-layered in order to support varying levels of access control.

In embodiments, the MNaaS platform features and benefits are detailed herein and the platform may deliver the MNaaS and ZTMN features to enable many different advanced applications.

In embodiments, the MNaaS features of the platform may provide an ability to create customized mobile networks per application and allow for isolation of physical infrastructure from mobile networks that are consumed by applications. The features of the platform may also provide distributed control of network configuration; self-reliance within each application instead of centralized command and control; and shorter time to launch new applications.

In embodiments, the platform may include declarative model driven provisioning and lifecycle management that may automate network lifecycle; integrate with DevOps and DevSecOps processes; avoid the need to write code for automation; avoid human error; lower total cost of ownership with faster time to deployment; and easier to automate.

In embodiments, the platform may include cloud native modern architecture for scalability, reliability, and geo-redundancy that may provide ease of resource management; an ability to scale up/down quickly to meet customer demands; little need to manage hardware lifecycle; and georedundancy economically and quickly.

In embodiments, the platform may be docker container-based and provide portability, performance, agility, isolation, faster deployment and open source architecture, which results in platform independency; efficient use of resources; and self-contained applications for fast and easy deployment.

In embodiments, the platform may include Kubernetes microservices that may be arranged as a loosely coupled system that is highly maintainable and testable; independently scalable; better fault isolation; open source; and configure to reduce services interdependency. The microservices may be easy to maintain and test individual service while allowing scaling up/down different services independently.

In embodiments, the platform may include modern programming languages, such as Golang which may reduce language complexity; provide native concurrency support and be compiled to native code and not a Java virtual machine. As such these languages may provide a smaller footprint, increased programming efficiency, the ability to execute faster, and use less memory.

In embodiments, the platform may include Stateless Network Functions (NFs) that provide separation of logic and data, so that failed functions may restart anywhere for service continuity. The performance of the stateless NFs may be scaled linearly and may provide session-less load balancing and relatively easy to implement fault tolerance.

In embodiments, the platform may include a Non-SQL database that may be scalable horizontally or vertically with dynamic schema and open source architecture that makes use of Restful APIs. In embodiments, the use of the non-SQL database makes changing the data model relatively inexpensive and provides tamper proof binary distribution to secure data in transit.

The following subsections provide the technical detail of the ZTMN architecture in which these three design principles may be shown to make the ZTMN extremely secure: zero trust policies drive the design of the ZTMN; the customers' own zero trust policies are extended to protect the mobile network; and minimize the impact of compromise.

Zero Trust Mobile Network Designed Based on Zero Trust Architectural Principles Micro-Segmentation In embodiments, the ZTMN may be run and managed on a per tenant basis and include several microservices so the platform may use specific technologies to drastically reduce attack surfaces. By way of these examples, the network control, data, and management planes may be segmented and isolated from each other with distinct authentication and privilege boundaries.

Figure 4:
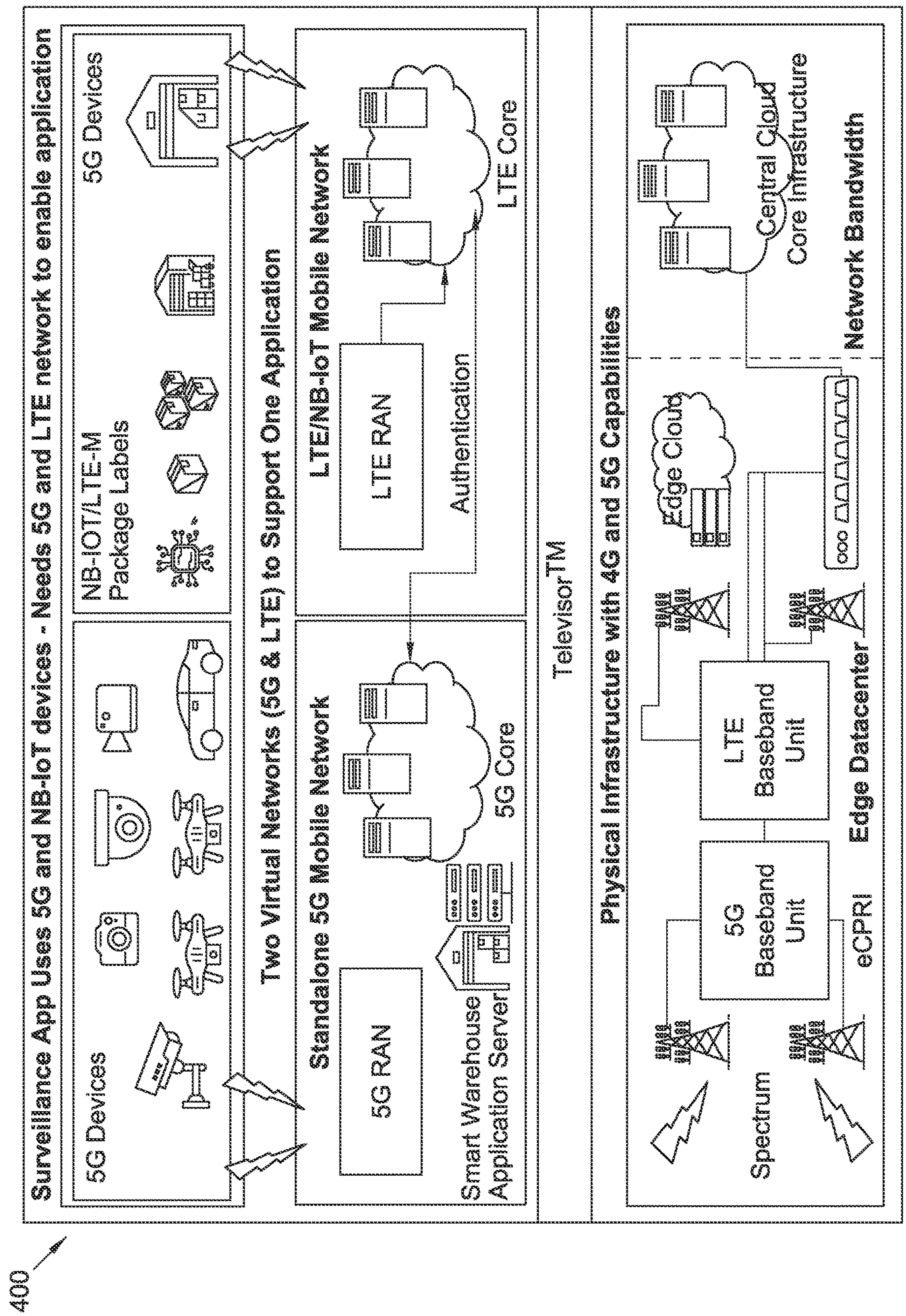

To the extent a customer application needs to access LTE devices (such as NB-IoT or LTE/M devices), the MNaaS features of the platform may permit the application to run a separate tenant network in order to minimize exposure to the 5G network given LTE's inherent vulnerabilities. By way of these examples, an LTE core may be run and set up a home-routing policy between the LTE core and 5G packet core that may ensure isolation of the less secure LTE network while unifying the identity and policy functions in the 5G core that have superior security features. In embodiments, examples of the architecture of such a deployment are shown in FIG. 4 at 400.

In embodiments, the platform provides improved security by providing separate tenant networks for LTE and 5G with home-routing against 5G core.

Zero Trust Policies

In embodiments, all authorized operators that manage a tenant may be given specific access based on zero trust policies. In embodiments, an operator is not given blanket access to the network management systems but solely access to their manageable micro-segmented tenant. In embodiments, the platform's management and orchestration operate at two levels. One is at the infrastructure level and is fully administered by the platform and the other runs at the tenant level with APIs and systems that provide enterprise level control.

Infrastructure Security

In embodiments, each system that connects with another system may be issued a PKI certificate or the like. Before any system connects to another system, its identity may be verified. All control traffic between every network function within ZTMN may be encrypted using, for example, AES-256 or a customer swappable algorithm. PKI administration may be provided as part of ZTMN and the Certificate Authority services component (i.e., the certificate generation) may be provided via a commercial contractual agreement and methodology with the platform's certificate authority partner.

SDN Security

In embodiments, data forwarding statistics may be applied to short supervisory transition events, retransmits, resets, reroutes, etc. In these examples, pattern recognition algorithms and artificial intelligence may then be used to detect network anomalies. If an anomaly is detected, the application may instruct the software defined networking (SDN) controller on how to reprogram the data plane to mitigate the anomaly.

Microservice Security

Using 3GPP architecture, all network functions may be defined as microservices without complete control of the definition of how these microservices may be implemented. In many implementations of these microservices, Docker containers may be used. 3GPP does not require isolation between microservices that serve multiple customers and some or all microservices in a typical 5G network may often share the same virtual machines. If the virtual machine, microservice or shared datastore between microservices may be compromised, then Applicant appreciates that there may be potential to expose the kernel level or kernel level data which then could expose all other microservices hosted within the same kernel.

In embodiments, the platform's ZTMN architecture may isolate microservices that serve various mobile networks. In embodiments, virtual machines may be spawned on a per tenant basis and control data traffic that is not only isolated at a container level (which is less secure) but also at the virtual machine level for a higher level of security.

Encryption and Data Ownership

In embodiments, all data in motion may be encrypted using AES-256 or similar levels of protection within the network. In examples, encryption algorithms may be swapped out for customer defined algorithms. In embodiments, all data at rest—including subscriber databases (UDR) and call logs—may be encrypted using customer owned keys. In these examples, the network operators of the platform may not have access to these keys. As such, the data in these systems may only be read and interpreted by network functions and management software that have been granted access to the data. This, in turn, may provide an extremely high level of data security and sovereignty to the customer.

Sandboxed Systems

In embodiments, each server or all servers may run in a behavior monitored sandbox. In these examples, the behavior being monitored includes various trackable and knowable attributes of user and device interactions with the network and core, including data flows, applications, and services. In embodiments, sandboxes may either be containers or virtual machines, and the behavior of each system may be modeled and monitored. By way of these examples, any anomalous behavior may either alert the administrator or isolate the sandbox from the rest of the system based on the severity of the incident. As such, each anomaly may be triaged and fixed to ensure a fix is consistently and atomically provided across all systems that might have the vulnerability.

Strong Authentication Management Network

In embodiments, the ZTMN may deploy a risk-based multi-factor authentication mechanism where an artificial intelligence system may monitor the access pattern of users and may calculate the risk of user activity based on platform parameters such as system logs, location, IP, and address. By way of these examples, unusual or high-risk activities may immediately trigger a stronger authentication request of a different factor to confirm the identity of the user. As such, the system may continually learn and adapt to changing behavior and vulnerability profiles.

Roaming Protection

In embodiments, the ZTMN architecture may allow for mobile assets from a ZTMN to roam onto other carriers' networks. While a mobile asset is roaming on another network, it may still be protected with all the security control as configured and provided in its home ZTMN, without compromising the latency requirements of a 5G network. By way of these examples, the user plane may be instantiated under the control of the enterprise using its network and using its security profile.

Extend Customer's Zero Trust Policies to Protect the Mobile Network

Applicant appreciates that virtual private clouds in public clouds allow enterprises to protect their assets in the public cloud using enterprise-controlled software defined perimeters and zero trust policies. The enterprise may either deploy their own security software inside the VPC and control and monitor data that leaves and enters the VPC, or may alternately use a set of security services that are available to consume from the public cloud provider to achieve a similar result.

Dynamic Provisioning of Security Perimeter Around UPF

In embodiments, the platform's ZTMN architecture may allow enterprises to define and operate their software defined perimeter including elements such as advanced firewalls, intrusion prevention and detection systems, secure socket layer offload, data loss prevention, etc., around each tenant of the zero trust mobile network, and to dynamically adjust the security perimeter to encapsulate where mobile devices connect to the enterprise to ensure their protection. By way of these examples, the software defined perimeter may be dynamically provisioned around the user plane functions to protect them from any attack from public networks to which they are connected, as well as the operator network.

Log Integration with Enterprise SIEM

In embodiments, the platform may expose its logs for all relevant functions of the ZTMN, as well as logs for all the user equipment activities to the enterprise, through its API layer. By way of these examples, these logs may be imported into the enterprise security information and event management system for integration with the analytics for the zero-trust mobile network.

Strong Device Authentication

In embodiments, the ZTMN may allow devices with an embedded-SIM (eSIM) or embedded universal integrated circuit card (eUICC), to be provisioned or reprogrammed as needed to add or modify restrictions or permissions. This may be important for enterprise applications that involve machine to machine (M2M) or IoT applications in order to minimize the use of physical SIM cards while being shown to improve reliability and security.

Apart from strong device identity authentication, enterprises may also deploy a secondary enterprise-controlled authentication and authorization that may be administered and verified against the enterprise's own identity and access management systems. These systems, for example, may be a secondary biometric authentication enforced to connect to the network or may be any other multi-factor authentication form, followed by an authorization to connect to the network. For connected devices where biometric authentication may not be a possibility, the ZTMN may provide a mechanism by which a trusted platform module (TPM) may be integrated into a client device and the TPM may be used to do secondary authentication as well as software validity verification.

Minimize Impact of Compromise

To the extent security is compromised, Applicant appreciates that typical activities of attackers are the exfiltration of critical data, modification of critical data to change the behavior of the systems, the spreading of vulnerabilities across systems, and performing activities assuming others' identities. In the rare occurrence that an attacker is able to penetrate the ZTMN's minimized attack surfaces, of the present disclosure, the platform may be configured to limit any potential damage as a result of the compromise. By way of these examples, the platform may protect against Data Exfiltration in that data inside the platform may be stored in a way that makes data exfiltration very difficult. All data (e.g., control, user, metadata, service data, etc.) may belong to a tenant network and may be encrypted using keys delivered by a customer controlled key management server.

Figure 5:
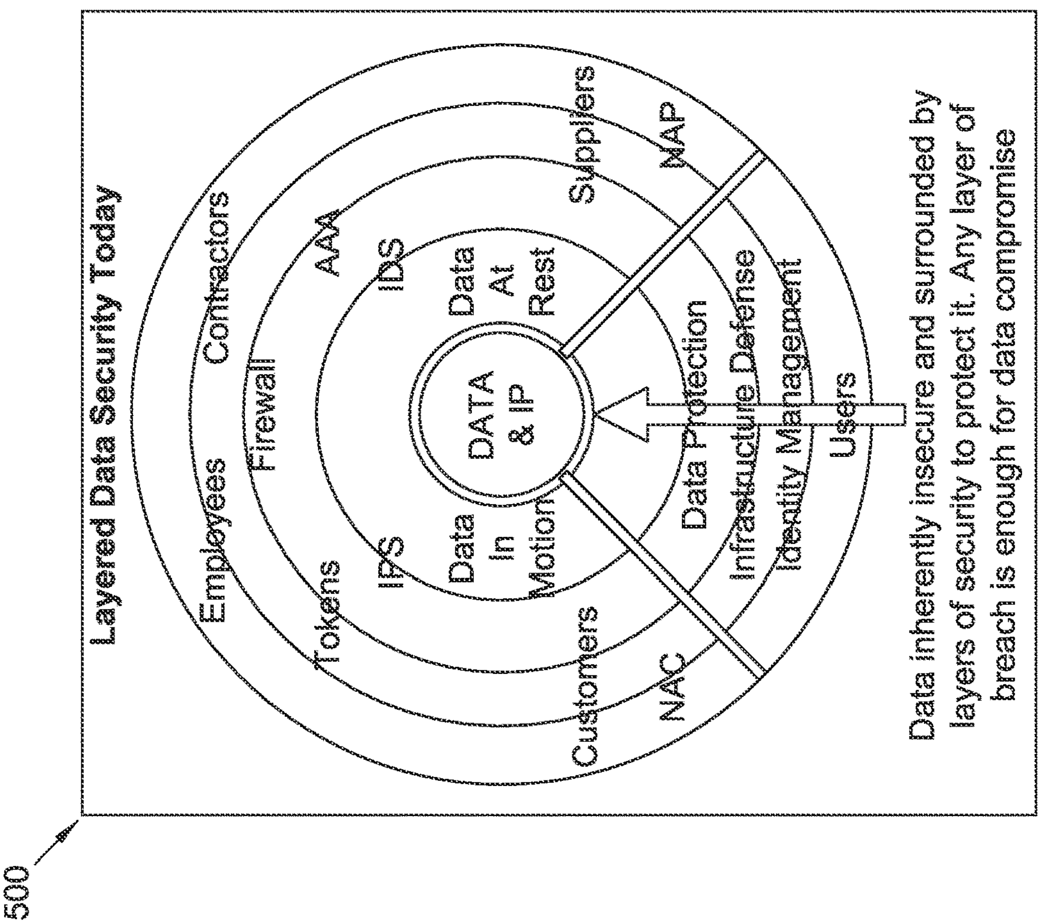
FIG. 5 is a prior art diagrammatic view of a data structure depicting typical data layers.

Some typical layered data security specifically data structure as typical data layers is shown in FIG. 5 at 500. Data is inherently insecure and surrounded by layers of security to protect it. Any layer of breach is enough for data compromise.

Figure 6:
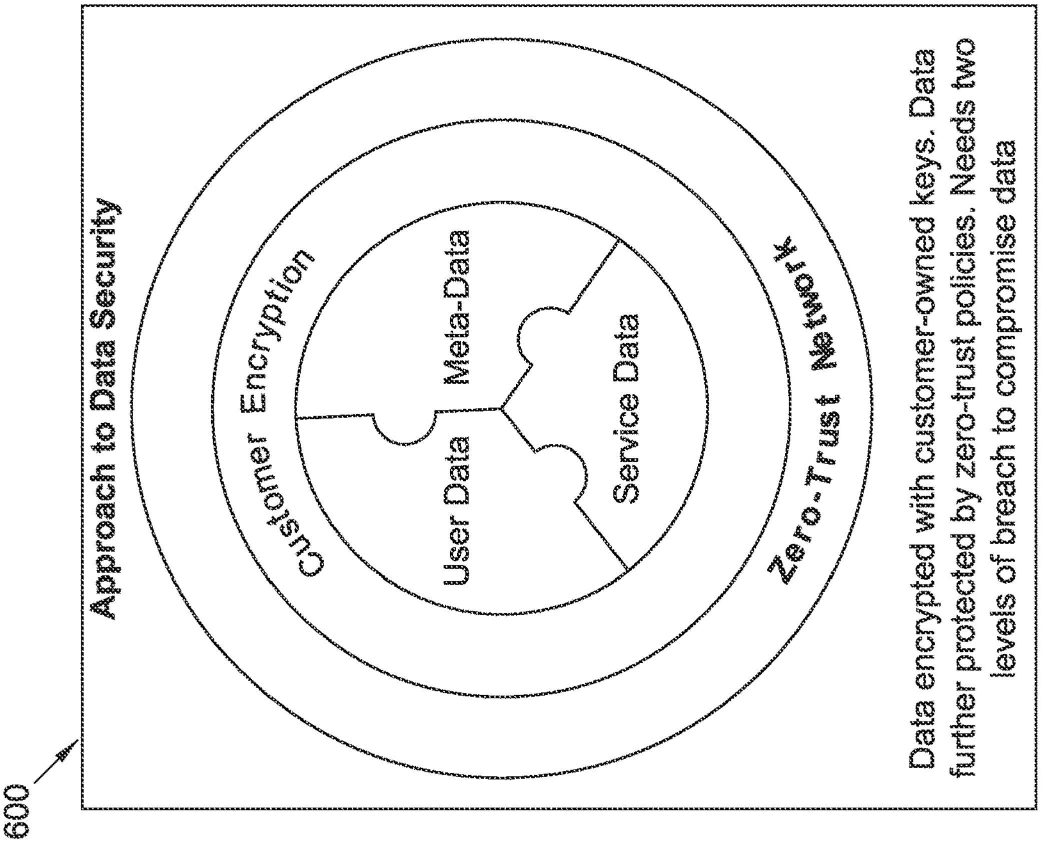
FIG. 6 is a diagrammatic view of a data structure having layers of policy-based key delivery that may ensure that the requisite keys to decrypt the data are delivered only to authorized systems or users in accordance with one or more example implementations of the present disclosure.

In embodiments, the key management server may employ another layer of policy-based key delivery that may ensure that the requisite keys to decrypt the data may be delivered only to authorized systems or users (e.g., as shown in FIG. 6 at 600). Data may be encrypted with customer-owned keys. As shown in FIG. 6 at 600, data may be protected by zero-trust policies which may need two levels of breach to compromise data. In the case of systems that access this data such as the core 5G system accessing HSS data, the identity of the requesting system may be verified using certificates. In the case of users accessing data, risk based multi-factor authentication may be used to verify the identity of the user. Without these identification and authentication systems, exfiltrating data alone may result in encrypted data that will not be usable.

In embodiments, data may be encrypted with customer owned keys and also protected by zero trust policies.

Protect Against Network Data Exfiltration

To the extent an attacker gets access to the network, Applicant appreciates that such attacker may seek to exfiltrate customer network data (e.g., data in motion). In embodiments, all user plane data transported on the platform may be encrypted to prevent the exfiltration of data in motion.

Protect Against Attack Propagation

To protect against the propagation of malware inside the network, smart sandboxes may be used across the platform. In embodiments, all assets may be deployed in smart sandboxes and may be monitored for unusual connection patterns and any software propagation between nodes. If such an activity is detected, the errant server may be immediately quarantined, and a fresh server may be restarted. An administrator may then immediately be alerted to triage and correct the issue.

Protect Against Impersonation

Applicant appreciates that another common tactic of a compromise may be impersonation. In embodiments, the strong user and device authentication employed for network administrators on the platform and the devices and users that connect to the platform tenant networks may be protected against impersonation of users and devices.

The feature benefits of the ZTMN may include security enhancements and the following features as described in following disclosure.

Micro-Segmentation

In embodiments, the platform may be configured to isolate subsystems for security, and reduced attack surface exposure. By way of these examples, customer data, metadata and logs encrypted using customer keys, and data encryption at the tenant level may use customer-owned keys that provide the customer with control. In addition, there may be no exposure of data to network operators or carrier networks; an ability to verify metadata sources, central control of key management by the customer enhances security, and threshold behavior for data exposure and vulnerabilities; compromised carrier network security that may be configured to not expose customer data; one or more mechanisms to avoid metadata injection vulnerabilities; and exfiltrated data may be further protected due to use of customer encryption keys.

Zero Trust Policies

These policies may improve access security for operations and data while reducing privileges and amplifying security.

Trust Verification and Encryption Between Network Functions

In embodiments, all communication between network functions on the platform may be trust verified using customer-controlled CA-issued certificates and data in motion may be encrypted. By way of these examples, these functions may be shown to avoid "man in the middle" attacks and data exposure due to network interception.

DNSSEC Instead of DNS

In embodiments, domain name system security extensions (DNSSEC) may be more secure than regular domain name system (DNS), which has several issues such as cache poisoning or registrar hijacking providing better security and avoiding man-in-the-middle attacks.

SDN Security at the Tenant Network Level

In embodiments, software defined networking (SDN) security may be configured according to the needs of the individual tenant application. Multiple levels of security classification may be supportable, e.g., NC3 mobile networks may be customized to use special encryption algorithms. By way of these examples, automation of network security configurations may be shown to reduce human error and lower operating costs.

In embodiments, AI-monitored sandboxes may be used for each microservice and process and each microservice and all call processing may be monitored using machine learning models that baseline behavior and look for anomalies. As such, the platform may be shown to provide better security that detects and flags anomalies and dynamic quarantining that may allow for better forensics to understand the root cause of potential compromises.

Continuous Risk Based Multi-Factor Authentication

In embodiments, the platform may provide access to network administration and control only after multi-factor authentication. By way of these examples, continuous authentication may assure zero trust security enforcement and artificial intelligence may detect high risk behavior while improving authentication, authorization, and accounting (AAA) posture and security.

Phishing, the most common method for compromising password, may be neutralized.

Secure Roaming Architecture

The ZTMN may support a secure roaming architecture using a home routing approach that may not be affected by visited network security compromises.

Log Integration with Enterprise SIEM

In embodiments, the platform may provide an ability to integrate network logs into enterprise SIEM results in a global view of security for the enterprise which may result in a more secure network as mobile events may be correlated with network events to get a better view of potential compromises and attacks.

Organization-Controlled Security Configuration for the UPF and Mobile Network

The MNaaS features of the platform permit provisioning user plane functions dynamically near the radio area network to which user equipment may connect. By way of these examples, these user plane functions may be provisioned by an organization-controlled security perimeter and may be an extension of an organization's zero trust policies to the mobile network. In embodiments, user plane may always run in a private IP address owned by the organization, traversing organization NAT and security perimeter before connecting to the Internet. By way of these examples, the data plane may never be exposed to external networks. In embodiments, the platform provides an ability to run mobile network devices within enterprise security perimeter while providing Uniform security profile for enterprise mobile users.

Customer Provisioned Firewall for the UPF

In embodiments, the platform provides superior protection over traditional firewalls as SSL offload may decrypt data for deeper malware inspection in attachments. SSL offload may allow for data loss prevention deployment. These features may be shown to provide a reduced possibility of malware; reduced possibility of network penetration; and reduced possibility of data exfiltration.

API-Driven Automated Provisioning Framework

In embodiments, applications that need mobile networks may provision these frameworks directly on demand. As such, human intervention may be required in provisioning. By way of these examples, automated provisioning may reduce the number of people that need administrator access to the mobile network thus reducing security, exposure, and errors.

Strong Device Authentication

In embodiments, the platform may require smartphones be forced to go through a biometric authentication or be MFA-provisioned in enterprise authentication, authorization, and accounting for better security control.

Enterprise Controlled Pre-Provisioned Passwords Secure IoT Devices for Added Security In embodiments, the platform may use pre-provisioned passwords to offer alternatives to SIM-based authentication controlled by carriers. By way of these examples, the platform may have the ability to use enterprise-controlled authentication methods.

In embodiments, the platform may be a standalone, cloud native solution that may be compatible with 3GPP standards and may be built on commercial off-the-shelf (COTS) hardware and open source software platforms. The baseline core network may be a 3GPP Release 16.0 and the PKI features may be based on commercial solutions for classified (CSfC) standards. All cloud, edge server systems may follow the Kubernetes architecture and APIs. The gNR radio units may be from COTS suppliers that support 5G standalone architecture and interfaces.

Potential End Item Applications for Proposed New Technologies

In embodiments, enhancements to the 5G network may enable enterprises to automatically provision and deploy customized highly secure networks based on application requirements and test and deploy next generation applications that require ultra-low latency and reliability (ULLR) and high bandwidth. Examples of such end-user applications are detailed below.

Applicant appreciates that multiple applications of various security requirements may need 5G network coverage in a base. By way of these examples, training applications that may use fixed location full motion video cameras as well as drones that capture videos may require high bandwidth and an edge network for storing videos locally. Further examples may include tracking applications that need to track the location of personnel; low bandwidth applications with no edge compute needs; immersive simulation application that uses AR/VR and may need high bandwidth; and edge storage and compute capabilities.

In embodiments, the platform may share physical infrastructure in the base across all three applications without sacrificing security or service level of each application. By way of these examples, each application may create a distinct tenant network for itself that limits coverage to specific areas in the base according to the needs of each application. Moreover, access to each network may be provisioned as appropriate. For the training and simulation applications, the platform may specify high bandwidth allocation and local edge compute infrastructure access in its IP configuration. For tracking applications, the platform may specify low bandwidth needs and no IP access to edge compute infrastructure.

Network Isolation Per Application

In embodiments, the platform may be deployed with customized network policies that may distribute control to people with the most knowledge of needs and operations. The platform may have a low total cost of ownership due to shared infrastructure and, in examples, RAN access may be limited to coverage area per tenant network.

Performance Improvements and Metrics

In embodiments, the core network of the platform may support system scaling up to millions of busy hour call attempts (BHCA). The platform systems may be based on Kubernetes server clusters and all functions may be relocatable to a cloud architecture for scaling. Platform metrics may include: processor load and Erlang as a function of CPU load; signaling load, SIP, SMS, and MMS processing as a function of CPU load; user plane load as a function of CPU load; user data management as a function of CPU load (e.g., for read/write throughput rates); cloud-RAN scalability, load per BTS on the Access and Mobility management Functions (AMF) as a function of CPU load; and Management and Orchestration (MANO) load as a function of CPU load.

There are additional metrics related specifically to the ZTMN security enhancements as detailed herein.

ZTMN Provisioning and Misconfiguration Events

In embodiments, the ZTMN includes management, applications and SIEM support to reduce cross-site scripting (XSS) events and cross-site request forgery (CSRF) events. The platform may also be configured to reduce vulnerabilities due to malicious applications events; missing access control events; insecure object reference events; remote code execution; server-side request forgery events; data exfil prevention; authentication and authorization events; data privacy, protection, and meta-data vulnerabilities events; and redirects and forwards events.

User Data Repository & Management

In embodiments, the platform may reduce sensitive data exposure events.

Device Impersonation

In embodiments, the platform may reduce multi factor authentication events; secondary authentication events; and 3GPP authentication and key agreement events.

Availability Attacks

In embodiments, the platform may reduce Geo redundancy.

In embodiments, the platform may provide a Mobile Network as a Service (MNaaS)-based platform built to the nuclear command, control and communications (NC3) security requirements of various defense customers. In embodiments, the flexible cloud-based architecture may integrate seamlessly with any number of public or private cloud deployments, radio technologies, and other wireless operators' infrastructure. The platform may provide customers with the ability to plan and deploy radios and antennas that meet their coverage and quickly create secure, powerful, and scalable 5G networks activated via one-click provisioning. In embodiments, the platform may handle any number of customers using its auto-scaling feature and may dramatically lower the barriers to entry for managing and deploying secure networks for critical communications.

Enhancements

In embodiments, the platform may provide its ZTMN architecture that also may support enterprise trust options, enterprise security transparency, and extensive options for virtual private cloud and multi-tenancy operations. In embodiments, the platform may use a DevSecOps development approach and continue to upgrade the core with additional feature enhancements. Some such enhancements may include: low earth orbit (LEO) based backhaul to provide redundancy and remote connectivity; reconfigurable FPGA based accelerator cards into all servers to support; hardware-based security and application acceleration capability directly into the network; physical security overall non-deterministic computing platforms; tamper resistance where necessary to preclude system breaches; two-person control of critical network functions to preclude insider threats; personnel reliability program to ensure network operators are functioning at peak reliability; extreme vetting to ensure employees are of the highest caliber; behavior analysis across the network to monitor for insider threats; counter-intelligence program to ensure all elements of the supply chain are verifiably secure; system redundancy to a combat standard; and EMP hardening.

In embodiments, the 5G telecommunication network and computing platform may provide 5G radio network based on C-RAN architecture and integrated fronthaul. In embodiments, the platform may provide integrated connectivity to the 5G backbone either using wired, fixed wireless, or a LEO based backhaul. In embodiments, the platform may provide an edge computing cloud that supports a variety of architectures such as containers and edge architectures supported by all public clouds. In embodiments, the platform may provide connectivity to one or more data centers of one or more customers or users through one or more virtual clouds or any of the public clouds over a secure, encrypted software-defined networking (SDN) layer. In embodiments, the platform may provide an encrypted storage platform that may be secured using a customer key server. In embodiments, the platform may provide a rapid provisioning infrastructure that may bring up the entire micro-datacenter by securely authenticating itself and connecting one or more edge devices to the 5G telecommunication network and computing platform of the present disclosure.

In embodiments, the 5G telecommunication network and computing platform may provide a dynamic spectrum management (DSM) system for spectrum harvesting through allocation and aggregation of contiguous and non-contiguous licensed, unlicensed, and shared spectrum bands. In embodiments, the platform may be configured to provide one or more kits to facilitate on the fly delivery of secured and dedicated 5G features of the platform integrated into one composite solution with automatic remote provisioning.

In embodiments, the 5G telecommunication network and computing platform may be configured to minimize the attack surface of the platform by employing one or more of the following.

Segment Systems by Purpose

In embodiments, the 5G telecommunication network and computing platform may be purposefully segmented into management plane systems, network plane systems, operational systems, and IT systems. By way of these examples, each system may be isolated with distinct authentication and privilege boundaries. In the event a system is compromised, the risk may be contained to that system and unable to spread to others.

Uniform Architecture

In embodiments, the 5G telecommunication network and computing platform may include a uniform, dedicated and secure architecture for managing and administering users, servers, endpoints, and software for all segmented systems.

Smart Sandboxes

In embodiments, the 5G telecommunication network and computing platform may deploy managed "smart" sandboxes in that each server may run in a behavior-monitored sandbox. In embodiments, the behavior-monitored sandboxes may function as containers or virtual machines and the behavior of each sandbox may be modeled using machine learning techniques for abnormal behavior. By way of these examples, any unusual behavior may also be monitored so an alert may be sent to the administrator, or the like. In embodiments, the detection of the unusual behavior may trigger the platform to isolate the sandbox from the rest of the platform based on the severity of the incident. By way of these examples, anomalies may be triaged, repaired, and the fix may be applied across all potentially vulnerable systems.

In embodiments, the platform may be configured to offer a standalone 5G networking and computing platform with greatly reduced attackable surfaces and end-to-end security. The platform may deploy secure standalone architecture 5G networks for defense, government and commercial customers where security and reliability are of paramount importance. The platform may be configured for deployment nationwide and into other segments with a significant focus on connectivity for rural communities and bolstering secure equipment surrounding military bases. As discussed herein, the compute platform may be shown to solve the security vulnerabilities inherent in many network and computing architecture by building security into the network itself.

In embodiments, the platform may be configured with standalone 5G architecture providing an end-to-end secure standalone (SA) 5G network optimized for critical next generation applications that includes, in embodiments, a standalone radio access network, hybrid transport networks, a 5G mobile core, and various edge computing sites.

In embodiments, the platform may be configured with integrated network, cloud and edge by providing a secure distributed edge network with integrated RAN, cloud and LEO backhaul with the customer experience that includes a perception of seamless provisioning. These systems and methods may enable next generation low latency applications and with the ability to set up a 5G network on the fly for remote operations.

In embodiments, the platform may be configured with minimized attack surfaces in that systems and networks may be segmented by purpose into management plane systems, network plane systems, operational systems, and IT systems. Each system may be isolated with distinct authentication and privilege boundaries and may be protected by smart sandboxing technology, secure DNS and encrypted I/O.

In embodiments, the platform may be configured with pervasive security at every level by deploying context based, multi-factor security protocols powered by artificial intelligence and machine learning for threat protection and detection. In further examples, electro-magnetic pulse (EMP) shields may be used to protect cell sites. Moreover, built in redundancy and resiliency may be deployed for all elements in the network including redundant backhaul links via LEO satellites.

In embodiments, the platform may be configured with minimized impact of compromises by employing data protection paradigms where data may be separated from its broader application context and all stored data may be distributed in a parametrized fashion with multi-level encryption.

In embodiments, the platform may be configured with improved data governance paradigms having an approach to data governance with focus on driving actionable insights for the military and the end users. In many examples, the platform may deploy a policy not to monetize data or share it with any third parties. In many examples, the platform may deploy complete autonomy for the user and control of their data including default opt out policies, automatic clearance of data tracking, and privacy-controlled containers.

In embodiments, the platform is configured with secure devices to enhance security for existing devices and end points through proactive initiatives such as virtualization, feature hardening, forced updates, and vendor limitations. By way of these examples, a variety of fully secure devices such as smartphones and wearables may be deployed with cloud-based code, centralized updates, registration, and limited on-device storage.

In embodiments, the platform may be configured with secure supply chain features that permit engagement with trusted entities to create a powerful and widespread ecosystem of 5G technology.

In embodiments, the 5G telecommunication network and computing platform may be configured to provide pervasive security at every level by employing one or more of the following.

User Security

In embodiments, the 5G telecommunication network and computing platform may employ context-based security and identity management for all users such as employees, administrators, subscribers, and the like. In embodiments, the platform may provide a risk-based multi-factor authentication mechanism where an artificially intelligent (AI) system may monitor the access pattern of users and calculates the risk of his or her activity based on parameters such as system logs, location, IP, and address. By way of these examples, unusual or high-risk activities may immediately trigger a stronger authentication request of a different factor to confirm the identity of the user. In embodiments, the 5G telecommunication network and computing platform may continually learn and adapt to changing behavior and vulnerability profiles. In embodiments, the platform may protect user identities based on a layered approach to establish a root of trust. By way of these examples, the first layer of protection may be to specify an anti-tamper mechanism for all subscribers. In many examples, standards such as Common Criteria or FIPS 140-2 may be adopted. In embodiments, the second layer of protection may be configured to protect subscriber identity. In embodiments, subscribers may be identified using eSim devices. In embodiments, the platform may require context-based identity management, which includes a substantial data pool, use of graph databases, and an extension of the cloud.

Infrastructure Security

In embodiments, the 5G telecommunication network and computing platform may provide infrastructure security in that all servers related to the platform may deploy standard security measures such as encrypted disks and images, locked BIOS, and the like. In embodiments, many systems of the platform may be deployed in and may run inside of the smart sandboxes in which behavior may be monitored. In embodiments, the platform may first deploy software changes to servers that may be verified in a shadow system and signed by certificates issued by the platform before any server will accept software and patches. In embodiments, the platform may include a constellation of servers that may exclusively connect to other trusted servers with certified credentials.

Network Security

In embodiments, the 5G telecommunication network and computing platform may deploy improved network security in that all segments of the platform may be protected using a standard network security infrastructure such as next-generation firewalls, intrusion detection, and prevention systems. In embodiments, the platform may deploy advanced security systems that may utilize unsupervised learning with advanced network traffic analysis that may be used to protect the networks of the platform.

Application Protection

In embodiments, the 5G telecommunication network and computing platform may provide application protection in that all applications—including vendor applications and internally created applications—may be deployed in the managed "smart" sandboxes whose behavior may be monitored by the platform. The managed sandboxes may model the behavior of each application server and detect anomalies. In embodiments, identified open source components and software of the platform may undergo separate security validation and certification and may do so in the managed sandboxes. In embodiments, all applications may be recompiled using secure versions of the open-source software.

Premises Protection

In embodiments, the 5G telecommunication network and computing platform may deploy premises protection in data centers and employee locations associated with the platform and may employ strict security protocols, such as facial recognition, biometric, and other next-generation identity management solutions.

Advanced Threat Detection and Response

In embodiments, the 5G telecommunication network and computing platform may include an AI/ML-based advanced threat detection and automated response system that may monitor activity across users, infrastructure, networks, and applications. By way of these examples, potential threats may be triaged, and automatic responses may trigger learned responses to contain and manage the threats.

Minimize Impact of Compromises

In the event an attacker penetrates the platform, the platform may be configured to limit the damage and to protect the network, system, and data integrity against the following vulnerabilities.

User Data Exfiltration

In embodiments, the 5G telecommunication network and computing platform may protect against user data exfiltration in that the platform may be configured with all disks in being encrypted, and where feasible, stored data may be split into multiple components and encrypted with a different key. By way of these examples, the key management server may employ a policy-based key delivery system that may ensure that requisite keys decrypt only the data delivered to authorized systems or users. Without authentication, exfiltrating data may result in unusable encrypted data.

Network Data Exfiltration

In embodiments, the 5G telecommunication network and computing platform may protect against network data exfiltration in that the platform may be configured so that all data passing through the platform may be seamlessly encrypted at the ingress of the network and decrypted at the egress-node of the network. In many examples, automatic virtual private network (VPN) tunnels may be established. For examples where there is traffic detected between two securitized devices, an end-to-end VPN tunnel may be set between these devices to route data as well as voice traffic. For examples where there is traffic between a securitized device and another device, the securitized device may establish a VPN between itself and the furthest network node that data traverses on the platform before it enters a network not associated with the platform. For examples where there is traffic between a securitized device and a server endpoint associated with the platform, a VPN tunnel may be established between them to secure the network traffic. For examples where there is traffic between a securitized device and another server that is associated with the platform, an optional VPN software may be made available to anyone. By way of this example, the VPN software (or portions thereof) may be downloaded and installed on any server. If this is done, the securitized device may detect the presence of such a VPN endpoint and may automatically create a VPN tunnel between them.

Attack Propagation

In embodiments, the 5G telecommunication network and computing platform may be configured to minimize attack propagation by using the managed "smart" sandboxes across the platform to protect against propagation and malware by monitoring unusual connection patterns and transactional behavior between nodes. When an activity is detected, the errant server, for example, may be immediately quarantined and a new server restarts. By way of these examples, an administrator may be immediately alerted to triage and fix the problem.

Impersonation

In embodiments, the 5G telecommunication network and computing platform may be configured to reduce the efficacy of impersonation by implementing contextual and biometrics based multi-factor user authentication for both users and employees associated with the platform rendering impersonation near impossible.

In embodiments, the 5G telecommunication network and computing platform may deploy data governance methods and systems knowing that user data today may constantly be collected by multiple entities and at various levels.

In embodiments, the 5G telecommunication network and computing platform may employ approaches to data governance through the protection of user data by retaining positions on the security and visibility of user data that may be stored within or associated with the platform as well as the protection, prioritization, and autonomy of personal and behavioral user data. In these examples, a distributed data management approach may enable data insight, availability, and protection; providing many users the capability to maintain full control of both information and infrastructure as it modernizes and transforms IT environments. When data is made visible, agencies may determine who owns the data, who has access to the data and classify the data according to its value and risk. Policies directed to accessing the data may be assigned and enforced for user authorization, access time requirements, retention, and disposal to comply with security and governance requirements Governance of User Data Stored In embodiments, the 5G telecommunication network and computing platform may deploy governance of stored user data in that the platform may store various information about users on its servers for fundamental network utilization. By way of these examples, this data may reflect general information about the user such as demographic information, information on multiple devices and networks the user accesses on the platform from, connection, location and communication (voice, text, and data) history of the user, connection duration, and volume.

In embodiments, user data associated with the platform may be stored and used only to validate network usage by the user for billing and user experience purposes. In embodiments, the platform may provide a portal for the user to inspect the data that is stored about the user on the platform and may allow the user to request deletion of such data beyond what may be mandated to be saved by the platform for billing and operational purposes.

In embodiments, all of the access to user data by people or representatives associated with the platform may be conditional and governed by robust access control and governance mechanisms. In many examples, all Personally Identifiable Information (PII) may be encrypted and stored and may be masked before it leaves the platform.

Enterprise Governance and User Autonomy

In embodiments, the 5G telecommunication network and computing platform may be deployed with enterprise governance and user autonomy when sharing user data such as critical components of user data that may include application data, site data, and location data, among other data sources.

In embodiments, the platform may be configured to allow users to control how data may be used by doing two things: (i) raise awareness of what information may be collected by source and provide mechanisms for users to become more engaged in managing or restricting data collection; and (ii) provide mechanisms by which users may limit the degree to which information may be shared with websites, applications, and the like.

User Control of Data Sharing

Modern data collection activities by digital services may be challenging to limit because the utilization of services happens over networks related and may not be related to the platform. With that said, the platform may require immediate and long-term measures that help to manage the inherent risk involved with data sharing.

Default Opt-Out

In embodiments, the 5G telecommunication network and computing platform may provide one immediate measure in that data flow between non-Google Android manufacturers and smartphones may be blocked unless the user opts-in. Only OS updates may be allowed to be downloaded by the smartphone.

Automatic Clearance of Data Tracking

In embodiments, the 5G telecommunication network and computing platform may provide a longer term measure in that a browser application may provide the ability for users to manage cookies and data sharing permissions for digital services. For data not permitted, the platform may automatically clear any data tracked for that user. In embodiments, the platform may deploy machine learning methodologies to provide meaningful insights to the user for informed data-sharing management.

Privacy-Controlled Container

In embodiments, the 5G telecommunication network and computing platform may be configured with a privacy-controlled container on top of the base smartphone OS to run services and applications. In these examples, this container may mask user data from websites to preserve site functionality while ensuring user privacy.

Privacy Advocacy

In embodiments, the 5G telecommunication network and computing platform may identify and provide social and legislative opportunities for users to promote cyber privacy and informed data-sharing initiatives.

In embodiments, the 5G telecommunication network and computing platform may be configured to provide device security with a series of steps to enhance device security, including augmenting security on existing Android devices and also deploying devices dedicated to the platform with enhanced security features.

Enhancing Security on Existing Android Devices

Virtualization

In embodiments, the 5G telecommunication network and computing platform may enhance security on existing Android devices by virtualizing core features, such as telephony and messaging, and running these applications in a Type 1 Hypervisor with its own Real-Time Operating System (RTOS). Security on the platform devices may further be enhanced by limiting the Android operating system's ability to extract or monitor such applications. By extension, this may significantly limit the number of attack surfaces available.

Feature Hardening

In embodiments, the 5G telecommunication network and computing platform may provide feature hardening knowing that on average, each Android release may contain between 2,500-3,000 changes within Android from the kernel and BSP updates to completely new APIs with some amount of virgin code inserted into the system that may be untested and unhardened. In embodiments, the platform may facilitate extending the existing Android test frameworks with a customer test suite so that penetration testing vulnerabilities may be identified early and addressed before a new device may launch.

Forced Updates

In embodiments, the 5G telecommunication network and computing platform may be deployed with policy to establish forced updates to ensure that devices remain current and security patches may be applied within a minimal window such as within 24 hours. In these examples, a forced update policy may reduce user prompts that may delay or prevent critical security updates.

Vendor Limitations

In embodiments, the 5G telecommunication network and computing platform may be deployed with vendor limitations such as restricting Google's ability to off-load data from the device related to the platform to ensure that no sensitive information may be inadvertently shared to a third party. By way of these examples, multiple approaches may be implemented with the platform to restrict this capability from deep pack inspection, to Radio Interface Layer (RIL) stack modification, to removing specific functionality or applications, and the like.

In embodiments, the 5G telecommunication network and computing platform may include end-point devices such as mobile phones and wearables. In embodiments, the platform may provide a standalone secure 5G network that may provide a dedicated, real-time, network slice allowing the platform to host large parts of the OS into a safe cloud environment.

In embodiments, the 5G telecommunication network and computing platform may be related to and work with a secure end-point device that may run on basic RTOS with minimal functionality. In embodiments, the end-point device may incorporate predictive artificial intelligence that may be configured to learn and anticipate user behavior to manage and prioritize network requirements and OS functionality. In embodiments, the end-point device may provide several of the following advantages.

Cloud-Based Code

In embodiments, the 5G telecommunication network and computing platform may be configured to minimize the software running directly on hardware without network interaction to reduce the number of attack vectors that hackers may seek and exploit. In embodiments, entities that supply the platform related devices may minimize the need to invest in long-term development and validation of functionality. If a feature is ultimately required, it may be implemented when called upon by the user.

Centralized Updates

In embodiments, the 5G telecommunication network and computing platform may provide centralized updates so updates made to the core cloud-based OS components may be made instantly available to all devices unlike current mobile devices where it may often take four to six months for core OS updates and security patches to be applied by users.

Device Registration

In embodiments, the 5G telecommunication network and computing platform may be related to devices that may be registered to the respective network slice providing the opportunity for verification to occur each time the slice may be accessed to prevent compromised network access.

Limited Device Storage

In embodiments, the 5G telecommunication network and computing platform may be configured so that if the device is lost or compromised, the amount of information contained on it and its utility to another person would be minimal.

Reduced Development Demands

In embodiments, the 5G telecommunication network and computing platform may be configured so that the demand for hardware and software development may be significantly reduced with OS components managed in the cloud. By way of these examples, new device development may uncouple hardware capability development from software, which may, in turn, allow the software to be inherently responsive to hardware features and functionality. Such platform related devices may enable a faster time to market for new hardware, which may maximize efficacy in maintaining the overall end-to-end security of a network. In embodiments, platform-related devices may be smartphones and wearable technologies including fully automated wearable devices with a noticeably low degree of manual involvement, and the like. In embodiments, the wearable electronic devices may track day-to-day fitness, activity, calorie consumption, sleep quality, heart rate, various vital parameters, and the like to provide insight into the overall wellbeing of the user. These devices may use non-invasive biosensors, such as the following: optical, motion (e.g., accelerometer, gyroscope, and magnetometer), electro-dermal activity sensors, body hydration, heart rate, and the like.

In embodiments, the 5G telecommunication network and computing platform and related devices may be configured to be connected to various communication layers of the platform making the data collected readily accessible from remote nodes in the network. In embodiments, this data integration may permit the inclusion of emerging biosensors to provide an increasingly comprehensive assessment of overall wellbeing. Emerging physiological biosensors may include blood glucose, blood pressure, blood oxygen saturation, and the like.

In embodiments, many examples may include military use cases. Military personnel experience significant physical and mental stress daily, often under extreme environmental conditions, with a high risk of injury. By way of these examples, the platform may be configured with a compressive view of both individuals and the larger units to a troop may better equip leadership with information to address overall health proactively.

Architecture Overview

Figure 7:
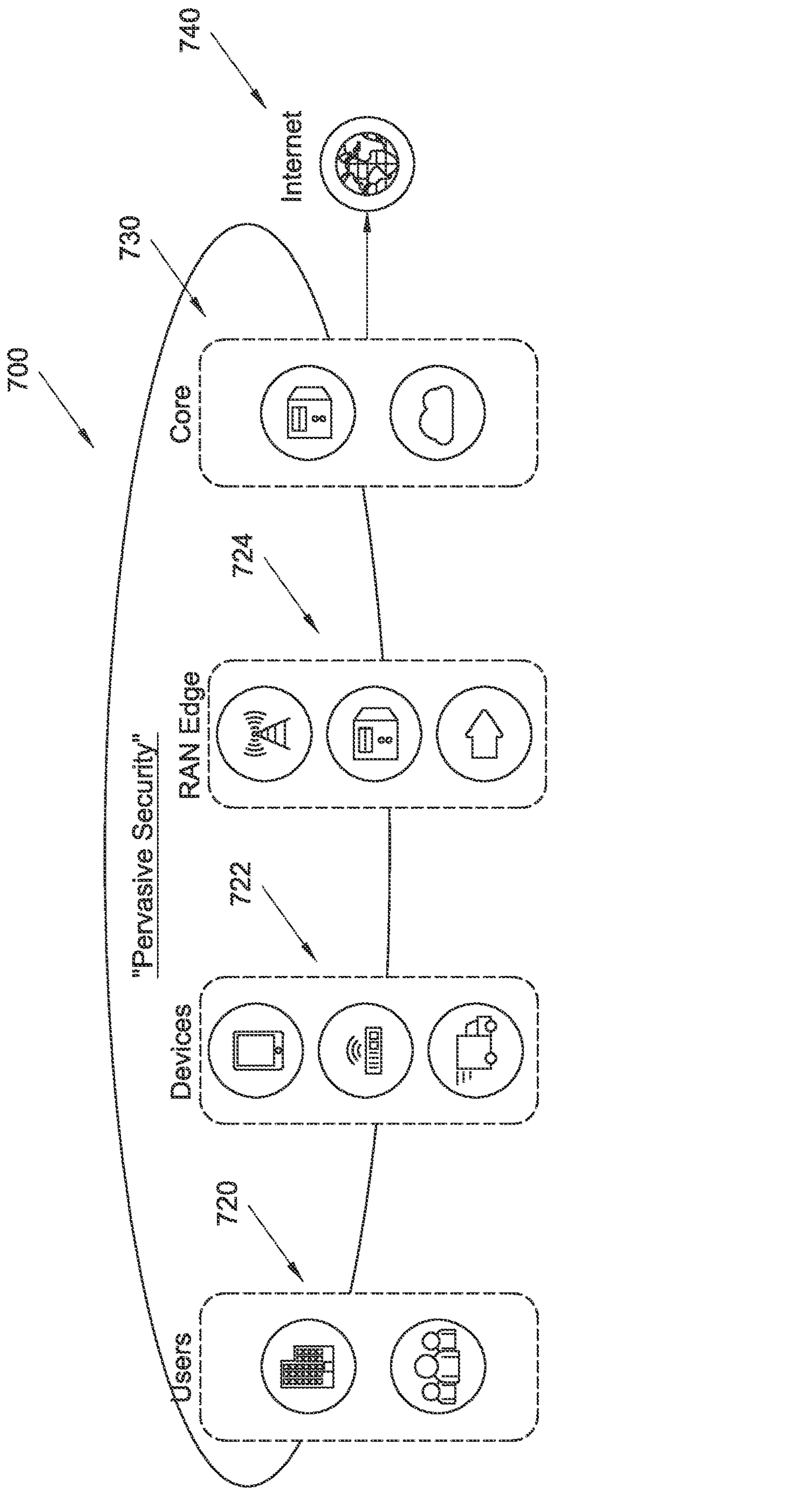
FIG. 7 is a diagrammatic view depicting further examples of a standalone and secured fifth generation technology (5G) architecture of a network and computing platform in accordance with one or more example implementations of the present disclosure.

In embodiments, the 5G telecommunication network and computing platform deploys a standalone 5G architecture to provide secure, dedicated, and end-to-end communications and computing. In embodiments, the platform as depicted in FIG. 7 may deploy pervasive security across all of its constituents as shown at 700. For its users at 720, the platform may deploy multi-factor, context-aware authentication including biometrics. For platform devices at 722, the platform may deploy endpoint network isolation technology with secure user elements monitored by an expert system managed by artificial intelligence modules. For the radio access network deployed by the platform at 724, the platform may deploy protected automated secure tamper proof sites that may be protected by electromagnetic pulses, and similar forms of attack. At 724, the platform may also deploy defense grade micro data centers with integrated and centralized or cloud-based radio access networks (C-RAN). At 724, the platform may also deploy ultra-low latency encrypted transport for fronthaul and backhaul. For the one or more cores of the platform at 730, the platform may deploy a virtualization environment with security-first encrypted designs, secure virtual network functions, highly secure cloud platform architectures, secure converged network services orchestration, and the like. As needed, the platform may access various internet destinations that are outside of the platform at 740.

Figure 8:
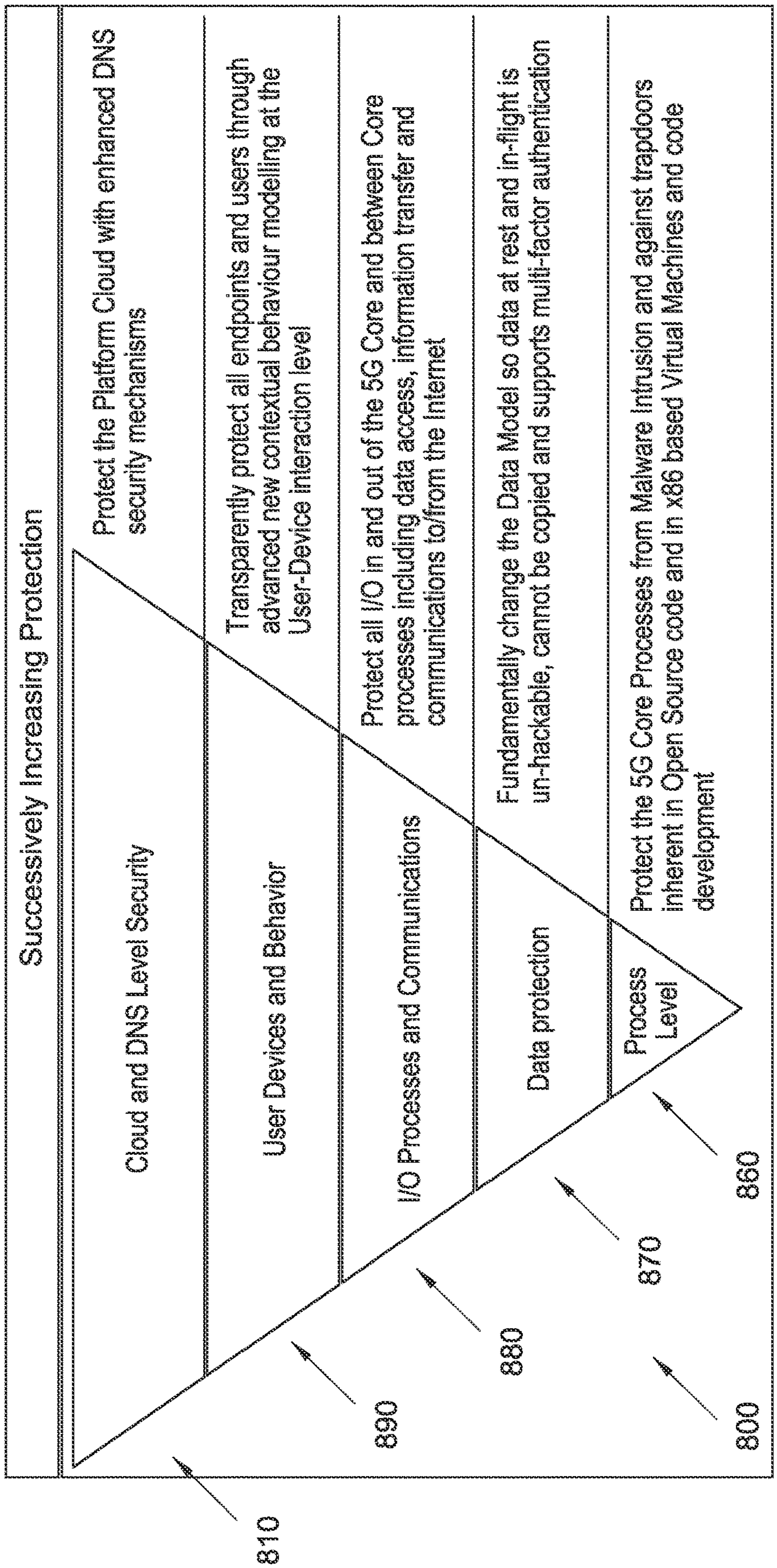
FIG. 8 is a diagrammatic view depicting further examples of successively increasing levels of data protection employed on the platform in accordance with one or more example implementations of the present disclosure.

In embodiments, the 5G telecommunication network and computing platform may deploy layers of protection throughout the platform as depicted in FIG. 8 at 800. In embodiments, the platform may deploy process level protection, at 860, from which the platform may build and layer protection. By way of these examples, process level protection at 860 may be deployed by the platform and may include sandboxing. By way of these examples, the platform may be configured to protect key processes with enhanced sandboxing that may operate below the virtual machine level to protect against virtual machine attacks and vulnerabilities in the operating system itself. In embodiments, the process level protection of the platform may also include containers that may ensure that key processes may be isolated and may be made immune to spoofing, malware intrusion, data exfiltration, and the like. In embodiments, the process level protection of the platform may also include behavior monitoring of key processes to ensure that they comply with expected ranges of processor load, input/output access, call model flows, and the like. In embodiments, the process level protection of the platform may also include data recording upon detecting an attack such that the platform may record and report the attack information. In embodiments, the process level protection of the platform may also include clean slate reset after isolating an intrusion and recording it. In doing so, the platform may be configured to wipe out the intruding or malicious process and returning the "clean slate," which may be a predetermined original state.

In embodiments, the 5G telecommunication network and computing platform may deploy layers of protection throughout the platform as depicted in FIG. 8 at 800. In embodiments, the platform may deploy a data protection level of protection, at 870, from which the platform may continue to build and layer protection. By way of these examples, the data protection level at 870 may be deployed by the platform to protect against exfiltration, malware, and the like. In embodiments, the data protection level at 870 may include data model protection that may dictate separate data, metadata and service function data both logically and physically. In doing so, the requirement for separate data, metadata and service function data, both logically and physically, may affect data structures at compile time and data access at run-time. In embodiments, the data protection level at 870 may also include data distribution protection in that data, metadata and function data may be kept distributed (i.e., multiple stores and multiple clouds) and may be kept in a chaotic state (i.e., encrypted) at rest. In embodiments, the data protection level at 870 may also include data access protection in that hardened data object storage hardware technology and access software technology may not be based on x86 hardware or processors may be used concurrently to access the data, the metadata and function data in real-time.

In embodiments, the 5G telecommunication network and computing platform may deploy layers of protection throughout the platform as depicted in FIG. 8 at 800. In embodiments, the platform may deploy an I/O processes and communication level of protection, at 880, from which the platform may continue to build and layer protection. By way of these examples, the I/O processes and communication level of protection at 880 may be deployed by the platform to ensure that all 5G core network packet layers and radio access network (RAN) communications may be protected against attack, copying or spoofing with the Internet, the RAN and one or more cores. In embodiments, the I/O processes and communication level of protection at 880 may include hardened I/O hardware and technology that may not be based on x86 hardware, operating systems or software to eliminate current known file-less, file based, polymorphic and other malware attack vectors. In embodiments, the I/O processes and communication level of protection at 880 may include encryption/decryption algorithms with the ability to add class six and seven key technologies including quantum keys to protect against unauthorized access. In embodiments, the I/O processes and communication level of protection at 880 may include link level optical communications with quantum level technology to secure long distance links over fiber between the RAN and the one or more cores for backhaul between the cores of the platform and Internet destination outside the platform, or between the cores of the platform and edge network devices also associated with the platform. By way of these examples, any attempt to "listen" to the link causes the channel to die. In embodiments, the I/O processes and communication level of protection at 880 may include micro data centers and all cloud extensions through the micro data centers of the platform may use the new link level protections and secure I/O protections.

In embodiments, the 5G telecommunication network and computing platform may deploy layers of protection throughout the platform as depicted in FIG. 8 at 890. In embodiments, the platform may deploy protection for user devices and behavior, at 890, from which the platform may continue to build and layer protection. By way of these examples, the protection for user devices and behavior at 890 may be deployed by the platform to ensure that all users of the platform may be unaware of the protection that is in place to improve the prevention of any endpoint attacks and vulnerabilities with little impact to current device hardware or firmware performance. In embodiments, the protection for user devices and behavior at 890 may include an automatic virtual private network in which all users and their devices are automatically protected by a virtual private network (VPN) without additional steps by user when placing a call, sending a message, receiving or sending data, or the like when two users are connected on the platform. In embodiments, the protection for user devices and behavior at 890 may include behavior monitoring in that all users on the platform (and outside the platform but connecting to it) may be assessed via endpoint and "man in the middle" behavior systems to ensure that individual call models may be following their prescribed behavior. By way of these examples, any anomalous behavior may be trapped, and the endpoint may be reset.

In embodiments, the protection for user devices and behavior at 890 may include network isolation using endpoint isolation software and methodologies to ensure users may not impact the one or more cores of the platform and the network as a whole with any malware upload.

In embodiments, the 5G telecommunication network and computing platform may deploy layers of protection throughout the platform as depicted in FIG. 8 at 810. In embodiments, the platform may deploy cloud and domain name system (DNS) level security, at 810, from which the platform may continue to build and layer protection. By way of these examples, the cloud and DNS level security at 810 may be deployed by the platform to ensure that all user and device level communication may be protected at the signaling and control plane level and the data and user plane level with the cores of the platform. In embodiments, the cloud and DNS level security at 810 may include deployment of a secure domain in that the cloud in which the platform resides may be a secure domain cloud ensuring that all sub-domain, client side devices and websites, signaling requests and requests for service may be structurally cleared by the one or more cores of the platform at the top level DNS to ensure signaling may not be spoofed or altered, which may be more prevalent when routing requests over other networks. In embodiments, the cloud and DNS level security at 810 may include a session border controller. In these examples, the platform may maintain its own session border controller (SBC) as part of a secure Domain with/without a top level domain to ensure that the platform has control over which Internet federations the platform may support and to ensure all bilateral communications links may be subject to behavior modeling as described herein. In embodiments, the cloud and DNS level security at 890 may include behavior modeling in that users on the platform and those off the platform but connecting to it may be assessed via "man in the middle" behavior systems to ensure that individual call models may follow their prescribed behavior. In these examples, any anomalous behavior may be trapped, the communication may be cleared, and the Auto-VPN may be terminated.

In embodiments, the 5G telecommunication network and computing platform may deploy layers of SIP security protection to ensure that all communications may be protected at the signaling and control plane. In embodiments, the SIP may include deployment of enhanced protocols to assure that SIP resolvers and proxies have not been compromised by rogue serving networks or by rogue SIP resolvers by maintaining a list of trusted and secure proxies for SIP resolution, maintaining gray and black lists of proxies under suspicion or outright quarantine to protect against rogue proxies, using "call-back" techniques to mitigate against gray listed and black listed proxies, performing origination authentication using trusted proxies and routes, etc. In embodiments the enhanced SIP security protocols may be maintained as part of the SBC, part of secure domain, part of a top-level domain, or part of the Session Mgmt. functions within the Core Network.

Figure 9:
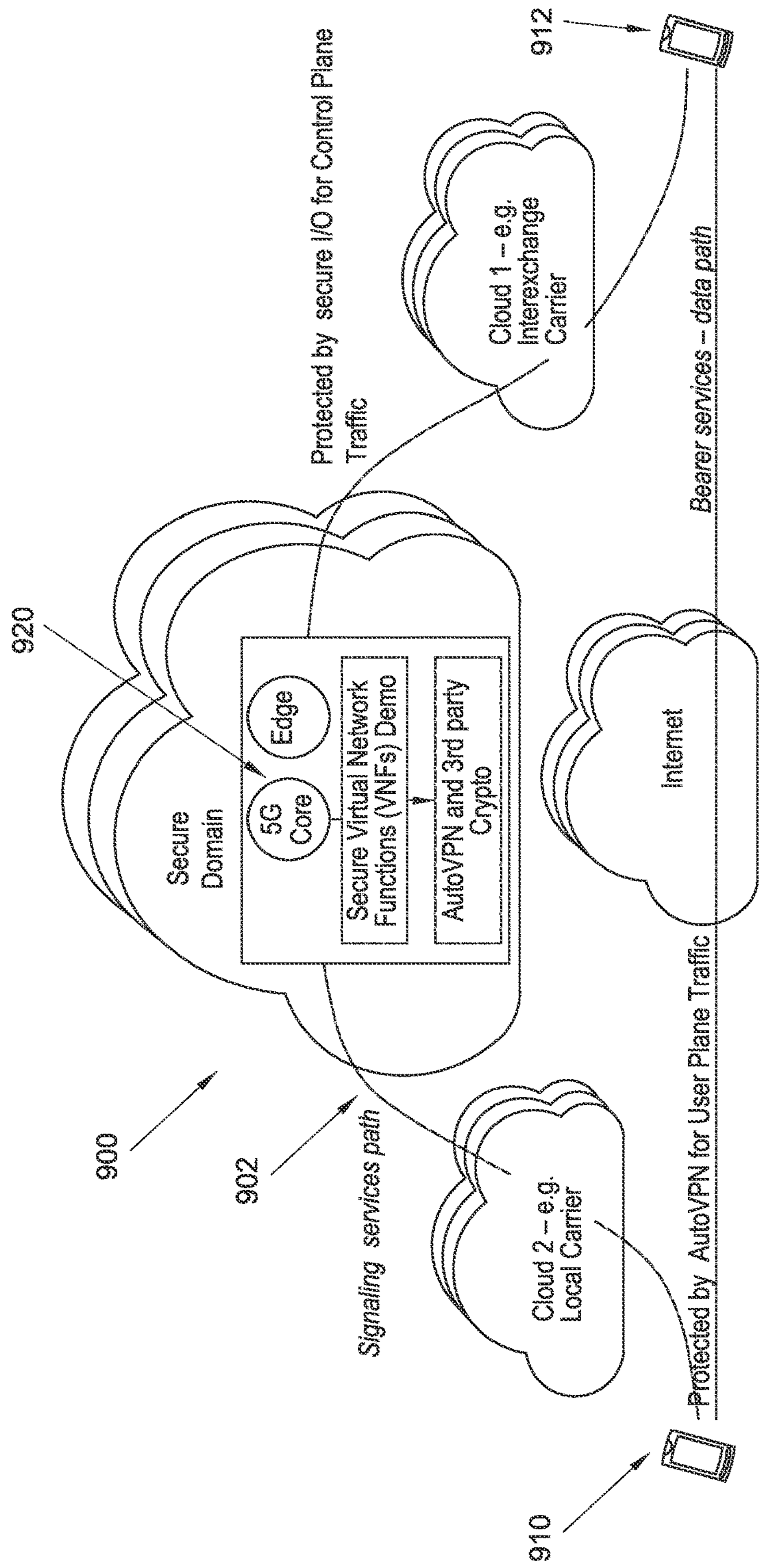
FIG. 9 is a diagrammatic view depicting further examples of dedicated and secure 5G core network and cloud architecture employed by the platform in accordance with one or more example implementations of the present disclosure.

In embodiments, the 5G telecommunication network and computing platform may deploy layers of SIP security protection to ensure that all communications may be protected at the signaling and control plane. In embodiments, the enhanced SIP security protocols and SIP resolvers may be deployed in the LEO constellation where the 5G Core Network may use its own space-borne proxies and earth station gateways, or may use bilateral communications with specific trusted terrestrial serving networks or SIP resolvers bypassing unknown, unverified, gray listed or black listed proxies, or where origin identification may not be ascertained using its enhanced SIP security protocols. In embodiments, the 5G telecommunication network and computing platform may provide a secure and dedicated 5G cloud to enhance data communications security. In the layers of security for the platform, the platform may be configured with the ability to logically "firewall" the one or more cores of the platform inside a secure domain and to secure all bearer traffic as depicted in FIG. 9 at 900. By way of these examples, the secure domain may permit the one or more cores of the platform to resolve and control all DNS queries at the secure domain from its global directory. In addition, the platform secure domain may serve as a logical partition and firewall within the global directory preventing higher level DNS servers from controlling any aspects of the actual bearer traffic once the call path, for example at 902, may be set up via the platform. In embodiments, the secure domain may auto provision the VPNs to the platform endpoints, for example at 910 and at 912, as long as the platform endpoints remain authorized and authenticated on the one or more cores 920 of the platform without requiring an explicit VPN set up at the platform endpoint. In doing so, this automatic VPN function may be controlled by the platform. With reference to FIG. 9, the platform secure domain may auto provision the VPN to the platform endpoints, for example at 910 and at 912. In doing so, the local peer may look to connect to the remote peer with a software defined network service request from the local peer responsive to a connection request from the remote peer. In embodiments, the local peer may also connect with the remote peer through an encrypted connection to an optional relay service. In these examples, the platform with its secure domain may be configured to ensure that platform session border controllers and SIP translations may be handled without intervening clouds and session initiation protocol resolvers that are not associated with the platform. In these examples, the platform with its secure domain may also be configured to automatic VPN protection by the structure of having the DNS server in the secure domain that may be dedicated and exclusive to the platform.

Figure 10:
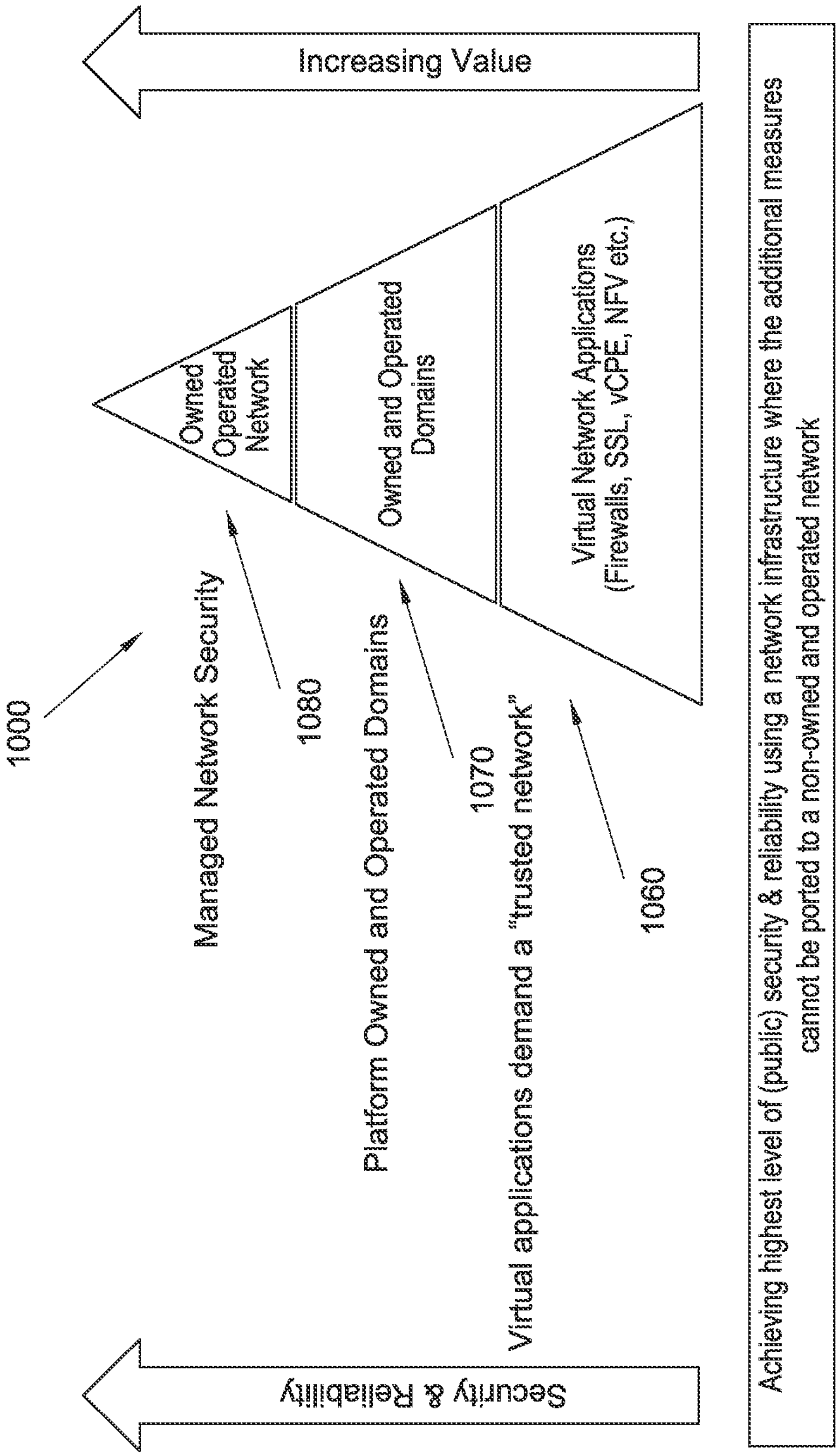
FIG. 10 is a diagrammatic view depicting further examples of dedicated and secure 5G cloud and secure domain architecture employed by the platform in accordance with one or more example implementations of the present disclosure.

In embodiments, the 5G telecommunication network and computing platform may provide public security and reliability using a network infrastructure where the additional measures may not be ported to a non-owned and operated network without the consent of the user. In doing so, the platform may ensure a highly-secure and trusted private network to reduce or eliminate fraud in critical markets such as defense, utilities, banking, logistics and healthcare. By way of these examples, the platform may provide increasing security and reliability in levels of increasing value as depicted in FIG. 10 at 1000. At the first level at 1060, all virtual applications may require a "trusted network" on the platform and may auto-instantiate new layers of security and encryption. In doing so, the virtual applications may be configured to protect clients and servers by requiring creation and provisioning to only operate on the platform. At the middle level at 1070, the platform may provide only "owned and operated" domains in that the platform establishes boundaries of the trusted network to allow other operators to support higher-liability applications. In this arrangement, the platform may require transaction fees. At the highest level, at 1080, the platform provides managed network security so that servers and software inside may be "owned and operated" by the platform and provide critical security completely managed by the platform. In this arrangement and at this highest level of security at 1080, the platform may be configured to deny authentication-handoffs for signaling and route selection to networks outside of a predetermined home network.

Figure 11:
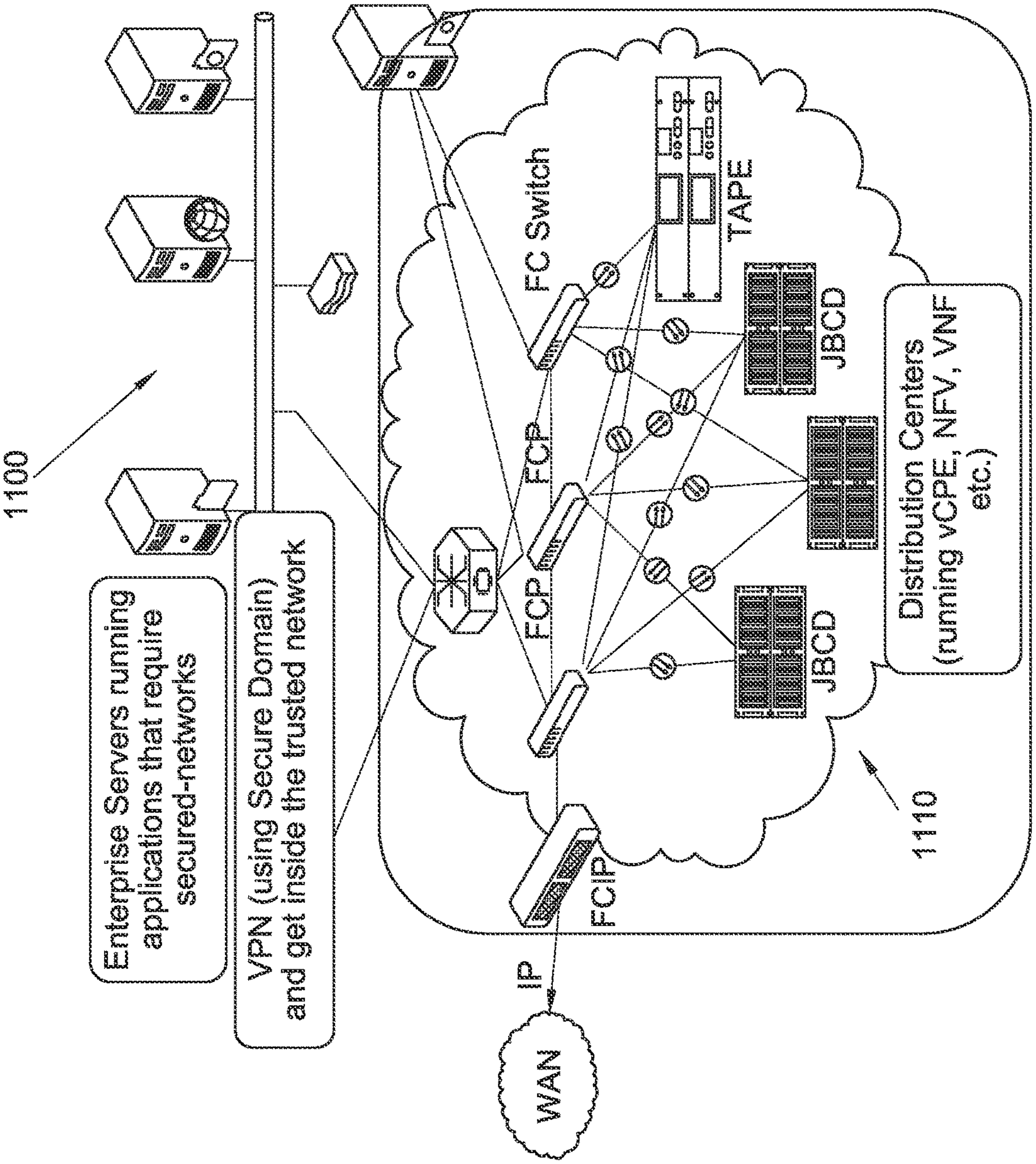
FIG. 11 is a diagrammatic view depicting further examples of dedicated and secure layers of trusted networks employed by the platform in accordance with one or more example implementations of the present disclosure.

In embodiments, the 5G telecommunication network and computing platform may provide hardened security to enterprise clients as depicted in FIG. 11 at 1100. The platform may provide secured and dedicated connectivity to users having, for example, distribution centers using virtual customer-premises equipment, network function virtualization, and other virtualizations of network functions at 1110. In embodiments, the secure domain server technology may be deployed to only run on an operator owned network. By way of these examples, "owned-and-operated" secured networks that operate secure domain in physically secure data center locations may improve enterprise trust in using secure domain technology.

In embodiments, the 5G telecommunication network and computing platform may provide protection of all inputs and outputs with the one or more cores of the platform for all control of user plane traffic. In embodiments, the platform may protect query transactions between components of the one or more core elements of the platform, such as subscriber data access, device validation, authentication data access, and the like. In embodiments, the platform may integrate field programmable gate arrays (FPGAs), such as DirectStream FPGAs, into the one or more cores of the platform at the platform packet gateway for the user plane and at the signaling gateway for the control plane interfaces. In embodiments, the platform may integrate FPGAs, such as DirectStream FPGAs, for inputs/outputs between one or more core components of the platform such as policy data access, home subscriber server subscriber data access, and for authentication data access. In embodiments, the platform may implement support for secure domain automatic VPN client integration. In embodiments, the platform may implement session initiation protocol messaging on FPGAs for the signaling gateway. In embodiments, the platform may implement instant messaging service messaging on FPGAs to support multi-media transport for the packet gateway.

In embodiments, the platform may employ secure domain server technology that may only run on an operator owned network. In these examples, owned-and-operated secured networks that operate secure domain registries and servers in physically secure data center locations may improve the enterprise trust in using secure domain technology and increase the level of security and reliability with the following. In embodiments, data at rest may be secured because the data center where the secure domain registry/server resides may be in an owned and operated facility with physical and local IT security control. In embodiments, data in flight may be secured because the payloads are carried on owned and operated network infrastructure without cross connection to foreign facilities or networks. In embodiments, the platform may protect certificate and key exchange by restricting operations to an owned and operated network. In embodiments, the platform may employ authenticating gateways, core routers, session border controller (SBC)/session initiation protocol (SIP) resolution servers and route reflectors subject to the same secure domain DNS as on the owned and operated network. Further, the platform may act as a secure domain SIP resolver.

Figure 12:
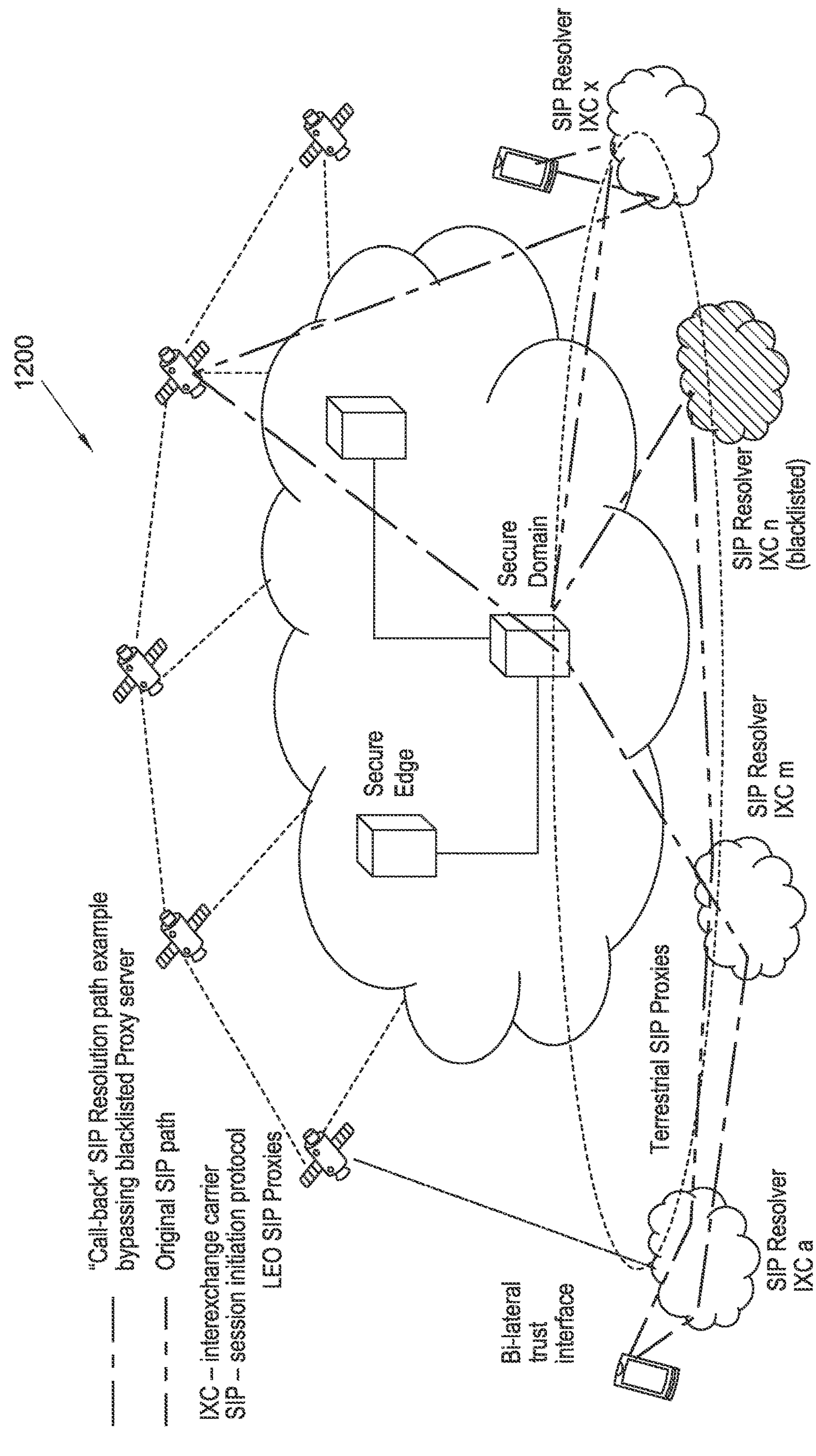
FIG. 12 is a diagrammatic view depicting further examples of dedicated and secure owned-and operated components and systems of the platform to present further hardened security in accordance with one or more example implementations of the present disclosure.

Referring now to the example implementation of FIG. 12, there is shown a dedicated and secure owned-and operated components and systems of the platform that may present further hardened security with respect to session initiation protocol (SIP) at 1200. As described further in the disclosure, FIG. 12 shows dotted line referring to "call back" SIP resolution path example bypassing blacklisted Proxy server as compared to dotted line referring to original SIP path. The network of FIG. 12 shows a bi-lateral trust interface where data may be transmitted across terrestrial SIP proxies via SIP resolver interexchange carriers (IXCs) a, m, n, x. For the original SIP path, transmission may be from a first user device via SIP resolver IXCs a, m, n, x as well as through a secure domain (e.g., between SIP resolver IXC n and SIP resolver IXC x) to a second user device. LEO SIP proxies may also be included for provided at least a bypass path. For the "call back" SIP resolution path example bypassing blacklisted Proxy server, transmission may be from a first user device via SIP resolver IXCs a, m, x as well as through a secure domain (e.g., between SIP resolver IXC m and at least one LEO SIP proxy) to a second user device. The at least one LEO SIP proxy may be positioned between the secure domain and the SIP resolver IXC x such that transmissions from the secure domain may be directed to the second user device via at least one LEO SIP proxy and the SIP resolver IXC x.

With the secure domain registry/server on an owned and operated network, the carrier may run multilevel security without intrusion and may provide additional checking and authentication services between a host and clients, and between clients. After installing a secure domain registry/server in an owned and operated data center on an owned and operated network on owned and operated facilities, the platform may run multi-level security by opening up different types of tunnels/VPNs transparently between the platform end-points based on the client resolution and/or host resolution to apply various security applications. In embodiments, the security applications may include monitoring unusual activity, e.g., tracking and reporting calls/data transfer to non-authorized networks on a separate dedicated tunnel running "tracking" algorithms based on one or more past histories. In embodiments, the security applications may include monitoring user behavior (e.g., identity checking based on key inputs, typing cadence, password exchanges, etc.) on a separate dedicated tunnel running "behavioral" algorithms based on past user activity. In embodiments, the security applications may include updating certificates periodically and transparently without the client knowing using a separate dedicated tunnel for dynamic key exchanges. In these examples, keys may be updated multiple times during a call and VPNs reestablished transparently. In embodiments, the security applications may include tracking network statistics for different traffic types on a separate dedicated tunnel running "management" algorithms.

Once the secure domain registry/server may be on an owned and operated network, the carrier may add auto-IoT security for sensor networks that use secure domain registration. After installing a secure domain registry/server in an owned and operated data center on an owned and operated network on owned and operated facilities, the provider may provide security to Internet of Things devices that tie back to the secure domain as clients. In addition, the IoT clients may use open spectrum as provided by a spectrum access system or through the utilization of unlicensed band spectrum but through registration with a secure domain be protected through a VPN provided automatically by the secure domain registration.

In embodiments, the platform may allow IoT devices as used for sensor networks, connected car applications, infrastructure projects, consumer applications and business applications to be protected via secure domain registration where the secure domain may recognize that an IoT client is registering for service. When the IoT client is registering for service, the client may automatically instantiate an end-to-end VPN, SSL protection, custom manufacturer private key protection, and the like. In embodiments, the client may automatically instantiate IPv6 encoding and mapping, which may be factory registered, meaning a product (e.g., sensor) supplier may preregister IoT devices using pre-agreed secure domain authentication procedures for manufacturer-specific security protocols.

In embodiments, the platform may deploy and use owned and operated network and network facilities to operate a secure domain server for secure communications such as an automatic VPN. In embodiments, the platform may operate a secure domain registry/name server product embodied in a telecommunications network where the secure domain registry/server, network, network facilities may include data centers that host the secure domain registry/server that may be physically owned and operated by a single service provider entity. In embodiments, the platform may operate a secure domain registry/name server product embodied in a telecommunications network to prevent secure domain hacking, spoofing and data vulnerabilities for data-at-rest. In embodiments, the platform may operate a secure domain registry/name server product embodied in a telecommunications network where in-flight during authentication, certification or key exchange activities for hosts, devices, clients or users may require secure communications through the secure domain.

In embodiments, the network provider may run multi-level security by opening up different types of tunnels/VPNs transparently between the endpoints based on the client resolution and/or host resolution to apply various security applications. In embodiments, the security applications may include monitoring unusual activity such as tracking and reporting calls/data transfer to non-authorized networks. In embodiments, the security applications may include monitoring user behavior (identity checking may be based on key inputs, typing cadence, password exchanges, etc.). In embodiments, the security applications may include updating certificates periodically and transparently without the client knowing. In embodiments, the security applications may include tracking network statistics for different traffic types. In embodiments, the security applications may include operating SSL independently for secure connections. In embodiments, the security applications may include operating TCP/IP offload engines for secure connections.

In embodiments, the network provider may support IoT manufacturer-specific security protocols, including auto VPN establishment on secure domain registration. In embodiments, the security protocols may include factory-based preregistration for devices before field ship and deployment, including adding secure keys, and IPv6 encoding. In embodiments, manufacturer-specific security protocols may be provided for field device registration.

Platform LEO Backhaul Architecture

Figure 13:
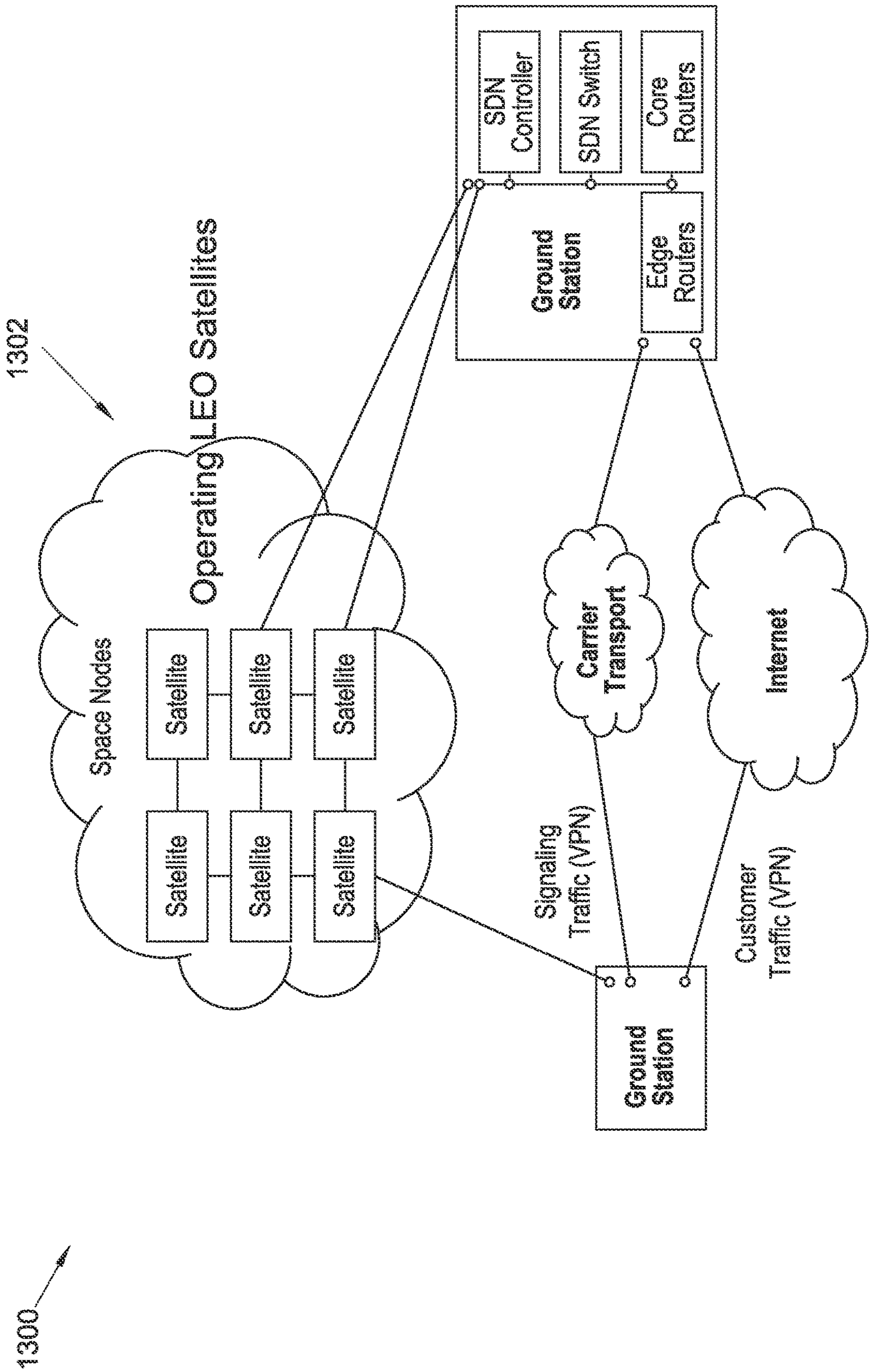
FIG. 13 is a diagrammatic view depicting examples of dedicated and secure low-earth orbit (LEO) constellation backhaul networks in accordance with one or more example implementations of the present disclosure.

In embodiments, the 5G telecommunication network and computing platform may provide secure and dedicated 5G low-earth orbit (LEO) backhaul architecture systems and methods to employ and integrate software-defined networking (SDN) to control and route content on the platform as depicted in FIG. 13 at 1300. In many instances, examples of the secure and dedicated 5G LEO backhaul architecture may be shown to provide protection against backhaul holes, to demonstrate backhaul redundancy between fiber and LEO satellites deployed in the platform, and to maintain sufficient performance, security and operations while operating the secure and dedicated 5G LEO backhaul systems (may also be referred to as "LEO system" or "LEO systems" throughout the disclosure) 1302. In embodiments, the LEO backhaul systems 1302 may provide continuous network monitoring using link hardware interface monitoring. In embodiments, the LEO backhaul systems 1302 may deploy switches that use backup links that employ early detection and fast change to preplanned backup paths when the situation warrants the reroute. In embodiments, the LEO backhaul systems 1302 may deploy software defined networking (SDN) to change routes when network updates suggest a faster network topology may be suitable. In embodiments, the LEO backhaul systems 1302 may be deployed with high availability in that the platform may use a unique forwarding plane (also may be referred to as data plane or user plane) via SDN Controllers that may provide data forwarding capabilities attuned to the LEO satellite ground-to-air-to-ground and air-to-air connectivity and rapid topology changes and movement with robust failover capability (e.g., hot-standby), and robust network security that may provide a network architected for security and automatic establishment of the virtual private network tunnel.

In embodiments, the LEO backhaul systems 1302 may be configured to create integrated operations and control for the earth to satellite to earth SDN wide-area networks. In embodiments, the LEO backhaul systems 1302 may be configured to secure terrestrial routes using VPN and for VPN via the low-earth orbit (LEO) satellite constellations. In embodiments, the LEO backhaul systems 1302 may be configured to perform near real-time backhaul (simulation) for terrestrial and LEO satellite constellations using SDN. In embodiments, the LEO backhaul systems 1302 may be configured to provide VPN for terrestrial and satellite portions of the LEO backhaul. In embodiments, the LEO backhaul systems 1302 may be configured to integrate SDN management capability for terrestrial and satellite constellation(s) including setting up forwarding plane information and control. In embodiments, the LEO backhaul systems 1302 may be configured to use an SDN based transport layer to deliver backhaul from platform edge devices to platform cloud components, such as the micro data center to core platform network components and radio-access network (RAN) to core platform network components using both fiber and operating LEO satellites. In embodiments, the LEO backhaul systems 1302 may be configured to use SDN both for the fiber and operating LEO satellite transport for the backhaul seamlessly integrated with SDN controllers. In embodiments, the LEO backhaul systems 1302 may be configured to implement forwarding plane capabilities for routing SDN flow from platform edge components to platform cloud assets with integrated operational control and management. By way of these examples, the platform may integrate terrestrial SDN controllers with earth station gateways. In embodiments, the platform may operate earth station gateways with fully integrated forwarding plane satellite operating capability with the LEO satellite constellation.

5G LEO Backhaul with Software Defined Networking (SDN) Integration

In embodiments, the platform may be configured to demonstrate seamless LEO backhaul operation with integrated software defined networking control and traffic routing and integrated security management. In embodiments, the following security attributes of a platform LEO backhaul may be deployed with the following features.

In embodiments, the LEO backhaul may be deployed with unshared, dedicated satellite communication links, either at Layer 1 (physical medium) or Layer 2 (data link); on-board processing and routing of traffic (i.e., "data center in the sky") that may include integrated software defined networking (SDN) control and traffic routing; and protocols and encryption envelope over LEO backhaul. Moreover, inter-satellite links may keep all backhaul traffic isolated in space between the base transceiver station (BTS) and core network regardless of the distance (e.g., Afghanistan to Washington, DC). LEO satellites or key payload elements may be manufactured by trusted aerospace industries with software from trusted origins conforming to software security standards established by the platform. Command, control, and telemetry of LEO satellites and their backhaul functionality may include encryption approved by trusted security agencies.

It is appreciated in light of the disclosure that integrating the LEO backhaul into the data governance, network management, and security envelope of the platform, LEO backhaul may become an integrated portion of the entire platform. This is achieved by uniquely designing the LEO satellites to operate as a dedicated component of the platform rather than employing conventional LEO communication satellites that may be intended to serve a variety of missions.

Platform Core Security—Sandboxing

Figure 14:
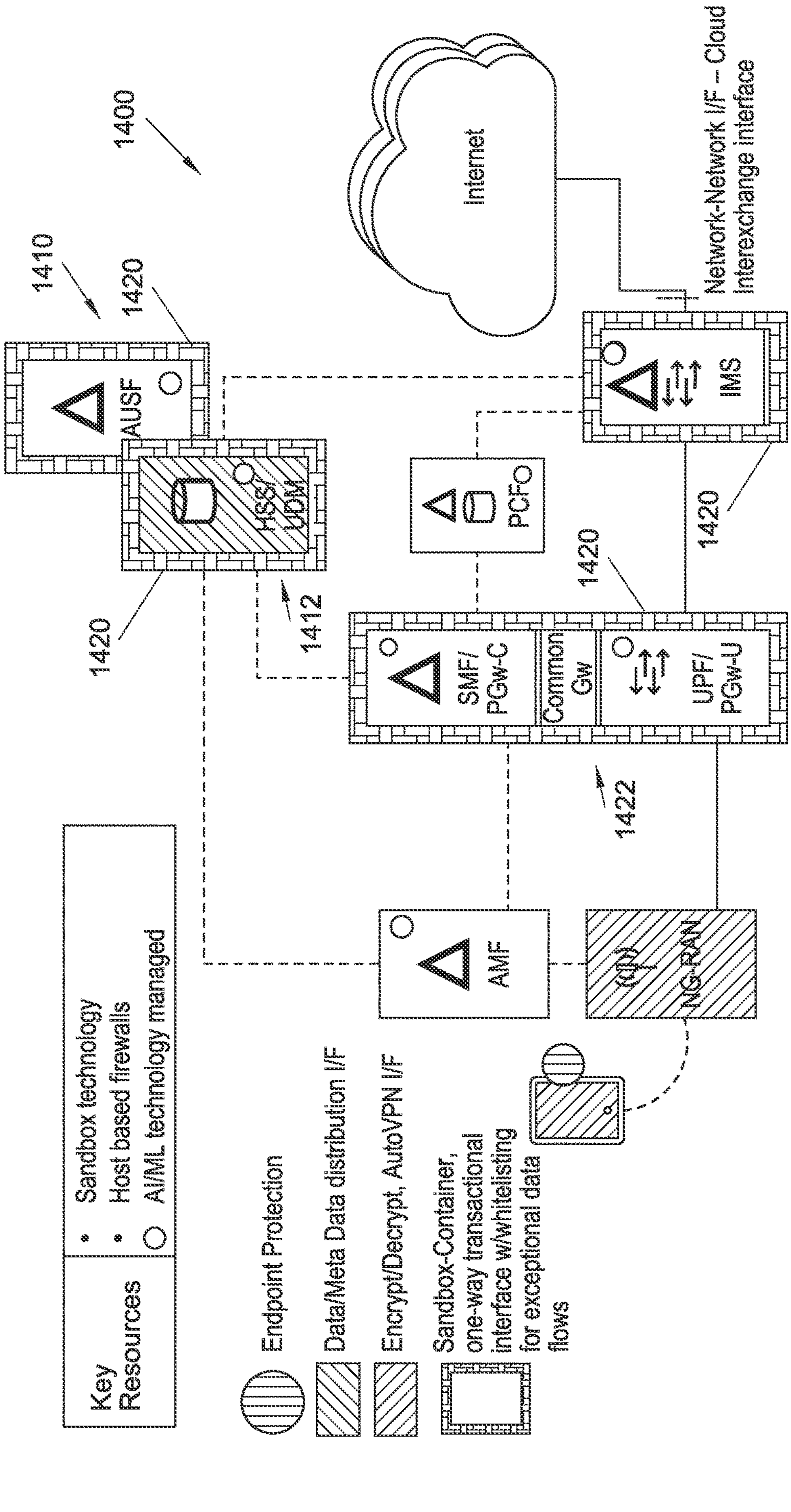
FIG. 14 is a diagrammatic view depicting examples of dedicated and secure sandbox architecture employed by the platform to actively manage and quarantine processes contained in the sandbox in accordance with one or more example implementations of the present disclosure.
Figure 15:
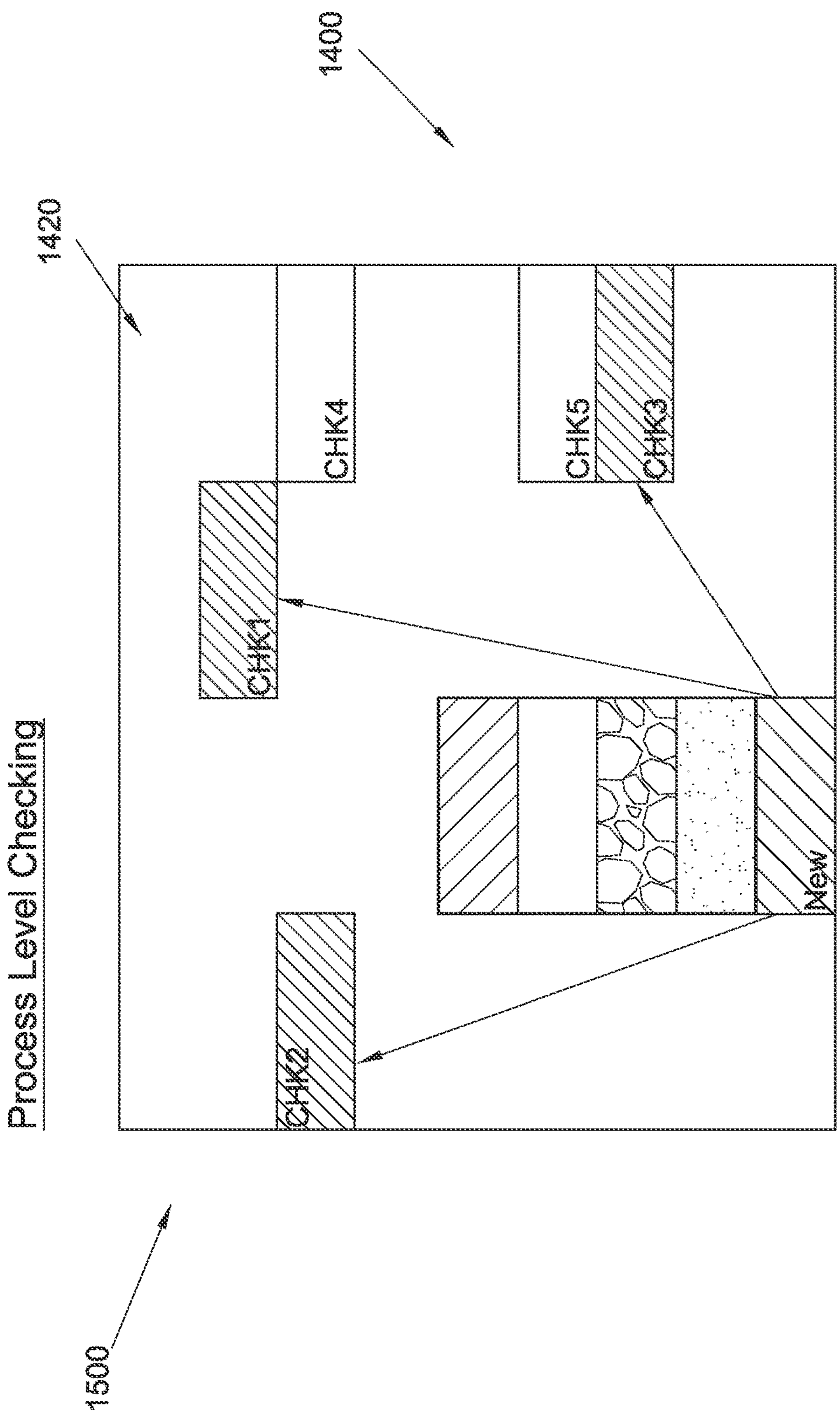
FIG. 15 is a diagrammatic view depicting examples of dedicated and secure sandbox architecture with keyed layers of checkpoints employed by the platform to actively manage and quarantine processes contained in the sandbox in accordance with one or more example implementations of the present disclosure.

In embodiments, the 5G telecommunication network and computing platform may provide security in the form of sandboxing at 1400 around core functions as depicted FIGS. 14, and 15. With reference to FIG. 14, the 5G telecommunication network and computing platform may provide security for the authentication server functions (AUSF) 1410 to be sandboxed with a behavior module that may "blueprint" allowed accesses to and from the user data repository or module (UDM) and Home Serving System (HSS) 1412. Each instance at the AUSF 1410 may run inside a sandbox 1420 whether it uses a full hypervisor or not. If malware attempts to exfiltrate data using an unauthorized path, then, in many examples, the process may be suspended, an audit trail may be set up, and then a clean slate reset may be performed on the process instance or the entire function. In many examples, the methodology described herein may be applied to any instantiable process including the session management, policy management and all mobility management functions such as at 1422. In many instances, the degree to which this sandboxing may be done is highly dependent on the ability to separate platform traffic flows and management data flows from traffic from other carriers and bearer traffic flows. In embodiments, the platform may be configured to sandbox many of the platform core processes or in some instances, entire platform cores.

In further examples of sandboxing, the platform may be configured such that the sandbox 1420 may be layered around the layers of the process as depicted in FIG. 15 and at 1500. In these examples, all of the checkpoints may be related to call behavior mandated by standards and which may be characterized at systems test time. For call type 1, for example, the sandbox may be configured so that call information must pass through the checkpoints in this order CHK 1 to CHK 2 to CHK 3. As such, for call type 2, the sandbox may be configured such that call information must pass through the checkpoints in this order CHK 1 to CHK 4 to CHK 5. In further examples, a checkpoint module may be added to each of the call models (e.g., as determined during testing). In these examples, this would be a compile time change. If a particular call fails to checkpoint in the correct order, in these examples, then it may be determined that something has gone wrong. At that point, the platform may quarantine the process, record what is happening, and then may clean slate reset it after reporting it.

Data Security Architecture

In embodiments, the 5G telecommunication network and computing platform may provide a data security architecture to employ high levels of data security for data at rest and data in-flight to protect against data breaches at various locations on the platform. In embodiments, the platform may employ user data separated from its underlying metadata. It will be appreciated in light of the disclosure that the data itself has no context without the rules for how the data is to be interpreted, manipulated and processed and therefore only has value when the data may be combined with the metadata and the behavior and context in which that data and metadata are to be used. In embodiments, the platform may separate the data and the metadata from its broader application context, such as the service function which may be responsible for performing actual services based on the change in data or change in context or for data retrieval and storage, and for stateful data processing. In embodiments, the platform may employ data separation techniques to ensure that critical subscriber and management data may not be spoofed, exfiltrated, destroyed or stolen without all three contexts (e.g., data, metadata, and the context/behavior in which the data and metadata reside) being captured. In embodiments, the platform may employ techniques that may be applied to the various systems of the platform, for example, those depicted in FIG. 14 such as the HSS and/or the UDR 1412, the authentication function 1410, policy and session management functions 1422, data repositories and data flows, and the like. These functions that may be used at call set-up time and may not be in the critical path for latency for when connections are established and therefore may be candidates for additional levels of security such as sandboxing.

Figure 16:
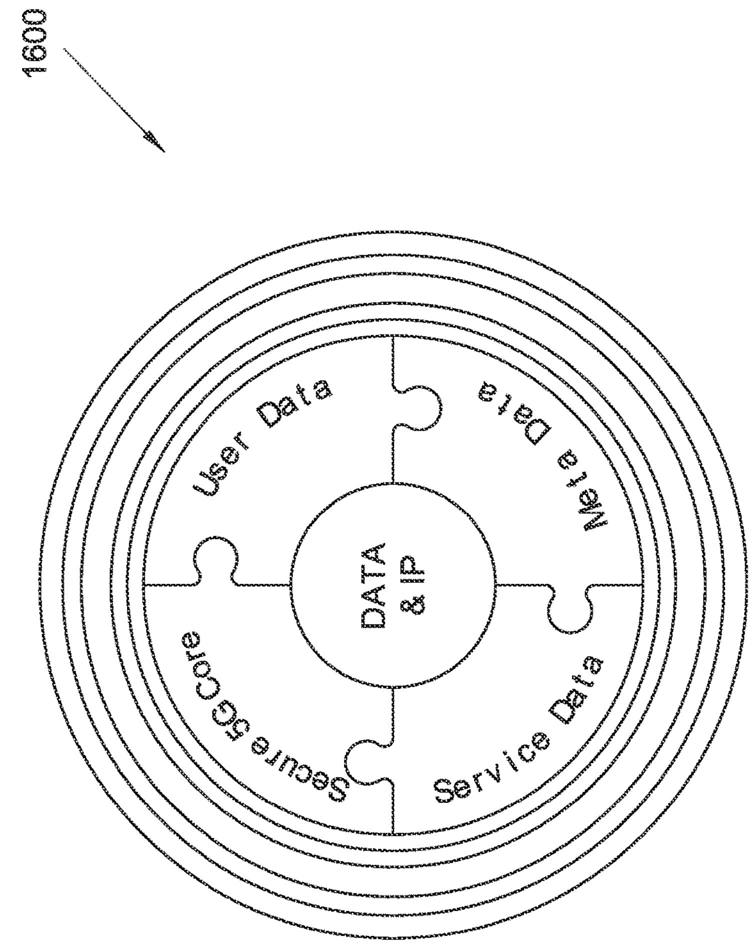
FIG. 16 is a diagrammatic view depicting examples of dedicated and secure data security architecture employed by the platform in accordance with one or more example implementations of the present disclosure.

In embodiments, the 5G telecommunication network and computing platform may provide a hardened security architecture to data in that the data may be restructured into secure, unbreachable, subcomponents as depicted in FIG. 16 at 1600. By way of these examples, the secure, unbreachable, subcomponents of data may be further protected by the containerized one or more cores of the platform together with additional layers of security. In embodiments, the 5G telecommunication network and computing platform may deploy cellular network security that may be built outside-in such that endpoint security may be provided at the point of origination or termination but not in the network itself. By way of these examples, the platform may use new security techniques to protect data at rest and in-flight. This data at rest or in-flight may be subscriber data, device data, or communications data (e.g., IP addresses, etc.). In embodiments, the platform may deploy another element of inside-out strategy by securing all intra-traffic and inter-traffic using proprietary technology such as contextual security, data-centric identity management, encrypt/decrypt and the like.

Figure 17:
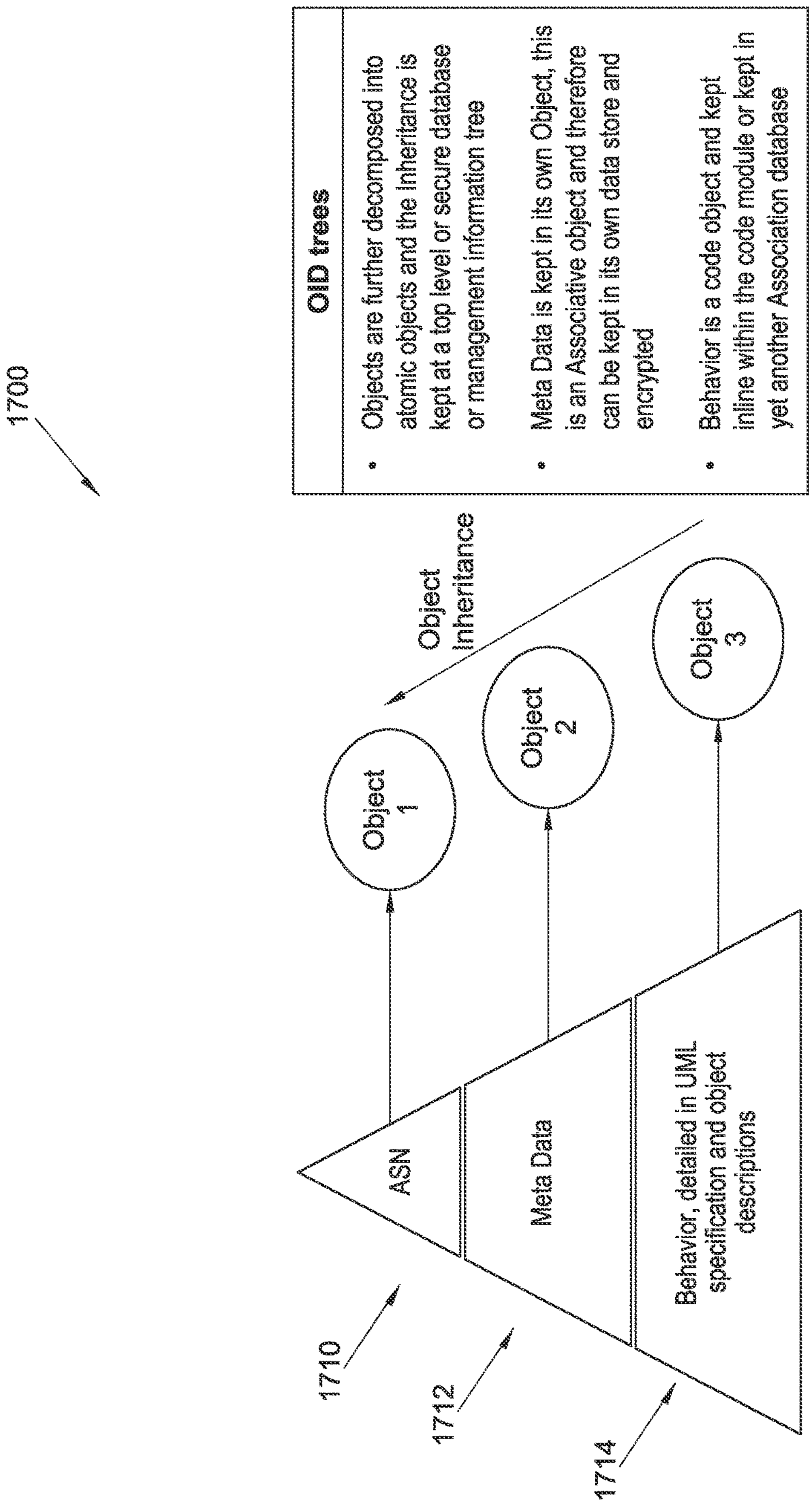
FIG. 17 is a diagrammatic view depicting examples of dedicated and secure data structures employed by the platform that use object identifiers to facilitate disentangling and reassembling data, metadata, and the context and behavior around that data and metadata to keep it secure in accordance with one or more example implementations of the present disclosure.

In embodiments, FIG. 17 depicts examples of dedicated and secure data structures employed by the platform at 1700 that may be used to disentangle data, metadata, and the context and behavior around that data and metadata to keep it secure and reassemble the three for delivery. In embodiments, the 5G telecommunication network and computing platform may employ data structures that may take advantage of abstract syntax notation to protect the layers of DNA of the data. By way of these examples, the abstract syntax notation may be used by the platform to describe data structures and variables and further define the values and ranges that the data may hold. In this structure, metadata may be the proteome of the data in that the metadata may provide how the data described in abstract syntax notation may to be interpreted and the logic between data elements. In these examples, the metadata may also detail how their values of the data interrelate. To have a full understanding of the data, the description in abstract syntax notation and the metadata must be united with the behavior and context for the data. In these examples, the behavior and context for the data may be the actual code and, in some instances, associated with a specific object type and detailed in the object diagram and UML.

Figure 18:
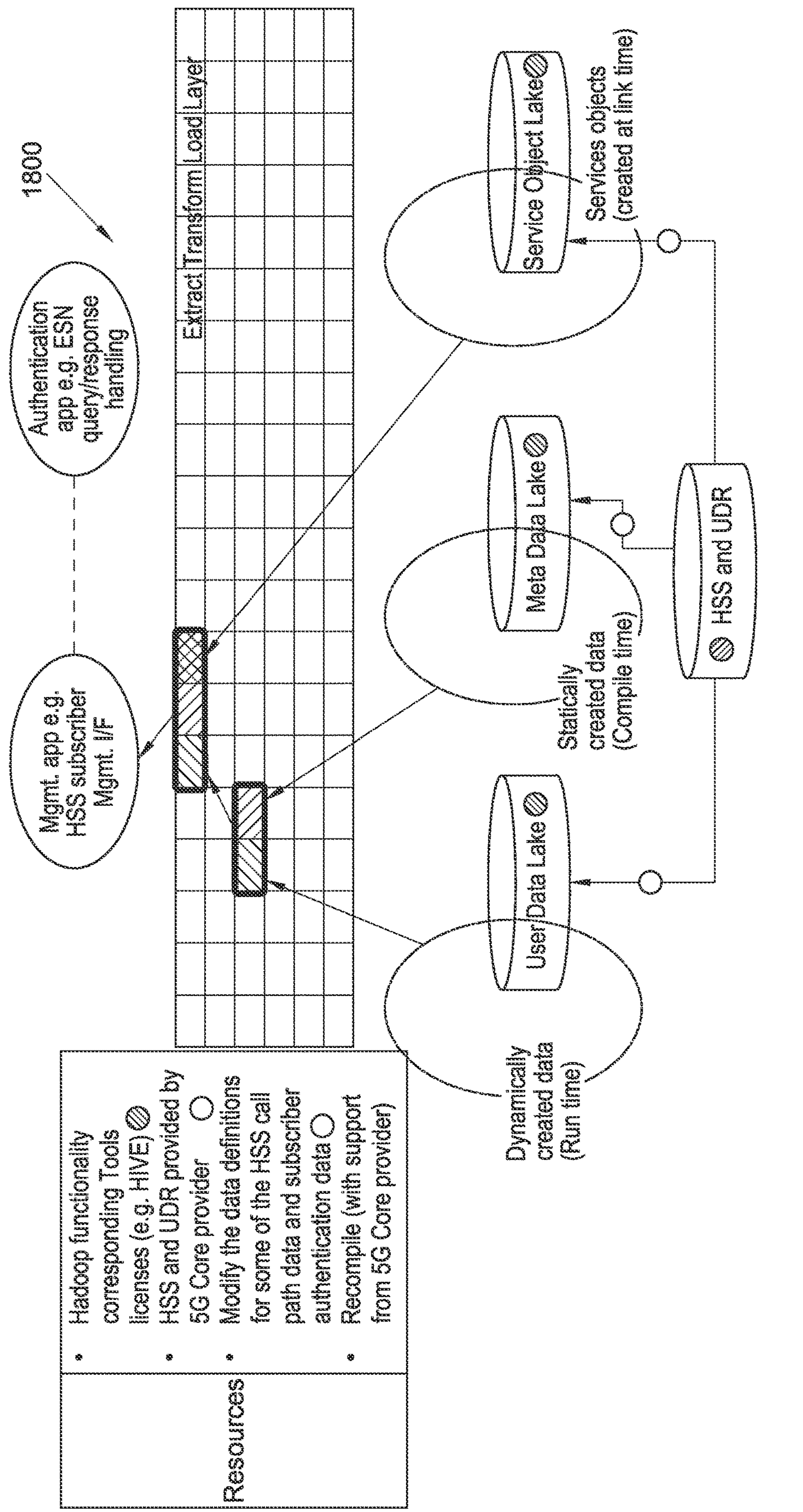
FIG. 18 is a diagrammatic view depicting examples of a dedicated and secure data system employed by the platform to extract load and transfer the data, metadata, and the context and behavior around that data and metadata as they are disentangled and reassembled in accordance with one or more example implementations of the present disclosure.

FIG. 17 depicts examples of dedicated and secure data structures employed by the platform that use object identifiers to facilitate disentangling and reassembling data, metadata, and the context and behavior around that data and metadata to keep it secure. It is appreciated in light of the disclosure that by separating the association at an object level of the data based on its ASN 1710, the metadata 1712 and behavior 1714 then data itself may lose meaning unless all three factors are known. In these examples, this means the separation of object information into multiple databases, code fragments, and creating atomic objects may be shown to protect data against theft and unauthorized utilization. In embodiments, the platform may employ objects that may be further decomposed into atomic objects and an inheritance for those objects may be kept at a top level or secure database, in a management information tree, or the like. By way of these examples, metadata may be kept in its own object and this object may be an associative object and therefore may be kept in its own data store and encrypted. Moreover, behavior and context (being one of the three factors) may also be a code object and may be kept in-line within the code module or kept in a further association database. In these examples, applications on the platform may only execute when all the objects (all of the three factors) are pulled together which may be done at run-time. In embodiments, as shown in FIG. 18, the platform may deploy Infrastructure-less data stores employing near real-time extraction, transform and load (ETL) processing at 1800 to combine data, metadata and context/behavior objects (e.g., service functionality) together prior to applications processing. In embodiments, the platform may deploy object databases or relational databases with object wrappers or relational databases employing in-memory, real-time, or front-end processing to extract the data, metadata and context/behavior objects together prior to applications processing. In embodiments, the platform may include application programming interfaces (APIs) to effectuate data distribution as depicted in FIG. 18 at 1800.

It is appreciated in light of the disclosure that in some instances, starting from ASN may present a situation where there may be no direct connection to behavior or context. In these instances, SysML may be better to deploy because it includes support for parametric modeling which, inherently, may permit connection to models defined elsewhere and/or different tools. In embodiments, the platform may use a functional mock-up interface (FMI). By way of these examples, FMI may allow the use of co-simulation between diverse systems or facilitate import and export of FMI components to/from systems. In embodiments, the platform may employ the UML/SysML versions of ASN. 1 (i.e., in the generation of the ASN.1), class definitions may be modernized for the extra requirements in SysML, and the behavioral definitions may be mapped to actual code using co-simulation, parametric modeling, keeping definitions in separate places, or the like. From there, then choose how to glue the system together whether inside UML or outside UML options.

In embodiments, the 5G telecommunication network and computing platform may employ top level objects that may be subdivided into atomic level objects. In these examples, the object atomic level may be as small as individual ASN values and types. By way of these examples, objects may be kept in separate data stores where an entire object may not be pulled together without inheritance (i.e., the roadmap for the object) and association information (i.e., interrelatedness). In embodiments, the platform data stores may be logically or physically separate or even in different clouds. By way of these examples, the objects may be pulled together at run-time, such as in big data analysis and processing where data lakes may be secure but off the platform. In these instances, real-time access may still be maintained using inheritance and association to disentangle and reassemble the information as needed.

In embodiments, the 5G telecommunication network and computing platform may employ data/metadata separation and may further separate the code from the data/metadata through service objects. It is appreciated in light of the disclosure that in object oriented analysis and design (OOA/OOD), options may be provided to allow for the separation of data and metadata into separate object constructs where the data may be defined by its Abstract Syntax Notation (ASN) definitions. In these examples, ASN data types may be encapsulated in a data object. The metadata may be encapsulated into a separate object in a metadata object. The data object and metadata object may be related by inheritance such that there may be a strict parent-child relationship or there may be a linking association such as a pointer relationship. In these examples, the data object and metadata object may relate to each other via their code behavior where the executable code is kept in a separate object such as a service object, which may be related to the metadata object by the various examples of inheritance or association.

In embodiments, the applications on the platform may use the inheritance and/or association relationships to reconstitute object information, metadata, and behavior execution at run time. In embodiments, the objects on the platform may be kept in separate databases and data stores and may exist in different clouds. It is appreciated in light of the disclosure that in object oriented design and analysis (OOD/A) options may be provided to allow programmers, code designers, developers, and the like, to allow objects to be automatically decomposed and separated into atomic sub-objects. In these examples, this may be performed where a single execution object, such as a service object, may require all the constituent data objects, metadata objects and therein any and all related atomic sub-objects to be reconstituted at run-time in order for the single execution object (e.g., the service object) to perform the necessary execution. In these examples, new inheritance and association structures may be generated and may allow for real-time constitution at run-time. In embodiments, new association rules may permit run-time interrelatedness between dissimilar objects and atomic sub-objects. In embodiments, the platform may permit object level data and atomic sub-object information to be kept in separate databases and cloud systems, which, in turn, may also allow for object/atomic objects to be encrypted.

In embodiments, the objects may be kept in-line within the code, e.g., as compiled time structures. In embodiments, the objects may be kept in-line within code objects in binary form kept in local or remote databases. In embodiments, the objects may be resolved at run-time through a normal symbol table and runtime library reference resolution techniques and methodology.

In embodiments, commercial-off-the-shelf tooling may be extended or enhanced to allow for the creation of the separation of object types and for enhanced capabilities for compile time and run-time reference resolution of the inheritance and association relationships and to support the data object, metadata object and service object separation techniques, support parametric programming concepts and strategy.

Figure 19:
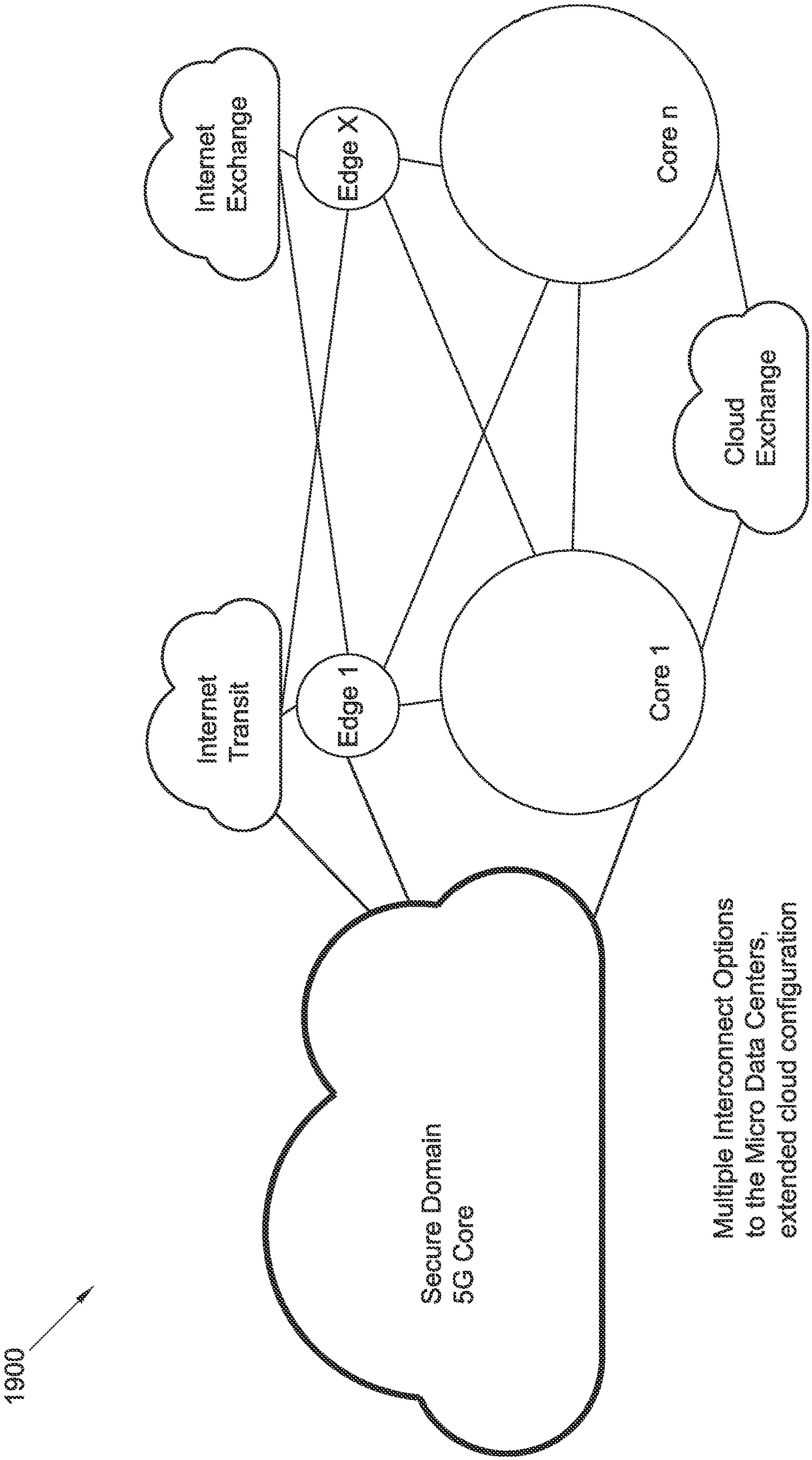
FIG. 19 is a diagrammatic view depicting examples of a dedicated and secure data system employing secure micro data center architecture by the platform including platform edge devices and one or more network cores residing at the platform secure domain in accordance with one or more example implementations of the present disclosure.
Figure 20:
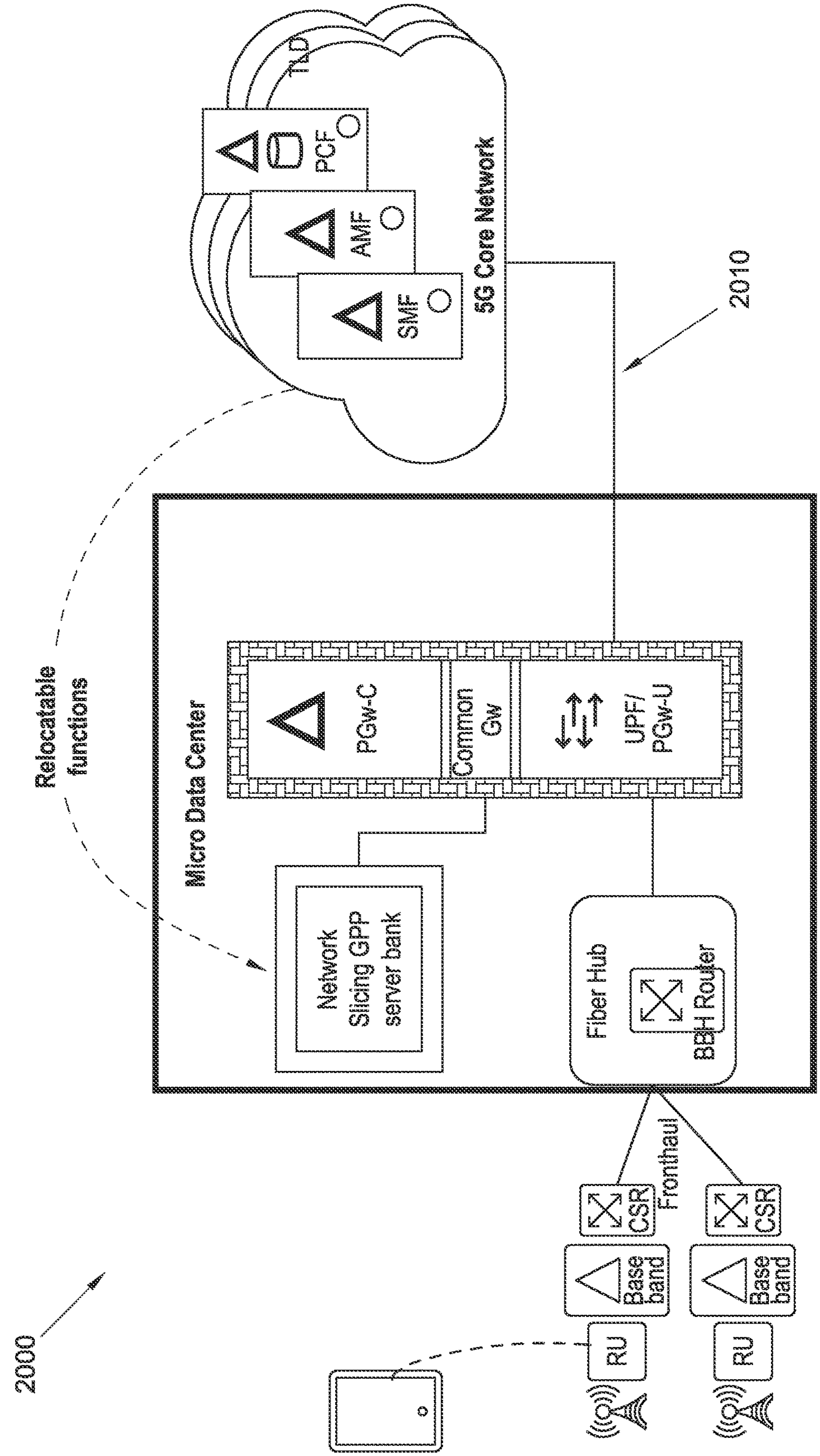
FIG. 20 is a diagrammatic view depicting examples of a dedicated and secure data system employing secure micro data center architecture and sandbox protections by the platform including platform edge devices and transit through platform LEO constellations, fiber, microwave, and the like in accordance with one or more example implementations of the present disclosure.

FIG. 19 depicts examples of dedicated and secure data system employing secure micro data center architecture by the platform including platform edge devices and one or more network cores residing in the platform top level domain at 1900. FIG. 20 depicts examples of dedicated and secure data system employing secure micro data center architecture and sandbox protections by the platform including platform edge devices and transit through platform LEO constellations, fiber, microwave, and the like at 2000. For example, FIG. 20 shows backhaul demo including microwave, fiber, and LEO based solutions at 2010. In the embodiments, the platform may provide secure micro data centers in a form where they may be "drop-shipped" with an integrated centralized or cloud connected radio access network (C-RAN) that may link to the 5G Core Network that may reside in a secure cloud or domain or top level domain (TLD) or any such combination. In embodiments, the platform may protect cloud and edge components. In these examples, the platform may be deployed with one or more micro data centers (MDCs) that may integrate an extensible cloud that may reside in the secure domain of the platform. In embodiments, the MDC may be drop-shipped and may be fully contained baseband unit with C-RAN connectivity (e.g., a BBU hotel) with options for fronthaul fiber or microwave interconnect. In embodiments, the fronthaul may be a common public radio interface (CPRI) that runs over the fiber or microwave to the baseband unit processing element. In embodiments, the MDC may be firewalled and may contain the C-RAN input/output interface and the baseband unit processing elements that together with the tower and remote radio heads may provide the radio access network.

In embodiments, the MDCs may also provide network slicing support for relocatable functions such as session management, signaling and bearer functions. These functions may allow signaling and data set up to occur, and for the bearer path to be set up across the Internet or for local applications processing. In these instances, policy control, authentication, and automatic VPN may remain in the secure domain level and purposefully not remoted. In embodiments, the MDCs may also provide C-RAN interface integration, auto-configuration and bring-up with one or more cores in the platform secure domain, zero-touch bring-up, LEO backhaul, and the like.

In embodiments, the 5G telecommunication network and computing platform may provide full 5G protection across the platform and may provide office applications for voice, video and data for all device types authorized to operate on one or more of the cores of the platform that may reside in the top level or secure domain. In embodiments, the platform may employ a platform secure domain that may be logically firewalled from the Internet and all the critical processes of the core may be sandboxed. In embodiments, the platform may employ a custom container for all sandboxed processes that may prevent unsolicited data exfiltration of any type and may be configured to clean slate the processes that violate the predetermined operational profiles. In embodiments, the platform may employ secure DNS and secure SIP processing that may reside at the platform secure domain. With this in mind, there may be no authority above the secure domain level and therefore this structure may cut out any spoofing at the session initiation protocol or data level. In embodiments, the platform may contain all devices in automatically provisioned VPN tunnels and all critical data may be distributed, e.g., subscriber information, authentication information, authorization information. In embodiments, the platform may deploy MDCs that may be linked to the platform secure domain for all policy, authentication, subscriber data. In embodiments, the MDCs may be standalone C-RAN and integrated processing hubs.

In embodiments, the 5G telecommunication network and computing platform may facilitate protecting data at rest to ensure that data belonging to a user or enterprise may be subject to authorization before it may be used for routing and Internet purposes. In these examples, the data may be separated into data, metadata, and service data. As such, any access to the data as a whole may be the subject to authorization controls. In embodiments, the controls may include atomic level permissions in that the actual owner of the data has to provide access permissions. In embodiments, the controls may be configured so that general level meaning may be that it is available to anyone and priority level meaning may be that it is open to the organization that houses the data and is available for use by the organization internally, e.g., for data checking or authentication purposes.

Secure 5G Core Network and Cloud

In embodiments, the platform may be configured to logically "firewall" the 5G Core Network inside a secure domain and to secure all signaling and bearer traffic. By way of these examples, this may prevent higher-level DNS servers from controlling any aspects of the control plane and may allow the platform to maintain all control over signaling or setting up bearer traffic paths in the platform Network or across intercarrier networks.

In embodiments, the platform may be configured to automate VPN setup to the endpoints without requiring an explicit VPN client or solicited set up at the endpoint. Furthermore, new secure I/O packet gateways based on field programmable gate arrays (FPGA) specifically designed for the 5G packet processing may be integrated into the platform 5G secure core network to support the control plane and user plane (e.g., also referred to as "data plane" which may be the data path) functions. In many examples, this may include all logical and physical links such as I/O between core components such as the radio access network and the 5G core network, for policy data access, for HSS subscriber data access, for multimedia services support, and the like.

5G Microdata Center (MDC) and Edge Network

In embodiments, the platform may be configured to demonstrate a secure, distributed, and integrated edge computing platform that may be deployed in real time and provisioned remotely. This differentiating feature of the platform may be shown to be especially useful in scenarios where certain military needs may require set up of a 5G network on the fly for special and temporary operations and other mission critical activities.

In embodiments, the Microdata Center (MDC) may integrate the radio access network (RAN), fronthaul, core network, secure Low Earth Orbit (LEO) satellite backhaul, and the cloud facility into one extensible network. By way of these examples, the MDC may be drop-shipped with a fully contained baseband unit (BBU) with integrated cloud-radio access network (C-RAN) connectivity with options for fronthaul fiber or microwave interconnect and low-earth orbit (LEO) backhaul. In addition, the MDC may also provide network slicing support for relocatable functions such as access and session management, signaling and bearer functions. By way of these examples, these functions may allow signaling and data set up to occur, and for the bearer path to be set up across the Internet or for supporting local processing and handling local latency sensitive applications.

In embodiments, the MDC may support a fully virtualized multi-tenant infrastructure, such as compute, networking, and storage. By way of these examples, the virtualization layer may provide some important security features. First, it may provide a sandbox environment to isolate customer applications from the physical infrastructure. Second, it may provide a security barrier between customers. Third, the usage of resources may be controlled so a customer may not exhaust all resources in the MDC and, for example, starve other customers. In addition to infrastructure, the MDC may also provide common security services to customer applications, such as data storage encryption.

5G Process, Data, and Infrastructure Security

In embodiments, the platform may be configured to protect the processes responsible for 5G secure core network operations, applications, and signaling and may provide relatively high levels of data security protection for data at rest, for data in flight, and both.

In embodiments, the platform may be configured to enhancing all the process level interactions through subsystem isolation, process sandboxing and applying machine learning behavior to key processes. By way of these examples, functions may be developed with machine learning behavior that may blueprint allowed patterns of access to and from key data sources and 5G secure core network resources such as the user data repository (UDR) and the home serving system (HSS). Each process instance may run inside a sandbox whether it is configured to use a full hypervisor or not. If malware attempts to exfiltrate data using an unauthorized path, then the process may be suspended, an audit trail may be set up, and then either by operator command or based on preestablished rules a clean slate reset may be performed. In embodiments, the isolation and machine learning methodology may apply to key instantiable processes of the 5G secure core network including session, authentication, database, policy, all mobility management functions, and the like.

In embodiments, the platform may be configured to deploy a new data protection paradigm where all stored data may be distributed in a parametrized fashion and encrypted with different keys. Moreover, the data may be further separated from its broader application context, e.g., the service function which may be responsible for performing actual services based on the change in data or change in context. In embodiments, these new data distribution and encryption techniques may ensure that critical subscriber and management data may not (or more difficult to) be spoofed, exfiltrated, destroyed or stolen without all sub-contexts being available or pulled together. By way of these examples, these techniques may be initially applied to the HSS, UDR, user data management processing and data repositories, and for key inter-process data flows.

5G Management and Network Operations (MANO)

In embodiments, the platform may be configured to provide end-to-end MANO capabilities and may define services that may be offered. By way of these examples, these services may be definable bundles of various components of such as 5G voice, 5G data, machine connectivity, bandwidth and backhaul functions, custom edge or access to standard edge for edge application deployment.

In embodiments, the MANO technology may be Open Network Automation Platform (ONAP) compliant and may allow for plug and play operational support systems. Because the platform may provide a 5G secure core network with integrated provisioning, performance management, administration and accounting functions, the platform may support best and vetted vendor operational systems such as general ledger systems. Furthermore, the system may provide for big data APIs and machine learning capabilities for value-add application development and custom application development.

In embodiments, the platform may be configured to securitize and authenticate all control plane and user plane messaging and operations, before, during, and after call processing is initiated using secure DNS, secure signaling, and secure I/O.

By way of these examples, the platform may logically firewall the 5G core network inside a secure domain and to secure all signaling and bearer traffic. In embodiments, the secure domain may allow the platform 5G secure core network to resolve and control all data path, signaling, and DNS queries and prevent malicious DNS servers, SIP proxies or serving networks from managing any aspects of the user or control plane of the platform. In this way, the platform may maintain full security control over signaling or bearer traffic channels hosted by the platform or across intercarrier networks.

In embodiments, the platform may be configured to automate VPN setup between endpoints it serves as long as the endpoints are authorized and authenticated. The VPN may be provided through encryption techniques handled by the core network within the data plane of the platform and may be part of SIP/SIP extensions and secure SIP implemented by the platform within the control plane. In embodiments, secure SIP may be based on the concept of zero-trust networking where SIP proxies are by default distrusted until they may be verified and switched to a trusted state.

In embodiments, secure I/O packet gateways may be configured explicitly for the integration of the data packet processing into the 5G secure core network of the platform to support the user plane functions.

Exemplary Facilities

In embodiments, the platform may be configured at an exemplary facility with an operating core network and RAN (e.g., initially based on 4G LTE). By way of these examples, the platform may provide operational support interfaces including element and network management functions to be able to bring up, administer, and manage the core network and RAN with C-RAN.

In embodiments, the 4G/5G Core Network may be a 4G NSA core. In further examples, the core network may be a 5G SA core. For the 4G LTE RAN, the spectrum bands supported may be bands currently supported by 4G LTE CONUS (Continental US).

Moreover, 4G LTE SIM (subscriber interface module) cards may be initialized in the databases for the home serving system, the policy control resource function, and the like.

In further examples, test equipment for signal attenuation and for simulating SIP and IMS may be installed to simulate compromises such as attackers, man-in-the-middle hacks, and the like. These simulations may be accomplished with standard ixia-type traffic boxes or via in-line patch scripts. Similarly, on the RAN side the platform facility may simulate replay attacks, UE spoofs, and the like. In doing so, the platform may use standard equipment from keysight-type companies or use in-line patches in the client UA registration or invite processes. These options may be predetermined based on the efficacy requirements for security testing.

Secure DNS Enhancements

It is appreciated in light of the disclosure that secure DNS refers to the Domain Name System Security Extensions (DNSSEC) defined by the Internet Engineering Task Force (IETF) for securing the Domain Name System (DNS) used on Internet Protocol (IP) multimedia networks. As such, DNS clients (resolvers) may perform origin authentication of DNS data, authenticated denial of existence, and data integrity. This may be accomplished by checking digital signature data associated with a query where the DNS resolver may be able to check if the information is identical (i.e., unmodified and complete) to the information published by the zone owner. It is appreciated in light of the disclosure that the requests for comments (RFC) associated with Secure DNS may also deal with key replacement and refresh, dealing with errors and exceptions, and different types of signature authorities and resolvers. In many examples, the RFCs for assuring that DNS resolution functions may be protected as per Secure DNS RFC's include: RFC 2535 Domain Name System Security Extensions; RFC 3833 A Threat Analysis of the Domain Name System; RFC 4033 DNS Security Introduction and Requirements (DNSSEC-bis); RFC 4034 Resource Records for the DNS Security Extensions (DNSSEC-bis); RFC 4035 Protocol Modifications for the DNS Security Extensions (DNSSEC-bis); RFC 4398 Storing Certificates in the Domain Name System (DNS); RFC 4470 Minimally Covering NSEC Records and DNSSEC On-line Signing; RFC 4509 Use of SHA-256 in DNSSEC Delegation Signer (DS) Resource Records (RRs) RFC; 5155 DNSSEC Hashed Authenticated Denial of Existence; RFC 6781 DNSSEC Operational Practices, Version 2; and RFC 6840 Clarifications and Implementation Notes for DNS Security (DNSSEC).

Secure SIP

It is appreciated in light of the disclosure that secure SIP assumes a zero-trust architecture. For calls handled exclusively on the platform and where the users and devices may be authenticated solely by the platform as the home serving network, SIP and call processing may proceed without any intervention of Secure SIP processing in the control plane. For calls between two devices on the platform but not on the platform network, for calls originating outside the platform where the non-platform user may be a visiting location register (VLR) i.e., a roamer on the platform network, or the call may be an incoming call from a foreign network then Secure SIP processing may be followed.

Maintaining Zero Trust Architecture

In embodiments, the platform is configured to implement a database that may maintain processes and procedures for validating or rejecting SIP proxies used as part of the SIP header for resolving SIP VIA's, i.e., call routing and address/eNUM resolution between platform and non-platform destinations. By way of these examples, the database may be dynamic and may be used for control plane processing of SIP resolution. In a zero trust architecture, there may be instances in which calls may be restricted to minimum facilities because, for example, the origin may not be determined or there may be problems resolving the trustworthiness of the SIP proxies used in the VIA headers.

SIP Whitelist

In embodiments, the platform may be configured to maintain a SIP Whitelist that details trusted proxies by carrier either initialized to be trustworthy or verified through third party databases or intercarrier data information exchange. By way of these examples, a VIA that may match an entry in the SIP whitelist, may be considered to be trustworthy for SIP internet key exchange (IKE) and for conducting the full range of SIP key exchange mechanisms and address resolution. In embodiments, the initialization of the SIP whitelist may require a management plane action to query inter-carriers for their proxy lists, e.g., multicast registrations supported by the multicast address "sip.mcast.net" (224.0.1.75 for IPv4). Moreover, using a management plane query may permit the whitelist to pull in all the known and verified country level proxies.

In embodiments, entries may be removed from the SIP whitelist by one of the following several options: by operator action; by timeouts where the proxy has not been used for a period of time (i.e., settable) and has, therefore, "aged-out" (although SIP Options may be used to "keep alive" the proxy status); by third party notification such as management reports over a Gx interface; and due to origin authentication failures, and the like.

SIP Graylist

In embodiments, the platform may be configured to maintain a SIP Graylist that details proxies used for the first time or carriers that may be encountered for the first time. If the carrier is known and has alternative routes to the origin, then the platform may deploy a SIP ReInvite over a trusted route. If the SIP ReInvite is successful, then the proxy may be moved to the whitelist for subsequent SIP resolution processing. In other examples, one of the following methodologies may be followed for moving SIP Greylist entries to the SIP Whitelist entries.

If the carrier is unknown, then a third party data source such as the North American numbering plan (NANP) may be consulted for verification of the carrier credentials. In embodiments, this would require a database SIP then if origin authentication may not be performed or the user may not be verified as a user on the platform, then the call may only be carried as a "restricted call" discussed further herein.

In embodiments, another option may be to use the SIP Options primitives to check proxy validation information such as registrar information to perform certificate exchange or checking against the domain/realm information.

In embodiments, the platform may use SIP Options to send "test messages" via trusted proxies to the unknown proxies to validate that they trust the unknown proxy (heuristic processing and validation). In embodiments, heuristics may be used based on previous call history to validate proxy servers as being reliable or sufficiently trusted to use for routing the control plane through the platform SIP black/gray/white lists and to kill and reroute when they are not based on mechanisms like SIP Re-Invite. In embodiments, SIP mechanisms like SIP Options may be used to test the SIP black/gray/white lists and to force re-registrations of the proxies and/or new keys when in doubt.

In embodiments, the platform may use peg counts maintained by the management plane that may determine when a threshold of successful resolutions has been reached allowing the proxy to move to the SIP Whitelist.

SIP Blacklist

In embodiments, the platform may be configured to maintain a SIP Blacklist of proxies that are not to be trusted. By way of these examples, calls may be immediately terminated or may be carried as restricted calls.

Restricted Call

In embodiments, the platform may be configured so that a restricted call may be given a minimum capability, e.g., voice only, which may be controlled through a session description protocol (SDP) exchange. By way of these examples, such calls may not be permitted to exercise the full capabilities of 5G and may be database restricted (e.g., no exfiltration of data may be allowed).

Origin Authentication

In embodiments, the platform may be configured to deploy several methods for performing origin authentication including interrogating eNUM databases for matching the SIP number, or matching the calling number identification in the CNUM database, or the calling name in the CNAM database or any combination. In certain examples, origin authentication may require access to third party databases, e.g., Neustar, Telcordia or possibly databases from the originating carrier.

In embodiments, the platform may be configured so that origin authentication may not be required for calls between platform devices hosted by the platform. Origin authentication may also not be required for calls between platform and non-platform devices where the VLR process has been executed successfully on the platform.

In embodiments origin authentication may be required, however, for any call where the SIP proxies may not be verified. In this case, the only viable option may be to issue a SIP Re-Invite where in effect the platform may issue its own invite (or re-invite) using a trusted path (when one is available) where the proxies are all known to be trusted.

It is appreciated in light of the disclosure that OTT methods may be used for specific requirements, especially those required by a sovereign and may be available to the platform and its users for very specific needs. In embodiments, the platform may enable origin authentication using third party databases such as eNUM, CNAM, CNUM, and the like, to make sure a user and directory number has not been hacked. By way of these examples, the platform may also involve correlating geolocation information with the third party databases (e.g., is the phone where it is supposed to be).

Secure I/O

In embodiments, the platform may be configured to deploy with certain links that may require the use of new cryptographic or encryption technologies for extremely secure data plane operations. In embodiments, these links may also be used to secure "open" physical links such as: backhaul data links, e.g., from the platform micro data centers (MDC) to the platform core network for control plane or data plane operations in cases where backhaul to the central core may be required (e.g., for HSS) access.

Backhaul Data Links from the IMS to the Internet

In embodiments, the platform may be configured to provide fronthaul for common public radio interface (CPRI) transport from the radio access network (RAN) to the microdata center (MDC) or platform core network. It is appreciated in light of the disclosure that CPRI may be timing sensitive because it carries radio information and, therefore, the technology used may be configured to meet the jitter requirements for less than seventy-five microsecond processing turnaround and less than 1.5 microsecond timing sensitivity for I/Q processing.

In embodiments, the platform may be configured to provide an interface to the cryptographic equipment that may be based on the UDP standard and may include a message based interface, e.g., secure stream or socket with call-backs for successful transmission. The interface specification may support three exemplary application programming interfaces as follows.

(1) In embodiments, management API may permit validation of an authorized device that may be attached to the packet gateways. The API may bring up the devices on recovery and start-up and may authorize them to use a certificate exchange. The API may also be used to initialize certain parameters for transport, e.g., the C-RAN interface may require different parameters to the data interfaces.

(2) In embodiments, a data plane API may support standard UDP communications where the cryptographic equipment may perform all (or most) packet handling and encryption. By way of these examples, the platform may provide a complete packet sequence to the device and the platform device may manage all three layers, MAC and physical transport requirements including fiber transport. In embodiments, the interface specification may provide certain primitives to support acknowledgements, errors, and reports.

(3) In embodiments, C-RAN API may support the transmission of radio data between the remote radio head (RRH) and the base band processing units within the microdata center (MDC) or radio access network (RAN). By way of these examples, the API may be tuned for the RRH type and sample rate may be, for example, sub-6 GHz and mmW connections through parameter setability via the management plane.

AutoVPN

For end-to-end data plane traffic between platform users, the platform may deploy automated VPN clients and key exchange and management may be provided through a third party system that may be integrated into operations, maintenance, administration and provisioning (OMAP) interfaces.

For platform to non-platform calls that are originated and terminated on the platform network, VPN may also be applied but, in embodiments, it may run from a platform to the serving RAN but not to the user equipment itself depending on user equipment capabilities and options. Options for S/MIME, TLS or IPSec may also be supported for platform to non-platform calls on the platform network.

For platform to non-platform calls where one side is not on the platform network then the call may be subject to a best efforts VPN service. This may also depend on the SDP exchange of options supported, meaning if the remote end may entertain S/MIME, TLS or IPSec it may be attempted. If a link is not established because of intervening serving networks, then the SDP exchange may determine the best compromise. Ultimately, if it is determined that there may be (i) no paths for security, (ii) the call requires security, (iii) there are untrusted proxies involved, and (iv) a SIP re-invite may not be possible, then it may be confined to a "restricted call" status protected from the overall platform.

In embodiments, SIP may require user agents (UA) acting on behalf of the user to register for service with a domain server responsible for resolving the location of the user in subsequent location requests. By way of these examples, user agents may be either a client side (UAC) or server side (UAS) entity. As such, there may be strict procedures for SIP registration, location services, and for UAC-UAS protocol handling aspects. In embodiments, a SIP registrar may be a separate entity to a location server and need not be co-resident. Generally, the SIP registrar may maintain the address of record for a UAC but that is network and implementation dependent as the separation of registrar and location server can be. In various examples, a carrier may have one registrar database for all of its UACs and may have many geographically distributed location servers. Registration may create bindings in a location service for a particular domain that may associate an address-of-record URI with one or more contact addresses for a user.

In embodiments, SIP resolution may require specific protocols at the user, transport and transaction level. However, because a request may involve other networks and domains, and because there may be no explicit end-to-end requirements for calling UAC to called UAC (or even for calling UAS to Called UAS verification), there may be holes in SIP that may be exploited. These may come about because of the fact that the transport procedures may not be end-to-end but bilateral between neighboring carriers or session border controllers or intermediaries in a chain of intermediaries.

In many examples, SIP VIAs may establish how a route may pass through many intermediaries before the location is found. It is appreciated in light of the disclosure that this may be exacerbated by redirect servers and weak policies adopted by inter-carrier border processes. As such, a SIP VIA header field may indicate the transport used for the transaction and may identify the location where the response is to be sent. By way of these examples, a value may be added to the SIP-VIA header field only after the transport that may be used to reach the next hop has been selected. When the UAC creates a request, it must, therefore, insert SIP-VIA header information into that request and, in many examples, it must contain a branch parameter. This parameter may be used to identify the transaction created by that request and may be used by both the client and the server. In examples, the branch parameter value must be unique across space and time for all requests sent by the UA. However, the precise format of the branch token may be carrier implementation defined. SIP registration procedures, SIP redirections, SIP location servers, and SIP VIAs may be common in the following types of attacks: Forgery; Verification spoof; Password compromises (at registration); Spam; Message and data Cloning; Message modification; Message insertion; Message tampering; Impersonation; Spoofing; Eavesdropping (adding SIP forks); Replay; Session spoofing; etc.

LEO Constellation Security

In embodiments, the LEO components of the platform may be shown to be more secure than ground based SIP registrar, SIP resolvers/location server entities or SIP redirect servers all of which may be open to back-door hacks (e.g., administration threats) and Internet level attacks from DDoS to malware. By moving platform registrar functions and location services to the LEO components of the platform, it may be shown that there may be almost zero chance that platform user information such as SIP addresses, addresses of record, and information used during SIP processing (e.g., Call Id. and tag information) may be spoofed, spammed, cloned, impersonated, forked or otherwise used in eavesdropping or malicious attacks.

Enhancing Stateless and Stateful Processing

In the many examples, there may be specific reasons for stateless (normal VIA routing) and stateful (e.g., CALEA) processing. With a LEO constellation, it may be shown to be possible to create more optimized options for both stateless and stateful processing including "skip" VIAs where using SIP Re-Invite messages to use a more trusted route to the origin, or using SIP Options processing to change a route at the midpoint in a call as a result of an unexpected event or to enforce an updated or new security policy. In addition, for users where the endpoint may not be verified or there may be no location server binding, it may be possible for the platform to create one-off authorizations that do not perturb the terrestrial networks and that are only held in the LEO network. In embodiments, the platform may adopt very specific SIP dialogs for one-off authorizations that may be unique and not open to ground based systems.

SIP Registrar Database

In embodiments, the registrar functions may be shown to be inherently easier to protect in the LEO constellation, to prevent forgery, and to prevent verification spoofs and password attacks. In LEO back-door attacks, the platform may be shown to entirely eliminate such attacks because a LEO constellation of the platform may leave a distinct audit trail for any LEO management plane accesses. To prevent malware attacks on the LEO SIP database, the access to change the LEO SIP database may be restricted, in embodiments, to flow through the LEO satellite control facility, which is a secure, restricted access facility with its LEO satellite control computers disconnected from the Internet and external systems ("airgap") to ensure satellite security.

In embodiments, the platform may be configured to permit hosting of addresses of records for non-platform users who apply for a platform identity. By way of these examples, this identity may be temporal or granted as a one-off under certain circumstances. By way of these examples, this may not be possible for the terrestrial network where all the appropriate location servers may need to be updated whereas in the LEO on the platform, a new address of record may be shared only amongst the LEO constellation and be kept confidential which may be very useful for battle field operations.

SIP Location Service

In embodiments, the LEO components of the platform may be responsible for updating the SIP "trees" in the terrestrial DNS but may use differentiated TLS methods for inter-carrier verification. Moreover, the LEO components may act as a universal default location service for non-verifiable UACs, which may be subject to other platform verification mechanisms including using SIP Dialogs for end-to-end, one-off, clearance procedures.

Call Control Flow Operational Requirements

In embodiments, the control plane of the platform as it relates to SIP processing and session description protocol (SDP) processing may be relocated to the LEO system (e.g., one or more LEO satellites such as the LEO constellation). By way of these examples, this may include all mid-call triggers, e.g., conferencing, add-ons, mid-call Invites, etc. In other words, all call selection and call handling may be configured to run the entire 5G control plane for 5G call setup may take place on the LEO system (e.g., LEO components of the platform).

In embodiments, some of the handling may, however, continue terrestrially once the call anchor radio access network (RAN) and mobility management entity (MME) are set up. By way of these examples, all calls have an MME anchor and may be set up by the access management function (AMF) and the session management function (SMF). In embodiments, certain control functions may remain with the terrestrial anchor points and the Core Network such as the following four examples:

(1) Processing for the S2 interface (call control to the device) and the X2 interface (call control between base stations) that may involve hand-offs between towers as the caller moves between towers. In embodiments, these transitions may be rapid and effect the media data streams. As such CSCF requirements for hand-off may be best handled by the platform core network, and the RAN and MME anchor points.

(2) Providing a Media controller gateway function that may be required for transcoding in VoLTE because it is part of the call control during call establishment and tear down, e.g., the session description protocol (SDP) may need to decide which transcoder to use which could involve some back and forth negotiation and parameter setting.

(3) There are cases for VoLTE where some of the functions may be split between the platform core network and the LEO such as for 4G fallback or circuit switched fallback.

(4) Network management and configuration management may be challenge and may require enhancements to the Gx interfaces and other management plane interfaces.

In embodiments, the platform may be configured to deploy secure SIP that may maintain black, grey, and white lists and may use origin authentication together with SIP re-Invite when the platform may not ascertain the trust level of an attempted SIP route. With the platform LEO constellation, additional enhancements may be possible including the following three enhancements:

(A) Fake Base Station handling. In embodiments, SIP may not validate the Base Station (BTS) or cell IDs. This is a function of the access management function (AMF) or mobility management entity (MME), which may directly deal with BTS authentication using encryption and registration functions in the Radio Access Network (e.g., the gNB signature may be authenticated prior to usage). In embodiments, LEO components on the platform may store gNB signatures in an equipment identification register (EIR), which may be kept in the LEO constellation. By way of these examples, this means all BTS verification may require a LEO authentication procedure as part of the AMF, may require a new Gx interface for "fast access", and may be shown to make the EIR un-hackable.

(B) Fake device handling. Management interfaces like N2 (HSS to MME connection management) or signaling interfaces like S1 (MME to UE) may use encryption for interactions with the UE (user equipment) after a certain point. To prevent fake devices, an EIR (equipment register) may therefore, be extended to include international mobile equipment identity (IMEI) validation. In embodiments, this may be an HSS function and, in some embodiments, the entire HSS database may be in the LEO constellation.

(C) Calls entirely on the platform. By keeping the HSS database in the LEO constellation, it may speed up resolution calls entirely on the platform and may minimize call-setup time and execution. It may be anticipated that the entire platform SIP registrar database may remain in the LEO constellation. Even though the constellation may be storage bound, the number of platform users and devices may not be expected to tax resources in the platform LEO system. In embodiments, medium sized platform LEO components may have a minimal capacity of 1 TB per satellite.

It is appreciated in light of the disclosure that for incoming calls, the CNAM (calling name) database may always be part of the resolution with the IMS, which may require access to the HSS/HLR (home location register) and UDM (user data management) DB. The IMS may, therefore, take care of that resolution and it may interface to other carriers to retrieve it. Resolving CNAM in the sky may not be critical as part of the SIP incoming call resolution, as it may be handled by the serving carrier at the terminating side or via an access to the Core Network HSS.

Processing Overhead

In embodiments, the number of SIP proxies may be driven by the number of BHCA (busy hour call attempts) for which the platform may be designed to handle. By way of these examples, using 100-200K BHCA for VoLTE as a benchmark, a single instance IMS may handle 100 k BHCA for SIP resolution.

Based on current information a single LEO satellite may be expected to provide the following performance characteristics: (1) 576 GPU cores per satellite for a medium sized satellite system. (2) 192 GPUs may cost a power budget of 76 W. In embodiments, a medium sized satellite may be expected to provide up to 700 W of use-able power for processing and compute. It may be expected that a ⅓rd of the power budget may be available for compute. This may support almost 576 GPU cores. (3) SIP may be uniquely adapted to GPU processing—may not require general purpose CPU. (4) Each GPU may run 1000+ threads. A single LEO satellite may, therefore, be capable of 500K threads per instance of time or based on Erlang models (2-minute call holding time, etc.) up to 10M BHCA per satellite. In embodiments, a small or medium sized constellation may be able to handle 500M or more BHCA.

Database Overhead

At any instance in time, the maximum number of VIAs being handled by the platform may be likely to be in the thousands. In embodiments, the 1 TB capacity may be more than adequate to handle database requirements (stateless and stateful) per instance of time or for 10M BHCA. In embodiments, the platform may exclusively use SIP resolvers in the LEO constellation and keep all the secure SIP processing in the LEO constellation e.g., black, white, and grey, and origin authentication and SIP Re-Invite.

In embodiments, CNAM resolution may not be needed in the LEO constellation as long as the terminating carrier handles the database DIP to fetch the CNAM entry.

In embodiments, HSS may be put in the LEO constellation for calls entirely hosted by the platform to limit roundtrip delays. Furthermore, with the HSS and SIP proxy handling in the LEO constellation, the platform may use proprietary methods to "test" the veracity of the SIP Proxies through data checking and signature checking, for example:

(a) Using SIP Option requests for UAS to UAS checking e.g., performing domain checks or using proxy cross referencing.

(b) SIP Dialog processing for UAC-UAC "handshakes" thru one-time keys and challenges etc. In embodiments, this may be useful for calls to the platform from a non-platform caller, from the platform to a non-platform receiver of the call, and for calls that may be entirely on the platform but users are not using authorized devices. The database requirements for maintaining the SIP proxies, Equipment Registers (EIR) and SIP black/white/grey lists may be expected to be small <20 GBytes per satellite. It is appreciated in light of the disclosure that the requirement for the HSS may be dependent upon the number of platform users and is, therefore, not likely to exceed 500 GBytes per satellite.

LEO Satellites May be a Critical Element of a Secure 5G Network Architecture

In embodiments, the platform with its dedicated 5G secure network may move computing, data, and application intelligence into the network and transform the network from a transactional transport medium to a robust and dynamic computing platform. This fundamental change in 5G architecture may enable next generation future applications that require ultra-low latency response times such as virtual reality, autonomous vehicles, and industrial robotics at a massive scale.

In embodiments, the platform edge may provide a secure distributed edge network with integrated RAN, cloud, and backhaul with seamless provisioning that may be critical for enabling next generation low latency applications and having the ability to set up a 5G network platform 'on-the-fly' for remote operations.

In embodiments, LEO satellites may be a critical element of the platform Edge Network. The LEO satellites of the platform may extend the 5G network ubiquitously and globally by providing secure backhaul and may also include the full platform security framework with full support for software defined networking (SDN). By taking this approach, each LEO satellite may become an actual 5G network node of the platform with tightly integrated 5G network functionality resulting in a more secure platform with a robust and high performing 5G network.

LEO Satellite Backhaul Provides Ubiquity, Security, and Redundancy

Low earth orbit (LEO) satellites or a blend of geostationary and LEO satellites may provide an ideal solution for backhaul connectivity. In embodiments, constellations including 5G LEO satellites may extend the reach of the platform 5G network to any part of the globe. As such, the LEO satellite backhaul connectivity may be easily and quickly established by deploying a small ground terminal at the 5G Radio Access Network (RAN) location.

It is appreciated in light of the disclosure that the LEO satellite's space-based routing may be difficult to intercept or interrupt making LEO backhaul highly secure. In embodiments, the platform LEO solution may further enhance LEO security by incorporating proprietary secure control plane, data model, sandboxing, and I/O encryption techniques. The security possible from LEO satellites' physical isolation in space may be augmented with the platform's security framework and may be especially valuable for secure standalone 5G networks for the military, intelligence, and commercial applications.

For certain sovereign governments and militaries, the platform may enable the immediate and secure provisioning of connectivity to secure installations such as embassies and military deployments. For example, LEO satellites on the platform may provide backhaul from a 5G RAN located at a military base in Afghanistan to a U.S.-based 5G Core without landing at any point or in any country between Afghanistan and the United States. Similarly, secure backhaul connectivity may be established from a plane in flight or from a ship at sea to a 5G core in the U.S. In addition, LEO backhaul may also be valuable for providing connectivity to rural addresses and providing uniform capability to remote select sovereign military bases, installations, and infrastructure.

For locations with fiber or microwave backhaul, LEO satellite backhaul provided by the platform may enhance 5G robustness by providing a physically diverse, space-based, redundant backhaul path. Terrestrial-based backhaul may be subject to unexpected interruption, such as when a fiber cable is accidentally cut by a backhoe or a microwave transmission path is interrupted by interference. By providing a redundant LEO satellite link to cell sites requiring assured service availability, temporary interruption to the fiber or microwave backhaul may be shown to be instantaneously restored via the LEO backhaul. Moreover, software-defined networking (SDN) integrated into the platform LEO satellites may further enhance the switch-over and switch-back capabilities from terrestrial and satellite paths.

It is appreciated in light of the disclosure that the disaggregated architecture of LEO constellations formed by multiple identical LEO satellites may make LEO satellite backhaul resilient and scalable. Moreover, placement of in-orbit spare satellites dispersed throughout the platform LEO constellation may permit failed satellites to be quickly replaced. This capability when combined with a continuous replenishment of operating policy and multiple satellite coverage for each 5G cell site, may ensure continuous LEO backhaul availability on the platform. As 5G network usage grows, the LEO constellation on the platform may be easily scaled to accommodate the increased backhaul usage by launching more satellites and decreasing the coverage footprint of each satellite. This may be analogous to increasing the capacity of a cellular network by increasing the number of cell sites within a given area.

In embodiments, the platform LEO satellite backhaul may bring substantial benefits to a secure standalone 5G network including the following: security, ubiquity, immediacy, resiliency, and scalability. Security may be provided by utilizing entirely space-based links between the RAN and 5G Network Core that may be very difficult to intercept, or interrupt further enhanced by the platform's proprietary secure control plane, data model, sandboxing, and I/O encryption techniques. Ubiquity may be provided by extending the platform 5G network to connect to a RAN located anywhere in the world. Immediacy may be provided by 5G RAN being provisioned within a few hours with the quick deployment of one or more satellite ground terminals. Resiliency may be provided with high availability augmented by the self-healing feature of a disaggregated LEO satellite constellation that may lead to essentially continuous 5G network availability. Scalability may be provided by growing capacity through launching more satellites incrementally, which may be analogous to increasing cell-site density in regions with growing populations. Deployment of a 5G-specific, Custom-Designed LEO Platform Solution may provide Unmatched Level of Security and Robustness.

In embodiments, the platform may incorporate a 5G-specific, custom-designed LEO satellite system (also referred to throughout disclosure as "LEO system") into its end-to-end platform. The platform LEO system may include the platform security framework (secure control plane, data protection, smart sandboxing, I/O encryption) with integrated software defined networking (SDN), to create a LEO backhaul segment and an integrated 5G system meeting platform objectives. As a result, platform LEO backhaul may be shown to be substantially more secure than typical commercial LEO systems.

In embodiments, the LEO satellites of the LEO system (of the platform) may incorporate, among others, the following features and benefits: (1) A LEO satellite constellation designed for 5G and dedicated to the platform network; (2) platform security protocols and encryption that may include LEO backhaul; (3) on-board processing and routing of traffic (i.e., data center in the sky) that may include platform-specific software defined networking (SDN); (4) inter-satellite links that may keep all backhaul traffic isolated in space between the 5G RAN and the 5G core network regardless of the separation distance (e.g., Afghanistan to DC); (5) platform LEO satellites manufactured by select aerospace industry suppliers with domestically-sourced and/or securely sourced software conforming to the platform's software security standards; and (6) command, control, and telemetry of platform LEO satellites that may employ encryption approved by the U.S. National Security Agency (e.g., currently "Gryphon") or approved by other select sovereigns.

In embodiments, LEO satellites on the platform may deliver the following capabilities and benefits to user: security for sovereign military or government installations and commercial installations; flexible, adaptable, re-locatable military and government operations; assured availability at critical sites; disaster recovery and backhaul redundancy; and uniform capability to rural addresses.

LEO Components on the Platform

To demonstrate conformance to the performance and operation objectives for the platform 5G system, platform LEO backhaul may be shown to provide at least: (1) platform security protocols and encryption that may envelope and include LEO backhaul; and (2) on-board processing and routing of traffic (i.e., data center in the sky) that may include integrated software defined networking (SDN) control and traffic routing. In embodiments, Applicant appreciates that these two functionalities may be central to integrating the LEO backhaul into the platform security envelope and network management. In embodiments, the LEO backhaul, the LEO security, and the LEO SDN may be shown to demonstrate the following: (1) equivalence of security robustness between the fiber and LEO backhaul paths; (2) passage of SDN control of traffic routing over the LEO backhaul path; and (3) equivalence of traffic control and routing via the SDN between the fiber and LEO backhaul paths.

Platform 5G LEO solution with network functionality and edge computing within each LEO satellite and the backhaul network may provide an unmatched level of platform security, redundancy, and robustness for military and government usage of 5G and the immediate ubiquity needed for 5G extension to rural and remote locations anywhere in the world.

It is appreciated in light of the disclosure that entities receiving and acting upon a session description protocol (SDP) message should be aware that a session description may not be trusted unless it has been obtained by an authenticated transport protocol from a known and trusted source. In embodiments, secure SIP processing on the platform may alleviate this problem. In case a session description has not been obtained in a trusted manner, the endpoint, in embodiments, may exercise care because, among other attacks, the media sessions received may not be the intended ones, the destination where media may be sent to may not be the expected one, any of the parameters of the session may be incorrect, or the media security may be compromised.

In embodiments, using a key exchange descriptor, e.g., SDP, may support the transfer of keys over a secure channel SSL/TLS but only if the SDP may be conveyed over a secure and trusted channel. Examples of such a channel might be SDP embedded inside an S/MIME message or a TLS-protected HTTP session. It is appreciated in light of the disclosure that it is important to ensure that the secure channel is with the party that is authorized to join the session and not an intermediary. If a caching proxy server may be used, it is important to ensure that the proxy is either trusted or unable to access the SDP using platform Secure SIP.

In embodiments, platform Microdata Centers (MDC) may include radio-heads; front-haul network; edge data center including RAN runs in the edge data center and customer workloads run in the edge data center; and back-haul network including via customer owned IP connectivity and via platform LEO connectivity.

LEO System Using SDN Feature of 5G

The software defined networking (SDN) capabilities, as described in the disclosure, may be a particularly useful feature of 5G technology. SDN is a key component of 5G such that 5G transport may not be run without SDN. The use of SDN with cellular networks may have been available with some earlier cellular networks such as at least some later versions of the fourth generation (4G) network. While the LEO system may be primarily used with 5G networks, Applicant appreciates that the LEO system may be used with other networks utilizing SDN capabilities.

The organization and/or architecture of control planes in most 4G and third generation (3G) networks may be the same such that control planes cannot be controlled through an application entity or layer. These communication networks typically include a signaling network that may be used with ground-based routers. In 4G, the signaling network may be SIP and for 3G, the signaling network may be SS7 which both typically use ground-based routers in generally the same manner. In contrast from these typical 3G and 4G networks, the LEO system may utilize SDN of 5G networks to provide desired functionality of specifically separating the control plane from the data plane, and for providing application layer control of the control plane. The LEO system may use at least one SDN controller for using or directing the control plane with respect to the data plane.

As described above, the 5G-related SDN may permit routing and managing for securing a control plane such that network control signaling may be separated from the data plane (e.g., voice, data traffic, etc.). With the ability to separate planes from one another, the virtual functions in support of the control plane may be supported by computing on the LEO system (e.g., LEO satellites) separate from LEO satellites whose resources support data communication across the data plane between two locations. In separating and securing the control plane, the signaling and handshaking may be conducted securely between these two locations to support data communication across the data plane, and for effectuating specific data plane behaviors e.g. broadcasting, multi-cast, specific types of routing, etc.

In some examples, the LEO system may use an OpenDaylight standard (e.g., use of SDN and network function virtualization (NFV) such as use of OpenDaylight representational state transfer (REST) APIs) for distinguishing and separating control between SDN controller on the LEO system that may provide control of the control plane and the SDN application (e.g., SDN application may be on the ground on a terrestrial system for directing or using the SDN controller on the LEO system). The capabilities of this standard may include use of application programming interfaces (APIs) that may be used with the LEO system for providing direction to the control plane. These APIs between the SDN application (e.g., on the ground) and the SDN controller of the LEO system (i.e., in the sky) may be used to direct the control plane with respect to the data plane (e.g., taking actions to data flows). The SDN controller of the control plane may further manipulate other APIs impacting the data flows of the data plane as described in more detail below.

LEO System Control of Forwarding Plane/Data Plane

The LEO system may use forwarding plane or data plane technology to address a forwarding plane problem. Communication of LEO satellites of the LEO system with an earth station may include a purview of each LEO satellite of a relatively short period of time (e.g., about six to 10 minutes) before connection may need to be switched to a new LEO satellite over the horizon. While traffic may be flowing to the earth station and from the earth station, the buffering and logistics required in order to maintain data streams without interruption and to support normal packet processing may be difficult for a LEO system because at the ground level, ground or terrestrial systems may need tracking sub-systems, gimbal sub-systems and/or other types of subsystems to be able to connect to the LEO satellites, and then be able to change routing tables proactively ahead of time, knowing the route of the LEO satellites, so that there may be an uninterruptible capability from the ground station to the LEO system via the LEO satellites. This may be referred to as the forwarding plane problem.

Typically, the forwarding plane (may also be referred to as a data plane or a user plane) may be at terrestrial systems on the ground working with routers at the LEO system with LEO satellites moving quickly (e.g., at X many miles per second) and the routers at terrestrial systems being fixed. In summary, on the ground there may be a fixed router, and in the sky, there may be moving routers on the LEO satellites. The forwarding plane or data plane may need to be proactive to anticipate future LEO satellites that may arrive (e.g., in a one-hour window) and be able to route efficiently without interruption and without perturbations to a control plane. This is because the control plane, although it is not time sensitive, may eliminate or at least limit dropouts which can end calls and/or cancel a signaling channel.

In some examples, there may be LEO satellite to LEO satellite communication such that the forwarding plane or data plane may be needed at least partially in the sky via the LEO system. For some 5G and SDN network examples, the control plane may be under the control of applications on the ground. For these examples, since the control plane may be under the control of an application and the application may need to launch particular types of capabilities (e.g., broadcast capability), there may be a need to have the forwarding plane or data plane (or at least a portion of the forwarding plane) in the sky at the LEO system that may be adaptable to application command or may be able to subsume what an application may be doing.

For example, where communication is between New York and Tokyo. If an application prefers to run this communication capability, then the forwarding plane or data plane at the LEO system (in the sky) may be dealing with the forwarding plane at terrestrial systems (at the ground) but also the forwarding plane in the sky due to communication between LEO satellites. For this example, the LEO system may provide a capability of taking over this control such that the LEO system may request all LEO satellites over New York and all LEO satellites over Tokyo to run this communication or broadcast application by utilizing the SDN of 5G as described in this disclosure. The related data stream may need to be replicated twice such that one stream may be sent to the New York LEO satellites and another data stream concurrently may be sent to the Tokyo LEO satellites.

Control Plane and Data Plane Nodal Network

In some examples, the control plane may be arranged as control plane nodes (e.g., where each LEO satellite may be a node) that may be connected by free space optical links or transmissions. These free space optical links may be lasers in space. The control plane nodes, for example LEO satellites, may be connected by free space optical links or transmissions. In contrast, as described above, terrestrial systems (e.g., terrestrial backhaul) may be connected by physical fiber optic cables.

In this example embodiment, control plane loads may be connected by free space optical links across control plane nodes. This example may include a network (e.g., 5G network) that expects that the control plane may, in most instances, exist in nodes that are physically separate from the nodes that are carrying the data plane. In most instances (except for secure calls), the data plane may be run terrestrially (i.e., via terrestrial systems). The LEO system may generally direct the control plane with respect to management of this special set of control plane nodes that have LEO characteristics that may be biased towards control plane activities.

The data plane may be formed from one or more data plane nodes (e.g., where each data plane node may be one terrestrial device). In examples, these terrestrial devices may be linked by fiber optic cables. For example, a terrestrial SDN network (e.g., as provided by carriers) may include data plane nodes that may be interconnected. The control plane may be used to manage the data plane (i.e., data plane nodes) such that all data plane nodes may be considered equal for finding best nodes based on topology, traffic flow, latency, and the like. The control plane may be further directed to select some data plane nodes over other data nodes with respect to security as described in the disclosure (e.g., using SIP black/gray/white lists).

LEO System Overview Example

Figure 21:
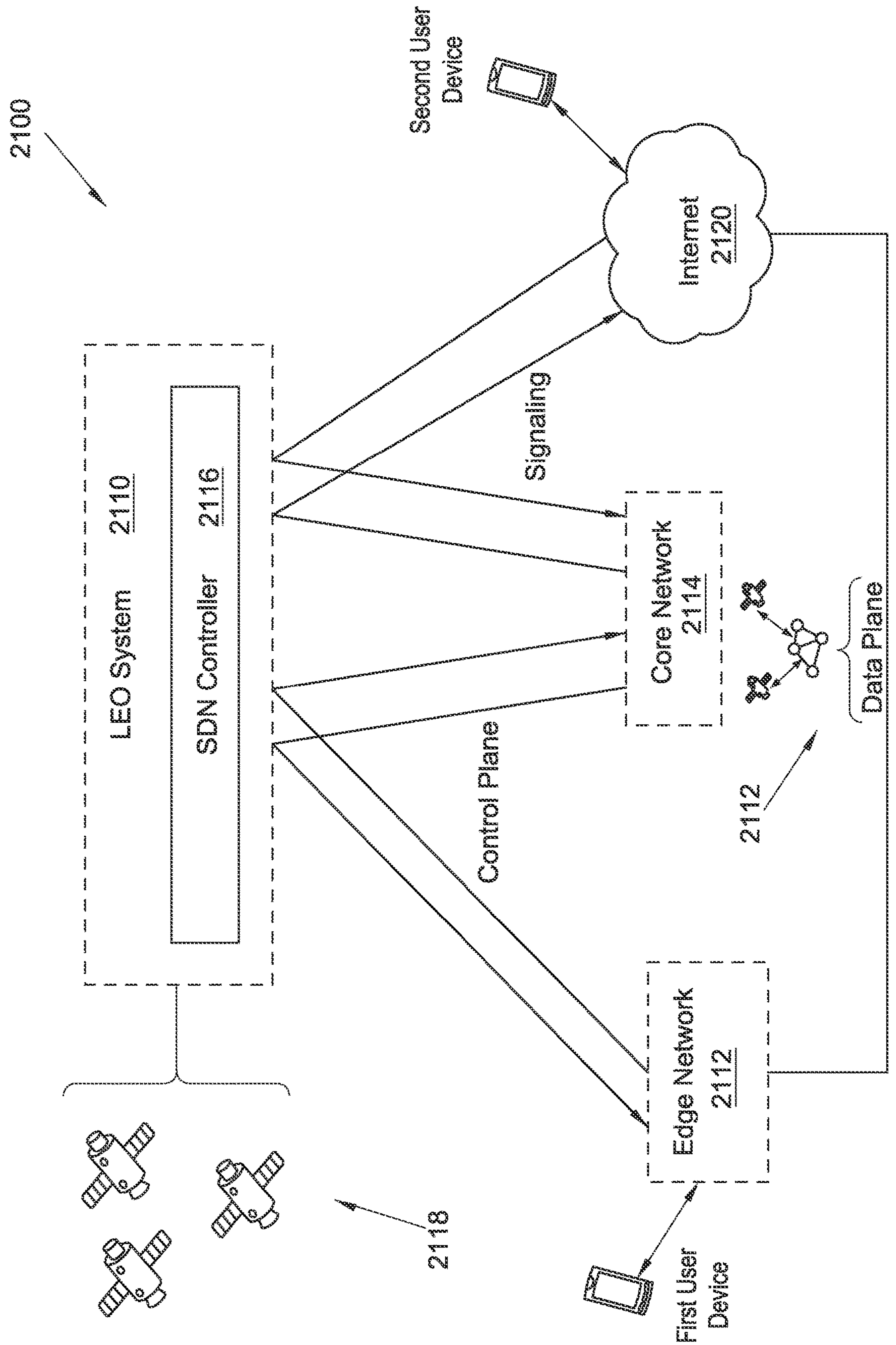
FIG. 21 is an example diagrammatic view of a LEO system communicating with an edge network and a core network across a 5G network in accordance with one or more example implementations of the disclosure.

In example embodiments, referring now to the example implementation of FIG. 21, there is shown a LEO system 2110 communicating with an edge network 2112 and a core network 2014 of a 5G network at 2100. Previous standard control planes may be typically between the edge network 2112 (e.g., 5G edge network or 5G cloud) and the core network 2114 (e.g., 5G core network or 5G core cloud). As shown in FIG. 21, the LEO system 2110 may utilize software-defined networking (SDN) to separate the data plane from the control plane of the 5G network. The edge network 2112 may be connected to the LEO system 2110 via the control plane such that LEO system 2110 may exclusively direct or use the control plane (e.g., using the SDN controller) between the edge network 2112 and the core network 2114 of the 5G network. The LEO system 2110 may determine and generate a pathway for the data plane by using or directing the control plane.

In example embodiments, as shown in FIG. 21, a first user may use their first user device to send a service request from a first location (where the first user device is located) via the 5G network for transmitting data from the first location to a second user device at a second location. The LEO system 2110 may establish software-defined networking (SDN) exclusive control of the control plane (e.g., using the SDN controller 2116) based on the service request. The LEO system 2110 may determine and generate a pathway for the data plane from the first location to the second location based on the service request and the control of the control plane on the LEO system 2110. The data may be transmitted along the data plane from the first user device at the first location to the second user device at the second location based on the generated pathway of the data plane. In some examples, the second user device may access this transmission from the first user device from the edge network 2112 via Internet 2120. The core network 2114 may provide signaling to various destinations across the LEO system 2110 and via the Internet 2120.

In example embodiments, as described above and shown in FIG. 21, the LEO system 2110 and particularly the control plane of the LEO system 2110 may be encompassed of one or more control plane nodes 2118 connected by free space optical links (e.g., may also be referred to as satellite communication links or inter-satellite links between satellites) forming the control plane of the 5G network across the one or more control plane nodes 2118. The SDN controller 2116 may be used by the one or more control plane nodes 2118 to direct or use the control plane in selecting one or more data plane nodes 2122 that form the data plane of the 5G network across the one or more selected data plane nodes 2122. The one or more control plane nodes 2118 may use the SDN controller 2116 to determine and generate the pathway for data across the one or more selected data plane nodes 2122. The one or more control plane nodes 2118 may be one or more LEO satellites. The one or more selected data plane nodes may include at least one of a LEO satellite, a terrestrial network device, and a combination thereof (e.g., mix of one or more LEO satellites and one or more terrestrial network devices).

In some examples, the data plane (e.g., bearer network) may be in the form of a fiber. The data plane may provide transmission of VPN/non-VPN data and/or voice/video data.

SIP may be generally used by the LEO system 2110 for signaling and controlling multimedia communication sessions such as with voice and video call applications as described in more detail below. Specifically, secure SIP may be used for providing blacklisting and whitelisting as well as origin authentication as described in the disclosure. In some examples, the SIP graylist, as described in the disclosure, may also be utilized.

HSS may be generally used for generating authentication vectors for subscriber authentication. HSS may also be used by the LEO system 2110 as described in the disclosure. In examples, for 5G networks, authentication server function (AUSF) may rely on HSS supplied information e.g. international mobile subscriber identity (IMSI) data and in turn the HSS utilizes unified data management (UDM) i.e. data repositories managed by the HSS. AUSF may generally resemble functionalities of HSS/AAA server of 4G networks for authenticating user equipment (UE). UDM may generally provide various operations (e.g., similar to HSS/AAA of 4G) such as user identification handling, user authentication, subscription management, access authorization, etc. HSS along with AUSF and/or UDF may be used with subscriber data, subscriber identity module (SIM) information, and phone information as described in the disclosure. These HSS-related modules may be specifically used for verifying identify of a requesting system using certificates as described above with respect to using risk based multi-factor authentication to verify identity of users.

The LEO system 2110 may interact with various software applications to provide different types of control and instructions to the control plane. For example, some applications may include network interactive voice response (IVR), DN Pooling, private dial plans, network private branch exchange (PBX), portability, announcements, and/or disaster Recovery.

The LEO system 2110 may also include and/or provide session description protocol (SDP) as described in more detail below. SDP may generally relate to end points negotiating parameters of exchange such as session announcement, session invitation, and other parameters. SDP may be generally used between end points for negotiation of media type, formal, and other associated properties. Specifically, the LEO system may use SDP for programming applications that may be handling private networks and specific interworking requirements e.g. language translations or announcements, etc.

The LEO system 2110 may use the SDN controller 2116 generally for network-related control such as routing, forwarding, and access control list (ACL). The SDN controller 2116 may be used to provide data plane control via a data plane control interface (e.g., APIs) such that packet forwarding processing may be issued by the SDN controller 2116 (e.g., related SDN control software).

LEO System Handshake Process

The LEO system may provide handshake capabilities by using a handshake subsystem (e.g., handshake application) that may manage all inter-carrier handshaking. For example, highly sensitive and secure communications (e.g., phone calls) may be transmitted with a sovereign military application. Where a transmission is between Washington, DC and a military base, the transmission may likely go through at least three to four terrestrial connect points or more. Typically, this transmission may follow the data plane which may include a pathway via one or more undersea cables. These undersea cables may be connected by one or more terrestrial networks for routing transmissions across the undersea cables. The pathway of the data plane may include several terrestrial networks in underdeveloped countries or countries that simply have minimal to no security standards (e.g., below software security standards established by the platform that may relate to a sovereign military security standard). The control plane may determine all these undersea and terrestrial points (e.g., undersea cables and terrestrial devices) for setting up the pathway of the data plane.

At each instance where the communication or transmission passes through an embassy point or a terrestrial point of a country, the communication may be passing through a different carrier having a carrier handshake. The secure domain name system (DNS), as described above, is designed to protect the integrity of the signaling information between carriers, but many inter-carrier relationships rely on trust relationships. Carrier handshake security issues may be typically addressed by session border controllers of carriers such that each carrier may validate communication as meeting a security profile. However, there is no way to determine a veracity of local security profile standards. For example, if communications and/or transmissions pass through high-risk countries, these countries' communication systems may have minimal security standards as described above (e.g., running minimal or no security protocols) allowing for information to be accessed from attacks or hacks (e.g., man-in-the-middle attacks). These countries with risky communication security standards have networks that may be immature such that the administrators may not be aware of attacks and external attackers accessing and/or extracting data on terrestrial links of these networks. Accordingly, by moving the control plane (i.e., including routing decisions) to a LEO system (i.e., LEO satellites), getting permissions of any of the terrestrial carriers or under sea carriers may no longer be needed. Further, the LEO system having control of the control plane at least provides management of which terrestrial carriers and/or undersea carriers may be authorized for a pathway by the data plane. These carriers may be selected based on the carriers being from a sovereignty having known security standards meeting LEO system's administrator security standards (e.g., as set by sovereign military security standards for communications/transmissions).

Databases Transferred to LEO System or Setup on LEO System

User Device Identification Databases

Moving control of routes to the LEO system (i.e., control to sky) may provide resolution of routes where the location of a user device (e.g., handset) may be anywhere in the world. In examples, this may be accomplished by moving relevant databases to the LEO system such as databases associated with routing (e.g., telephone numbering databases). For example, in order for the LEO system to determine where the user device may be located in the world, the LEO system may need information related to the user device in the LEO system such as user device identification information. Specifically, the user device identification information may include mobile identification information, user information, carrier information, and/or user device owner. Databases having this user device identification information may be transferred to the LEO system or at least accessible by the LEO system for eliminating handshaking described above (e.g., terrestrially hand shaking and/or under the sea handshaking). Other databases involved and/or needed for controlling routes may be transferred to or at least accessible by the LEO system as needed to assist with "control plane" functionality. These databases may be replicated in many respects when transferred to the LEO system.

Portability Database

Another database that may be included with the LEO system (e.g., created) or accessed by the LEO system may be a portability database (e.g., number portability database) for assisting with any complexities associated with portability issues. These portability issues may refer to, for example, a user switching carriers and keeping telephone number information, but the original databases that held the user's information may be moved from carrier to carrier (referred to as "number portability"). There may be a disassociation between the number and the carrier. This disassociation may be captured in the number portability database such that the LEO system may use the number portability database to resolve these issues and other similar issues. For example, in order for the LEO system to track a user's mobile phone, the LEO system may need to determine user's real serving carrier. This may be accomplished by going through the number portability database since the phone number itself does not indicate associated serving carrier. Further, in order for the LEO system to determine that the user is a legit user, the LEO system may need mobile identification information and home serving information of the user. The home serving information may be maintained by the user's carrier which may be copied to the LEO system or at least accessed by the LEO system. In examples, some carries may not be willing to move this type of information to the sky on the LEO system but as long as the LEO system is able to determine that the user belongs to a carrier (e.g., preferably a legitimate carrier such as Verizon™), the LEO system may send a query to the carrier asking for validation. Specifically, the query may include a LEO system request that may identify the user as being on the network of the LEO system, provide MZ information from the portability database, refer to link between user and carrier, and request authorization to serve user. The carrier may respond that the LEO system is authorized or not authorized to serve the user. In summary, in examples, the LEO system may have access to MZ data and telephone number data as well as access to the number portability database in the sky (e.g., data and the number portability database may be pushed to LEO system of one or more LEO satellites).

Encryption Keys

When the user is authorized by the carrier, the carrier may send the LEO system several encryption keys that allow the LEO system to decrypt information that may be needed. For example, the carrier may provide an encryption key such as an anchor key to the user's communication (e.g., anchor key may be associated with the user and/or the user device). The anchor key may be kept at the end point of the end-to-end network (e.g., last point in network chain) that may be serving the user's communication. The anchor key may be used for all of the user device's transactions. In some examples, once user device communications may be completed (e.g., communications related to same transaction or communications within a predetermined time frame have all been sent and received), the anchor key may be destroyed and relationship with the home serving network information may be destroyed. Further, communication may then be sent back to the home serving network requesting payment for having served the user in user's location. This example provides a snapshot of how telephone processing may be executed with encryption keys.

In some examples, when a call is disconnected, there may be security risks at terrestrial systems. For example, when the call ends, the user's anchor keys may be intended to be deconstructed and destroyed, however, many carriers may keep the anchor key information. This may create security risks for these users since the anchor key information may be stored with one or more carriers which leaves a possibility of this information being accessed from external attack. Security breaches may occur when access is gained to these anchor keys such as by false registration attacks and replay attacks such that a session may be artificially extended. By moving this control/management of anchor keys to the LEO system, this deconstruction and destruction may be controlled and managed by the LEO system based on administrator configured standards such that the user may not be held to other standards of terrestrial systems (e.g., minimal type network standards) that may be in conflict with the administrator preferred security standards.

In another example, the anchor key mechanism may be maintained and executed at the edges of a network (e.g., on a visitor network). In this example, while the anchor key mechanism may not be on the LEO system, this mechanism may be subtending or supporting the LEO system. In other examples, the LEO system may be the edge of the network (e.g. serving an embassy point and bypassing a local network) and using the anchor key mechanism.

Home Serving Information with Application Use

In some example embodiments, home serving information may be optionally moved to the LEO system. For example, home serving information may be moved to the LEO system for a classified group of users (e.g., only users that are authorized to use the LEO system). The classified group of users may also refer to only users from one or more selected or designated sovereign countries. For users from other countries, associated carriers may be identified and then the LEO system may send these associated carriers queries and have the carriers respond to the queriers. Using an example where two users (first user and second user) are within the classified group of users and selected/designated countries, a signaling connection may be set up from location A of the first user to location Z of the second user. The LEO system (e.g., specifically control plane application of the LEO system) may run this connection that may initiate or activate services.

In some example embodiments, the activated service may be an interactive voice response (IVR) service because user was not able to place a call so instead sent communication via an IRV device. The IVR may play a message (e.g., user's recorded voice) or the message may be transmitted to a private branch exchange (PBX)-type system (e.g., internet protocol private branch exchange (IP PBX)) that may try to locate the first user and/or second user in a PBX group. This process may be performed through a software application such as an IVR application. The software application may be run at the LEO system or may be left running at the terrestrial system. In general, with the control plane on the LEO system, an administrator of the LEO system may have the flexibility to be able to decide which applications may be moved to the LEO system depending on efficacy, urgency, and security requirements. Whenever a software application is moved to the LEO system (e.g., in the sky), compute power may need to be determined to accommodate an increase in processing. For some examples, as described above, only application control may be run at the LEO system such that applications themselves may continue to run at terrestrial systems (e.g., app control in the sky and applications at the ground). For other examples, some applications (that normally run terrestrially) may be run at the LEO system (e.g., run app control and some applications in the sky) especially for highly sensitive secure applications.

LEO System Having Session Initiation Protocol (SIP) and Session Description Protocol (SDP)

In example embodiments, while a connection is actively running between location A of the first user to location Z of the second user, control plane messages may need to be tracked. Some of these control plane messages may be related to billing whereas other messages may be related to features that may get initiated or activated mid-call. For example, a user may decide to add another user to a call. This may be referred to as a mid-call trigger. The same processes described above (e.g., process used to setup call between first user and second user) may be repeated in the mid call trigger to add another user or users to the call. These mid call triggers may need to be honored such that a session initiation protocol (SIP) and all related processing capabilities of SIP, as described in the disclosure, may need to be added to the LEO system (i.e., added to satellites in the sky). Accordingly, in some examples, SIP may be replicated in the LEO system for triggers such as mid call triggers.

The LEO system may use and deploy SIP resolution for dedicated compute in support of the control plane such that layers of SIP security protection (i.e., security protocol in sky) may ensure that all communications may be protected at signaling and at the control plane. The 5G telecommunication network and computing platform may deploy layers of SIP such that the control plane may be used over SIP. For example, SIP resolvers may be deployed in the LEO system and specifically the forward plane (e.g., forwarding plane satellite operating capability with LEO) such that each of the calls may thereby bypass unknown, unverified, gray listed or black listed proxies, or where origin identification cannot be ascertained using its enhanced SIP security protocols. Secure SIP by retracing directional routing may be used to eliminate typical "middle" processing (e.g., re-route call by user that was not properly identified). In some examples, VPN may be provided through encryption techniques handled by the core network within the data plane of the platform and may be part of SIP/SIP extensions and secure SIP that may be implemented by the LEO system (e.g., of the platform) within the control plane.

SIP may relate to pure signaling that may connect communication (e.g., from location A to location Z). Session description protocol (SDP) is the protocol that may be used to disseminate call model information and/or adapt call models in real time as well as add services during a call. In some examples, SDP may be performed as a voice operation only. In other examples, SDP may be used for short message service (SMS) traffic and multimedia traffic because multimedia traffic may be typically run over the control plane (e.g., where data plane may not be needed for sending short messages such as SMS messages or minimal byte packets). Using the control plane for this end-to-end signaling of secure data may provide efficiency.

In some example embodiments, SIP may be added to the LEO system (i.e., in the sky) with full capabilities of SIP in the form of SIP virtual servers (e.g., may also be referred to as SIP proxy or registrar) that may provide management of SIP calls in the network. The LEO system may also include session description protocol (SDP) virtual servers. These SDP virtual servers may be used with SIP virtual servers to specify and carry sessions (e.g., session media). The SDP virtual servers may be used with multimedia communication sessions regarding session invitation and session announcement being primarily used with streaming media applications such as video conferencing and VoIP. For example, a first user may add another second user mid trigger to a call, but the second user added may be from a country with security concerns and may speak a different language from the language of the first user. Using the SDP virtual server, the LEO system may initiate a function which interprets in real time (e.g., translate from one language to another language in real time for the first speaker and vice versa through reverse translation for the second speaker). In some examples, there may be sovereign military applications that may be under the control of the SDP virtual server such that the SDP virtual server (including SDP-related software) may be needed on the LEO system to control these sovereign military applications. Having SDP capabilities on the LEO system may also provide for encryption handling and end to end encryption for the control plane and for the data plane.

Accordingly, there are several benefits to having SIP and SDP virtual servers (i.e., SIP software and SDP software) on the LEO system.

In example embodiments, moving SDP capabilities to the LEO system allows for software development (e.g., supporting DevOps and may include DevSecOps as described above) to be managed at the LEO system which may further improve control of security. For example, SDP may allow for programmers to be able to change models (e.g., change call models). Otherwise, call models may be typically fixed, but moving SDP to the LEO system may allow for the ability to vary call models, add new capabilities, and/or take other actions in support of software applications running on the ground (i.e., on terrestrial systems) e.g. by effectuating changes to the call model through the SDP.

Blocking Data from Control Plane

In some example embodiments, multimedia traffic may be run on the control plane (e.g., using SDP). The LEO system may provide the ability to block multimedia traffic from running on the control plane to improve security. Specifically, the control plane may block SMS traffic and multimedia traffic from using the control plane. This avoids risky data from being sent over the control plane such as insecure video, malware, etc.

For example, if SMS and multimedia messaging service (MMS) were shut down from the control plane, each instance where there is an SMS requirement or MMS requirement, a bearer channel (e.g., data plane channel) may need to be setup. The data plane may run as it typically does through e.g. geostationary (GEO) satellites and middle earth orbit (MEO) satellites and/or terrestrial networks (e.g., terrestrial devices) as done for a typical data plane connection. In other example embodiments, there may be instances where the data plane may be run on LEO systems depending on the data.

LEO System Using Control Plane to Direct Data Plane Routing

In example embodiments, the LEO system may use its control of the control plane to direct data plane routing. Typically, the control plane may provide information to terrestrial devices (e.g., ground servers). Once the control plane sets up a route (e.g., route from location A to Z), then a portion of the control plane near A may communicate with portion of data plane near A step-by-step routing. Specifically, this communication may be between LEO system and a terrestrial device (e.g., ground server) near location A where the data plane starts. For example, the portion of the control plane near A (e.g., LEO system) may provide following instruction: To get to location Z, data link may need to be set up on router #near location A, link #, undersea cable #, cross-connect #may be terminated and instead going to router #, etc. until ending at router #near location Z. The control plane may be setting up a physical path route that is communicated. The control plane may assess the physical path, provide the physical path information to the data plane, and the data plane may then set up this physical path (e.g., setup may be done using typical standard internet routing protocols).

Having the control plane on the LEO system may allow for customized control of a data plane route for the data plane. This is especially important when dealing with high security data. For example, with highly secure calls purposeful routing through trusted terrestrial networks and/or trusted LEO networks may need to be done. With this arrangement, controlling of the data plane path may be initiated and monitored by a highly secure LEO system. Routing data plane connectivity across the world may be controlled with respect to considering security standards around the world such that routes may be setup to avoid pathways through some regions. This may be based on countries in region and/or whether regions have security standards below a preferred security standard (e.g., below software security standards established by the platform that may relate to a sovereign military security standard) such that this standard threshold may be used in determining and setting up route for the data plane. The LEO system may manage and direct the control plane in routing the data plane that meets rules, protocols, and/or standards of the LEO system. These rules, protocols, and/or standards may be configured by an administrator of the LEO system.

Accordingly, in some examples, a limited number of especially sensitive traffic on the data plane may be run through the LEO system for a specified level of security (e.g., threshold level of security). For example, where data may be categorized and/or marked at various levels of security, the LEO system may be able to determine if the data is associated with the specific level of security or higher indicating that the data plane may be treated according to administrator standards (e.g., run all or portions of data plane on LEO system). Alternatively, communications may be distinguished as either having some or any level of security versus communication having no level of security such that secure communications may be treated differently with respect to the data plane. In some examples, at a highest security level, the control plane may be in a secure mode such that managing, controlling, and/or adjusting the data plane may be accomplished as needed to match security (e.g., as identified by an administrator security rules). This matched security may result in the data plane being run on the ground (e.g., via terrestrial systems), in the sky (e.g., via LEO system), or a combination thereof.

LEO System Identification of Terrestrial Pathways to Avoid

The data plane may be passed through bearer channels or connections terrestrially or may be passed across the LEO system (e.g., across one or more LEO satellites via free space optical links between LEO satellites). Passage of the data plane across LEO satellites may be highly secure. In contrast, passage of the data plane across bearer connections or channels via terrestrial systems/devices may not be secure. Thus, controlling of the routing of this terrestrial data plane is important to security. The terrestrial data plane may also be set up with additional encryption. Pathways or routes may include terrestrial-based stations that may be interconnected by submarine communications cables and some land-based cables. There are several submarine communications cables which may include e.g., SEA-ME-WE 3 (South-East Asia-Middle East-Western Europe 3), Africa Coast to Europe (ACE), Asia-America Gateway (AAG) Cable System, ITUR (Italy-Turkey-Ukraine-Russia), etc. Terrestrial communication may be limited by choices since some cables may be built by consortiums. To avoid specific cable lines (e.g., avoid passing through regions with below standard security), the LEO system may direct control plane to setup path for data plane that avoids one or more cable lines that may be reported to routers. These different cable lines may be coded with identifiers such as common language facility identifiers (CLFIs) and common location language identifiers (CLLIs). CLLIs may be code designating terrestrial links from one point to another point (e.g., point A to point B). CLFIs may be facility identifiers that may refer to e.g., an undersea cable from point A to Z.

When a path may be generated for the data plane, the path may encompass or be made up of combinations of CLFIs and CLLIs. Each CLFI may be considered a conduit and each CLLI may be considered a cross-connect point. The generated path may include a chain of CLFIs and CLLIs that may represent the data plane path. The control plane may generate this path for the data plane. In some examples, the terrestrial carriers may be instructed that these are CLFIs and/or CLLIs that may be approved for bearer channels. Any CLFIs and/or CLLIs that may not be on an approved list (e.g., approved white list and unapproved black list for CLFIs and CLLIs) may be instructed to terrestrial carries such that devices and cables associated with the unapproved CLFIs and CLLIs (e.g., on black list or not on white list) may not be used for the data plane path. In some examples, a list of approved CLFIs and/or CLLIs may be used for instructing terrestrial carriers (e.g., pathway whitelist such as whitelist of CLFIs and/or CLLIs). This list may be a pre-determined list that may be determined and setup by the administrator of the LEO system. This list may be updated by the administrator as the whitelist (approved) and/or blacklist (not approved) for CLFIs and/or CLLIs may change. In some examples, the generated proposed path itself (e.g., based on security standards of different regions, countries, terrestrial devices, etc. as described above) may be used for instructing terrestrial carriers of approved CLFIs and/or CLLIs.

A data plane path may be discerned from a SIP header since the SIP header may include path information. The LEO system may have access to and/or obtain the SIP header in order to discern path information for the data plane. Discerning the path of the data plane from the data plane itself may be difficult since the data plane may run through the Internet (e.g., where Internet routers typically have their own independent control over actions relating to the data plane path). An arrangement may be setup with carriers such that the provided list of approved CLFIs and/or CLLIs (e.g., CLFI and CLLI white list) may only be used such that data plane traffic may be routed only through the CLFIs and/or CLLIs listed (i.e., on the CLFI and CLLI white list). In some examples, a white list may include approved terrestrial network VIAs (e.g., SIP VIAs) and a blacklist of not approved terrestrial network VIAs (e.g., SIP VIAs).

In example embodiments, the LEO system may have a function that may allow the control plane to similarly manage pathway transmissions and communications for the data plane to LEO satellites. For this example, some LEO satellites may be approved whereas other LEO satellites may not be approved. Pathways for the data plane via the LEO system may only be allowed through approved LEO satellites. The approved satellites may be members of the LEO system thus forming a constellation. Also, some approved satellites may be part of other constellations that may not necessarily be part the LEO system. Similar to CLFI and CLLI lists described above, the LEO system may also include a white list (approved satellites) and/or blacklist (not approved satellites) for satellites. Satellites may be referred to in lists by some form of identification information that may be associated and correspond with each satellite (e.g., LEO satellite). In some examples, the LEO system may use the control plane to generate the pathway of the data plane via the approved LEO satellites only or through a combination of the approved LEO satellites and approved terrestrial systems.

In example embodiments, LEO satellites may typically interact with satellites in the same constellation only (e.g., where all satellites in same constellation have same level of security standards forming a closed ecosystem) such as LEO satellite members to LEO system. For this example, the data plane path when moving across satellites may only involve the LEO satellites in same constellation. In other example embodiments, LEO satellites of the same constellation (e.g., members of the LEO system) may interact with satellites of other constellations that may have standards of security the same or different from the standard of security of the LEO system constellation of satellites. Accordingly, based on approved lists of satellites and/or satellite constellations (e.g., similar to white list of satellites described above) or administrator selected security standard, a data plane pathway may be setup across multiple constellations that have security standards that at least meet the security standard for the constellation of satellites associated with the LEO system.

In example embodiments, the LEO system may setup the data plane (e.g., using the control plane) to have a pathway that includes a combination of LEO satellites (e.g., from the same constellation or multiple constellations) and terrestrial systems such that the pathway may go through one or more approved LEO satellites and one or more approved terrestrial systems. In this combination, there may be a need for the data plane path to go from location A to the sky, sky back to the ground, ground back to the sky, and then sky to location Z as needed to provide most direct pathway via approved satellites and approved terrestrial systems only.

Data Plane Flexibility Across LEO System for Highly Secure Data

With full control of the control plane for higher security transactions (e.g., calls), a preferred routing may be generated because a locus of control for the control plane is on the LEO system. Some communications may have specific security requirements (e.g., multilevel security requirements or multiple levels of security (MLS)) that may have to be met through the data plane being run through the LEO system (e.g., via LEO satellites). This may avoid security concerns for especially overly sensitive information (i.e., highly secure traffic). For other communications, the data plane may use terrestrial devices, links, and systems (e.g., terrestrial servers).

For example, with highly secure calls, purposeful routing through trusted terrestrial networks and/or trusted LEO networks may be accomplished. Specifically, for example, for a given especially sensitive secure call, a system manager of the LEO system for the control plane may provide an instruction that the sensitive call may need to be routed over the LEO system such that no terrestrial network may be trusted. Alternatively, the data plane may be routed across the LEO system for a portion of the path (where this portion of the path may be over regions with below standard network securities) and the data plane may be shifted to terrestrial networks (e.g., related terrestrial devices) for the remaining portion of the path (e.g., where the remaining portion of the path may be through networks having security at or above network security preferences as selected by administrator). Data plane traffic (e.g., bandwidth and capacity in bits per second) may be substantially higher and greater than the control plane traffic. Accordingly, there may be a general interest to limit and reduce the data plane traffic on the LEO system (i.e., satellite hardware of LEO satellites) as much as possible to reduce costs associated with satellite hardware that needs to accommodate data plane traffic.

With the control plane on the LEO system, there may be flexibility on providing the data plane. This flexibility may include the ability to provide the entire data plane via the LEO system (i.e., in the sky), a portion of the data plane via the LEO system (e.g., combination between terrestrial networks and LEO system), or no data plane via the LEO system (i.e., data plane entirely via terrestrial networks).

This may be based on data itself such that the data plane for highly sensitive data may be run either entirely via the LEO system or a portion of the data plane may be run through the LEO system. For example, highly secure MLS communications may be transmitted on data planes entirely through the LEO system.

LEO System Satellite Configurations

In example embodiments, dedicated compute to support the control plane may provide edge compute nodes on the LEO system to address latency issues. Power resources of the LEO system satellite(s) may be shifted from communication to computing particularly for control plane computing. For example, each LEO system satellite may be a compact satellite with a focus on computing (e.g., narrow band computing) with more power devoted to computing on board. This is different than most standard satellites that are not focused on compute but focused on communications. The LEO system may utilize cloud compute and SDN in moving calls to various members of the LEO system. Use of SDN may provide ability to dedicate compute in support of the control plane on the LEO system (e.g., LEO satellites).

The LEO system may be configured to run the control plane and at least some portions of the data plane. As described above, in some examples, the entire data plane may be run on the LEO system. The LEO system may be run on a single satellite and/or multiple satellites (e.g., as part of a constellation of satellites). The compute power of each satellite hardware may be used to determine a number of satellites needed for the LEO system. Although the data plane and control plane may be two separate channels, these separate channels may be run through one satellite (e.g., data plane and control plane through same hardware). In other examples, both channels may be run concurrently through the same multiple LEO satellites (e.g., constellation of LEO satellites). This may be accomplished along entire pathway from location A to location Z. With this in mind, the LEO system may need to monitor and manage a load of the data plane to avoid over burdening hardware of one or more satellites (e.g., below headroom limit of hardware). The LEO system may determine distribution of the control plane and/or data plane across multiple satellites while considering optimized bandwidth and speed along with balanced load (e.g., based on headroom of each satellite) across the hardware of the multiple satellites. Further, determining distribution may also be prioritized based on security of data such that MLS high security traffic may be prioritized over other less secure traffic.

The LEO system may include LEO management software that may be run on the satellite hardware that may include control plane software (e.g., signaling software) and data plane software. As described above, the control plane software may be used to access databases such as number databases, MZ databases, and polling HSS databases. The control plane software may use the access to these databases to determine how to connect communication from location A to location Z and may then set up the data plane based on this determination.

In example embodiments, the LEO system may be setup with a customized LEO satellite having the 5G control plane. The custom LEO satellite may include customized logic and decision-making abilities. In some examples, the control plane may be set up on the LEO system such that the control plane may be customized at application layer to implement control plane functions. Satellite intelligence and various control features may be incorporated to make the customized LEO satellite system unique as compared to other satellite systems.

There may be a partial correlation between complexity of the control plane and traffic on the data plane. This may refer to size, scale, and scope of the control plane hardware, software, and system resources that may change complexity depending on the data plane. For example, as the amount of the data plane traffic increases (e.g., gigabit per second, two gigabits per second, 10 gigabits per second, one hundred gigabits per second), the control plane may need to be sophisticated to accommodate this traffic. This may not be linear (i.e., not one to one) such that if a size of data plane traffic increases by 10, complexity of the control plane to manage this traffic may need to be doubled. In examples, this complexity may refer to the control plane doing more work which may refer to the compute power. Control plane algorithms may only need to be changed when a new application may be introduced or a new call type. To change the control plane algorithms, there may be a need to be able to refresh LEO software such that a new LEO software may be uploaded to replace previous LEO software instead of reprogramming. Volume of data may not affect the control plane except the control plane may need more power because it is handling more connections per second or per hour.

LEO System Satellite Configuration with Applications

The LEO system may include the capability of running various software applications or at least running control portions of various applications that were previously run on terrestrial devices. With the SDN application having control over the control plane or at least being able to influence the control plane, the variety of software applications may be moved to the LEO system (i.e., one or more satellites). In some examples, as described above with respect to SDN applications, these software applications may be separated between a control portion (i.e., control of control plane) that may be on the LEO system (i.e., in the sky) and the rest of the application may be on a terrestrial system. In other examples, entire applications or at least a majority portion of the applications may be run on the LEO system to avoid security issues with running these applications across one or more terrestrial systems. To do this, the LEO system may need sufficient compute power which may be based on hardware. This may be sufficient compute power (and related hardware) to accommodate execution of at least control portions of applications, majority portions of applications, and/or entire applications (e.g., as needed based on security standards for each application).

For example, each LEO satellite may include a server computer (e.g., general purpose computer) that may run control software (e.g., application control portions) that may be directed by LEO software applications (e.g., control plane application and data plane application with API interfaces between the applications). This arrangement may be the same for any telecommunication network including 5G networks and any other enhancements or upgrades to 5G networks. Specifically, the LEO software applications may be running at one of the communication points (e.g., location A or location Z) such that application control may be running on the LEO system. For example, the application server may run these LEO software applications via a network (e.g., Internet) from terrestrial systems on the ground (e.g., at location A, location Z, or another location). The LEO software application may be run across a combination of locations (e.g., location A, location Z, and another location). In some examples, in addition to control software, at least portions of the LEO software applications may be run on the LEO satellite. Application control portions may be run on the LEO system such that applications themselves may continue to run at terrestrial systems (e.g., application control in the sky and applications at the ground). In other examples, as described above, some applications may also be moved entirely or at least a majority portion of the applications from terrestrial systems to the LEO system at one or more satellites. In example embodiments, Kubernetes servers may be used to provide control plane-related software applications that may decide when and where to run pods, manage traffic routing, and scale the pods based on the utilization or other metrics that may be defined by the administrator of the LEO system.

In some examples, applications are moved to the LEO system such that these applications may be specialized highly secure applications and not third-party applications. These highly secure applications may be API type applications for secure communications such as “hot line” calls. In general, most applications typically run at terrestrial systems (e.g., a mobile phone) such that only the control plane aspect of these applications may be moved to the LEO system. The high secure applications may be entirely run or at least a majority portion of the application may be run on the LEO system.

Further, additional security options may allow for applications to shift some portion of the application or the entire application to the LEO system. One form of security may include encryption of data transmitted by the application. Further, in some examples, backhaul over terrestrial links may be avoided by instead extending the data plane via the LEO system with or without encryption in the sky such that data may be transmitted via the LEO satellites.

Third Party Applications

In example embodiments, the LEO system may interact with third party applications. A third-party application (e.g., video application) may be typically hosted on a third-party server. Using the previous call example (from location A to Z), the LEO system may allow for a user to send a video on the third party sever using the third-party video application over the call. The third party application running on the third party server may not be affected by control of the control plane by the LEO system. It is the data path for this communication and transmission (e.g., where stream of data is running) that may be impacted. Specifically, the LEO system may direct the control plane (e.g., using the SDN controller). With a mid-call trigger, the control plane may be used to direct the data plane (i.e., data traffic) to the Z location via a designated path based on application control at the LEO system. Applications may continue to run at terrestrial systems and devices including third party applications even while the LEO system uses the control plane to direct routing of the data plane.

Reprogrammable or Reconfigurable Type Satellite for LEO System

In example embodiments, a reprogrammable LEO satellite system may be reconfigured to manage the control plane. In general, most legacy satellites are typically setup to address high volume traffic in communication pipes of date plane. It may be difficult to reconfigure an already launched legacy satellite since the satellite usually does not have computer hardware on board to implement control plane functionality locally. There may be a need for reprogrammable satellites to be launched that could be reconfigured remotely. For example, the reprogrammable LEO satellite may include field-programmable gate array (FPGA) hardware that may be flashed and flexibly reconfigurable remotely from terrestrial systems and devices at the ground (e.g., using tunable repeater having digital repeater filters). In other examples, the reprogrammable LEO satellite may be reprogrammed without FPGA while utilizing other technologies to provide reprogramming of LEO software such that the LEO satellite may be reprogrammed to manage the control plane. Applicant appreciates various reprogrammable technologies may be used with or without FPGA hardware.

There may be interest in providing interconnect, interoperate, communication, transmit to/receive from, other satellites in the sky. In an example, other satellites (e.g., third party satellites) that are not part of the LEO system may be launched with re-programmability allowing for adding and/or linking these satellites to LEO system after the launch (e.g., ability of re-programmable satellites to be synced up from an interface perspective with LEO system). These other LEO satellites may be added to LEO system group of satellites to form a new constellation of LEO satellites. Re-programmability may be used as a way to extend the 5G control plane capability interfaces of the LEO system to other third-party satellites (e.g., re-programmable third-party satellites) that are not originally members to the LEO system. In some example embodiments, satellites may be launched with integrated field programmable gate arrays (FPGAs) (e.g., DirectStream FPGAs as described in the disclosure) which may technically allow for more easily reprogramming then previous satellite architecture at least. With FPGA, the hardware of the LEO satellites may be flashed and rebuilt from the ground to provide for the functionality described in this disclosure particularly software-related to managing the control plane with respect to the data plane. In other examples, the reprogrammable LEO satellite may be reprogrammed without FPGA while utilizing other technologies to provide reprogramming of LEO software such that the LEO satellite may include reprogrammed software that is related to managing the control plane with respect to the data plane. In other example embodiments, applications may be built on terrestrial systems and then uploaded to the LEO system (i.e., LEO software of one more satellites) using appropriate security measures.

LEO System Interaction with Application Plane and Data Plane Via APIs

Figure 22:
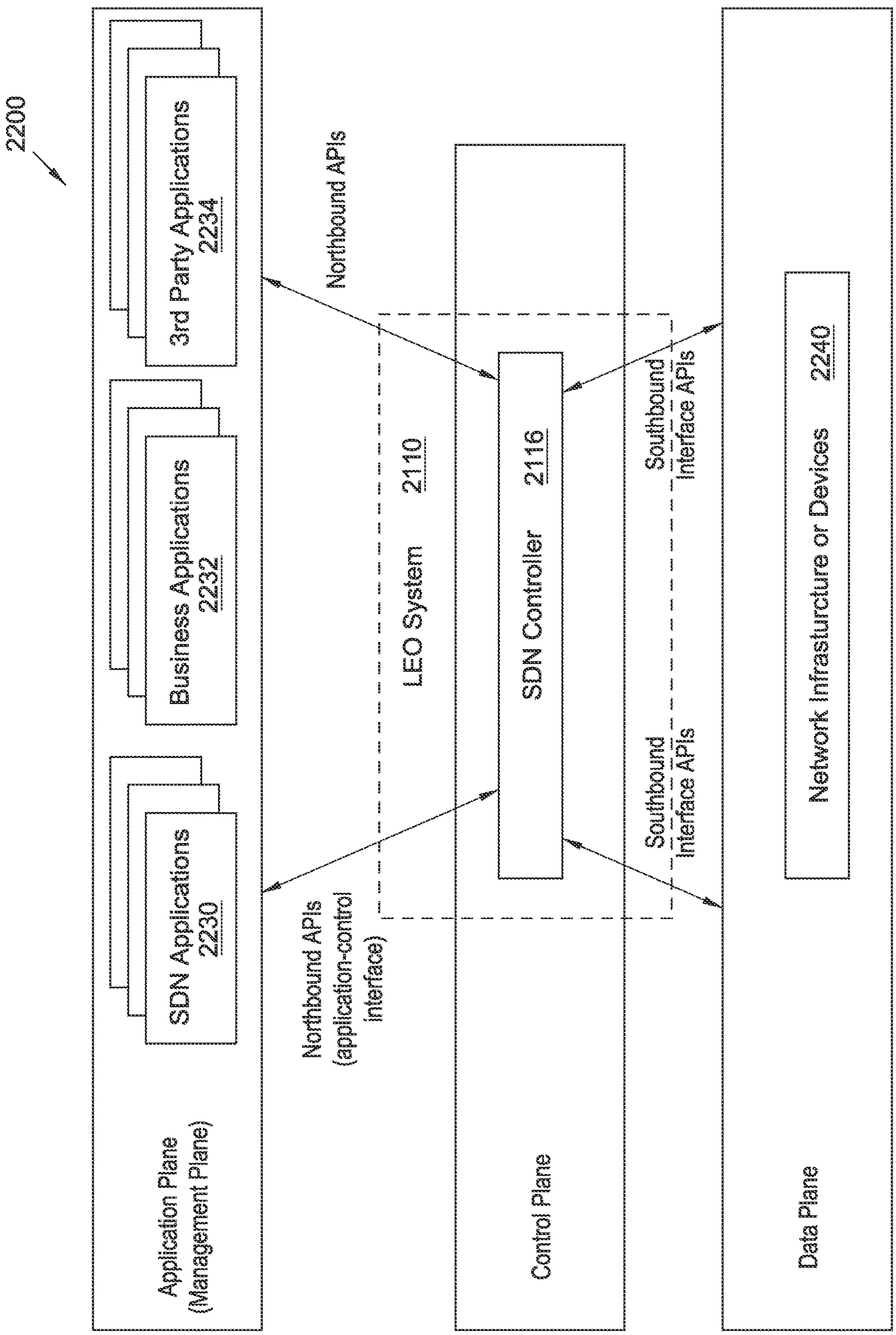
FIG. 22 is an example diagrammatic view of a control plane running along with the LEO system of FIG. 21 for interacting with an application plane and a data plane of the 5G network according to one or more example implementations of the disclosure.

In example embodiments, referring now to the example implementation of FIG. 22, there is shown the LEO system 2110 using the control plane to interact with an application plane and a data plane of the 5G network at 2200. As described above, the control plane runs along the LEO system 2110 and may use the SDN controller 2116 to engage and/or communicate with other planes such as the data plane and the application plane (may also be referred to as a management plane). In some examples, these planes may be segmented and isolated from each with distinct authentication and privilege boundaries. In some examples, the control plane may include one or multiple SDN controllers 2116 that my communicate with each other in providing SDN controller responsibilities. The application plane typically hosts SDN applications 2230 that may communicate and direct the SDN controller via a northbound interface (e.g., standard northbound API for providing an application-control interface). The northbound interface may use the northbound APIs to provide network configuration and management with respect to the SDN controller 2116. As described above, the northbound APIs may be OpenDaylight APIs (e.g., use OpenDaylight representational state transfer (REST) APIs) for providing interface between the application plane (e.g., may include user interface) and control plane. The SDN applications 2230 may communicate behaviors and resources needed to the SDN controller 2116 on the control plane via these northbound APIs. Each SDN application 2230 may include application logic and drivers. SDN applications may be related to network, business, services, and cloud orchestration. SDN applications may also provide network analytics, routing, traffic engineering, mobility, network virtualization, quality of service (QoS), monitoring, security, etc. Other applications (e.g., business applications 2232 and third-party applications 2234) as described above may be included on the application plane for configuring the network for various purposes. On the control plane, the SDN controller 2116 may translate application plane requirements from the northbound APIs for controlling the path for the data plane. The SDN controller 2116 may be used to generate a network map to be used by the SDN applications (e.g., in deciding path of the data plane). The data plane which may also be referred to as the infrastructure plane or layer refers to network infrastructure or devices 2240 (e.g., routers, switches—such as physical switches and virtual switches that may include LAN switch and packet switch, network devices, core network, base stations, etc.) for implementing the SDN data path and forwarding data traffic. The network infrastructure or devices 2240 may directly control data processing and forwarding of the data path for the entire network. The SDN controller 2116 may communicate with this data layer (e.g., network infrastructure or devices of the data plane) via a southbound interface (e.g., southbound APIs such as OpenFlow) that may provide a control-data interface. The southbound APIs may provide data plane control by using control protocol such as OpenFlow which is a communication protocol that may give access to data plane of network infrastructure or devices 2240. In summary, the SDN controller 2116 may receive instructions from the SDN applications 2230 that may be relayed to the network infrastructure or devices 2240. The SDN controller 2116 may also extract information about the network from the network infrastructure or devices 2240 that may be conveyed back to the SDN applications (e.g., view of network including events and statistical information).

Re-Programmability of Customized Satellite

In example embodiments, SDP and SDN controller elements may be moved to the LEO system including related APIs. There is a certain amount of re-programmability through these APIs. These APIs may be sufficiently powerful to effectuate data streams and capabilities added through these APIs that affect data flows through the LEO system. This may control flows through the LEO system (e.g., satellites) such as mid-call triggers.

With customized satellites, a general-purpose server computer may be used for the satellite that may be subject to a developer's complete reprogramming. In some examples, Linux servers may be used on LEO satellites that may provide a dev-ops environment such that applications may be created on the ground (e.g., at terrestrial systems) and may be uploaded to the LEO system. The LEO system may include a platform that may run through its checks and then instantiates for the LEO software application.

Sandboxing AI Gates with Programming

In some example embodiments, there may be compute diversification at the LEO system using sandboxing AI gates. The introduction of sandboxing with the LEO system may be used to prevent an application that has malware from being introduced such that the malware may attempt to leave a sandbox or to affect a host. Some software applications may be run in the sandbox such that the sandbox may be erased if any malware tries to access memory space or data space outside of the sandbox. Other sandboxing techniques may be used as described in this disclosure.

Other Enterprise Type Security for LEO System

The LEO system may utilize other enterprise types of security as described in this disclosure. For example, where application hosts may be on a Linux server, a LEO constellation provider may not introduce normal protections (e.g., host-based firewalls). The LEO system may include firewall security. As described above, sandboxes may also be used knowing that the host may or may not be protected by a firewall. There may need to be rules with the sandbox such that any sandbox violation may result in an associated application being destroyed.

LEO System Precision Navigation in Timing

Precision navigation in timing may be based on compute timing build. In the LEO system, a network timing protocol (NTP) may be used to address all communications as being time-based. On the ground in terrestrial systems, GPS or NTP may be used. NTP may be an internet-based protocol. Packet networks may require timing functions in order to maintain order of packets and priority of packets. With timing, the LEO system may have improved security and robustness by being able to generate and use its own timing standards. The LEO system may use standard timing standards as used with all networks (e.g., SDN networks, 4G networks, 5G networks) which may require relatively precise timing for synchronization. Timing may be from GPS, satellites, and/or other sources. GPS may be preferred as generally considered to be reliable because it is satellite based and isolated in the sky.

In one example, the LEO system may include LEO satellites with a capability of sourcing secure in the sky timing signals for the LEO system. Having satellites with their own internal timing source that may be comparable to GPS but may provide an additional level of security beyond general GPS for accurate timing (e.g., internally generated on customized satellites). This may be accomplished with a rubidium clock, photon timing, and the like.

Other LEO System Features

In example embodiments, the LEO system may provide various other features. The LEO system may provide the ability to ensure that inter-satellite links may keep all backhaul traffic isolated in space between a base transceiver station and the core network regardless of the separation distance. In some examples, machine learning applications may be utilized with the LEO system. The LEO system may provide enhances to LEO security by applying the secure control plane to 5G with artificial intelligence (AI) automation (e.g., using the machine learning applications). For example, security at the LEO system may manage security of networks when moving around the world.

LEO System Processes

Figure 23:
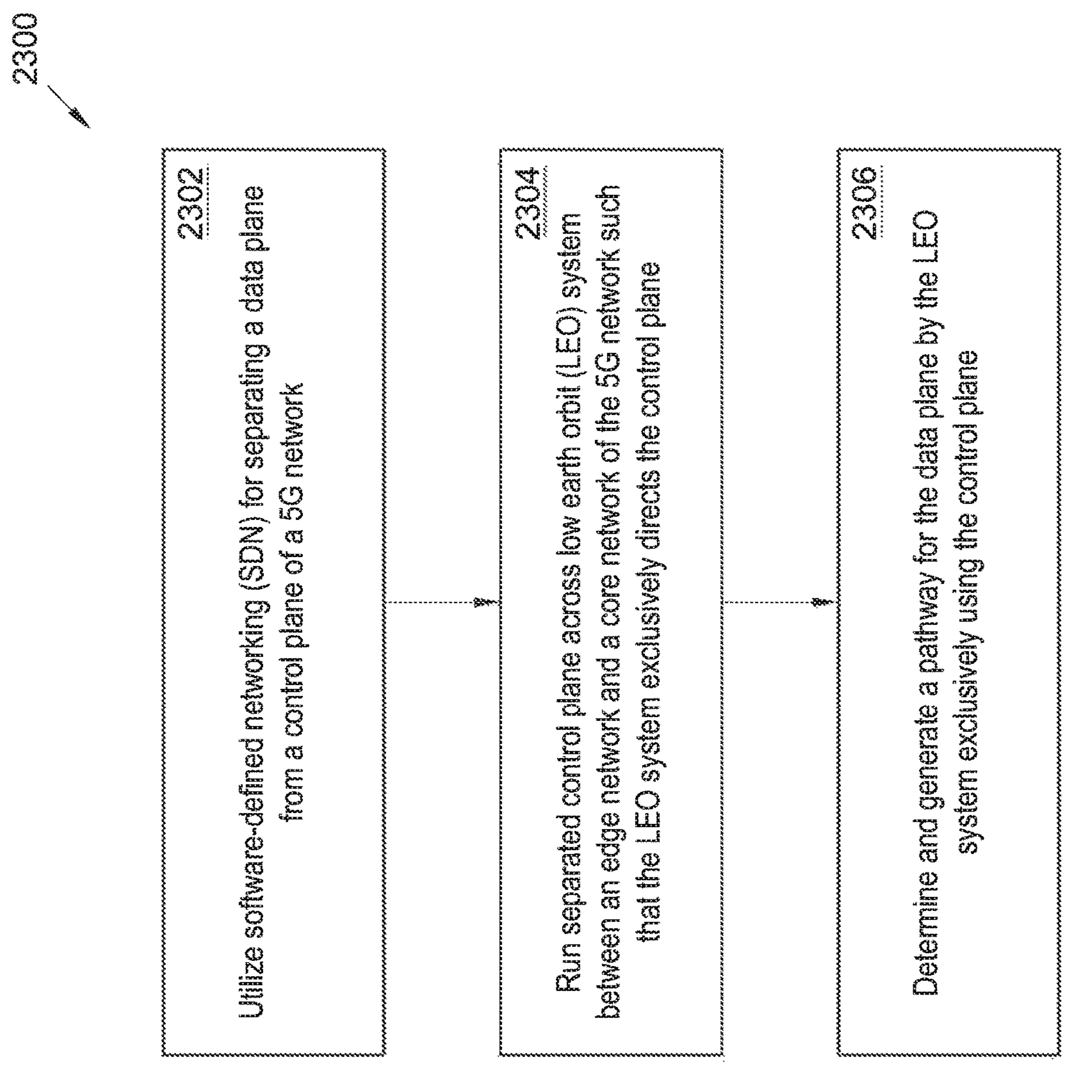
FIG. 23 is an example flowchart of a 5G configuration process according to one or more example implementations of the disclosure.

FIG. 23 shows an example 5G configuration process at 2300. In this example, software-defined networking (SDN) may be utilized for separating a data plane from a control plane of a 5G network 2302. The separated control plane may be run across a low earth orbit (LEO) system between an edge network and a core network of the 5G network such that the LEO system exclusively directs or uses the control plane 2304. A pathway for the data plane may be determined and generated by the LEO system exclusively using the control plane 2306.

Figure 24:
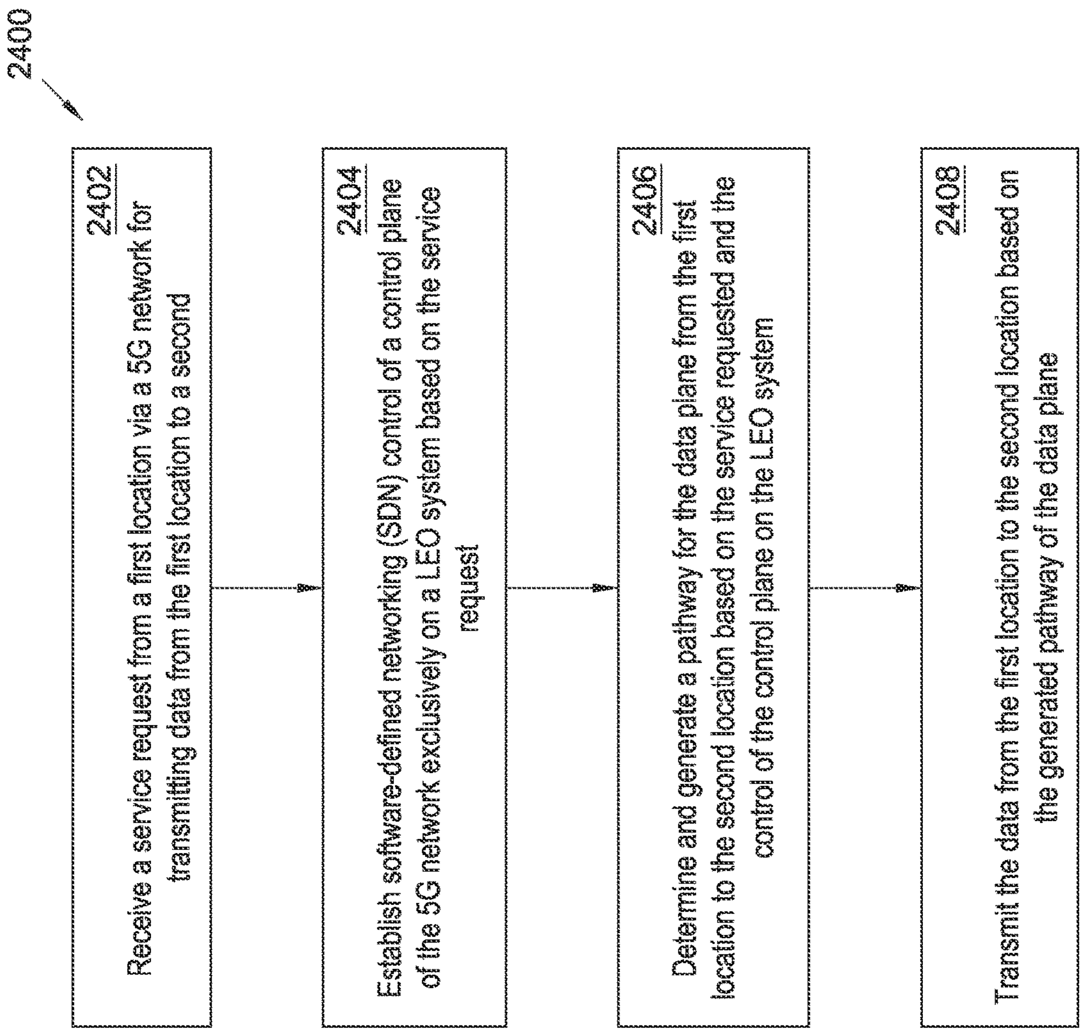
FIG. 24 is an example flowchart of a LEO directed 5G telecommunication process according to one or more example implementations of the disclosure.

FIG. 24 shows an example LEO directed 5G telecommunication process at 2400. In this example, a service request from a first location may be received via a 5G network for transmitting data from the first location to a second location 2402. Software-defined networking (SDN) control of a control plane of the 5G network may be established exclusively on a LEO system based on the service request 2404. A pathway for the data plane from the first location to the second location may be determined and generated based on the service request and the control of the control plane on the LEO system 2406. The data may be transmitted from the first location to the second location based on the generated pathway of the data plane 2408.

Platform Utilization of Other Technologies

The LEO system or more generally the platform may utilize other technologies. For example, the platform may use open RAN (O-RAN) specific items for a distributed unit/central unit (DU/CU) split and may introduce some specific security language. For example, certificates may be tied to these O-RAN specific components including e.g., eCPRI stack/modem. Also, in other examples, the platform may use secure edge proxy protection (SEPP) with 5G networks. In some example embodiments, the platform may be used to stop bidding down attacks, stop running SMS and MMS over the control plane, and/or assure that old keys may be removed (e.g., use a proxy connection to check that previous serving carrier destroyed keys).

MDC Sizing

With Aerial/Satellite images, there may be local determinations of sufficient radio placement, which may be based site conditions. In embodiments, deployment and placement may be planned with locations of radio-heads and locations of edge data centers. Edge data centers may be sized to number of servers. Ethernet front-haul, RAN and routing infrastructure may be configured and shipped to customer with predetermined locations of installations for radio-heads. With radio-heads installed self-provisioning may begin.

Edge DC Provisioning

In embodiments, the platform may be configured so the edge data center (DC) may initiate an outbound secure connection to the platform provisioning server. In embodiments, the edge (DC) may be self-provisioning, in conjunction with local provisioning agent running on the edge DC, the platform may provision the following software services RAN, initial boot-strap configurations of the radio heads, switching, routing, security, edge DC cloud layer, back-haul, and the like.

Customer Self-Provisioning of Edge-Cloud

Applicant may appreciate in light of the disclosure that customers and users may use a GUI interface for: (1) configuring the edge-cloud; (2) secure storage (on the edge cloud) and transport to their central workloads using their own key server or those provided on the platform; (3) deploy workloads by seamlessly extending their central workloads; (4) self-provision user equipment to site-specific 5G network; and (5) monitor the status of their cloud and local 5G network.

Ongoing Management and Optimization

In embodiments, the platform may monitor and operate the local 5G network and edge cloud. By way of these examples, the platform may collect data from users' equipment having network coverage and in doing so, the platform may automatically reconfigure radio characteristics for optimal coverage.

In addition, the platform may monitor edge cloud and network for capacity adjustments including working with customers to upgrade capacity.

In embodiments, software layers for one or more micro-data centers include: (1) automated sizing; (2) extra space remote radio planning; (3) extra space provisioning; (4) extra space cloud layer; (5) extra space provisioning interfaces for: cloud infrastructure, cloud workloads, users' equipment, and the like; and (6) extra space monitoring; and optimization of radio.

Micro Data Center—Deployment Architecture

In embodiments, micro data centers (MDC) may include modular data center architecture that may share some of the same components as some typical data centers. Toward that end, MDCs may be designed to be portable and provide plug and play features. The MDCs may have preconfigured compute, storage and network and additionally include built-in cooling systems and fire protection and security systems. In embodiments, the platform network MDCs may have all the hardware ready for use and may also provide a software platform that is ready for application deployment immediately.

Although each MDC may be deployed separately, all platform MDCs together may be configured to form a large distributed data center. By way of these examples, user workload may reside on one MDC or distributed over multiple MDCs.

User Management—Accounts and Domains

In embodiments, the platform may be configured to provide each user with an account that may be organized in a hierarchical directory structure. By way of these examples, each account may have one and only one entry in the structure. In embodiments, user authentication information and other attributes may be stored in the entry.

In these examples, a user must belong to one domain and only one domain. A domain may have subdomains and form a parent-child relationship. A domain may have multiple subdomains but only one parent domain. In embodiments, all domains, subdomains and accounts form a tree structure and the root of the tree will be the root domain. In embodiments, one domain administrator account may be created automatically during domain creation time and the domain administrator may have the privileges to manage the subdomains and accounts.

In embodiments, an account on the platform may allocate resources from the platform and become the owner of these resources. To control the usage of the system resources, the platform may assign a quota to every account or domain. By way of these examples, an account may not allocate more resources than its quota and the total resources of subdomains, accounts and groups may not exceed the quota of their parent domain.

Groups

In embodiments, a group may be a collection of accounts that may belong to different domains. By way of these examples, a group may serve as a container of resources so users of different domains may work on common tasks. A group may be created by a domain administrator and the domain administrator may become the group administrator who may invite other users to join the group. Each group belongs to the domain of the domain administrator. As such, a group may own its own resources and may be assigned its own quota but its resources usage may be limited by the domain quota.

Services

In embodiments, the microdata centers (MDC)s may provide multi-tenant service environments. Both infrastructure as a service (IaaS) and platform as a service (PaaS) may be provided. In embodiments, IaaS may contain the basic building blocks for applications and may provide access to networking, compute and storage to, in turn, provide customers and users with the highest level of flexibility and management control over the resources. In embodiments, PaaS may simplify managing the underlying infrastructure and may allow the developer to focus on the application. This, in turn, may help developers be more efficient as they may embrace services offered by the platform to facilitate resources procurement, capacity planning or maintaining infrastructure.

IaaS—Compute

In embodiments, the microdata centers (MDC)s may provide secure, resizable compute capacity that may allow customers and users to increase or decrease capacity rapidly to match their application needs. By way of these examples, the customers and users also have the choice of multiple instance types, operation systems and software packages. In embodiments, the MDC may permit selection of different configurations of memory, CPU, GPU and storage. Moreover, the instance may be integrated with other services such as virtual private network (VPN), block storage, object storage and key management to provide a complete, secure solution for computing. Each instance may also be executed in a sandboxed environment so the instance may be isolated from both the host and other instances. When an instance terminates, the platform may be configured so that there is no residue left on the host.

Block Storage

In embodiments, the block storage may provide a high performance block storage service designed for use with the compute services for both throughput and transaction intensive workload. A broad range of workloads, such as relational and non-relational databases, containerized application, analytical engines, file systems and media flows may be supported. Designed for mission critical applications, block storage may be configured with different redundancy level. Customers may also use snapshots with automatic backup the volumes to object storage services. In embodiments, volumes may be configured to be encrypted by default. By way of these examples, encryption of data at-rest, data in-transit and volume snapshot are all supported. Customers and users may choose to use either built-in key management or their own key management system once vetted by the platform.

Object Storage

In embodiments, the object storage may offer data availability, security and performance. Meaning customers and users may use it to store and protect any amount of data for many different use cases, such as websites, backup and restore, and archive. By way of these examples, the object storage may be designed to automatically replicate data to multiple locations for high durability.

In embodiments, the data controlled by object storage may be encrypted by default. As such, customers may use built-in key management system or provide their own key management once vetted by the platform.

Network

In embodiments, the platform may be configured to deploy a virtual private network (VPN) that may allow customers to define a virtual network and have complete control over their virtual network environment including their own IP address range, creation of subnets, and configuration of routing tables and gateway. In embodiments both IPv4 and IPv6 may be supported in the VPN. The platform may deploy the VPN to provide a virtual private cloud (VPC). In embodiments, the VPC may deploy multiple layers of security including security groups and network access control lists to enable inbound and outbound filtering at the instance level or subnet level. Additionally, security appliances, such as firewalls or intrusion detection systems (IDS) may be optionally added into the VPC.

PaaS

In embodiments, the microdata centers (MDCs) support an open-source contain-orchestration system automating application deployment, scaling or management such as Kubernetes as a PaaS. By way of these examples, Kubernetes may manage clusters of instances and schedule containers to run on the cluster based on the available computing resource and resource requirement of each container. Containers may be run in logical groupings called pods and you may run and scale one or many containers together as a pod. Kubernetes may also provide a control plane software that decides when and where to run the pods, manage traffic routing, and scale the pods based on the utilization or other metrics that the customers or users define. Kubernetes may also automatically restart pods if they or the instance they are running on fail. In embodiments, a Kubernetes cluster may be launched for each account on demand. There may be shared workload between accounts on Kubernetes for security reason.

Key Management

In embodiments, the built-in key management system (KMS) may facilitate customer or user creation and management keys and control the use of encryption across multiple services and in customers' applications. By way of these examples, the KMS may be a secure and resilient service that may use hardware security modules that may be validated, e.g., under Federal Information Processing Standard (FIPS) 140-2, or are in the process of being validated.

When an encrypted volume is attached to an instance, data stored at rest on the volume, disk I/O and snapshots created from the volume may all be encrypted and, as such, the encryption is done on the host of the instance. The encryption and decryption may be handled transparently from the instance.

In embodiments, KMS may generate one or multiple master keys for a customer. In embodiments, the master keys never leave KMS system and are not viewable by anyone. When a volume is configured as encrypted, KMS will generate a data key from the master key. By way of these examples, an encrypted version of the data key may be stored with the volume. When the volume is attached to an instance, the host of the instance may request the KMS to decrypt the data key. The plain text data key may then be used by the host to read/write data to the volume. In embodiments, the decrypted key is stored in the host memory and, in these examples, is never stored in any storage when the volume is detached, the data key may be purged from memory.

Monitoring

In embodiments, the MDC may measure all resources usage periodically. In examples a counter may be deployed that is defined as a cumulative metric that represents a single monotonically increasing counter whose value may only increase or be reset on restart. For example, transmit bytes or receive bytes on an interface may be counters. In examples a gauge may be deployed that is defined as a metric that represents a single numerical value that may be arbitrarily go up and down. For example, memory usage or CPU usage may be gauges. In embodiments, the MDC may keep measurements on both physical resources and virtual resources. By way of these examples, the storage space for keeping these records may be limited so they may be, in some examples, kept in a round-robin database where newer records may overwrite older records when there is no more space. In embodiments, a user and customers may only view the monitoring data on the resources they own. By way of these examples, the monitoring data for the physical resources may be configured so that they are only viewable to system administrator. In embodiments, all resources in an MDC have counters associated with them.

Cloud-Based OS Capabilities

In embodiments, the platform deploys an approach with the core of the operating system located in the cloud and made available to users in an on-demand mode to enable platform edge devices to exploit both the transformation benefits of 5G and to address the escalating security threats that exist the in the modern mobile-centric world. As such, moving the core of the OS into the cloud will provide both greater flexibility, integrity and security at the device level without disruption to the user.

In embodiments, the platform edge devices may include an embedded Micro operating system (MicroOS) that may provide support for the core hardware, kernel and driver packages plus basic services such as telephony and messaging. In embodiments, microOS may work seamlessly with a smartphone or other user equipment operating system companion operating system, such as Android, which resides in the cloud. By way of these examples, components of the operating system (OS) for smartphones or other user equipment may be downloaded from the cloud to the mobile device when there is a benefit to executing the software locally (such as when the device is likely to be in low or no connectivity areas). Applicant may appreciate in light of the disclosure that the operating systems of smartphones or other user equipment may be similar to how many mobile applications and desktop applications work today such that a small client may be installed that scans the hardware to understand the target environment and then downloads the appropriate extensions, drivers, service packs etc., as required.

Using traditional abstraction techniques, key capabilities of the underlying hardware of the mobile device may be exposed to the OS of the smartphone or other user equipment. Applicant may appreciate that this approach is not based on virtualizing the hardware and running the different software environments in virtual containers but rather that the OS of the smartphone or other user equipment may operate as a logical extension of the MicroOS and as such both OS environments are fully aware of each other and may work in tandem to provide the support, security and services required by the user.

In embodiments, the platform provides a detailed and focused attitude to all aspects of kernel management as a correctly configured kernel may ensure that the kernel may be a perfect match to the underlying hardware and provide optimum performance but may also be a core element of any security architecture. Working in tandem with the kernel, the permissions or privileges management policies must be strictly adhered to. Providing that the permissions are correctly enforced within the OS, will ensure that only authorized users or components may perform specific actions or access specific files within the OS and on the greater platform.

With the main parts of the operating system residing in the cloud, it is also important to be able to ensure in embodiments, that edge devices may function even when connectivity is not available or is likely to be intermittent. To this end, platform devices may be configured to anticipate the behavioral patterns of the user and network conditions and, in turn, pre-emptively download parts or, in extreme cases, all the operating system as required. In embodiments, leveraging this approach may also ensure that when functionality is downloaded to the device, it is always the most up to date, validated, version and, therefore, may remove many of the legacy aging issues associated with traditional mobile devices.

Hardware Considerations—Design and Development Costs

In embodiments, platform edge devices may focus on security, usability and on demand functions when needed. By all purposefully and in a predetermined configuration the platform does require running the operating system code on the device but rather leveraging the collective compute power of the cloud environment. In doing so, there remains little need to use the latest and greatest processor or to have extensive amounts of RAM on local devices to cope with edge use cases for peak device usage.

With this architecture in mind, the platform may deploy hardened hardware solutions that may be shown to be stable and reduce risk of unexpected hardware issues manifesting themselves during myriad software updates.

Test and Validation

There are several benefits from a test and validation standpoint. The first is linked to the above on design and development in that the platform is more than effective without use of new or leading edge components. In embodiments, the platform may benefit from the fact that possibly latent issues in the hardware or in the related drivers may be hardened and board support packages may be included and updated with hardware components such as chipset suppliers having a suite of reference drivers for different OS platforms.

The second key benefit from a test and validation standpoint may be achieved by moving the devices core operating system (OS) into the cloud to run continuous testing through the development and usage of the OS. Using one or more cloud facilities hosted by the platform to run the OS removes the dependence on edge device hardware availability for running a voluminous number of test cases. Moreover, testing may start much earlier in the development process. It will be appreciated in light of the disclosure that normally testing may be gated by the need for hardware samples and those samples may sometimes be in limited supply until the device is close to launch. In many examples, devices deployed on the platform have no such dependency. Furthermore, thousands of virtual instances of the OS may be, in embodiments, created enabling much richer, automated testing to take place across a wider range of use case scenarios and with a strong focus on known failure modes and edge cases.

In embodiments, testing may also take place throughout the life cycle of the edge device and operating system without any impact to the user. Because platform edge device hardware will not be required to run test cases, unlike traditional devices and networks, the platform may enable continuous software quality improvements. In embodiments, the platform also enables the cloud based OS for smartphones and other user equipment to be updated with the latest hardened enhancements and APIs.

Machine Learning on the Graphics Processing Unit

As disclosed herein, user behavior analytics based on leveraging machine learning (ML) techniques may be included in the overall security model for platform edge devices. In embodiments, an embedded ML engine may be executed either on the central processing unit (CPU) or the graphics processing unit (GPU). In many examples, the platform architecture may use the GPU to execute the ML implementations and functions.

Securing Devices

In embodiments, the platform security models implemented for edge devices on the network need, in many examples, to view the relationship between the device and network as being seamless. The platform may provide an end-to-end chain of trust and validation across the device/network relationship via a layered security architecture, in contrast to examples of isolated and individual defenses that may operate independently and without the benefit of immediate collaboration.

Designed-In-Versus Bolt-on

By taking a new approach to how Smartphones and edge devices work on the platform network means that we may also place security at the heart of the OS strategy with a "Design-In" rather than a bolt-on approach. This has led to significant re-writes of core parts as may be appreciated bolting on or retro-fitting security to an operating system is far from trivial and invariably such efforts may end up creating many new threat surfaces due to the complexity of updating all related components and dependencies that are linked to the new security frameworks being implemented.

In embodiments, the platform may deploy many features to bolster the security framework of the network including the following.

Behavioral Analytics

In embodiments, the platform security architecture may deploy user behavioral models and behavioral analytics. By defining roles for different user types, which could, for example, mirror existing roles and ranks within the armed forces, these may be used as templates to both anticipate user requirements but also to monitor for any unusual behavior.

By storing these profiles in the cloud, the network may leverage the anonymized usage data from the platform subscriber base to continually fine tune and update the profiles which may then be shared back to end user devices.

In embodiments, embedded machine learning clients inside the device may further monitor user behavior over time to identify any potential unauthorized or abnormal usage which may then be highlighted to the network control center for detailed analysis and remedial action (if required).

For such techniques to be effective in providing enhanced levels of security it may be required that both the device and network work in tandem. As soon as a potential threat is identified in one device by working in conjunction with the network the device may not only take actions to protect itself but the device may also broadcast alerts to all devices to update security policies or disabling functionality as required in order to keep the device secure along with local and greater portions of the network.

Hardware Security Modules and Crypto Key Storage

In embodiments, a hardware security module (HSM) may be embedded and its cryptographic operations may be optimized. By way of these examples, the HSM may include a set of embedded cryptographic libraries and symmetric and asymmetric algorithms to support multiple encryption techniques including approaches such as PKI. The HSM may also encrypt a wide range of messages that typically run as system buses (e.g., the D-BUS) thus providing an additional layer of communication.

By deploying certificates and digital credentials to support applications such as identify management and user authentication, the platform leverage HSMs as part of the security framework on edge devices, smartphones, user equipment, and the like. Additionally, the HSM, in many examples, is the logical place to store cryptographic keys that may be used for encrypting and decrypting operations between the device and remote servers.

In embodiments, the HSM may be leveraged to provide support for secure boot capabilities. When the device is first deployed, a secure key (e.g., signed by a trusted entity) may be placed in the HSM. During device boot up, the OS may be validated against the secure key to confirm that the OS image has not been tampered with or compromised. With this approach, OS updates are deployed to the device with correctly authenticated embedded keys before being deployed to other devices to ensure a successful boot process.

Over the Air Software Updating—Essential to Mandate

In embodiments, software over-the-air (SOTA) updates may be mandated and automatically installed. In these examples the update may be installed silently wherever possible to remove optionality and to ensure that the latest security enhancements are deployed within a committed time frame after they have been validated and released. In embodiments, this will also ensure that all users, or groups of users depending on the policies applied, may have the same software versions of the OS and applications at the same time. This will not only yield benefits in terms of security and device stability but also for device support teams as they will no longer need to be experts in multiple OS and application versions.

Identity Management

In embodiments, identity management may be used to enhance security and validate who is using devices and what they have access to (where devices have shared usage). In embodiments, Identity Management may include support features such as Single Sign On (SSO) enabling users to authenticate, often biometrically, one time and the have access to multiple online systems and services. By way of these examples, Identities or certificates may be typically stored inside the device in a cryptographic vault that may be a pure software solution or may also use the hardware security module within the platform application processor to store the user certificates. In embodiments, identity management may work in conjunction with public key infrastructure (PKI) to provide an additional layer of security.

Using Identity Management and PKI in combination may provide a powerful set of tools to ensure that only those who should be accessing a service may and that any data shared between the network and edge devices of the platform (or network to network) may be encrypted to further protect the customers or users. In embodiments, the concept of identify management may be further extended to effectively make the device self-aware of its purpose. In an example, one of the areas where this weakness in security has been observed is in the Bring Your Own Device (BOYD) approach adopted by many enterprises. While there are, for example, benefits to allowing an employee to use their own device for work purposes, it may effectively result in issues for enterprise security policies. Applicant may appreciate in light of the disclosure that this is made worse by the device not understanding its nature or purpose and, as such, it would be much simpler to handle these issues within the OS and having the device understand what it is being used for and the context so that the correct services and content may be exposed.

In many examples of external attacks that when undetected for longer than they should have, the device and network in question may be shown to have repelled the attack sooner by understanding that it was under attack or that what it was being instructed to do was suspicious, malicious, or the like. By moving the OS in to the cloud these benefits are further enhanced. Policies may be set based on usage patterns, times of day, location, etc. that enable or disable access to specific functionality or services. Any issues that the device then detects may be quickly identified, analyzed and the appropriate actions taken including updating all other devices in the field about the new threat that has been detected.

Machine Learning and Artificial Intelligence

In embodiments, the machine learning (ML) system may include an embedded client that may run within the micro-OS on each platform device and a companion ML system that may reside within the network cloud. These two ML platforms may share common data definitions, user profile configurations and learning algorithms enabling them to interwork seamlessly.

User Behavior Data Collection

In embodiments, default user profiles may be created based on customer defined roles and permissions and may be used to form the basis of reference normal behavior which the ML learning system may use to assess potential security threats or usability enhancements. In embodiments, platform devices may support the embedded ML engine that may have access to all relevant system calls and data flows. As user data is collected the embedded ML engine may analyze their activity to identify the user behavior that may be statistically abnormal potentially suggesting that the device has been compromised either by malware or that the physical user of the device is no longer the authorized user. Examples may include the following: requests to send large amounts of data to new contacts or servers; significant increase of interactions between system APIs (where there is no user HMI element or interaction); installation of applications or services that do not fit with users' profiles; use of different (i.e., not trusted) encryption techniques or keys; and predetermined differences and deviation therefrom in the time of day that the device is being used—potentially suggesting the presence of malware.

Once such behavior has been identified there are, in many examples, several scenarios that may be executed in order to protect the user/device/data such as the following: notification to the network control center for analysis; confirmation by the user that requested operations are valid; and deprecation of APIs or applications while user validation is performed.

Under normal operational conditions, platform devices; in many examples, may provide user profile and behavioral analytics updates on a pre-defined update cycle. In the event of security threats being identified, a platform device may automatically connect to the network operations center to alert the network and initiate remedial actions. Once agreed action plans have been identified, software patches or profile changes may be pushed from the network to all "at risk" devices. Such updates may be signed by a trusted signing authority and will need to be hardened by the platform.

Predicting Requirements

As the user behavioral models are refined and fine-tuned for each user or customer, machine learning systems, in many examples, may anticipate patterns of behavior in terms of application and service interaction. In embodiments, the ML system may signal to the network that the user is likely to need specific functionality to be executed either in the network or to be pre-cached on the device itself. Such capabilities will not be limited to just predicting software needs but also geographic challenges such as areas of low or zero coverage or when the user is likely to be (or not likely to be) in a mesh network environment. In these circumstances, the device may signal to the network that it sees sufficient connectivity to benefit from downloading the complete smartphone (or other user equipment) software stack to the device in order to be able to continue providing the full range of services that the user needs or is anticipated to need, for example, while in poor coverage areas.

Another important aspect of the device experience is the general usability in that the ML system may train on usability scenarios and issues to identify and refine the embedded or cloud-based human-machine interface (HMI). By way of these examples, the same HMI does not need to be provided to all users but rather may be fine-tuned for each user or customer group or potentially individual optimized screen layouts, menu flows, voice interactions or gesture-based interactions.

Monitoring the User Base

In embodiments, it is not only individual behavior that will be analyzed but also the data available from the entire user base will be used by the ML system to analyze a wide range of issues in order to continuously enhance the performance and integrity of the platform devices. The ML system may will be configurable such that it may analyze and train on all users, groups of users or random samples, etc. Areas where examples of the issues that may be analyzed across the wider user base include the following: security risks; hardware performance issues; software stability issues (based on, for example, crash logs and instrumentation data), which typically are segmented into severity types for resolution prioritization; underutilized system capabilities; software driver performance; applications or services performance; browser usage and performance; issues driving unexpectedly high consumption of system resource; battery performance; and the like.

In embodiments, output from the ML system may inform the development priorities for the device software and any related cloud components on the platform. Once updates have been developed and validated for release, they may be either compiled into the cloud-based smartphone (or other user equipment) platform thus making them instantly available to all devices; or pushed on a pre-defined schedule to the platform device as an update to the embedded micro-OS.

Mesh Networking

In embodiments, mesh networking on the platform may dynamically turn each edge device into a router (or base-station) that may act as an extension of the network in order to extend coverage for service in areas where traditional cellular coverage is not available or not stable enough to support the applications or services required.

By way of these examples, the edge devices with the best connection to the core network will act as the back haul for the rest of the devices connected via the mesh extension. However, if one or more new devices are added to the network with better connections, however, those better connections may take over and act as the new back haul anchor in that as more devices are added into the mesh environment, the better the coverage and throughput on the network becomes (in contrast to traditional cellular networks) where available capacity and bandwidth available is reduced when more devices are added to the network.

Creating Secure Network Extensions

As with other aspects of the platform the Mesh network needs to be secure and may implement the following to improve security.

Segmentation and Reassembly

In embodiments, data payloads may be segmented and transmitted across multiple access timeslots and paths when transmitted to the intended receiver. This may increase security by significantly increasing the complexity of trying to intercept and assemble messages by unauthorized actors.

Policy Management

Policy management may be used in conjunction with device authentication to ensure that only approved devices are added into a mesh network or specific mesh neighborhood. Such a policy could, for example, define that only devices with a specific credentials may be added to the mesh network or that a specific encryption key be used for sending data across the mesh network.

Over the Air Provisioning

In embodiments, the core mesh capabilities may be enabled or updated to a platform edge device, using over-the-air programming. In embodiments, devices may be provisioned with mesh support as and when required or have mesh support removed dynamically based on the customers security policies.

Maintaining Response Times and Performance

In embodiments, the platform mesh may boost network performance in highly congested device environments using advanced transmission power management, frequency management and time slicing. By way of these examples, dynamic neighborhoods may be created between user groups that allow multiple groups to co-exist without impacting their network performance. Monitoring signal strength and device density may enable the mesh network to dynamically determine the optimal power transmit modes to maximize the spectrum usage to accommodate the maximum number of devices at any given time. As the radio environment changes, the mesh network, in many examples, may reconfigure itself in real-time to adapt and maintain performance. Such reconfigurations may be done within milliseconds to avoid any performance impact for users.

Example Use Case Scenarios

In embodiments battlefield scenarios may be supported by platform mesh networks where there is not time or it is not practical to put up traditional infrastructure. By way of these examples, devices may dynamically join and disconnect from the network and, as needed, may provide an accurate location when joining, while connected to, or when leaving the network enabling troops or other armed forces assets to be accurately tracked. Additionally, the distributed broadcast nature of mesh networking may provide a key security element when sending real time messages to combatants.

In embodiments, underground environments such as subway systems may be easily supported by platform mesh networks, which may remove the need to retrofit microcells that may be both costly and complex to deploy in older systems. Another challenging issues for such networks may be the spike in capacity requirements during peak rush-hours but platform mesh networks may enhance capacity and performance as new devices are added.

Enabling New Applications and Experiences

With the enhanced bandwidth, low latency network response times and network slicing a wide range of new applications and services that impact all industries may be supported by the platform. Examples include the following:

Healthcare

With latency times down to 1 ms for 5G networking, the vision of remote procedures being conducted over a mobile network may become a reality. In embodiments, surgeons may not only carry out remote procedures, they may also receive real-time tactile feedback during procedures. These capabilities may transform the types of life saving treatment than may be provided by first responders attending to accidents or even treatment of injured service personal on the battlefield. Similarly, the use of wearable medical devices such as heart rate monitors, or embedded devices such as pacemakers may be transformed with the ability receive real time updates, performance and administer medication (where devices are capable).

Autonomous Vehicles

In embodiments, the platform may support autonomous vehicles where, in densely populated areas, real time updates as to changing traffic and road conditions may be required from the network. In these situations, the ability for vehicles to instantly share information on environmental changes (such as a road traffic accident) may be beneficial when sent to the network for instant dissemination to all other autonomous vehicles on the road.

Smart Cities

As cities continue to evolve, they will become ever more connected from traffic management systems and CCTV systems to buildings and medical systems and the like. With such large data sets, the role of large data analytics and AI will develop to play a leading role in the efficient management of cities. However, the reality of most major cities is that wireless communications will need to carry most of the data due to the complexity of trying to retrofit wired connectivity. For a smart city with a dedicated 5G network slice, the ability to efficiently balance services, such as public transport, between supply and demand around the city will be transformational.

All the above scenarios will be further enhanced by support from the platform mesh networks enabling the dynamic extension of the network to meet the coverage needs of users.

Another benefit of the platform edge device architecture is removal of the dependency between OS releases and application versions, which often creates significant frustration for device users. In some examples, new application releases typically only support a specific number of legacy OS versions and this may result in users of older devices finding that utility of their device is drastically reduced over time. By moving the OS in the cloud this issue is largely removed as OS updates may be instantly made available to users when needed. Likewise, application updates may be pre-tested in the cloud before being made available to users. In some examples when a user's hardware is not able to support a particular OS update or App version, the older version may be maintained and provided to that user.

In embodiments, provided herein is a self-contained 5G mobile telecommunications and edge computing platform for the provision of communication and networking using a decentralized data model. In embodiments, provided herein is a self-contained 5G mobile telecommunications and edge computing platform for the provision of communication and networking using a decentralized data model and for the provision of communication and networking having low earth orbit satellites for backhaul, a securitized micro-data center, and software defined networking system integrated in a self-configuring, out-of-the-box, network kit. In embodiments, provided herein is a self-contained 5G mobile telecommunications and edge computing platform for the provision of communication and networking using a decentralized data model and having a 5G core network. In embodiments, provided herein is a self-contained 5G mobile telecommunications and edge computing platform for the provision of communication and networking using a decentralized data model and having a top-level and/or secure domain name server system with enhanced secure SIP protocols having a 5G core network that resolves and controls all signaling and domain name server system queries at the top level of the global directory or within a secure domain. In embodiments, provided herein is a self-contained 5G mobile telecommunications and edge computing platform for the provision of communication and networking using a decentralized data model and having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity. In embodiments, provided herein is a self-contained 5G mobile telecommunications and edge computing platform for the provision of communication and networking using a decentralized data model and having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications. In embodiments, provided herein is a self-contained 5G mobile telecommunications and edge computing platform for the provision of communication and networking using a decentralized data model and having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols. In embodiments, provided herein is a self-contained 5G mobile telecommunications and edge computing platform for the provision of communication and networking using a decentralized data model and having a top-level domain name server system having a 5G core network that resolves and controls all signaling and domain name server system queries at the top level of the global directory and having a system for automating VPN setup to authorized and authenticated endpoints. In embodiments, provided herein is a self-contained 5G mobile telecommunications and edge computing platform for the provision of communication and networking using a decentralized data model and having a top-level domain name server system having a 5G core network that resolves and controls all signaling and domain name server system queries at the top level of the global directory and having input/output packet gateways based on application-specific integrated circuits purposed for 5G packet processing. In embodiments, provided herein is a self-contained 5G mobile telecommunications and edge computing platform for the provision of communication and networking using a decentralized data model and having a top-level domain name server system having a 5G core network that resolves and controls all signaling and domain name server system queries at the top level of the global directory and having application-specific integrated circuits purposed for 5G packet processing to support control plane and user plane functions. In embodiments, provided herein is a self-contained 5G mobile telecommunications and edge computing platform for the provision of communication and networking using a decentralized data model and having a top-level domain name server system having a 5G core network that resolves and controls all signaling and domain name server system queries at the top level of the global directory and having field programmable gate array-based hardware and software for session initiation protocol messaging for the signaling gateways. In embodiments, provided herein is a self-contained 5G mobile telecommunications and edge computing platform for the provision of communication and networking using a decentralized data model and having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging. In embodiments, provided herein is a self-contained 5G mobile telecommunications and edge computing platform for the provision of communication and networking using a decentralized data model and having a top-level domain name server system having a 5G core network that resolves and controls all signaling and domain name server system queries at the top level of the global directory and having a system for providing field programmable gate array-based control plane input/output security. In embodiments, provided herein is a self-contained 5G mobile telecommunications and edge computing platform for the provision of communication and networking using a decentralized data model and having a top-level domain name server system having a 5G core network that resolves and controls all signaling and domain name server system queries at the top level of the global directory and having a system for providing field gate programmable array-based user plane input/output security. In embodiments, provided herein is a self-contained 5G mobile telecommunications and edge computing platform for the provision of communication and networking using a decentralized data model and having a top-level domain system having a session border controller to ensure all bilateral communication links are subject to behavior monitoring. In embodiments, provided herein is a self-contained 5G mobile telecommunications and edge computing platform for the provision of communication and networking using a decentralized data model and having a top-level domain system employing secure SIP protocols to check SIP resolvers or proxies that are either gray listed or black listed in cases where proxy identification or route veracity cannot be determined or trusted, and using certain protocols to ascertain origin authentication and to reestablish separate trusted routes to the origin where the origin has been authenticated and verified. In embodiments, provided herein is a self-contained 5G mobile telecommunications and edge computing platform for the provision of communication and networking using a decentralized data model and having a firewalled microdata center having a fully-contained baseband unit system integrated with cloud-radio access network connectivity and having a fronthaul fiber or microwave interconnect. In embodiments, provided herein is a self-contained 5G mobile telecommunications and edge computing platform for the provision of communication and networking using a decentralized data model and having an edge computing system. In embodiments, provided herein is a self-contained 5G mobile telecommunications and edge computing platform for the provision of communication and networking using a decentralized data model and having a low earth orbit satellite system for backhaul operation integrated with a software-defined networking system. In embodiments, provided herein is a self-contained 5G mobile telecommunications and edge computing platform for the provision of communication and networking using a decentralized data model and having a low earth orbit satellite system for backhaul operation integrated with a software defined networking system, wherein satellite communication links are unshared and are at the physical layer. In embodiments, provided herein is a self-contained 5G mobile telecommunications and edge computing platform for the provision of communication and networking using a decentralized data model and having a low earth orbit satellite system for backhaul operation integrated with a software defined networking system, wherein satellite communication links are unshared and are at the data layer. In embodiments, provided herein is a self-contained 5G mobile telecommunications and edge computing platform for the provision of communication and networking using a decentralized data model and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform for the provision of communication and networking using a decentralized data model and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform for the provision of communication and networking using a decentralized data model and having an application programming interface. In embodiments, provided herein is a self-contained 5G mobile telecommunications and edge computing platform for the provision of communication and networking using a decentralized data model and having a restful application programming interface. In embodiments, provided herein is a self-contained 5G mobile telecommunications and edge computing platform for the provision of communication and networking using a decentralized data model and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform for the provision of communication and networking using a decentralized data model and having virtual trust levels at the process level. In embodiments, provided herein is a self-contained 5G mobile telecommunications and edge computing platform for the provision of communication and networking using a decentralized data model and having a process isolation system. In embodiments, provided herein is a self-contained 5G mobile telecommunications and edge computing platform for the provision of communication and networking using a decentralized data model and having partitioned kernels. In embodiments, provided herein is a self-contained 5G mobile telecommunications and edge computing platform for the provision of communication and networking using a decentralized data model and having an identity management system for identifying, authenticating, and authorizing platform subscribers. In embodiments, provided herein is a self-contained 5G mobile telecommunications and edge computing platform for the provision of communication and networking using a decentralized data model and having an authentication system having a risk-based authentication system that uses machine learning and/or artificial intelligence to determine the risk of user activity. In embodiments, provided herein is a self-contained 5G mobile telecommunications and edge computing platform for the provision of communication and networking using a decentralized data model and having an authentication system having a system for providing multi-factor context aware authentication using machine learning and/or artificial intelligence and biometric identification. In embodiments, provided herein is a self-contained 5G mobile telecommunications and edge computing platform for the provision of communication and networking using a decentralized data model and having a private blockchain for storing data. In embodiments, provided herein is a self-contained 5G mobile telecommunications and edge computing platform for the provision of communication and networking using a decentralized data model and having a distributed ledger system for storing data. In embodiments, provided herein is a self-contained 5G mobile telecommunications and edge computing platform for the provision of communication and networking using a decentralized data model and having a checkpoint module in each call model. In embodiments, provided herein is a self-contained 5G mobile telecommunications and edge computing platform for the provision of communication and networking using a decentralized data model and having a data recording and reporting system for recording data related to detected anomalies and/or generating reports related to detected anomalies. In embodiments, provided herein is a self-contained 5G mobile telecommunications and edge computing platform for the provision of communication and networking using a decentralized data model and having a system for enabling clean slate reset, wherein a clean slate reset may be performed by pre-established rules or by operator command. In embodiments, provided herein is a self-contained 5G mobile telecommunications and edge computing platform for the provision of communication and networking using a decentralized data model and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform for the provision of communication and networking using a decentralized data model and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform for the provision of communication and networking using a decentralized data model and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform for the provision of communication and networking using a decentralized data model and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform for the provision of communication and networking using a decentralized data model and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform for the provision of communication and networking using a decentralized data model and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform for the provision of communication and networking using a decentralized data model and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform for the provision of communication and networking using a decentralized data model and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform for the provision of communication and networking using a decentralized data model and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform for the provision of communication and networking using a decentralized data model and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform for the provision of communication and networking using a decentralized data model and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform for the provision of communication and networking using a decentralized data model and having a smart network slicing system for segmenting the network to align with unique application requirements. In embodiments, provided herein is a self-contained 5G mobile telecommunications and edge computing platform for the provision of communication and networking using a decentralized data model and having a quantum encryption system for enabling quantum encryption and decryption. In embodiments, provided herein is a self-contained 5G mobile telecommunications and edge computing platform for the provision of communication and networking using a decentralized data model and having a certificate authority for issuing digital certificates. In embodiments, provided herein is a self-contained 5G mobile telecommunications and edge computing platform for the provision of communication and networking using a decentralized data model and having a system for providing cyber security in space. In embodiments, provided herein is a self-contained 5G mobile telecommunications and edge computing platform for the provision of communication and networking using a decentralized data model and having secure session initiation protocol security mechanisms. In embodiments, provided herein is a self-contained 5G mobile telecommunications and edge computing platform for the provision of communication and networking using a decentralized data model and having a management and orchestration system for coordinating network resources for applications and the lifecycle management of virtual network functions. In embodiments, provided herein is a self-contained 5G mobile telecommunications and edge computing platform for the provision of communication and networking using a decentralized data model and having a dashboard and/or application programming interface for orchestration and management of a 5G network. In embodiments, provided herein is a self-contained 5G mobile telecommunications and edge computing platform for the provision of communication and networking using a decentralized data model and having a system for identifying user information collected by a source, generating a notification and/or report related the collected user information, and sending the notification and/or report to the user. In embodiments, provided herein is a self-contained 5G mobile telecommunications and edge computing platform for the provision of communication and networking using a decentralized data model and having a system for enabling a user to limit the degree to which information is shared with websites and applications. In embodiments, provided herein is a self-contained 5G mobile telecommunications and edge computing platform for the provision of communication and networking using a decentralized data model and having a system for blocking data flow between specific manufacturers unless a user opts in. In embodiments, provided herein is a self-contained 5G mobile telecommunications and edge computing platform for the provision of communication and networking using a decentralized data model and having a system for enabling automatic clearance of data tracking. In embodiments, provided herein is a self-contained 5G mobile telecommunications and edge computing platform for the provision of communication and networking using a decentralized data model and having a machine learning and/or artificial intelligence system for providing insights to users related to data-sharing management. In embodiments, provided herein is a self-contained 5G mobile telecommunications and edge computing platform for the provision of communication and networking using a decentralized data model and having a privacy-controlled container on top of the base smartphone operating system to run services and applications. In embodiments, provided herein is a self-contained 5G mobile telecommunications and edge computing platform for the provision of communication and networking using a decentralized data model and having virtualized operating system applications wherein the applications are run on a Type 1 Hypervisor having a real-time operating system. In embodiments, provided herein is a self-contained 5G mobile telecommunications and edge computing platform for the provision of communication and networking using a decentralized data model and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform for the provision of communication and networking using a decentralized data model and having a forced operating system software update system for automatically forcing operating system software updates on the 5G mobile devices of platform subscribers. In embodiments, provided herein is a self-contained 5G mobile telecommunications and edge computing platform for the provision of communication and networking using a decentralized data model and having a device registration system for registering a user device to a specific network segment. In embodiments, provided herein is a self-contained 5G mobile telecommunications and edge computing platform for the provision of communication and networking using a decentralized data model and having a multi-static radar having beam forming MIMO antennas. In embodiments, provided herein is a self-contained 5G mobile telecommunications and edge computing platform for the provision of communication and networking using a decentralized data model and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform for the provision of communication and networking using a decentralized data model and having a drone shield system for using a fleet of drones to form a dynamic barrier. In embodiments, provided herein is a self-contained 5G mobile telecommunications and edge computing platform for the provision of communication and networking using a decentralized data model and having a global payload delivery system that generates, deploys, and delivers electronic attack radio frequency and compute payloads through the low earth orbit satellite backhaul network. In embodiments, provided herein is a self-contained 5G mobile telecommunications and edge computing platform for the provision of communication and networking using a decentralized data model and having a precision navigation and timing system that uses a network of low orbit earth satellites as a timing source. In embodiments, provided herein is a self-contained 5G mobile telecommunications and edge computing platform for the provision of communication and networking using a decentralized data model and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform for the provision of communication and networking using a decentralized data model and having an augmented reality system that uses a machine learning and/or artificial intelligence system for providing a simulated environment. In embodiments, provided herein is a self-contained 5G mobile telecommunications and edge computing platform for the provision of communication and networking using a decentralized data model and having a virtual reality system that uses a machine learning and/or artificial intelligence system for providing a simulated environment. In embodiments, provided herein is a self-contained 5G mobile telecommunications and edge computing platform for the provision of communication and networking using a decentralized data model and having a customer relationship management system for managing communications with current and/or potential customers. In embodiments, provided herein is a self-contained 5G mobile telecommunications and edge computing platform for the provision of communication and networking using a decentralized data model and having a remote surgery system having a system for providing haptic feedback related to a surgical procedure. In embodiments, provided herein is a self-contained 5G mobile telecommunications and edge computing platform for the provision of communication and networking using a decentralized data model and having a remote driving system for controlling a remote vehicle and having a system for providing haptic feedback related to driving of the vehicle. In embodiments, provided herein is a self-contained 5G mobile telecommunications and edge computing platform for the provision of communication and networking using a decentralized data model and having a remote machine operation system for controlling a remote machine and having a system for providing haptic feedback related to machine operation. In embodiments, provided herein is a self-contained 5G mobile telecommunications and edge computing platform for the provision of communication and networking using a decentralized data model and having an electronic beam steering system to send targeted signals to receivers in 5G mobile devices.

In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a 5G core network. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a top-level domain name server system having a 5G core network that resolves and controls all signaling and domain name server system queries at the top level of the global directory. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a top-level domain name server system having a 5G core network that resolves and controls all signaling and domain name server system queries at the top level of the global directory and having a system for automating VPN setup to authorized and authenticated endpoints. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a top-level domain name server system having a 5G core network that resolves and controls all signaling and domain name server system queries at the top level of the global directory and having input/output packet gateways based on application-specific integrated circuits purposed for 5G packet processing. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a top-level domain name server system having a 5G core network that resolves and controls all signaling and domain name server system queries at the top level of the global directory and having application-specific integrated circuits purposed for 5G packet processing to support control plane and user plane functions. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a top-level domain name server system having a 5G core network that resolves and controls all signaling and domain name server system queries at the top level of the global directory and having field programmable gate array-based hardware and software for session initiation protocol messaging for the signaling gateways. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a top-level domain name server system having a 5G core network that resolves and controls all signaling and domain name server system queries at the top level of the global directory and having a system for providing field programmable gate array-based control plane input/output security. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a top-level domain name server system having a 5G core network that resolves and controls all signaling and domain name server system queries at the top level of the global directory and having a system for providing field gate programmable array-based user plane input/output security. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a top-level domain system having a session border controller to ensure all bilateral communication links are subject to behavior monitoring. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a firewalled micro-data center having a fully-contained baseband unit system integrated with cloud-radio access network connectivity and having a fronthaul fiber or microwave interconnect. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an edge computing system. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a low earth orbit satellite system for backhaul operation integrated with a software-defined networking system. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a low earth orbit satellite system for backhaul operation integrated with a software defined networking system, wherein satellite communication links are unshared and are at the physical layer. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a low earth orbit satellite system for backhaul operation integrated with a software defined networking system, wherein satellite communication links are unshared and are at the data layer. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an application programming interface. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a restful application programming interface. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having virtual trust levels at the process level. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a process isolation system. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having partitioned kernels. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an identity management system for identifying, authenticating, and authorizing platform subscribers. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an authentication system having a risk-based authentication system that uses machine learning and/or artificial intelligence to determine the risk of user activity. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an authentication system having a system for providing multi-factor context aware authentication using machine learning and/or artificial intelligence and biometric identification. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a private blockchain for storing data. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a distributed ledger system for storing data. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a compile-time checkpoint module on each call model. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a data recording and reporting system for recording data related to detected anomalies and/or generating reports related to detected anomalies. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a system for enabling clean slate reset, wherein a clean slate reset may be performed by pre-established rules or by operator command. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a smart network slicing system for segmenting the network to align with unique application requirements. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a quantum encryption system for enabling quantum encryption and decryption. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a certificate authority for issuing digital certificates. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a system for providing cyber security in space. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having secure session initiation protocol security mechanisms. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a management and orchestration system for coordinating network resources for applications and the lifecycle management of virtual network functions. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a dashboard and/or application programming interface for orchestration and management of a 5G network. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a system for identifying user information collected by a source, generating a notification and/or report related the collected user information, and sending the notification and/or report to the user. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a system for enabling a user to limit the degree to which information is shared with websites and applications. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a system for blocking data flow between specific manufacturers unless a user opts in. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a system for enabling automatic clearance of data tracking. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a machine learning and/or artificial intelligence system for providing insights to users related to data-sharing management. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a privacy-controlled container on top of the base smartphone operating system to run services and applications. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having virtualized operating system applications wherein the applications are run on a Type 1 Hypervisor having a real-time operating system. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a forced operating system software update system for automatically forcing operating system software updates on the 5G mobile devices of platform subscribers. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a device registration system for registering a user device to a specific network segment. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a multi-static radar having beam forming MIMO antennas. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a drone shield system for using a fleet of drones to form a dynamic barrier. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a global payload delivery system that generates, deploys, and delivers electronic attack radio frequency and compute payloads through the low earth orbit satellite backhaul network. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a precision navigation and timing system that uses a network of low orbit earth satellites as a timing source. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an augmented reality system that uses a machine learning and/or artificial intelligence system for providing a simulated environment. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a virtual reality system that uses a machine learning and/or artificial intelligence system for providing a simulated environment. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a customer relationship management system for managing communications with current and/or potential customers. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a remote surgery system having a system for providing haptic feedback related to a surgical procedure. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a remote driving system for controlling a remote vehicle and having a system for providing haptic feedback related to driving of the vehicle. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having a remote machine operation system for controlling a remote machine and having a system for providing haptic feedback related to machine operation. In embodiments, provided herein is a self-contained 5G mobile telecommunications and edge computing platform for the provision of communication and networking having low earth orbit satellites for backhaul, a securitized micro-data center, and software defined networking system integrated in a self-configuring, out-of-the-box, network kit and having an electronic beam steering system to send targeted signals to receivers in 5G mobile devices.

In embodiments, provided herein is a self-contained 5G mobile telecommunications and edge computing platform having a 5G core network. In embodiments, provided herein is a self-contained 5G mobile telecommunications and edge computing platform having a 5G core network and having a top-level domain name server system having a 5G core network that resolves and controls all signaling and domain name server system queries at the top level of the global directory. In embodiments, provided herein is a self-contained 5G mobile telecommunications and edge computing platform having a 5G core network and having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity. In embodiments, provided herein is a self-contained 5G mobile telecommunications and edge computing platform having a 5G core network and having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications. In embodiments, provided herein is a self-contained 5G mobile telecommunications and edge computing platform having a 5G core network and having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols. In embodiments, provided herein is a self-contained 5G mobile telecommunications and edge computing platform having a 5G core network and having a top-level domain name server system having a 5G core network that resolves and controls all signaling and domain name server system queries at the top level of the global directory and having a system for automating VPN setup to authorized and authenticated endpoints. In embodiments, provided herein is a self-contained 5G mobile telecommunications and edge computing platform having a 5G core network and having a top-level domain name server system having a 5G core network that resolves and controls all signaling and domain name server system queries at the top level of the global directory and having input/output packet gateways based on application-specific integrated circuits purposed for 5G packet processing. In embodiments, provided herein is a self-contained 5G mobile telecommunications and edge computing platform having a 5G core network and having a top-level domain name server system having a 5G core network that resolves and controls all signaling and domain name server system queries at the top level of the global directory and having application-specific integrated circuits purposed for 5G packet processing to support control plane and user plane functions. In embodiments, provided herein is a self-contained 5G mobile telecommunications and edge computing platform having a 5G core network and having a top-level domain name server system having a 5G core network that resolves and controls all signaling and domain name server system queries at the top level of the global directory and having field programmable gate array-based hardware and software for session initiation protocol messaging for the signaling gateways. In embodiments, provided herein is a self-contained 5G mobile telecommunications and edge computing platform having a 5G core network and having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging. In embodiments, provided herein is a self-contained 5G mobile telecommunications and edge computing platform having a 5G core network and having a top-level domain name server system having a 5G core network that resolves and controls all signaling and domain name server system queries at the top level of the global directory and having a system for providing field programmable gate array-based control plane input/output security. In embodiments, provided herein is a self-contained 5G mobile telecommunications and edge computing platform having a 5G core network and having a top-level domain name server system having a 5G core network that resolves and controls all signaling and domain name server system queries at the top level of the global directory and having a system for providing field gate programmable array-based user plane input/output security. In embodiments, provided herein is a self-contained 5G mobile telecommunications and edge computing platform having a 5G core network and having a top-level domain system having a session border controller to ensure all bilateral communication links are subject to behavior monitoring. In embodiments, provided herein is a self-contained 5G mobile telecommunications and edge computing platform having a 5G core network and having a firewalled microdata center having a fully-contained baseband unit system integrated with cloud-radio access network connectivity and having a fronthaul fiber or microwave interconnect. In embodiments, provided herein is a self-contained 5G mobile telecommunications and edge computing platform having a 5G core network and having an edge computing system. In embodiments, provided herein is a self-contained 5G mobile telecommunications and edge computing platform having a 5G core network and having a low earth orbit satellite system for backhaul operation integrated with a software-defined networking system. In embodiments, provided herein is a self-contained 5G mobile telecommunications and edge computing platform having a 5G core network and having a low earth orbit satellite system for backhaul operation integrated with a software defined networking system, wherein satellite communication links are unshared and are at the physical layer. In embodiments, provided herein is a self-contained 5G mobile telecommunications and edge computing platform having a 5G core network and having a low earth orbit satellite system for backhaul operation integrated with a software defined networking system, wherein satellite communication links are unshared and are at the data layer. In embodiments, provided herein is a self-contained 5G mobile telecommunications and edge computing platform having a 5G core network and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a 5G core network and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a 5G core network and having an application programming interface. In embodiments, provided herein is a self-contained 5G mobile telecommunications and edge computing platform having a 5G core network and having a restful application programming interface. In embodiments, provided herein is a self-contained 5G mobile telecommunications and edge computing platform having a 5G core network and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a 5G core network and having virtual trust levels at the process level. In embodiments, provided herein is a self-contained 5G mobile telecommunications and edge computing platform having a 5G core network and having a process isolation system. In embodiments, provided herein is a self-contained 5G mobile telecommunications and edge computing platform having a 5G core network and having partitioned kernels. In embodiments, provided herein is a self-contained 5G mobile telecommunications and edge computing platform having a 5G core network and having an identity management system for identifying, authenticating, and authorizing platform subscribers. In embodiments, provided herein is a self-contained 5G mobile telecommunications and edge computing platform having a 5G core network and having an authentication system having a risk-based authentication system that uses machine learning and/or artificial intelligence to determine the risk of user activity. In embodiments, provided herein is a self-contained 5G mobile telecommunications and edge computing platform having a 5G core network and having an authentication system having a system for providing multi-factor context aware authentication using machine learning and/or artificial intelligence and biometric identification. In embodiments, provided herein is a self-contained 5G mobile telecommunications and edge computing platform having a 5G core network and having a private blockchain for storing data. In embodiments, provided herein is a self-contained 5G mobile telecommunications and edge computing platform having a 5G core network and having a distributed ledger system for storing data. In embodiments, provided herein is a self-contained 5G mobile telecommunications and edge computing platform having a 5G core network and having a compile-time checkpoint module on each call model. In embodiments, provided herein is a self-contained 5G mobile telecommunications and edge computing platform having a 5G core network and having a data recording and reporting system for recording data related to detected anomalies and/or generating reports related to detected anomalies. In embodiments, provided herein is a self-contained 5G mobile telecommunications and edge computing platform having a 5G core network and having a system for enabling clean slate reset, wherein a clean slate reset may be performed by pre-established rules or by operator command. In embodiments, provided herein is a self-contained 5G mobile telecommunications and edge computing platform having a 5G core network and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a 5G core network and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a 5G core network and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a 5G core network and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a 5G core network and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a 5G core network and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a 5G core network and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a 5G core network and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a 5G core network and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a 5G core network and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a 5G core network and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a 5G core network and having a smart network slicing system for segmenting the network to align with unique application requirements. In embodiments, provided herein is a self-contained 5G mobile telecommunications and edge computing platform having a 5G core network and having a quantum encryption system for enabling quantum encryption and decryption. In embodiments, provided herein is a self-contained 5G mobile telecommunications and edge computing platform having a 5G core network and having a certificate authority for issuing digital certificates. In embodiments, provided herein is a self-contained 5G mobile telecommunications and edge computing platform having a 5G core network and having a system for providing cyber security in space. In embodiments, provided herein is a self-contained 5G mobile telecommunications and edge computing platform having a 5G core network and having secure session initiation protocol security mechanisms. In embodiments, provided herein is a self-contained 5G mobile telecommunications and edge computing platform having a 5G core network and having a management and orchestration system for coordinating network resources for applications and the lifecycle management of virtual network functions. In embodiments, provided herein is a self-contained 5G mobile telecommunications and edge computing platform having a 5G core network and having a dashboard and/or application programming interface for orchestration and management of a 5G network. In embodiments, provided herein is a self-contained 5G mobile telecommunications and edge computing platform having a 5G core network and having a system for identifying user information collected by a source, generating a notification and/or report related the collected user information, and sending the notification and/or report to the user. In embodiments, provided herein is a self-contained 5G mobile telecommunications and edge computing platform having a 5G core network and having a system for enabling a user to limit the degree to which information is shared with websites and applications. In embodiments, provided herein is a self-contained 5G mobile telecommunications and edge computing platform having a 5G core network and having a system for blocking data flow between specific manufacturers unless a user opts in. In embodiments, provided herein is a self-contained 5G mobile telecommunications and edge computing platform having a 5G core network and having a system for enabling automatic clearance of data tracking. In embodiments, provided herein is a self-contained 5G mobile telecommunications and edge computing platform having a 5G core network and having a machine learning and/or artificial intelligence system for providing insights to users related to data-sharing management. In embodiments, provided herein is a self-contained 5G mobile telecommunications and edge computing platform having a 5G core network and having a privacy-controlled container on top of the base smartphone operating system to run services and applications. In embodiments, provided herein is a self-contained 5G mobile telecommunications and edge computing platform having a 5G core network and having virtualized operating system applications wherein the applications are run on a Type 1 Hypervisor having a real-time operating system. In embodiments, provided herein is a self-contained 5G mobile telecommunications and edge computing platform having a 5G core network and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a 5G core network and having a forced operating system software update system for automatically forcing operating system software updates on the 5G mobile devices of platform subscribers. In embodiments, provided herein is a self-contained 5G mobile telecommunications and edge computing platform having a 5G core network and having a device registration system for registering a user device to a specific network segment. In embodiments, provided herein is a self-contained 5G mobile telecommunications and edge computing platform having a 5G core network and having a multi-static radar having beam forming MIMO antennas. In embodiments, provided herein is a self-contained 5G mobile telecommunications and edge computing platform having a 5G core network and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a 5G core network and having a drone shield system for using a fleet of drones to form a dynamic barrier. In embodiments, provided herein is a self-contained 5G mobile telecommunications and edge computing platform having a 5G core network and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a 5G core network and having a precision navigation and timing system that uses a network of low orbit earth satellites as a timing source. In embodiments, provided herein is a self-contained 5G mobile telecommunications and edge computing platform having a 5G core network and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a 5G core network and having an augmented reality system that uses a machine learning and/or artificial intelligence system for providing a simulated environment. In embodiments, provided herein is a self-contained 5G mobile telecommunications and edge computing platform having a 5G core network and having a virtual reality system that uses a machine learning and/or artificial intelligence system for providing a simulated environment. In embodiments, provided herein is a self-contained 5G mobile telecommunications and edge computing platform having a 5G core network and having a customer relationship management system for managing communications with current and/or potential customers. In embodiments, provided herein is a self-contained 5G mobile telecommunications and edge computing platform having a 5G core network and having a remote surgery system having a system for providing haptic feedback related to a surgical procedure. In embodiments, provided herein is a self-contained 5G mobile telecommunications and edge computing platform having a 5G core network and having a remote driving system for controlling a remote vehicle and having a system for providing haptic feedback related to driving of the vehicle. In embodiments, provided herein is a self-contained 5G mobile telecommunications and edge computing platform having a 5G core network and having a remote machine operation system for controlling a remote machine and having a system for providing haptic feedback related to machine operation. In embodiments, provided herein is a self-contained 5G mobile telecommunications and edge computing platform having a 5G core network and having an electronic beam steering system to send targeted signals to receivers in 5G mobile devices.

In embodiments, provided herein is a self-contained 5G mobile telecommunications and edge computing platform having a top-level domain name server system having a 5G core network that resolves and controls all signaling and domain name server system queries at the top level of the global directory. In embodiments, provided herein is a self-contained 5G mobile telecommunications and edge computing platform having a top-level domain name server system having a 5G core network that resolves and controls all signaling and domain name server system queries at the top level of the global directory and having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity. In embodiments, provided herein is a self-contained 5G mobile telecommunications and edge computing platform having a top-level domain name server system having a 5G core network that resolves and controls all signaling and domain name server system queries at the top level of the global directory and having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications. In embodiments, provided herein is a self-contained 5G mobile telecommunications and edge computing platform having a top-level domain name server system having a 5G core network that resolves and controls all signaling and domain name server system queries at the top level of the global directory and having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols. In embodiments, provided herein is a self-contained 5G mobile telecommunications and edge computing platform having a top-level domain name server system having a 5G core network that resolves and controls all signaling and domain name server system queries at the top level of the global directory and having a top-level domain name server system having a 5G core network that resolves and controls all signaling and domain name server system queries at the top level of the global directory and having a system for automating VPN setup to authorized and authenticated end-points. In embodiments, provided herein is a self-contained 5G mobile telecommunications and edge computing platform having a top-level domain name server system having a 5G core network that resolves and controls all signaling and domain name server system queries at the top level of the global directory and having a top-level domain name server system having a 5G core network that resolves and controls all signaling and domain name server system queries at the top level of the global directory and having input/output packet gateways based on application-specific integrated circuits purposed for 5G packet processing. In embodiments, provided herein is a self-contained 5G mobile telecommunications and edge computing platform having a top-level domain name server system having a 5G core network that resolves and controls all signaling and domain name server system queries at the top level of the global directory and having a top-level domain name server system having a 5G core network that resolves and controls all signaling and domain name server system queries at the top level of the global directory and having application-specific integrated circuits purposed for 5G packet processing to support control plane and user plane functions. In embodiments, provided herein is a self-contained 5G mobile telecommunications and edge computing platform having a top-level domain name server system having a 5G core network that resolves and controls all signaling and domain name server system queries at the top level of the global directory and having a top-level domain name server system having a 5G core network that resolves and controls all signaling and domain name server system queries at the top level of the global directory and having field programmable gate array-based hardware and software for session initiation protocol messaging for the signaling gateways. In embodiments, provided herein is a self-contained 5G mobile telecommunications and edge computing platform having a top-level domain name server system having a 5G core network that resolves and controls all signaling and domain name server system queries at the top level of the global directory and having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging. In embodiments, provided herein is a self-contained 5G mobile telecommunications and edge computing platform having a top-level domain name server system having a 5G core network that resolves and controls all signaling and domain name server system queries at the top level of the global directory and having a top-level domain name server system having a 5G core network that resolves and controls all signaling and domain name server system queries at the top level of the global directory and having a system for providing field programmable gate array-based control plane input/output security. In embodiments, provided herein is a self-contained 5G mobile telecommunications and edge computing platform having a top-level domain name server system having a 5G core network that resolves and controls all signaling and domain name server system queries at the top level of the global directory and having a top-level domain name server system having a 5G core network that resolves and controls all signaling and domain name server system queries at the top level of the global directory and having a system for providing field gate programmable array-based user plane input/output security. In embodiments, provided herein is a self-contained 5G mobile telecommunications and edge computing platform having a top-level domain name server system having a 5G core network that resolves and controls all signaling and domain name server system queries at the top level of the global directory and having a top-level domain system having a session border controller to ensure all bilateral communication links are subject to behavior monitoring. In embodiments, provided herein is a self-contained 5G mobile telecommunications and edge computing platform having a top-level domain name server system having a 5G core network that resolves and controls all signaling and domain name server system queries at the top level of the global directory and having a firewalled microdata center having a fully-contained baseband unit system integrated with cloud-radio access network connectivity and having a fronthaul fiber or microwave interconnect. In embodiments, provided herein is a self-contained 5G mobile telecommunications and edge computing platform having a top-level domain name server system having a 5G core network that resolves and controls all signaling and domain name server system queries at the top level of the global directory and having an edge computing system. In embodiments, provided herein is a self-contained 5G mobile telecommunications and edge computing platform having a top-level domain name server system having a 5G core network that resolves and controls all signaling and domain name server system queries at the top level of the global directory and having a low earth orbit satellite system for backhaul operation integrated with a software-defined networking system. In embodiments, provided herein is a self-contained 5G mobile telecommunications and edge computing platform having a top-level domain name server system having a 5G core network that resolves and controls all signaling and domain name server system queries at the top level of the global directory and having a low earth orbit satellite system for backhaul operation integrated with a software defined networking system, wherein satellite communication links are unshared and are at the physical layer. In embodiments, provided herein is a self-contained 5G mobile telecommunications and edge computing platform having a top-level domain name server system having a 5G core network that resolves and controls all signaling and domain name server system queries at the top level of the global directory and having a low earth orbit satellite system for backhaul operation integrated with a software defined networking system, wherein satellite communication links are unshared and are at the data layer. In embodiments, provided herein is a self-contained 5G mobile telecommunications and edge computing platform having a top-level domain name server system having a 5G core network that resolves and controls all signaling and domain name server system queries at the top level of the global directory and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a top-level domain name server system having a 5G core network that resolves and controls all signaling and domain name server system queries at the top level of the global directory and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a top-level domain name server system having a 5G core network that resolves and controls all signaling and domain name server system queries at the top level of the global directory and having an application programming interface. In embodiments, provided herein is a self-contained 5G mobile telecommunications and edge computing platform having a top-level domain name server system having a 5G core network that resolves and controls all signaling and domain name server system queries at the top level of the global directory and having a restful application programming interface. In embodiments, provided herein is a self-contained 5G mobile telecommunications and edge computing platform having a top-level domain name server system having a 5G core network that resolves and controls all signaling and domain name server system queries at the top level of the global directory and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a top-level domain name server system having a 5G core network that resolves and controls all signaling and domain name server system queries at the top level of the global directory and having virtual trust levels at the process level. In embodiments, provided herein is a self-contained 5G mobile telecommunications and edge computing platform having a top-level domain name server system having a 5G core network that resolves and controls all signaling and domain name server system queries at the top level of the global directory and having a process isolation system. In embodiments, provided herein is a self-contained 5G mobile telecommunications and edge computing platform having a top-level domain name server system having a 5G core network that resolves and controls all signaling and domain name server system queries at the top level of the global directory and having partitioned kernels. In embodiments, provided herein is a self-contained 5G mobile telecommunications and edge computing platform having a top-level domain name server system having a 5G core network that resolves and controls all signaling and domain name server system queries at the top level of the global directory and having an identity management system for identifying, authenticating, and authorizing platform subscribers. In embodiments, provided herein is a self-contained 5G mobile telecommunications and edge computing platform having a top-level domain name server system having a 5G core network that resolves and controls all signaling and domain name server system queries at the top level of the global directory and having an authentication system having a risk-based authentication system that uses machine learning and/or artificial intelligence to determine the risk of user activity. In embodiments, provided herein is a self-contained 5G mobile telecommunications and edge computing platform having a top-level domain name server system having a 5G core network that resolves and controls all signaling and domain name server system queries at the top level of the global directory and having an authentication system having a system for providing multi-factor context aware authentication using machine learning and/or artificial intelligence and biometric identification. In embodiments, provided herein is a self-contained 5G mobile telecommunications and edge computing platform having a top-level domain name server system having a 5G core network that resolves and controls all signaling and domain name server system queries at the top level of the global directory and having a private blockchain for storing data. In embodiments, provided herein is a self-contained 5G mobile telecommunications and edge computing platform having a top-level domain name server system having a 5G core network that resolves and controls all signaling and domain name server system queries at the top level of the global directory and having a distributed ledger system for storing data. In embodiments, provided herein is a self-contained 5G mobile telecommunications and edge computing platform having a top-level domain name server system having a 5G core network that resolves and controls all signaling and domain name server system queries at the top level of the global directory and having a compile-time checkpoint module on each call model. In embodiments, provided herein is a self-contained 5G mobile telecommunications and edge computing platform having a top-level domain name server system having a 5G core network that resolves and controls all signaling and domain name server system queries at the top level of the global directory and having a data recording and reporting system for recording data related to detected anomalies and/or generating reports related to detected anomalies. In embodiments, provided herein is a self-contained 5G mobile telecommunications and edge computing platform having a top-level domain name server system having a 5G core network that resolves and controls all signaling and domain name server system queries at the top level of the global directory and having a system for enabling clean slate reset, wherein a clean slate reset may be performed by pre-established rules or by operator command. In embodiments, provided herein is a self-contained 5G mobile telecommunications and edge computing platform having a top-level domain name server system having a 5G core network that resolves and controls all signaling and domain name server system queries at the top level of the global directory and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a top-level domain name server system having a 5G core network that resolves and controls all signaling and domain name server system queries at the top level of the global directory and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a top-level domain name server system having a 5G core network that resolves and controls all signaling and domain name server system queries at the top level of the global directory and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a top-level domain name server system having a 5G core network that resolves and controls all signaling and domain name server system queries at the top level of the global directory and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a top-level domain name server system having a 5G core network that resolves and controls all signaling and domain name server system queries at the top level of the global directory and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a top-level domain name server system having a 5G core network that resolves and controls all signaling and domain name server system queries at the top level of the global directory and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a top-level domain name server system having a 5G core network that resolves and controls all signaling and domain name server system queries at the top level of the global directory and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a top-level domain name server system having a 5G core network that resolves and controls all signaling and domain name server system queries at the top level of the global directory and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a top-level domain name server system having a 5G core network that resolves and controls all signaling and domain name server system queries at the top level of the global directory and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a top-level domain name server system having a 5G core network that resolves and controls all signaling and domain name server system queries at the top level of the global directory and having a smart network slicing system for segmenting the network to align with unique application requirements. In embodiments, provided herein is a self-contained 5G mobile telecommunications and edge computing platform having a top-level domain name server system having a 5G core network that resolves and controls all signaling and domain name server system queries at the top level of the global directory and having a quantum encryption system for enabling quantum encryption and decryption. In embodiments, provided herein is a self-contained 5G mobile telecommunications and edge computing platform having a top-level domain name server system having a 5G core network that resolves and controls all signaling and domain name server system queries at the top level of the global directory and having a certificate authority for issuing digital certificates. In embodiments, provided herein is a self-contained 5G mobile telecommunications and edge computing platform having a top-level domain name server system having a 5G core network that resolves and controls all signaling and domain name server system queries at the top level of the global directory and having a system for providing cyber security in space. In embodiments, provided herein is a self-contained 5G mobile telecommunications and edge computing platform having a top-level domain name server system having a 5G core network that resolves and controls all signaling and domain name server system queries at the top level of the global directory and having secure session initiation protocol security mechanisms. In embodiments, provided herein is a self-contained 5G mobile telecommunications and edge computing platform having a top-level domain name server system having a 5G core network that resolves and controls all signaling and domain name server system queries at the top level of the global directory and having a management and orchestration system for coordinating network resources for applications and the lifecycle management of virtual network functions. In embodiments, provided herein is a self-contained 5G mobile telecommunications and edge computing platform having a top-level domain name server system having a 5G core network that resolves and controls all signaling and domain name server system queries at the top level of the global directory and having a dashboard and/or application programming interface for orchestration and management of a 5G network. In embodiments, provided herein is a self-contained 5G mobile telecommunications and edge computing platform having a top-level domain name server system having a 5G core network that resolves and controls all signaling and domain name server system queries at the top level of the global directory and having a system for identifying user information collected by a source, generating a notification and/or report related the collected user information, and sending the notification and/or report to the user. In embodiments, provided herein is a self-contained 5G mobile telecommunications and edge computing platform having a top-level domain name server system having a 5G core network that resolves and controls all signaling and domain name server system queries at the top level of the global directory and having a system for enabling a user to limit the degree to which information is shared with websites and applications. In embodiments, provided herein is a self-contained 5G mobile telecommunications and edge computing platform having a top-level domain name server system having a 5G core network that resolves and controls all signaling and domain name server system queries at the top level of the global directory and having a system for blocking data flow between specific manufacturers unless a user opts in. In embodiments, provided herein is a self-contained 5G mobile telecommunications and edge computing platform having a top-level domain name server system having a 5G core network that resolves and controls all signaling and domain name server system queries at the top level of the global directory and having a system for enabling automatic clearance of data tracking. In embodiments, provided herein is a self-contained 5G mobile telecommunications and edge computing platform having a top-level domain name server system having a 5G core network that resolves and controls all signaling and domain name server system queries at the top level of the global directory and having a machine learning and/or artificial intelligence system for providing insights to users related to data-sharing management. In embodiments, provided herein is a self-contained 5G mobile telecommunications and edge computing platform having a top-level domain name server system having a 5G core network that resolves and controls all signaling and domain name server system queries at the top level of the global directory and having a privacy-controlled container on top of the base smartphone operating system to run services and applications. In embodiments, provided herein is a self-contained 5G mobile telecommunications and edge computing platform having a top-level domain name server system having a 5G core network that resolves and controls all signaling and domain name server system queries at the top level of the global directory and having virtualized operating system applications wherein the applications are run on a Type 1 Hypervisor having a real-time operating system. In embodiments, provided herein is a self-contained 5G mobile telecommunications and edge computing platform having a top-level domain name server system having a 5G core network that resolves and controls all signaling and domain name server system queries at the top level of the global directory and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a top-level domain name server system having a 5G core network that resolves and controls all signaling and domain name server system queries at the top level of the global directory and having a forced operating system software update system for automatically forcing operating system software updates on the 5G mobile devices of platform subscribers. In embodiments, provided herein is a self-contained 5G mobile telecommunications and edge computing platform having a top-level domain name server system having a 5G core network that resolves and controls all signaling and domain name server system queries at the top level of the global directory and having a device registration system for registering a user device to a specific network segment. In embodiments, provided herein is a self-contained 5G mobile telecommunications and edge computing platform having a top-level domain name server system having a 5G core network that resolves and controls all signaling and domain name server system queries at the top level of the global directory and having a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory and having a drone shield system for using a fleet of drones to form a dynamic barrier. In embodiments, provided herein is a self-contained 5G mobile telecommunications and edge computing platform having a top-level domain name server system having a 5G core network that resolves and controls all signaling and domain name server system queries at the top level of the global directory and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a top-level domain name server system having a 5G core network that resolves and controls all signaling and domain name server system queries at the top level of the global directory and having a precision navigation and timing system that uses a network of low orbit earth satellites as a timing source. In embodiments, provided herein is a self-contained 5G mobile telecommunications and edge computing platform having a top-level domain name server system having a 5G core network that resolves and controls all signaling and domain name server system queries at the top level of the global directory and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a top-level domain name server system having a 5G core network that resolves and controls all signaling and domain name server system queries at the top level of the global directory and having an augmented reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory and having a virtual reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory and having a customer relationship management system for managing communications with current and/or potential customers. In embodiments, provided herein is a self-contained 5G mobile telecommunications and edge computing platform having a top-level domain name server system having a 5G core network that resolves and controls all signaling and domain name server system queries at the top level of the global directory and having a remote surgery system having a system for providing haptic feedback related to a surgical procedure. In embodiments, provided herein is a self-contained 5G mobile telecommunications and edge computing platform having a top-level domain name server system having a 5G core network that resolves and controls all signaling and domain name server system queries at the top level of the global directory and having a remote driving system for controlling a remote vehicle and having a system for providing haptic feedback related to driving of the vehicle. In embodiments, provided herein is a self-contained 5G mobile telecommunications and edge computing platform having a top-level domain name server system having a 5G core network that resolves and controls all signaling and domain name server system queries at the top level of the global directory and having a remote machine operation system for controlling a remote machine and having a system for providing haptic feedback related to machine operation. In embodiments, provided herein is a self-contained 5G mobile telecommunications and edge computing platform having a top-level domain name server system having a 5G core network that resolves and controls all signaling and domain name server system queries at the top level of the global directory and having an electronic beam steering system to send targeted signals to receivers in 5G mobile devices.

In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a top-level domain name server system having a 5G core network that resolves and controls all signaling and domain name server system queries at the top level of the global directory and having a system for automating VPN setup to authorized and authenticated end-points. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a top-level domain name server system having a 5G core network that resolves and controls all signaling and domain name server system queries at the top level of the global directory and having input/output packet gateways based on application-specific integrated circuits purposed for 5G packet processing. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a top-level domain name server system having a 5G core network that resolves and controls all signaling and domain name server system queries at the top level of the global directory and having application-specific integrated circuits purposed for 5G packet processing to support control plane and user plane functions. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a top-level domain name server system having a 5G core network that resolves and controls all signaling and domain name server system queries at the top level of the global directory and having field programmable gate array-based hardware and software for session initiation protocol messaging for the signaling gateways. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a top-level domain name server system having a 5G core network that resolves and controls all signaling and domain name server system queries at the top level of the global directory and having a system for providing field programmable gate array-based control plane input/output security. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a top-level domain name server system having a 5G core network that resolves and controls all signaling and domain name server system queries at the top level of the global directory and having a system for providing field gate programmable array-based user plane input/output security. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a top-level domain system having a session border controller to ensure all bilateral communication links are subject to behavior monitoring. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a firewalled microdata center having a fully-contained baseband unit system integrated with cloud-radio access network connectivity and having a fronthaul fiber or microwave interconnect. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an edge computing system. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a low earth orbit satellite system for backhaul operation integrated with a software-defined networking system. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a low earth orbit satellite system for backhaul operation integrated with a software defined networking system, wherein satellite communication links are unshared and are at the physical layer. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a low earth orbit satellite system for backhaul operation integrated with a software defined networking system, wherein satellite communication links are unshared and are at the data layer. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an application programming interface. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a restful application programming interface. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having virtual trust levels at the process level. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a process isolation system. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having partitioned kernels. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an identity management system for identifying, authenticating, and authorizing platform subscribers. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an authentication system having a risk-based authentication system that uses machine learning and/or artificial intelligence to determine the risk of user activity. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an authentication system having a system for providing multi-factor context aware authentication using machine learning and/or artificial intelligence and biometric identification. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a private blockchain for storing data. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a distributed ledger system for storing data. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a compile-time checkpoint module on each call model. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a data recording and reporting system for recording data related to detected anomalies and/or generating reports related to detected anomalies. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a system for enabling clean slate reset, wherein a clean slate reset may be performed by pre-established rules or by operator command. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a smart network slicing system for segmenting the network to align with unique application requirements. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a quantum encryption system for enabling quantum encryption and decryption. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a certificate authority for issuing digital certificates. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a system for providing cyber security in space. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having secure session initiation protocol security mechanisms. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a management and orchestration system for coordinating network resources for applications and the lifecycle management of virtual network functions. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a dashboard and/or application programming interface for orchestration and management of a 5G network. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a system for identifying user information collected by a source, generating a notification and/or report related the collected user information, and sending the notification and/or report to the user. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a system for enabling a user to limit the degree to which information is shared with websites and applications. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a system for blocking data flow between specific manufacturers unless a user opts in. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a system for enabling automatic clearance of data tracking. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a machine learning and/or artificial intelligence system for providing insights to users related to data-sharing management. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a privacy-controlled container on top of the base smartphone operating system to run services and applications. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having virtualized operating system applications wherein the applications are run on a Type 1 Hypervisor having a real-time operating system. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a forced operating system software update system for automatically forcing operating system software updates on the 5G mobile devices of platform subscribers. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a device registration system for registering a user device to a specific network segment. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a drone shield system for using a fleet of drones to form a dynamic barrier. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a precision navigation and timing system that uses a network of low orbit earth satellites as a timing source. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an augmented reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a virtual reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a customer relationship management system for managing communications with current and/or potential customers. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a remote surgery system having a system for providing haptic feedback related to a surgical procedure. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a remote driving system for controlling a remote vehicle and having a system for providing haptic feedback related to driving of the vehicle. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having a remote machine operation system for controlling a remote machine and having a system for providing haptic feedback related to machine operation. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and having an electronic beam steering system to send targeted signals to receivers in 5G mobile devices.

In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a top-level domain name server system having a 5G core network that resolves and controls all signaling and domain name server system queries at the top level of the global directory and having a system for automating VPN setup to authorized and authenticated endpoints. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a top-level domain name server system having a 5G core network that resolves and controls all signaling and domain name server system queries at the top level of the global directory and having input/output packet gateways based on application-specific integrated circuits purposed for 5G packet processing. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a top-level domain name server system having a 5G core network that resolves and controls all signaling and domain name server system queries at the top level of the global directory and having application-specific integrated circuits purposed for 5G packet processing to support control plane and user plane functions. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a top-level domain name server system having a 5G core network that resolves and controls all signaling and domain name server system queries at the top level of the global directory and having field programmable gate array-based hardware and software for session initiation protocol messaging for the signaling gateways. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a top-level domain name server system having a 5G core network that resolves and controls all signaling and domain name server system queries at the top level of the global directory and having a system for providing field programmable gate array-based control plane input/output security. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a top-level domain name server system having a 5G core network that resolves and controls all signaling and domain name server system queries at the top level of the global directory and having a system for providing field gate programmable array-based user plane input/output security. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a top-level domain system having a session border controller to ensure all bilateral communication links are subject to behavior monitoring. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a firewalled microdata center having a fully-contained baseband unit system integrated with cloud-radio access network connectivity and having a fronthaul fiber or microwave interconnect. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an edge computing system. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a low earth orbit satellite system for backhaul operation integrated with a software-defined networking system. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a low earth orbit satellite system for backhaul operation integrated with a software defined networking system, wherein satellite communication links are unshared and are at the physical layer. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a low earth orbit satellite system for backhaul operation integrated with a software defined networking system, wherein satellite communication links are unshared and are at the data layer. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an application programming interface. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a restful application programming interface. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having virtual trust levels at the process level. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a process isolation system. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having partitioned kernels. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an identity management system for identifying, authenticating, and authorizing platform subscribers. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an authentication system having a risk-based authentication system that uses machine learning and/or artificial intelligence to determine the risk of user activity. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an authentication system having a system for providing multi-factor context aware authentication using machine learning and/or artificial intelligence and biometric identification. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a private blockchain for storing data. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a distributed ledger system for storing data. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a compile-time checkpoint module on each call model. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a data recording and reporting system for recording data related to detected anomalies and/or generating reports related to detected anomalies. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a system for enabling clean slate reset, wherein a clean slate reset may be performed by pre-established rules or by operator command. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a smart network slicing system for segmenting the network to align with unique application requirements. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a quantum encryption system for enabling quantum encryption and decryption. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a certificate authority for issuing digital certificates. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a system for providing cyber security in space. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having secure session initiation protocol security mechanisms. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a management and orchestration system for coordinating network resources for applications and the lifecycle management of virtual network functions. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a dashboard and/or application programming interface for orchestration and management of a 5G network. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a system for identifying user information collected by a source, generating a notification and/or report related the collected user information, and sending the notification and/or report to the user. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a system for enabling a user to limit the degree to which information is shared with websites and applications. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a system for blocking data flow between specific manufacturers unless a user opts in. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a system for enabling automatic clearance of data tracking. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a machine learning and/or artificial intelligence system for providing insights to users related to data-sharing management. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a privacy-controlled container on top of the base smartphone operating system to run services and applications. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having virtualized operating system applications wherein the applications are run on a Type 1 Hypervisor having a real-time operating system. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a forced operating system software update system for automatically forcing operating system software updates on the 5G mobile devices of platform subscribers. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a device registration system for registering a user device to a specific network segment. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a drone shield system for using a fleet of drones to form a dynamic barrier. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a precision navigation and timing system that uses a network of low orbit earth satellites as a timing source. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an augmented reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a virtual reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a customer relationship management system for managing communications with current and/or potential customers. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a remote surgery system having a system for providing haptic feedback related to a surgical procedure. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a remote driving system for controlling a remote vehicle and having a system for providing haptic feedback related to driving of the vehicle. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having a remote machine operation system for controlling a remote machine and having a system for providing haptic feedback related to machine operation. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain server system, the 5G core network, and network facilities are owned and operated by a single service provider entity and wherein the network provider can run multi-level security by opening different types of tunnels and/or virtual private networks transparently between the end-points based on the client resolution and/or the host resolution to apply various security applications and having an electronic beam steering system to send targeted signals to receivers in 5G mobile devices.

In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a top-level domain name server system having a 5G core network that resolves and controls all signaling and domain name server system queries at the top level of the global directory and having a system for automating VPN setup to authorized and authenticated endpoints. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a top-level domain name server system having a 5G core network that resolves and controls all signaling and domain name server system queries at the top level of the global directory and having input/output packet gateways based on application-specific integrated circuits purposed for 5G packet processing. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a top-level domain name server system having a 5G core network that resolves and controls all signaling and domain name server system queries at the top level of the global directory and having application-specific integrated circuits purposed for 5G packet processing to support control plane and user plane functions. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a top-level domain name server system having a 5G core network that resolves and controls all signaling and domain name server system queries at the top level of the global directory and having field programmable gate array-based hardware and software for session initiation protocol messaging for the signaling gateways. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a top-level domain name server system having a 5G core network that resolves and controls all signaling and domain name server system queries at the top level of the global directory and having a system for providing field programmable gate array-based control plane input/output security. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a top-level domain name server system having a 5G core network that resolves and controls all signaling and domain name server system queries at the top level of the global directory and having a system for providing field gate programmable array-based user plane input/output security. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a top-level domain system having a session border controller to ensure all bilateral communication links are subject to behavior monitoring. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a firewalled microdata center having a fully-contained baseband unit system integrated with cloud-radio access network connectivity and having a fronthaul fiber or microwave interconnect. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an edge computing system. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a low earth orbit satellite system for backhaul operation integrated with a software-defined networking system. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a low earth orbit satellite system for backhaul operation integrated with a software defined networking system, wherein satellite communication links are unshared and are at the physical layer. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a low earth orbit satellite system for backhaul operation integrated with a software defined networking system, wherein satellite communication links are unshared and are at the data layer. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an application programming interface. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a restful application programming interface. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having virtual trust levels at the process level. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a process isolation system. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having partitioned kernels. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an identity management system for identifying, authenticating, and authorizing platform subscribers. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an authentication system having a risk-based authentication system that uses machine learning and/or artificial intelligence to determine the risk of user activity. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an authentication system having a system for providing multi-factor context aware authentication using machine learning and/or artificial intelligence and biometric identification. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a private blockchain for storing data. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a distributed ledger system for storing data. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a compile-time checkpoint module on each call model. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a data recording and reporting system for recording data related to detected anomalies and/or generating reports related to detected anomalies. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a system for enabling clean slate reset, wherein a clean slate reset may be performed by pre-established rules or by operator command. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a smart network slicing system for segmenting the network to align with unique application requirements. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a quantum encryption system for enabling quantum encryption and decryption. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a certificate authority for issuing digital certificates. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a system for providing cyber security in space. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having secure session initiation protocol security mechanisms. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a management and orchestration system for coordinating network resources for applications and the lifecycle management of virtual network functions. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a dashboard and/or application programming interface for orchestration and management of a 5G network. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a system for identifying user information collected by a source, generating a notification and/or report related the collected user information, and sending the notification and/or report to the user. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a system for enabling a user to limit the degree to which information is shared with websites and applications. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a system for blocking data flow between specific manufacturers unless a user opts in. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a system for enabling automatic clearance of data tracking. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a machine learning and/or artificial intelligence system for providing insights to users related to data-sharing management. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a privacy-controlled container on top of the base smartphone operating system to run services and applications. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having virtualized operating system applications wherein the applications are run on a Type 1 Hypervisor having a real-time operating system. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a forced operating system software update system for automatically forcing operating system software updates on the 5G mobile devices of platform subscribers. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a device registration system for registering a user device to a specific network segment. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocolscols and having a drone shield system for using a fleet of drones to form a dynamic barrier. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a precision navigation and timing system that uses a network of low orbit earth satellites as a timing source. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an augmented reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a virtual reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a customer relationship management system for managing communications with current and/or potential customers. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a remote surgery system having a system for providing haptic feedback related to a surgical procedure. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a remote driving system for controlling a remote vehicle and having a system for providing haptic feedback related to driving of the vehicle. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having a remote machine operation system for controlling a remote machine and having a system for providing haptic feedback related to machine operation. In embodiments, provided herein is a self-contained 5G mobile telecommunications and edge computing platform having a top-level domain name server system having a 5G core network that resolves and controls all signaling and domain name server system queries at the top level of the global directory, and wherein the top-level domain name server system, data center systems that host the top-level domain name server system, the 5G core network, and network facilities are owned and operated by a single service provider entity and wherein the network provider supports IoT manufacturer-specific security protocols and having an electronic beam steering system to send targeted signals to receivers in 5G mobile devices.

In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a top-level domain name server system having a 5G core network that resolves and controls all signaling and domain name server system queries at the top level of the global directory and having input/output packet gateways based on application-specific integrated circuits purposed for 5G packet processing. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a top-level domain name server system having a 5G core network that resolves and controls all signaling and domain name server system queries at the top level of the global directory and having application-specific integrated circuits purposed for 5G packet processing to support control plane and user plane functions. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a top-level domain name server system having a 5G core network that resolves and controls all signaling and domain name server system queries at the top level of the global directory and having field programmable gate array-based hardware and software for session initiation protocol messaging for the signaling gateways. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a top-level domain name server system having a 5G core network that resolves and controls all signaling and domain name server system queries at the top level of the global directory and having a system for providing field programmable gate array-based control plane input/output security. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a top-level domain name server system having a 5G core network that resolves and controls all signaling and domain name server system queries at the top level of the global directory and having a system for providing field gate programmable array-based user plane input/output security. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a top-level domain system having a session border controller to ensure all bilateral communication links are subject to behavior monitoring. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a firewalled microdata center having a fully-contained baseband unit system integrated with cloud-radio access network connectivity and having a fronthaul fiber or microwave interconnect. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an edge computing system. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a low earth orbit satellite system for backhaul operation integrated with a software-defined networking system. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a low earth orbit satellite system for backhaul operation integrated with a software defined networking system, wherein satellite communication links are unshared and are at the physical layer. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a low earth orbit satellite system for backhaul operation integrated with a software defined networking system, wherein satellite communication links are unshared and are at the data layer. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an application programming interface. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a restful application programming interface. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having virtual trust levels at the process level. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a process isolation system. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having partitioned kernels. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an identity management system for identifying, authenticating, and authorizing platform subscribers. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an authentication system having a risk-based authentication system that uses machine learning and/or artificial intelligence to determine the risk of user activity. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an authentication system having a system for providing multi-factor context aware authentication using machine learning and/or artificial intelligence and biometric identification. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a private blockchain for storing data. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a distributed ledger system for storing data. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a compile-time checkpoint module on each call model. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a data recording and reporting system for recording data related to detected anomalies and/or generating reports related to detected anomalies. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a system for enabling clean slate reset, wherein a clean slate reset may be performed by pre-established rules or by operator command. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a smart network slicing system for segmenting the network to align with unique application requirements. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a quantum encryption system for enabling quantum encryption and decryption. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a certificate authority for issuing digital certificates. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a system for providing cyber security in space. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having secure session initiation protocol security mechanisms. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a management and orchestration system for coordinating network resources for applications and the lifecycle management of virtual network functions. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a dashboard and/or application programming interface for orchestration and management of a 5G network. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a system for identifying user information collected by a source, generating a notification and/or report related the collected user information, and sending the notification and/or report to the user. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a system for enabling a user to limit the degree to which information is shared with websites and applications. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a system for blocking data flow between specific manufacturers unless a user opts in. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a system for enabling automatic clearance of data tracking. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a machine learning and/or artificial intelligence system for providing insights to users related to data-sharing management. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a privacy-controlled container on top of the base smartphone operating system to run services and applications. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having virtualized operating system applications wherein the applications are run on a Type 1 Hypervisor having a real-time operating system. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a forced operating system software update system for automatically forcing operating system software updates on the 5G mobile devices of platform subscribers. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a device registration system for registering a user device to a specific network segment. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a drone shield system for using a fleet of drones to form a dynamic barrier. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a precision navigation and timing system that uses a network of low orbit earth satellites as a timing source. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an augmented reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a virtual reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a customer relationship management system for managing communications with current and/or potential customers. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a remote surgery system having a system for providing haptic feedback related to a surgical procedure. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a remote driving system for controlling a remote vehicle and having a system for providing haptic feedback related to driving of the vehicle. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having a remote machine operation system for controlling a remote machine and having a system for providing haptic feedback related to machine operation. In embodiments, provided herein is a self-contained 5G mobile telecommunications and edge computing platform having a top-level domain name server system having a 5G core network that resolves and controls all signaling and domain name server system queries at the top level of the global directory and having a system for automating VPN setup to authorized and authenticated endpoints and having an electronic beam steering system to send targeted signals to receivers in 5G mobile devices.

In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a top-level domain name server system having a 5G core network that resolves and controls all signaling and domain name server system queries at the top level of the global directory and having application-specific integrated circuits purposed for 5G packet processing to support control plane and user plane functions. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a top-level domain name server system having a 5G core network that resolves and controls all signaling and domain name server system queries at the top level of the global directory and having field programmable gate array-based hardware and software for session initiation protocol messaging for the signaling gateways. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a top-level domain name server system having a 5G core network that resolves and controls all signaling and domain name server system queries at the top level of the global directory and having a system for providing field programmable gate array-based control plane input/output security. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a top-level domain name server system having a 5G core network that resolves and controls all signaling and domain name server system queries at the top level of the global directory and having a system for providing field gate programmable array-based user plane input/output security. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a top-level domain system having a session border controller to ensure all bilateral communication links are subject to behavior monitoring. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a firewalled microdata center having a fully-contained baseband unit system integrated with cloud-radio access network connectivity and having a fronthaul fiber or microwave interconnect. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an edge computing system. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a low earth orbit satellite system for backhaul operation integrated with a software-defined networking system. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a low earth orbit satellite system for backhaul operation integrated with a software defined networking system, wherein satellite communication links are unshared and are at the physical layer. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a low earth orbit satellite system for backhaul operation integrated with a software defined networking system, wherein satellite communication links are unshared and are at the data layer. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an application programming interface. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a restful application programming interface. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having virtual trust levels at the process level. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a process isolation system. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having partitioned kernels. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an identity management system for identifying, authenticating, and authorizing platform subscribers. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an authentication system having a risk-based authentication system that uses machine learning and/or artificial intelligence to determine the risk of user activity. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an authentication system having a system for providing multi-factor context aware authentication using machine learning and/or artificial intelligence and biometric identification. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a private blockchain for storing data. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a distributed ledger system for storing data. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a compile-time checkpoint module on each call model. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a data recording and reporting system for recording data related to detected anomalies and/or generating reports related to detected anomalies. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a system for enabling clean slate reset, wherein a clean slate reset may be performed by pre-established rules or by operator command. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a smart network slicing system for segmenting the network to align with unique application requirements. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a quantum encryption system for enabling quantum encryption and decryption. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a certificate authority for issuing digital certificates. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a system for providing cyber security in space. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having secure session initiation protocol security mechanisms. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a management and orchestration system for coordinating network resources for applications and the lifecycle management of virtual network functions. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a dashboard and/or application programming interface for orchestration and management of a 5G network. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a system for identifying user information collected by a source, generating a notification and/or report related the collected user information, and sending the notification and/or report to the user. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a system for enabling a user to limit the degree to which information is shared with websites and applications. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a system for blocking data flow between specific manufacturers unless a user opts in. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a system for enabling automatic clearance of data tracking. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a machine learning and/or artificial intelligence system for providing insights to users related to data-sharing management. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a privacy-controlled container on top of the base smartphone operating system to run services and applications. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having virtualized operating system applications wherein the applications are run on a Type 1 Hypervisor having a real-time operating system. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a forced operating system software update system for automatically forcing operating system software updates on the 5G mobile devices of platform subscribers. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a device registration system for registering a user device to a specific network segment. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a drone shield system for using a fleet of drones to form a dynamic barrier. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a precision navigation and timing system that uses a network of low orbit earth satellites as a timing source. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an augmented reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a virtual reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a customer relationship management system for managing communications with current and/or potential customers. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a remote surgery system having a system for providing haptic feedback related to a surgical procedure. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a remote driving system for controlling a remote vehicle and having a system for providing haptic feedback related to driving of the vehicle. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having a remote machine operation system for controlling a remote machine and having a system for providing haptic feedback related to machine operation. In embodiments, provided herein is a self-contained 5G mobile telecommunications and edge computing platform having a top-level domain name server system having a 5G core network that resolves and controls all signaling and domain name server system queries at the top level of the global directory and having input/output packet gateways based on application-specific integrated circuits purposed for 5G packet processing and having an electronic beam steering system to send targeted signals to receivers in 5G mobile devices.

In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a top-level domain name server system having a 5G core network that resolves and controls all signaling and domain name server system queries at the top level of the global directory and having field programmable gate array-based hardware and software for session initiation protocol messaging for the signaling gateways. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a top-level domain name server system having a 5G core network that resolves and controls all signaling and domain name server system queries at the top level of the global directory and having a system for providing field programmable gate array-based control plane input/output security. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a top-level domain name server system having a 5G core network that resolves and controls all signaling and domain name server system queries at the top level of the global directory and having a system for providing field gate programmable array-based user plane input/output security. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a top-level domain system having a session border controller to ensure all bilateral communication links are subject to behavior monitoring. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a firewalled microdata center having a fully-contained baseband unit system integrated with cloud-radio access network connectivity and having a fronthaul fiber or microwave interconnect. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an edge computing system. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a low earth orbit satellite system for backhaul operation integrated with a software-defined networking system. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a low earth orbit satellite system for backhaul operation integrated with a software defined networking system, wherein satellite communication links are unshared and are at the physical layer. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a low earth orbit satellite system for backhaul operation integrated with a software defined networking system, wherein satellite communication links are unshared and are at the data layer. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an application programming interface. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a restful application programming interface. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having virtual trust levels at the process level. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a process isolation system. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having partitioned kernels. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an identity management system for identifying, authenticating, and authorizing platform subscribers. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an authentication system having a risk-based authentication system that uses machine learning and/or artificial intelligence to determine the risk of user activity. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an authentication system having a system for providing multi-factor context aware authentication using machine learning and/or artificial intelligence and biometric identification. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a private blockchain for storing data. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a distributed ledger system for storing data. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a compile-time checkpoint module on each call model. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a data recording and reporting system for recording data related to detected anomalies and/or generating reports related to detected anomalies. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a system for enabling clean slate reset, wherein a clean slate reset may be performed by pre-established rules or by operator command. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a smart network slicing system for segmenting the network to align with unique application requirements. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a quantum encryption system for enabling quantum encryption and decryption. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a certificate authority for issuing digital certificates. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a system for providing cyber security in space. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having secure session initiation protocol security mechanisms. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a management and orchestration system for coordinating network resources for applications and the lifecycle management of virtual network functions. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a dashboard and/or application programming interface for orchestration and management of a 5G network. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a system for identifying user information collected by a source, generating a notification and/or report related the collected user information, and sending the notification and/or report to the user. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a system for enabling a user to limit the degree to which information is shared with websites and applications. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a system for blocking data flow between specific manufacturers unless a user opts in. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a system for enabling automatic clearance of data tracking. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a machine learning and/or artificial intelligence system for providing insights to users related to data-sharing management. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a privacy-controlled container on top of the base smartphone operating system to run services and applications. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having virtualized operating system applications wherein the applications are run on a Type 1 Hypervisor having a real-time operating system. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a forced operating system software update system for automatically forcing operating system software updates on the 5G mobile devices of platform subscribers. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a device registration system for registering a user device to a specific network segment. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a drone shield system for using a fleet of drones to form a dynamic barrier. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a precision navigation and timing system that uses a network of low orbit earth satellites as a timing source. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an augmented reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a virtual reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a customer relationship management system for managing communications with current and/or potential customers. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a remote surgery system having a system for providing haptic feedback related to a surgical procedure. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a remote driving system for controlling a remote vehicle and having a system for providing haptic feedback related to driving of the vehicle. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having a remote machine operation system for controlling a remote machine and having a system for providing haptic feedback related to machine operation. In embodiments, provided herein is a self-contained 5G mobile telecommunications and edge computing platform having a top-level domain name server system having a 5G core network that resolves and controls all signaling and domain name server system queries at the top level of the global directory and having application-specific integrated circuits purposed for 5G packet processing to support control plane and user plane functions and having an electronic beam steering system to send targeted signals to receivers in 5G mobile devices.

In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a top-level domain name server system having a 5G core network that resolves and controls all signaling and domain name server system queries at the top level of the global directory and having a system for providing field programmable gate array-based control plane input/output security. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a top-level domain name server system having a 5G core network that resolves and controls all signaling and domain name server system queries at the top level of the global directory and having a system for providing field gate programmable array-based user plane input/output security. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a top-level domain system having a session border controller to ensure all bilateral communication links are subject to behavior monitoring. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a firewalled microdata center having a fully-contained baseband unit system integrated with cloud-radio access network connectivity and having a fronthaul fiber or microwave interconnect. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an edge computing system. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a low earth orbit satellite system for backhaul operation integrated with a software-defined networking system. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a low earth orbit satellite system for backhaul operation integrated with a software defined networking system, wherein satellite communication links are unshared and are at the physical layer. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a low earth orbit satellite system for backhaul operation integrated with a software defined networking system, wherein satellite communication links are unshared and are at the data layer. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an application programming interface. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a restful application programming interface. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having virtual trust levels at the process level. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a process isolation system. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having partitioned kernels. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an identity management system for identifying, authenticating, and authorizing platform subscribers. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an authentication system having a risk-based authentication system that uses machine learning and/or artificial intelligence to determine the risk of user activity. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an authentication system having a system for providing multi-factor context aware authentication using machine learning and/or artificial intelligence and biometric identification. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a private blockchain for storing data. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a distributed ledger system for storing data. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a compile-time checkpoint module on each call model. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a data recording and reporting system for recording data related to detected anomalies and/or generating reports related to detected anomalies. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling clean slate reset, wherein a clean slate reset may be performed by pre-established rules or by operator command. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a smart network slicing system for segmenting the network to align with unique application requirements. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a quantum encryption system for enabling quantum encryption and decryption. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a certificate authority for issuing digital certificates. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for providing cyber security in space. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having secure session initiation protocol security mechanisms. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a management and orchestration system for coordinating network resources for applications and the lifecycle management of virtual network functions. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a dashboard and/or application programming interface for orchestration and management of a 5G network. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for identifying user information collected by a source, generating a notification and/or report related the collected user information, and sending the notification and/or report to the user. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling a user to limit the degree to which information is shared with websites and applications. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for blocking data flow between specific manufacturers unless a user opts in. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling automatic clearance of data tracking. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a machine learning and/or artificial intelligence system for providing insights to users related to data-sharing management. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a privacy-controlled container on top of the base smartphone operating system to run services and applications. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having virtualized operating system applications wherein the applications are run on a Type 1 Hypervisor having a real-time operating system. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a forced operating system software update system for automatically forcing operating system software updates on the 5G mobile devices of platform subscribers. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a device registration system for registering a user device to a specific network segment. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a drone shield system for using a fleet of drones to form a dynamic barrier. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a precision navigation and timing system that uses a network of low orbit earth satellites as a timing source. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an augmented reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a virtual reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a customer relationship management system for managing communications with current and/or potential customers. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a remote surgery system having a system for providing haptic feedback related to a surgical procedure. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a remote driving system for controlling a remote vehicle and having a system for providing haptic feedback related to driving of the vehicle. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a remote machine operation system for controlling a remote machine and having a system for providing haptic feedback related to machine operation. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having an electronic beam steering system to send targeted signals to receivers in 5G mobile devices.

In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a top-level domain name server system having a 5G core network that resolves and controls all signaling and domain name server system queries at the top level of the global directory and having a system for providing field programmable gate array-based control plane input/output security. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a top-level domain name server system having a 5G core network that resolves and controls all signaling and domain name server system queries at the top level of the global directory and having a system for providing field gate programmable array-based user plane input/output security. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a top-level domain system having a session border controller to ensure all bilateral communication links are subject to behavior monitoring. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a firewalled microdata center having a fully-contained baseband unit system integrated with cloud-radio access network connectivity and having a fronthaul fiber or microwave interconnect. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an edge computing system. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a low earth orbit satellite system for backhaul operation integrated with a software-defined networking system. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a low earth orbit satellite system for backhaul operation integrated with a software defined networking system, wherein satellite communication links are unshared and are at the physical layer. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a low earth orbit satellite system for backhaul operation integrated with a software defined networking system, wherein satellite communication links are unshared and are at the data layer. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an application programming interface. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a restful application programming interface. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having virtual trust levels at the process level. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a process isolation system. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having partitioned kernels. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an identity management system for identifying, authenticating, and authorizing platform subscribers. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an authentication system having a risk-based authentication system that uses machine learning and/or artificial intelligence to determine the risk of user activity. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an authentication system having a system for providing multi-factor context aware authentication using machine learning and/or artificial intelligence and biometric identification. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a private blockchain for storing data. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a distributed ledger system for storing data. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a compile-time checkpoint module on each call model. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a data recording and reporting system for recording data related to detected anomalies and/or generating reports related to detected anomalies. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a system for enabling clean slate reset, wherein a clean slate reset may be performed by pre-established rules or by operator command. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a smart network slicing system for segmenting the network to align with unique application requirements. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a quantum encryption system for enabling quantum encryption and decryption. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a certificate authority for issuing digital certificates. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a system for providing cyber security in space. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having secure session initiation protocol security mechanisms. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a management and orchestration system for coordinating network resources for applications and the lifecycle management of virtual network functions. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a dashboard and/or application programming interface for orchestration and management of a 5G network. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a system for identifying user information collected by a source, generating a notification and/or report related the collected user information, and sending the notification and/or report to the user. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a system for enabling a user to limit the degree to which information is shared with websites and applications. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a system for blocking data flow between specific manufacturers unless a user opts in. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a system for enabling automatic clearance of data tracking. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a machine learning and/or artificial intelligence system for providing insights to users related to data-sharing management. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a privacy-controlled container on top of the base smartphone operating system to run services and applications. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having virtualized operating system applications wherein the applications are run on a Type 1 Hypervisor having a real-time operating system. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a forced operating system software update system for automatically forcing operating system software updates on the 5G mobile devices of platform subscribers. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a device registration system for registering a user device to a specific network segment. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a drone shield system for using a fleet of drones to form a dynamic barrier. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a precision navigation and timing system that uses a network of low orbit earth satellites as a timing source. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an augmented reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a virtual reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a customer relationship management system for managing communications with current and/or potential customers. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a remote surgery system having a system for providing haptic feedback related to a surgical procedure. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a remote driving system for controlling a remote vehicle and having a system for providing haptic feedback related to driving of the vehicle. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having a remote machine operation system for controlling a remote machine and having a system for providing haptic feedback related to machine operation. In embodiments, provided herein is a self-contained 5G mobile telecommunications and edge computing platform having a top-level domain name server system having a 5G core network that resolves and controls all signaling and domain name server system queries at the top level of the global directory and having field programmable gate array-based hardware and software for session initiation protocol messaging for the signaling gateways and having a system for enabling IP multimedia subsystem messaging and having an electronic beam steering system to send targeted signals to receivers in 5G mobile devices.

In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a top-level domain name server system having a 5G core network that resolves and controls all signaling and domain name server system queries at the top level of the global directory and having a system for providing field gate programmable array-based user plane input/output security. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a top-level domain system having a session border controller to ensure all bilateral communication links are subject to behavior monitoring. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a firewalled micro-data center having a fully-contained baseband unit system integrated with cloud-radio access network connectivity and having a fronthaul fiber or microwave interconnect. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an edge computing system. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a low earth orbit satellite system for backhaul operation integrated with a software-defined networking system. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a low earth orbit satellite system for backhaul operation integrated with a software defined networking system, wherein satellite communication links are unshared and are at the physical layer. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a low earth orbit satellite system for backhaul operation integrated with a software defined networking system, wherein satellite communication links are unshared and are at the data layer. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an application programming interface. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a restful application programming interface. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having virtual trust levels at the process level. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a process isolation system. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having partitioned kernels. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an identity management system for identifying, authenticating, and authorizing platform subscribers. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an authentication system having a risk-based authentication system that uses machine learning and/or artificial intelligence to determine the risk of user activity. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an authentication system having a system for providing multi-factor context aware authentication using machine learning and/or artificial intelligence and biometric identification. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a private blockchain for storing data. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a distributed ledger system for storing data. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a compile-time checkpoint module on each call model. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a data recording and reporting system for recording data related to detected anomalies and/or generating reports related to detected anomalies. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a system for enabling clean slate reset, wherein a clean slate reset may be performed by pre-established rules or by operator command. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a smart network slicing system for segmenting the network to align with unique application requirements. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a quantum encryption system for enabling quantum encryption and decryption. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a certificate authority for issuing digital certificates. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a system for providing cyber security in space. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having secure session initiation protocol security mechanisms. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a management and orchestration system for coordinating network resources for applications and the lifecycle management of virtual network functions. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a dashboard and/or application programming interface for orchestration and management of a 5G network. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a system for identifying user information collected by a source, generating a notification and/or report related the collected user information, and sending the notification and/or report to the user. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a system for enabling a user to limit the degree to which information is shared with websites and applications. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a system for blocking data flow between specific manufacturers unless a user opts in. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a system for enabling automatic clearance of data tracking. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a machine learning and/or artificial intelligence system for providing insights to users related to data-sharing management. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a privacy-controlled container on top of the base smartphone operating system to run services and applications. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having virtualized operating system applications wherein the applications are run on a Type 1 Hypervisor having a real-time operating system. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a forced operating system software update system for automatically forcing operating system software updates on the 5G mobile devices of platform subscribers. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a device registration system for registering a user device to a specific network segment. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a drone shield system for using a fleet of drones to form a dynamic barrier. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a precision navigation and timing system that uses a network of low orbit earth satellites as a timing source. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an augmented reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a virtual reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a customer relationship management system for managing communications with current and/or potential customers. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a remote surgery system having a system for providing haptic feedback related to a surgical procedure. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a remote driving system for controlling a remote vehicle and having a system for providing haptic feedback related to driving of the vehicle. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having a remote machine operation system for controlling a remote machine and having a system for providing haptic feedback related to machine operation. In embodiments, provided herein is a self-contained 5G mobile telecommunications and edge computing platform having a top-level domain name server system having a 5G core network that resolves and controls all signaling and domain name server system queries at the top level of the global directory and having a system for providing field programmable gate array-based control plane input/output security and having an electronic beam steering system to send targeted signals to receivers in 5G mobile devices.

In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a top-level domain system having a session border controller to ensure all bilateral communication links are subject to behavior monitoring. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a firewalled microdata center having a fully-contained baseband unit system integrated with cloud-radio access network connectivity and having a fronthaul fiber or microwave interconnect. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an edge computing system. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a low earth orbit satellite system for backhaul operation integrated with a software-defined networking system. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a low earth orbit satellite system for backhaul operation integrated with a software defined networking system, wherein satellite communication links are unshared and are at the physical layer. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a low earth orbit satellite system for backhaul operation integrated with a software defined networking system, wherein satellite communication links are unshared and are at the data layer. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an application programming interface. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a restful application programming interface. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having virtual trust levels at the process level. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a process isolation system. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having partitioned kernels. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an identity management system for identifying, authenticating, and authorizing platform subscribers. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an authentication system having a risk-based authentication system that uses machine learning and/or artificial intelligence to determine the risk of user activity. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an authentication system having a system for providing multi-factor context aware authentication using machine learning and/or artificial intelligence and biometric identification. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a private blockchain for storing data. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a distributed ledger system for storing data. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a compile-time checkpoint module on each call model. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a data recording and reporting system for recording data related to detected anomalies and/or generating reports related to detected anomalies. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a system for enabling clean slate reset, wherein a clean slate reset may be performed by pre-established rules or by operator command. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a smart network slicing system for segmenting the network to align with unique application requirements. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a quantum encryption system for enabling quantum encryption and decryption. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a certificate authority for issuing digital certificates. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a system for providing cyber security in space. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having secure session initiation protocol security mechanisms. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a management and orchestration system for coordinating network resources for applications and the lifecycle management of virtual network functions. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a dashboard and/or application programming interface for orchestration and management of a 5G network. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a system for identifying user information collected by a source, generating a notification and/or report related the collected user information, and sending the notification and/or report to the user. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a system for enabling a user to limit the degree to which information is shared with websites and applications. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a system for blocking data flow between specific manufacturers unless a user opts in. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a system for enabling automatic clearance of data tracking. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a machine learning and/or artificial intelligence system for providing insights to users related to data-sharing management. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a privacy-controlled container on top of the base smartphone operating system to run services and applications. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having virtualized operating system applications wherein the applications are run on a Type 1 Hypervisor having a real-time operating system. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a forced operating system software update system for automatically forcing operating system software updates on the 5G mobile devices of platform subscribers. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a device registration system for registering a user device to a specific network segment. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a drone shield system for using a fleet of drones to form a dynamic barrier. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a precision navigation and timing system that uses a network of low orbit earth satellites as a timing source. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an augmented reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a virtual reality system that uses a machine learning and/or artificial intelligence system for providing a simulated environment. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a customer relationship management system for managing communications with current and/or potential customers. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a remote surgery system having a system for providing haptic feedback related to a surgical procedure. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a remote driving system for controlling a remote vehicle and having a system for providing haptic feedback related to driving of the vehicle. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having a remote machine operation system for controlling a remote machine and having a system for providing haptic feedback related to machine operation. In embodiments, provided herein is a self-contained 5G mobile telecommunications and edge computing platform having a top-level domain name server system having a 5G core network that resolves and controls all signaling and domain name server system queries at the top level of the global directory and having a system for providing field gate programmable array-based user plane input/output security and having an electronic beam steering system to send targeted signals to receivers in 5G mobile devices.

In embodiments, provided herein is a self-contained 5G mobile telecommunications and edge computing platform having a top-level domain system having a session border controller to ensure all bilateral communication links are subject to behavior monitoring. In embodiments, provided herein is a self-contained 5G mobile telecommunications and edge computing platform having a top-level domain system having a session border controller to ensure all bilateral communication links are subject to behavior monitoring and having a firewalled microdata center having a fully-contained baseband unit system integrated with cloud-radio access network connectivity and having a fronthaul fiber or microwave interconnect. In embodiments, provided herein is a self-contained 5G mobile telecommunications and edge computing platform having a top-level domain system having a session border controller to ensure all bilateral communication links are subject to behavior monitoring and having an edge computing system. In embodiments, provided herein is a self-contained 5G mobile telecommunications and edge computing platform having a top-level domain system having a session border controller to ensure all bilateral communication links are subject to behavior monitoring and having a low earth orbit satellite system for backhaul operation integrated with a software-defined networking system. In embodiments, provided herein is a self-contained 5G mobile telecommunications and edge computing platform having a top-level domain system having a session border controller to ensure all bilateral communication links are subject to behavior monitoring and having a low earth orbit satellite system for backhaul operation integrated with a software defined networking system, wherein satellite communication links are unshared and are at the physical layer. In embodiments, provided herein is a self-contained 5G mobile telecommunications and edge computing platform having a top-level domain system having a session border controller to ensure all bilateral communication links are subject to behavior monitoring and having a low earth orbit satellite system for backhaul operation integrated with a software defined networking system, wherein satellite communication links are unshared and are at the data layer. In embodiments, provided herein is a self-contained 5G mobile telecommunications and edge computing platform having a top-level domain system having a session border controller to ensure all bilateral communication links are subject to behavior monitoring and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a top-level domain system having a session border controller to ensure all bilateral communication links are subject to behavior monitoring and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a top-level domain system having a session border controller to ensure all bilateral communication links are subject to behavior monitoring and having an application programming interface. In embodiments, provided herein is a self-contained 5G mobile telecommunications and edge computing platform having a top-level domain system having a session border controller to ensure all bilateral communication links are subject to behavior monitoring and having a restful application programming interface. In embodiments, provided herein is a self-contained 5G mobile telecommunications and edge computing platform having a top-level domain system having a session border controller to ensure all bilateral communication links are subject to behavior monitoring and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a top-level domain system having a session border controller to ensure all bilateral communication links are subject to behavior monitoring and having virtual trust levels at the process level. In embodiments, provided herein is a self-contained 5G mobile telecommunications and edge computing platform having a top-level domain system having a session border controller to ensure all bilateral communication links are subject to behavior monitoring and having a process isolation system. In embodiments, provided herein is a self-contained 5G mobile telecommunications and edge computing platform having a top-level domain system having a session border controller to ensure all bilateral communication links are subject to behavior monitoring and having partitioned kernels. In embodiments, provided herein is a self-contained 5G mobile telecommunications and edge computing platform having a top-level domain system having a session border controller to ensure all bilateral communication links are subject to behavior monitoring and having an identity management system for identifying, authenticating, and authorizing platform subscribers. In embodiments, provided herein is a self-contained 5G mobile telecommunications and edge computing platform having a top-level domain system having a session border controller to ensure all bilateral communication links are subject to behavior monitoring and having an authentication system having a risk-based authentication system that uses machine learning and/or artificial intelligence to determine the risk of user activity. In embodiments, provided herein is a self-contained 5G mobile telecommunications and edge computing platform having a top-level domain system having a session border controller to ensure all bilateral communication links are subject to behavior monitoring and having an authentication system having a system for providing multi-factor context aware authentication using machine learning and/or artificial intelligence and biometric identification. In embodiments, provided herein is a self-contained 5G mobile telecommunications and edge computing platform having a top-level domain system having a session border controller to ensure all bilateral communication links are subject to behavior monitoring and having a private blockchain for storing data. In embodiments, provided herein is a self-contained 5G mobile telecommunications and edge computing platform having a top-level domain system having a session border controller to ensure all bilateral communication links are subject to behavior monitoring and having a distributed ledger system for storing data. In embodiments, provided herein is a self-contained 5G mobile telecommunications and edge computing platform having a top-level domain system having a session border controller to ensure all bilateral communication links are subject to behavior monitoring and having a compile-time checkpoint module on each call model. In embodiments, provided herein is a self-contained 5G mobile telecommunications and edge computing platform having a top-level domain system having a session border controller to ensure all bilateral communication links are subject to behavior monitoring and having a data recording and reporting system for recording data related to detected anomalies and/or generating reports related to detected anomalies. In embodiments, provided herein is a self-contained 5G mobile telecommunications and edge computing platform having a top-level domain system having a session border controller to ensure all bilateral communication links are subject to behavior monitoring and having a system for enabling clean slate reset, wherein a clean slate reset may be performed by pre-established rules or by operator command. In embodiments, provided herein is a self-contained 5G mobile telecommunications and edge computing platform having a top-level domain system having a session border controller to ensure all bilateral communication links are subject to behavior monitoring and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a top-level domain system having a session border controller to ensure all bilateral communication links are subject to behavior monitoring and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a top-level domain system having a session border controller to ensure all bilateral communication links are subject to behavior monitoring and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a top-level domain system having a session border controller to ensure all bilateral communication links are subject to behavior monitoring and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a top-level domain system having a session border controller to ensure all bilateral communication links are subject to behavior monitoring and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a top-level domain system having a session border controller to ensure all bilateral communication links are subject to behavior monitoring and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a top-level domain system having a session border controller to ensure all bilateral communication links are subject to behavior monitoring and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a top-level domain system having a session border controller to ensure all bilateral communication links are subject to behavior monitoring and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a top-level domain system having a session border controller to ensure all bilateral communication links are subject to behavior monitoring and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a top-level domain system having a session border controller to ensure all bilateral communication links are subject to behavior monitoring and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a top-level domain system having a session border controller to ensure all bilateral communication links are subject to behavior monitoring and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a top-level domain system having a session border controller to ensure all bilateral communication links are subject to behavior monitoring and having a smart network slicing system for segmenting the network to align with unique application requirements. In embodiments, provided herein is a self-contained 5G mobile telecommunications and edge computing platform having a top-level domain system having a session border controller to ensure all bilateral communication links are subject to behavior monitoring and having a quantum encryption system for enabling quantum encryption and decryption. In embodiments, provided herein is a self-contained 5G mobile telecommunications and edge computing platform having a top-level domain system having a session border controller to ensure all bilateral communication links are subject to behavior monitoring and having a certificate authority for issuing digital certificates. In embodiments, provided herein is a self-contained 5G mobile telecommunications and edge computing platform having a top-level domain system having a session border controller to ensure all bilateral communication links are subject to behavior monitoring and having a system for providing cyber security in space. In embodiments, provided herein is a self-contained 5G mobile telecommunications and edge computing platform having a top-level domain system having a session border controller to ensure all bilateral communication links are subject to behavior monitoring and having secure session initiation protocol security mechanisms. In embodiments, provided herein is a self-contained 5G mobile telecommunications and edge computing platform having a top-level domain system having a session border controller to ensure all bilateral communication links are subject to behavior monitoring and having a management and orchestration system for coordinating network resources for applications and the lifecycle management of virtual network functions. In embodiments, provided herein is a self-contained 5G mobile telecommunications and edge computing platform having a top-level domain system having a session border controller to ensure all bilateral communication links are subject to behavior monitoring and having a dashboard and/or application programming interface for orchestration and management of a 5G network. In embodiments, provided herein is a self-contained 5G mobile telecommunications and edge computing platform having a top-level domain system having a session border controller to ensure all bilateral communication links are subject to behavior monitoring and having a system for identifying user information collected by a source, generating a notification and/or report related the collected user information, and sending the notification and/or report to the user. In embodiments, provided herein is a self-contained 5G mobile telecommunications and edge computing platform having a top-level domain system having a session border controller to ensure all bilateral communication links are subject to behavior monitoring and having a system for enabling a user to limit the degree to which information is shared with websites and applications. In embodiments, provided herein is a self-contained 5G mobile telecommunications and edge computing platform having a top-level domain system having a session border controller to ensure all bilateral communication links are subject to behavior monitoring and having a system for blocking data flow between specific manufacturers unless a user opts in. In embodiments, provided herein is a self-contained 5G mobile telecommunications and edge computing platform having a top-level domain system having a session border controller to ensure all bilateral communication links are subject to behavior monitoring and having a system for enabling automatic clearance of data tracking. In embodiments, provided herein is a self-contained 5G mobile telecommunications and edge computing platform having a top-level domain system having a session border controller to ensure all bilateral communication links are subject to behavior monitoring and having a machine learning and/or artificial intelligence system for providing insights to users related to data-sharing management. In embodiments, provided herein is a self-contained 5G mobile telecommunications and edge computing platform having a top-level domain system having a session border controller to ensure all bilateral communication links are subject to behavior monitoring and having a privacy-controlled container on top of the base smartphone operating system to run services and applications. In embodiments, provided herein is a self-contained 5G mobile telecommunications and edge computing platform having a top-level domain system having a session border controller to ensure all bilateral communication links are subject to behavior monitoring and having virtualized operating system applications wherein the applications are run on a Type 1 Hypervisor having a real-time operating system. In embodiments, provided herein is a self-contained 5G mobile telecommunications and edge computing platform having a top-level domain system having a session border controller to ensure all bilateral communication links are subject to behavior monitoring and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a top-level domain system having a session border controller to ensure all bilateral communication links are subject to behavior monitoring and having a forced operating system software update system for automatically forcing operating system software updates on the 5G mobile devices of platform subscribers. In embodiments, provided herein is a self-contained 5G mobile telecommunications and edge computing platform having a top-level domain system having a session border controller to ensure all bilateral communication links are subject to behavior monitoring and having a device registration system for registering a user device to a specific network segment. In embodiments, provided herein is a self-contained 5G mobile telecommunications and edge computing platform having a top-level domain system having a session border controller to ensure all bilateral communication links are subject to behavior monitoring and having a multi-static radar having beam forming MIMO antennas. In embodiments, provided herein is a self-contained 5G mobile telecommunications and edge computing platform having a top-level domain system having a session border controller to ensure all bilateral communication links are subject to behavior monitoring and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a top-level domain system having a session border controller to ensure all bilateral communication links are subject to behavior monitoring and having a drone shield system for using a fleet of drones to form a dynamic barrier. In embodiments, provided herein is a self-contained 5G mobile telecommunications and edge computing platform having a top-level domain system having a session border controller to ensure all bilateral communication links are subject to behavior monitoring and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a top-level domain system having a session border controller to ensure all bilateral communication links are subject to behavior monitoring and having a precision navigation and timing system that uses a network of low orbit earth satellites as a timing source. In embodiments, provided herein is a self-contained 5G mobile telecommunications and edge computing platform having a top-level domain system having a session border controller to ensure all bilateral communication links are subject to behavior monitoring and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a top-level domain system having a session border controller to ensure all bilateral communication links are subject to behavior monitoring and having an augmented reality system that uses a machine learning and/or artificial intelligence system for providing a simulated environment. In embodiments, provided herein is a self-contained 5G mobile telecommunications and edge computing platform having a top-level domain system having a session border controller to ensure all bilateral communication links are subject to behavior monitoring and having a virtual reality system that uses a machine learning and/or artificial intelligence system for providing a simulated environment. In embodiments, provided herein is a self-contained 5G mobile telecommunications and edge computing platform having a top-level domain system having a session border controller to ensure all bilateral communication links are subject to behavior monitoring and having a customer relationship management system for managing communications with current and/or potential customers. In embodiments, provided herein is a self-contained 5G mobile telecommunications and edge computing platform having a top-level domain system having a session border controller to ensure all bilateral communication links are subject to behavior monitoring and having a remote surgery system having a system for providing haptic feedback related to a surgical procedure. In embodiments, provided herein is a self-contained 5G mobile telecommunications and edge computing platform having a top-level domain system having a session border controller to ensure all bilateral communication links are subject to behavior monitoring and having a remote driving system for controlling a remote vehicle and having a system for providing haptic feedback related to driving of the vehicle. In embodiments, provided herein is a self-contained 5G mobile telecommunications and edge computing platform having a top-level domain system having a session border controller to ensure all bilateral communication links are subject to behavior monitoring and having a remote machine operation system for controlling a remote machine and having a system for providing haptic feedback related to machine operation. In embodiments, provided herein is a self-contained 5G mobile telecommunications and edge computing platform having a top-level domain system having a session border controller to ensure all bilateral communication links are subject to behavior monitoring and having an electronic beam steering system to send targeted signals to receivers in 5G mobile devices.

In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an edge computing system. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a low earth orbit satellite system for backhaul operation integrated with a software-defined networking system. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a low earth orbit satellite system for backhaul operation integrated with a software defined networking system, wherein satellite communication links are unshared and are at the physical layer. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a low earth orbit satellite system for backhaul operation integrated with a software defined networking system, wherein satellite communication links are unshared and are at the data layer. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an application programming interface. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a restful application programming interface. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having virtual trust levels at the process level. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a process isolation system. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having partitioned kernels. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an identity management system for identifying, authenticating, and authorizing platform subscribers. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an authentication system having a risk-based authentication system that uses machine learning and/or artificial intelligence to determine the risk of user activity. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an authentication system having a system for providing multi-factor context aware authentication using machine learning and/or artificial intelligence and biometric identification. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a private blockchain for storing data. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a distributed ledger system for storing data. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a compile-time checkpoint module on each call model. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a data recording and reporting system for recording data related to detected anomalies and/or generating reports related to detected anomalies. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a system for enabling clean slate reset, wherein a clean slate reset may be performed by pre-established rules or by operator command. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a smart network slicing system for segmenting the network to align with unique application requirements. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a quantum encryption system for enabling quantum encryption and decryption. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a certificate authority for issuing digital certificates. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a system for providing cyber security in space. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having secure session initiation protocol security mechanisms. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a management and orchestration system for coordinating network resources for applications and the lifecycle management of virtual network functions. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a dashboard and/or application programming interface for orchestration and management of a 5G network. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a system for identifying user information collected by a source, generating a notification and/or report related the collected user information, and sending the notification and/or report to the user. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a system for enabling a user to limit the degree to which information is shared with websites and applications. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a system for blocking data flow between specific manufacturers unless a user opts in. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a system for enabling automatic clearance of data tracking. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a machine learning and/or artificial intelligence system for providing insights to users related to data-sharing management. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a privacy-controlled container on top of the base smartphone operating system to run services and applications. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having virtualized operating system applications wherein the applications are run on a Type 1 Hypervisor having a real-time operating system. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a forced operating system software update system for automatically forcing operating system software updates on the 5G mobile devices of platform subscribers. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a device registration system for registering a user device to a specific network segment. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a multi-static radar having beam forming MIMO antennas. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a drone shield system for using a fleet of drones to form a dynamic barrier. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a precision navigation and timing system that uses a network of low orbit earth satellites as a timing source. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an augmented reality system that uses a machine learning and/or artificial intelligence system for providing a simulated environment. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a virtual reality system that uses a machine learning and/or artificial intelligence system for providing a simulated environment. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a customer relationship management system for managing communications with current and/or potential customers. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a remote surgery system having a system for providing haptic feedback related to a surgical procedure. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a remote driving system for controlling a remote vehicle and having a system for providing haptic feedback related to driving of the vehicle. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having a remote machine operation system for controlling a remote machine and having a system for providing haptic feedback related to machine operation. In embodiments, provided herein is a self-contained 5G mobile telecommunications and edge computing platform having a firewalled microdata center having a fully-contained baseband unit system integrated with cloud-radio access network connectivity and having a fronthaul fiber or microwave interconnect and having an electronic beam steering system to send targeted signals to receivers in 5G mobile devices.

In embodiments, provided herein is a self-contained 5G mobile telecommunications and edge computing platform having an edge computing system. In embodiments, provided herein is a self-contained 5G mobile telecommunications and edge computing platform having an edge computing system and having a low earth orbit satellite system for backhaul operation integrated with a software-defined networking system. In embodiments, provided herein is a self-contained 5G mobile telecommunications and edge computing platform having an edge computing system and having a low earth orbit satellite system for backhaul operation integrated with a software defined networking system, wherein satellite communication links are unshared and are at the physical layer. In embodiments, provided herein is a self-contained 5G mobile telecommunications and edge computing platform having an edge computing system and having a low earth orbit satellite system for backhaul operation integrated with a software defined networking system, wherein satellite communication links are unshared and are at the data layer. In embodiments, provided herein is a self-contained 5G mobile telecommunications and edge computing platform having an edge computing system and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having an edge computing system and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having an edge computing system and having an application programming interface. In embodiments, provided herein is a self-contained 5G mobile telecommunications and edge computing platform having an edge computing system and having a restful application programming interface. In embodiments, provided herein is a self-contained 5G mobile telecommunications and edge computing platform having an edge computing system and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having an edge computing system and having virtual trust levels at the process level. In embodiments, provided herein is a self-contained 5G mobile telecommunications and edge computing platform having an edge computing system and having a process isolation system. In embodiments, provided herein is a self-contained 5G mobile telecommunications and edge computing platform having an edge computing system and having partitioned kernels. In embodiments, provided herein is a self-contained 5G mobile telecommunications and edge computing platform having an edge computing system and having an identity management system for identifying, authenticating, and authorizing platform subscribers. In embodiments, provided herein is a self-contained 5G mobile telecommunications and edge computing platform having an edge computing system and having an authentication system having a risk-based authentication system that uses machine learning and/or artificial intelligence to determine the risk of user activity. In embodiments, provided herein is a self-contained 5G mobile telecommunications and edge computing platform having an edge computing system and having an authentication system having a system for providing multi-factor context aware authentication using machine learning and/or artificial intelligence and biometric identification. In embodiments, provided herein is a self-contained 5G mobile telecommunications and edge computing platform having an edge computing system and having a private blockchain for storing data. In embodiments, provided herein is a self-contained 5G mobile telecommunications and edge computing platform having an edge computing system and having a distributed ledger system for storing data. In embodiments, provided herein is a self-contained 5G mobile telecommunications and edge computing platform having an edge computing system and having a compile-time checkpoint module on each call model. In embodiments, provided herein is a self-contained 5G mobile telecommunications and edge computing platform having an edge computing system and having a data recording and reporting system for recording data related to detected anomalies and/or generating reports related to detected anomalies. In embodiments, provided herein is a self-contained 5G mobile telecommunications and edge computing platform having an edge computing system and having a system for enabling clean slate reset, wherein a clean slate reset may be performed by pre-established rules or by operator command. In embodiments, provided herein is a self-contained 5G mobile telecommunications and edge computing platform having an edge computing system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having an edge computing system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having an edge computing system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having an edge computing system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having an edge computing system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having an edge computing system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having an edge computing system and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having an edge computing system and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having an edge computing system and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having an edge computing system and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having an edge computing system and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having an edge computing system and having a smart network slicing system for segmenting the network to align with unique application requirements. In embodiments, provided herein is a self-contained 5G mobile telecommunications and edge computing platform having an edge computing system and having a quantum encryption system for enabling quantum encryption and decryption. In embodiments, provided herein is a self-contained 5G mobile telecommunications and edge computing platform having an edge computing system and having a certificate authority for issuing digital certificates. In embodiments, provided herein is a self-contained 5G mobile telecommunications and edge computing platform having an edge computing system and having a system for providing cyber security in space. In embodiments, provided herein is a self-contained 5G mobile telecommunications and edge computing platform having an edge computing system and having secure session initiation protocol security mechanisms. In embodiments, provided herein is a self-contained 5G mobile telecommunications and edge computing platform having an edge computing system and having a management and orchestration system for coordinating network resources for applications and the lifecycle management of virtual network functions. In embodiments, provided herein is a self-contained 5G mobile telecommunications and edge computing platform having an edge computing system and having a dashboard and/or application programming interface for orchestration and management of a 5G network. In embodiments, provided herein is a self-contained 5G mobile telecommunications and edge computing platform having an edge computing system and having a system for identifying user information collected by a source, generating a notification and/or report related the collected user information, and sending the notification and/or report to the user. In embodiments, provided herein is a self-contained 5G mobile telecommunications and edge computing platform having an edge computing system and having a system for enabling a user to limit the degree to which information is shared with websites and applications. In embodiments, provided herein is a self-contained 5G mobile telecommunications and edge computing platform having an edge computing system and having a system for blocking data flow between specific manufacturers unless a user opts in. In embodiments, provided herein is a self-contained 5G mobile telecommunications and edge computing platform having an edge computing system and having a system for enabling automatic clearance of data tracking. In embodiments, provided herein is a self-contained 5G mobile telecommunications and edge computing platform having an edge computing system and having a machine learning and/or artificial intelligence system for providing insights to users related to data-sharing management. In embodiments, provided herein is a self-contained 5G mobile telecommunications and edge computing platform having an edge computing system and having a privacy-controlled container on top of the base smartphone operating system to run services and applications. In embodiments, provided herein is a self-contained 5G mobile telecommunications and edge computing platform having an edge computing system and having virtualized operating system applications wherein the applications are run on a Type 1 Hypervisor having a real-time operating system. In embodiments, provided herein is a self-contained 5G mobile telecommunications and edge computing platform having an edge computing system and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having an edge computing system and having a forced operating system software update system for automatically forcing operating system software updates on the 5G mobile devices of platform subscribers. In embodiments, provided herein is a self-contained 5G mobile telecommunications and edge computing platform having an edge computing system and having a device registration system for registering a user device to a specific network segment. In embodiments, provided herein is a self-contained 5G mobile telecommunications and edge computing platform having an edge computing system and having a multi-static radar having beam forming MIMO antennas. In embodiments, provided herein is a self-contained 5G mobile telecommunications and edge computing platform having an edge computing system and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having an edge computing system and having a drone shield system for using a fleet of drones to form a dynamic barrier. In embodiments, provided herein is a self-contained 5G mobile telecommunications and edge computing platform having an edge computing system and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having an edge computing system and having a precision navigation and timing system that uses a network of low orbit earth satellites as a timing source. In embodiments, provided herein is a self-contained 5G mobile telecommunications and edge computing platform having an edge computing system and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having an edge computing system and having an augmented reality system that uses a machine learning and/or artificial intelligence system for providing a simulated environment. In embodiments, provided herein is a self-contained 5G mobile telecommunications and edge computing platform having an edge computing system and having a virtual reality system that uses a machine learning and/or artificial intelligence system for providing a simulated environment. In embodiments, provided herein is a self-contained 5G mobile telecommunications and edge computing platform having an edge computing system and having a customer relationship management system for managing communications with current and/or potential customers. In embodiments, provided herein is a self-contained 5G mobile telecommunications and edge computing platform having an edge computing system and having a remote surgery system having a system for providing haptic feedback related to a surgical procedure. In embodiments, provided herein is a self-contained 5G mobile telecommunications and edge computing platform having an edge computing system and having a remote driving system for controlling a remote vehicle and having a system for providing haptic feedback related to driving of the vehicle. In embodiments, provided herein is a self-contained 5G mobile telecommunications and edge computing platform having an edge computing system and having a remote machine operation system for controlling a remote machine and having a system for providing haptic feedback related to machine operation. In embodiments, provided herein is a self-contained 5G mobile telecommunications and edge computing platform having an edge computing system and having an electronic beam steering system to send targeted signals to receivers in 5G mobile devices.

In embodiments, provided herein is a self-contained 5G mobile telecommunications and edge computing platform having a low earth orbit satellite system for backhaul operation integrated with a software-defined networking system. In embodiments, provided herein is a self-contained 5G mobile telecommunications and edge computing platform having a low earth orbit satellite system for backhaul operation integrated with a software-defined networking system and having a low earth orbit satellite system for backhaul operation integrated with a software defined networking system, wherein satellite communication links are unshared and are at the physical layer. In embodiments, provided herein is a self-contained 5G mobile telecommunications and edge computing platform having a low earth orbit satellite system for backhaul operation integrated with a software-defined networking system and having a low earth orbit satellite system for backhaul operation integrated with a software defined networking system, wherein satellite communication links are unshared and are at the data layer. In embodiments, provided herein is a self-contained 5G mobile telecommunications and edge computing platform having a low earth orbit satellite system for backhaul operation integrated with a software-defined networking system and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a low earth orbit satellite system for backhaul operation integrated with a software-defined networking system and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a low earth orbit satellite system for backhaul operation integrated with a software-defined networking system and having an application programming interface. In embodiments, provided herein is a self-contained 5G mobile telecommunications and edge computing platform having a low earth orbit satellite system for backhaul operation integrated with a software-defined networking system and having a restful application programming interface. In embodiments, provided herein is a self-contained 5G mobile telecommunications and edge computing platform having a low earth orbit satellite system for backhaul operation integrated with a software-defined networking system and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a low earth orbit satellite system for backhaul operation integrated with a software-defined networking system and having virtual trust levels at the process level. In embodiments, provided herein is a self-contained 5G mobile telecommunications and edge computing platform having a low earth orbit satellite system for backhaul operation integrated with a software-defined networking system and having a process isolation system. In embodiments, provided herein is a self-contained 5G mobile telecommunications and edge computing platform having a low earth orbit satellite system for backhaul operation integrated with a software-defined networking system and having partitioned kernels. In embodiments, provided herein is a self-contained 5G mobile telecommunications and edge computing platform having a low earth orbit satellite system for backhaul operation integrated with a software-defined networking system and having an identity management system for identifying, authenticating, and authorizing platform subscribers. In embodiments, provided herein is a self-contained 5G mobile telecommunications and edge computing platform having a low earth orbit satellite system for backhaul operation integrated with a software-defined networking system and having an authentication system having a risk-based authentication system that uses machine learning and/or artificial intelligence to determine the risk of user activity. In embodiments, provided herein is a self-contained 5G mobile telecommunications and edge computing platform having a low earth orbit satellite system for backhaul operation integrated with a software-defined networking system and having an authentication system having a system for providing multi-factor context aware authentication using machine learning and/or artificial intelligence and biometric identification. In embodiments, provided herein is a self-contained 5G mobile telecommunications and edge computing platform having a low earth orbit satellite system for backhaul operation integrated with a software-defined networking system and having a private blockchain for storing data. In embodiments, provided herein is a self-contained 5G mobile telecommunications and edge computing platform having a low earth orbit satellite system for backhaul operation integrated with a software-defined networking system and having a distributed ledger system for storing data. In embodiments, provided herein is a self-contained 5G mobile telecommunications and edge computing platform having a low earth orbit satellite system for backhaul operation integrated with a software-defined networking system and having a compile-time checkpoint module on each call model. In embodiments, provided herein is a self-contained 5G mobile telecommunications and edge computing platform having a low earth orbit satellite system for backhaul operation integrated with a software-defined networking system and having a data recording and reporting system for recording data related to detected anomalies and/or generating reports related to detected anomalies. In embodiments, provided herein is a self-contained 5G mobile telecommunications and edge computing platform having a low earth orbit satellite system for backhaul operation integrated with a software-defined networking system and having a system for enabling clean slate reset, wherein a clean slate reset may be performed by pre-established rules or by operator command. In embodiments, provided herein is a self-contained 5G mobile telecommunications and edge computing platform having a low earth orbit satellite system for backhaul operation integrated with a software-defined networking system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a low earth orbit satellite system for backhaul operation integrated with a software-defined networking system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a low earth orbit satellite system for backhaul operation integrated with a software-defined networking system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a low earth orbit satellite system for backhaul operation integrated with a software-defined networking system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a low earth orbit satellite system for backhaul operation integrated with a software-defined networking system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a low earth orbit satellite system for backhaul operation integrated with a software-defined networking system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a low earth orbit satellite system for backhaul operation integrated with a software-defined networking system and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a low earth orbit satellite system for backhaul operation integrated with a software-defined networking system and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a low earth orbit satellite system for backhaul operation integrated with a software-defined networking system and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a low earth orbit satellite system for backhaul operation integrated with a software-defined networking system and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a low earth orbit satellite system for backhaul operation integrated with a software-defined networking system and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a low earth orbit satellite system for backhaul operation integrated with a software-defined networking system and having a smart network slicing system for segmenting the network to align with unique application requirements. In embodiments, provided herein is a self-contained 5G mobile telecommunications and edge computing platform having a low earth orbit satellite system for backhaul operation integrated with a software-defined networking system and having a quantum encryption system for enabling quantum encryption and decryption. In embodiments, provided herein is a self-contained 5G mobile telecommunications and edge computing platform having a low earth orbit satellite system for backhaul operation integrated with a software-defined networking system and having a certificate authority for issuing digital certificates. In embodiments, provided herein is a self-contained 5G mobile telecommunications and edge computing platform having a low earth orbit satellite system for backhaul operation integrated with a software-defined networking system and having a system for providing cyber security in space. In embodiments, provided herein is a self-contained 5G mobile telecommunications and edge computing platform having a low earth orbit satellite system for backhaul operation integrated with a software-defined networking system and having secure session initiation protocol security mechanisms. In embodiments, provided herein is a self-contained 5G mobile telecommunications and edge computing platform having a low earth orbit satellite system for backhaul operation integrated with a software-defined networking system and having a management and orchestration system for coordinating network resources for applications and the lifecycle management of virtual network functions. In embodiments, provided herein is a self-contained 5G mobile telecommunications and edge computing platform having a low earth orbit satellite system for backhaul operation integrated with a software-defined networking system and having a dashboard and/or application programming interface for orchestration and management of a 5G network. In embodiments, provided herein is a self-contained 5G mobile telecommunications and edge computing platform having a low earth orbit satellite system for backhaul operation integrated with a software-defined networking system and having a system for identifying user information collected by a source, generating a notification and/or report related the collected user information, and sending the notification and/or report to the user. In embodiments, provided herein is a self-contained 5G mobile telecommunications and edge computing platform having a low earth orbit satellite system for backhaul operation integrated with a software-defined networking system and having a system for enabling a user to limit the degree to which information is shared with websites and applications. In embodiments, provided herein is a self-contained 5G mobile telecommunications and edge computing platform having a low earth orbit satellite system for backhaul operation integrated with a software-defined networking system and having a system for blocking data flow between specific manufacturers unless a user opts in. In embodiments, provided herein is a self-contained 5G mobile telecommunications and edge computing platform having a low earth orbit satellite system for backhaul operation integrated with a software-defined networking system and having a system for enabling automatic clearance of data tracking. In embodiments, provided herein is a self-contained 5G mobile telecommunications and edge computing platform having a low earth orbit satellite system for backhaul operation integrated with a software-defined networking system and having a machine learning and/or artificial intelligence system for providing insights to users related to data-sharing management. In embodiments, provided herein is a self-contained 5G mobile telecommunications and edge computing platform having a low earth orbit satellite system for backhaul operation integrated with a software-defined networking system and having a privacy-controlled container on top of the base smartphone operating system to run services and applications. In embodiments, provided herein is a self-contained 5G mobile telecommunications and edge computing platform having a low earth orbit satellite system for backhaul operation integrated with a software-defined networking system and having virtualized operating system applications wherein the applications are run on a Type 1 Hypervisor having a real-time operating system. In embodiments, provided herein is a self-contained 5G mobile telecommunications and edge computing platform having a low earth orbit satellite system for backhaul operation integrated with a software-defined networking system and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a low earth orbit satellite system for backhaul operation integrated with a software-defined networking system and having a forced operating system software update system for automatically forcing operating system software updates on the 5G mobile devices of platform subscribers. In embodiments, provided herein is a self-contained 5G mobile telecommunications and edge computing platform having a low earth orbit satellite system for backhaul operation integrated with a software-defined networking system and having a device registration system for registering a user device to a specific network segment. In embodiments, provided herein is a self-contained 5G mobile telecommunications and edge computing platform having a low earth orbit satellite system for backhaul operation integrated with a software-defined networking system and having a multi-static radar having beam forming MIMO antennas. In embodiments, provided herein is a self-contained 5G mobile telecommunications and edge computing platform having a low earth orbit satellite system for backhaul operation integrated with a software-defined networking system and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a low earth orbit satellite system for backhaul operation integrated with a software-defined networking system and having a drone shield system for using a fleet of drones to form a dynamic barrier. In embodiments, provided herein is a self-contained 5G mobile telecommunications and edge computing platform having a low earth orbit satellite system for backhaul operation integrated with a software-defined networking system and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a low earth orbit satellite system for backhaul operation integrated with a software-defined networking system and having a precision navigation and timing system that uses a network of low orbit earth satellites as a timing source. In embodiments, provided herein is a self-contained 5G mobile telecommunications and edge computing platform having a low earth orbit satellite system for backhaul operation integrated with a software-defined networking system and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a low earth orbit satellite system for backhaul operation integrated with a software-defined networking system and having an augmented reality system that uses a machine learning and/or artificial intelligence system for providing a simulated environment. In embodiments, provided herein is a self-contained 5G mobile telecommunications and edge computing platform having a low earth orbit satellite system for backhaul operation integrated with a software-defined networking system and having a virtual reality system that uses a machine learning and/or artificial intelligence system for providing a simulated environment. In embodiments, provided herein is a self-contained 5G mobile telecommunications and edge computing platform having a low earth orbit satellite system for backhaul operation integrated with a software-defined networking system and having a customer relationship management system for managing communications with current and/or potential customers. In embodiments, provided herein is a self-contained 5G mobile telecommunications and edge computing platform having a low earth orbit satellite system for backhaul operation integrated with a software-defined networking system and having a remote surgery system having a system for providing haptic feedback related to a surgical procedure. In embodiments, provided herein is a self-contained 5G mobile telecommunications and edge computing platform having a low earth orbit satellite system for backhaul operation integrated with a software-defined networking system and having a remote driving system for controlling a remote vehicle and having a system for providing haptic feedback related to driving of the vehicle. In embodiments, provided herein is a self-contained 5G mobile telecommunications and edge computing platform having a low earth orbit satellite system for backhaul operation integrated with a software-defined networking system and having a remote machine operation system for controlling a remote machine and having a system for providing haptic feedback related to machine operation. In embodiments, provided herein is a self-contained 5G mobile telecommunications and edge computing platform having a low earth orbit satellite system for backhaul operation integrated with a software-defined networking system and having an electronic beam steering system to send targeted signals to receivers in 5G mobile devices.

In embodiments, provided herein is a self-contained 5G mobile telecommunications and edge computing platform having a low earth orbit satellite system for backhaul operation integrated with a software defined networking system, wherein satellite communication links are unshared and are at the physical layer. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a low earth orbit satellite system for backhaul operation integrated with a software defined networking system, wherein satellite communication links are unshared and are at the data layer. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a low earth orbit satellite system for backhaul operation integrated with a software defined networking system, wherein satellite communication links are unshared and are at the physical layer and having an application programming interface. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a restful application programming interface. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a low earth orbit satellite system for backhaul operation integrated with a software defined networking system, wherein satellite communication links are unshared and are at the physical layer and having virtual trust levels at the process level. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a process isolation system. In embodiments, provided herein is a self-contained 5G mobile telecommunications and edge computing platform having a low earth orbit satellite system for backhaul operation integrated with a software defined networking system, wherein satellite communication links are unshared and are at the physical layer and having partitioned kernels. In embodiments, provided herein is a self-contained 5G mobile telecommunications and edge computing platform having a low earth orbit satellite system for backhaul operation integrated with a software defined networking system, wherein satellite communication links are unshared and are at the physical layer and having an identity management system for identifying, authenticating, and authorizing platform subscribers. In embodiments, provided herein is a self-contained 5G mobile telecommunications and edge computing platform having a low earth orbit satellite system for backhaul operation integrated with a software defined networking system, wherein satellite communication links are unshared and are at the physical layer and having an authentication system having a risk-based authentication system that uses machine learning and/or artificial intelligence to determine the risk of user activity. In embodiments, provided herein is a self-contained 5G mobile telecommunications and edge computing platform having a low earth orbit satellite system for backhaul operation integrated with a software defined networking system, wherein satellite communication links are unshared and are at the physical layer and having an authentication system having a system for providing multifactor context aware authentication using machine learning and/or artificial intelligence and biometric identification. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a private blockchain for storing data. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a distributed ledger system for storing data. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a compile-time checkpoint module on each call model. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a data recording and reporting system for recording data related to detected anomalies and/or generating reports related to detected anomalies. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a system for enabling clean slate reset, wherein a clean slate reset may be performed by pre-established rules or by operator command. In embodiments, provided herein is a self-contained 5G mobile telecommunications and edge computing platform having a low earth orbit satellite system for backhaul operation integrated with a software defined networking system, wherein satellite communication links are unshared and are at the physical layer and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a low earth orbit satellite system for backhaul operation integrated with a software defined networking system, wherein satellite communication links are unshared and are at the physical layer and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a low earth orbit satellite system for backhaul operation integrated with a software defined networking system, wherein satellite communication links are unshared and are at the physical layer and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a low earth orbit satellite system for backhaul operation integrated with a software defined networking system, wherein satellite communication links are unshared and are at the physical layer and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a low earth orbit satellite system for backhaul operation integrated with a software defined networking system, wherein satellite communication links are unshared and are at the physical layer and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a low earth orbit satellite system for backhaul operation integrated with a software defined networking system, wherein satellite communication links are unshared and are at the physical layer and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a low earth orbit satellite system for backhaul operation integrated with a software defined networking system, wherein satellite communication links are unshared and are at the physical layer and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a low earth orbit satellite system for backhaul operation integrated with a software defined networking system, wherein satellite communication links are unshared and are at the physical layer and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a low earth orbit satellite system for backhaul operation integrated with a software defined networking system, wherein satellite communication links are unshared and are at the physical layer and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a low earth orbit satellite system for backhaul operation integrated with a software defined networking system, wherein satellite communication links are unshared and are at the physical layer and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a smart network slicing system for segmenting the network to align with unique application requirements. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a quantum encryption system for enabling quantum encryption and decryption. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a certificate authority for issuing digital certificates. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a system for providing cyber security in space. In embodiments, provided herein is a self-contained 5G mobile telecommunications and edge computing platform having a low earth orbit satellite system for backhaul operation integrated with a software defined networking system, wherein satellite communication links are unshared and are at the physical layer and having secure session initiation protocol security mechanisms. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a management and orchestration system for coordinating network resources for applications and the lifecycle management of virtual network functions. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a dashboard and/or application programming interface for orchestration and management of a 5G network. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a system for identifying user information collected by a source, generating a notification and/or report related the collected user information, and sending the notification and/or report to the user. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a system for enabling a user to limit the degree to which information is shared with websites and applications. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a system for blocking data flow between specific manufacturers unless a user opts in. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a system for enabling automatic clearance of data tracking. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a machine learning and/or artificial intelligence system for providing insights to users related to data-sharing management. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a privacy-controlled container on top of the base smartphone operating system to run services and applications. In embodiments, provided herein is a self-contained 5G mobile telecommunications and edge computing platform having a low earth orbit satellite system for backhaul operation integrated with a software defined networking system, wherein satellite communication links are unshared and are at the physical layer and having virtualized operating system applications wherein the applications are run on a Type 1 Hypervisor having a real-time operating system. In embodiments, provided herein is a self-contained 5G mobile telecommunications and edge computing platform having a low earth orbit satellite system for backhaul operation integrated with a software defined networking system, wherein satellite communication links are unshared and are at the physical layer and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a forced operating system software update system for automatically forcing operating system software updates on the 5G mobile devices of platform subscribers. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a device registration system for registering a user device to a specific network segment. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a multi-static radar having beam forming MIMO antennas. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a drone shield system for using a fleet of drones to form a dynamic barrier. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a precision navigation and timing system that uses a network of low orbit earth satellites as a timing source. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a low earth orbit satellite system for backhaul operation integrated with a software defined networking system, wherein satellite communication links are unshared and are at the physical layer and having an augmented reality system that uses a machine learning and/or artificial intelligence system for providing a simulated environment. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a virtual reality system that uses a machine learning and/or artificial intelligence system for providing a simulated environment. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a customer relationship management system for managing communications with current and/or potential customers. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a remote surgery system having a system for providing haptic feedback related to a surgical procedure. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a remote driving system for controlling a remote vehicle and having a system for providing haptic feedback related to driving of the vehicle. In embodiments, provided herein is a self-contained 5G mobile telecommunications and edge computing platform having a low earth orbit satellite system for backhaul operation integrated with a software defined networking system, wherein satellite communication links are unshared and are at the physical layer and having a remote machine operation system for controlling a remote machine and having a system for providing haptic feedback related to machine operation. In embodiments, provided herein is a self-contained 5G mobile telecommunications and edge computing platform having a low earth orbit satellite system for backhaul operation integrated with a software defined networking system, wherein satellite communication links are unshared and are at the physical layer and having an electronic beam steering system to send targeted signals to receivers in 5G mobile devices.

In embodiments, provided herein is a self-contained 5G mobile telecommunications and edge computing platform having a low earth orbit satellite system for backhaul operation integrated with a software defined networking system, wherein satellite communication links are unshared and are at the data layer. In embodiments, provided herein is a self-contained 5G mobile telecommunications and edge computing platform having a low earth orbit satellite system for backhaul operation integrated with a software defined networking system, wherein satellite communication links are unshared and are at the data layer and having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a low earth orbit satellite system for backhaul operation integrated with a software defined networking system, wherein satellite communication links are unshared and are at the data layer and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a low earth orbit satellite system for backhaul operation integrated with a software defined networking system, wherein satellite communication links are unshared and are at the data layer and having an application programming interface. In embodiments, provided herein is a self-contained 5G mobile telecommunications and edge computing platform having a low earth orbit satellite system for backhaul operation integrated with a software defined networking system, wherein satellite communication links are unshared and are at the data layer and having a restful application programming interface. In embodiments, provided herein is a self-contained 5G mobile telecommunications and edge computing platform having a low earth orbit satellite system for backhaul operation integrated with a software defined networking system, wherein satellite communication links are unshared and are at the data layer and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a low earth orbit satellite system for backhaul operation integrated with a software defined networking system, wherein satellite communication links are unshared and are at the data layer and having virtual trust levels at the process level. In embodiments, provided herein is a self-contained 5G mobile telecommunications and edge computing platform having a low earth orbit satellite system for backhaul operation integrated with a software defined networking system, wherein satellite communication links are unshared and are at the data layer and having a process isolation system. In embodiments, provided herein is a self-contained 5G mobile telecommunications and edge computing platform having a low earth orbit satellite system for backhaul operation integrated with a software defined networking system, wherein satellite communication links are unshared and are at the data layer and having partitioned kernels. In embodiments, provided herein is a self-contained 5G mobile telecommunications and edge computing platform having a low earth orbit satellite system for backhaul operation integrated with a software defined networking system, wherein satellite communication links are unshared and are at the data layer and having an identity management system for identifying, authenticating, and authorizing platform subscribers. In embodiments, provided herein is a self-contained 5G mobile telecommunications and edge computing platform having a low earth orbit satellite system for backhaul operation integrated with a software defined networking system, wherein satellite communication links are unshared and are at the data layer and having an authentication system having a risk-based authentication system that uses machine learning and/or artificial intelligence to determine the risk of user activity. In embodiments, provided herein is a self-contained 5G mobile telecommunications and edge computing platform having a low earth orbit satellite system for backhaul operation integrated with a software defined networking system, wherein satellite communication links are unshared and are at the data layer and having an authentication system having a system for providing multi-factor context aware authentication using machine learning and/or artificial intelligence and biometric identification. In embodiments, provided herein is a self-contained 5G mobile telecommunications and edge computing platform having a low earth orbit satellite system for backhaul operation integrated with a software defined networking system, wherein satellite communication links are unshared and are at the data layer and having a private blockchain for storing data. In embodiments, provided herein is a self-contained 5G mobile telecommunications and edge computing platform having a low earth orbit satellite system for backhaul operation integrated with a software defined networking system, wherein satellite communication links are unshared and are at the data layer and having a distributed ledger system for storing data. In embodiments, provided herein is a self-contained 5G mobile telecommunications and edge computing platform having a low earth orbit satellite system for backhaul operation integrated with a software defined networking system, wherein satellite communication links are unshared and are at the data layer and having a compile-time checkpoint module on each call model. In embodiments, provided herein is a self-contained 5G mobile telecommunications and edge computing platform having a low earth orbit satellite system for backhaul operation integrated with a software defined networking system, wherein satellite communication links are unshared and are at the data layer and having a data recording and reporting system for recording data related to detected anomalies and/or generating reports related to detected anomalies. In embodiments, provided herein is a self-contained 5G mobile telecommunications and edge computing platform having a low earth orbit satellite system for backhaul operation integrated with a software defined networking system, wherein satellite communication links are unshared and are at the data layer and having a system for enabling clean slate reset, wherein a clean slate reset may be performed by pre-established rules or by operator command. In embodiments, provided herein is a self-contained 5G mobile telecommunications and edge computing platform having a low earth orbit satellite system for backhaul operation integrated with a software defined networking system, wherein satellite communication links are unshared and are at the data layer and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a low earth orbit satellite system for backhaul operation integrated with a software defined networking system, wherein satellite communication links are unshared and are at the data layer and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a low earth orbit satellite system for backhaul operation integrated with a software defined networking system, wherein satellite communication links are unshared and are at the data layer and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a low earth orbit satellite system for backhaul operation integrated with a software defined networking system, wherein satellite communication links are unshared and are at the data layer and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a low earth orbit satellite system for backhaul operation integrated with a software defined networking system, wherein satellite communication links are unshared and are at the data layer and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a low earth orbit satellite system for backhaul operation integrated with a software defined networking system, wherein satellite communication links are unshared and are at the data layer and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a low earth orbit satellite system for backhaul operation integrated with a software defined networking system, wherein satellite communication links are unshared and are at the data layer and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a low earth orbit satellite system for backhaul operation integrated with a software defined networking system, wherein satellite communication links are unshared and are at the data layer and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a low earth orbit satellite system for backhaul operation integrated with a software defined networking system, wherein satellite communication links are unshared and are at the data layer and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a low earth orbit satellite system for backhaul operation integrated with a software defined networking system, wherein satellite communication links are unshared and are at the data layer and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a low earth orbit satellite system for backhaul operation integrated with a software defined networking system, wherein satellite communication links are unshared and are at the data layer and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein the requestor is notified of the denial and updated when the denial is resolved or the request is terminated. In embodiments, provided herein is a self-contained 5G mobile telecommunications and edge computing platform having a low earth orbit satellite system for backhaul operation integrated with a software defined networking system, wherein satellite communication links are unshared and are at the data layer and having a smart network slicing system for segmenting the network to align with unique application requirements. In embodiments, provided herein is a self-contained 5G mobile telecommunications and edge computing platform having a low earth orbit satellite system for backhaul operation integrated with a software defined networking system, wherein satellite communication links are unshared and are at the data layer and having a quantum encryption system for enabling quantum encryption and decryption. In embodiments, provided herein is a self-contained 5G mobile telecommunications and edge computing platform having a low earth orbit satellite system for backhaul operation integrated with a software defined networking system, wherein satellite communication links are unshared and are at the data layer and having a certificate authority for issuing digital certificates. In embodiments, provided herein is a self-contained 5G mobile telecommunications and edge computing platform having a low earth orbit satellite system for backhaul operation integrated with a software defined networking system, wherein satellite communication links are unshared and are at the data layer and having a system for providing cyber security in space. In embodiments, provided herein is a self-contained 5G mobile telecommunications and edge computing platform having a low earth orbit satellite system for backhaul operation integrated with a software defined networking system, wherein satellite communication links are unshared and are at the data layer and having secure session initiation protocol security mechanisms. In embodiments, provided herein is a self-contained 5G mobile telecommunications and edge computing platform having a low earth orbit satellite system for backhaul operation integrated with a software defined networking system, wherein satellite communication links are unshared and are at the data layer and having a management and orchestration system for coordinating network resources for applications and the lifecycle management of virtual network functions. In embodiments, provided herein is a self-contained 5G mobile telecommunications and edge computing platform having a low earth orbit satellite system for backhaul operation integrated with a software defined networking system, wherein satellite communication links are unshared and are at the data layer and having a dashboard and/or application programming interface for orchestration and management of a 5G network. In embodiments, provided herein is a self-contained 5G mobile telecommunications and edge computing platform having a low earth orbit satellite system for backhaul operation integrated with a software defined networking system, wherein satellite communication links are unshared and are at the data layer and having a system for identifying user information collected by a source, generating a notification and/or report related the collected user information, and sending the notification and/or report to the user. In embodiments, provided herein is a self-contained 5G mobile telecommunications and edge computing platform having a low earth orbit satellite system for backhaul operation integrated with a software defined networking system, wherein satellite communication links are unshared and are at the data layer and having a system for enabling a user to limit the degree to which information is shared with websites and applications. In embodiments, provided herein is a self-contained 5G mobile telecommunications and edge computing platform having a low earth orbit satellite system for backhaul operation integrated with a software defined networking system, wherein satellite communication links are unshared and are at the data layer and having a system for blocking data flow between specific manufacturers unless a user opts in. In embodiments, provided herein is a self-contained 5G mobile telecommunications and edge computing platform having a low earth orbit satellite system for backhaul operation integrated with a software defined networking system, wherein satellite communication links are unshared and are at the data layer and having a system for enabling automatic clearance of data tracking. In embodiments, provided herein is a self-contained 5G mobile telecommunications and edge computing platform having a low earth orbit satellite system for backhaul operation integrated with a software defined networking system, wherein satellite communication links are unshared and are at the data layer and having a machine learning and/or artificial intelligence system for providing insights to users related to data-sharing management. In embodiments, provided herein is a self-contained 5G mobile telecommunications and edge computing platform having a low earth orbit satellite system for backhaul operation integrated with a software defined networking system, wherein satellite communication links are unshared and are at the data layer and having a privacy-controlled container on top of the base smartphone operating system to run services and applications. In embodiments, provided herein is a self-contained 5G mobile telecommunications and edge computing platform having a low earth orbit satellite system for backhaul operation integrated with a software defined networking system, wherein satellite communication links are unshared and are at the data layer and having virtualized operating system applications wherein the applications are run on a Type 1 Hypervisor having a real-time operating system. In embodiments, provided herein is a self-contained 5G mobile telecommunications and edge computing platform having a low earth orbit satellite system for backhaul operation integrated with a software defined networking system, wherein satellite communication links are unshared and are at the data layer and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a low earth orbit satellite system for backhaul operation integrated with a software defined networking system, wherein satellite communication links are unshared and are at the data layer and having a forced operating system software update system for automatically forcing operating system software updates on the 5G mobile devices of platform subscribers. In embodiments, provided herein is a self-contained 5G mobile telecommunications and edge computing platform having a low earth orbit satellite system for backhaul operation integrated with a software defined networking system, wherein satellite communication links are unshared and are at the data layer and having a device registration system for registering a user device to a specific network segment. In embodiments, provided herein is a self-contained 5G mobile telecommunications and edge computing platform having a low earth orbit satellite system for backhaul operation integrated with a software defined networking system, wherein satellite communication links are unshared and are at the data layer and having a multi-static radar having beam forming MIMO antennas. In embodiments, provided herein is a self-contained 5G mobile telecommunications and edge computing platform having a low earth orbit satellite system for backhaul operation integrated with a software defined networking system, wherein satellite communication links are unshared and are at the data layer and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a low earth orbit satellite system for backhaul operation integrated with a software defined networking system, wherein satellite communication links are unshared and are at the data layer and having a drone shield system for using a fleet of drones to form a dynamic barrier. In embodiments, provided herein is a self-contained 5G mobile telecommunications and edge computing platform having a low earth orbit satellite system for backhaul operation integrated with a software defined networking system, wherein satellite communication links are unshared and are at the data layer and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a low earth orbit satellite system for backhaul operation integrated with a software defined networking system, wherein satellite communication links are unshared and are at the data layer and having a precision navigation and timing system that uses a network of low orbit earth satellites as a timing source. In embodiments, provided herein is a self-contained 5G mobile telecommunications and edge computing platform having a low earth orbit satellite system for backhaul operation integrated with a software defined networking system, wherein satellite communication links are unshared and are at the data layer and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a low earth orbit satellite system for backhaul operation integrated with a software defined networking system, wherein satellite communication links are unshared and are at the data layer and having an augmented reality system that uses a machine learning and/or artificial intelligence system for providing a simulated environment. In embodiments, provided herein is a self-contained 5G mobile telecommunications and edge computing platform having a low earth orbit satellite system for backhaul operation integrated with a software defined networking system, wherein satellite communication links are unshared and are at the data layer and having a virtual reality system that uses a machine learning and/or artificial intelligence system for providing a simulated environment. In embodiments, provided herein is a self-contained 5G mobile telecommunications and edge computing platform having a low earth orbit satellite system for backhaul operation integrated with a software defined networking system, wherein satellite communication links are unshared and are at the data layer and having a customer relationship management system for managing communications with current and/or potential customers. In embodiments, provided herein is a self-contained 5G mobile telecommunications and edge computing platform having a low earth orbit satellite system for backhaul operation integrated with a software defined networking system, wherein satellite communication links are unshared and are at the data layer and having a remote surgery system having a system for providing haptic feedback related to a surgical procedure. In embodiments, provided herein is a self-contained 5G mobile telecommunications and edge computing platform having a low earth orbit satellite system for backhaul operation integrated with a software defined networking system, wherein satellite communication links are unshared and are at the data layer and having a remote driving system for controlling a remote vehicle and having a system for providing haptic feedback related to driving of the vehicle. In embodiments, provided herein is a self-contained 5G mobile telecommunications and edge computing platform having a low earth orbit satellite system for backhaul operation integrated with a software defined networking system, wherein satellite communication links are unshared and are at the data layer and having a remote machine operation system for controlling a remote machine and having a system for providing haptic feedback related to machine operation. In embodiments, provided herein is a self-contained 5G mobile telecommunications and edge computing platform having a low earth orbit satellite system for backhaul operation integrated with a software defined networking system, wherein satellite communication links are unshared and are at the data layer and having an electronic beam steering system to send targeted signals to receivers in 5G mobile devices.

In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having an application programming interface. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a restful application programming interface. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having virtual trust levels at the process level. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a process isolation system. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having partitioned kernels. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having an identity management system for identifying, authenticating, and authorizing platform subscribers. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having an authentication system having a risk-based authentication system that uses machine learning and/or artificial intelligence to determine the risk of user activity. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having an authentication system having a system for providing multi-factor context aware authentication using machine learning and/or artificial intelligence and biometric identification. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a private blockchain for storing data. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a distributed ledger system for storing data. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a compile-time checkpoint module on each call model. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a data recording and reporting system for recording data related to detected anomalies and/or generating reports related to detected anomalies. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a system for enabling clean slate reset, wherein a clean slate reset may be performed by pre-established rules or by operator command. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a smart network slicing system for segmenting the network to align with unique application requirements. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a quantum encryption system for enabling quantum encryption and decryption. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a certificate authority for issuing digital certificates. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a system for providing cyber security in space. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having secure session initiation protocol security mechanisms. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a management and orchestration system for coordinating network resources for applications and the lifecycle management of virtual network functions. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a dashboard and/or application programming interface for orchestration and management of a 5G network. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a system for identifying user information collected by a source, generating a notification and/or report related the collected user information, and sending the notification and/or report to the user. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a system for enabling a user to limit the degree to which information is shared with websites and applications. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a system for blocking data flow between specific manufacturers unless a user opts in. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a system for enabling automatic clearance of data tracking. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a machine learning and/or artificial intelligence system for providing insights to users related to data-sharing management. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a privacy-controlled container on top of the base smartphone operating system to run services and applications. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having virtualized operating system applications wherein the applications are run on a Type 1 Hypervisor having a real-time operating system. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a forced operating system software update system for automatically forcing operating system software updates on the 5G mobile devices of platform subscribers. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a device registration system for registering a user device to a specific network segment. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a multi-static radar having beam forming MIMO antennas. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a drone shield system for using a fleet of drones to form a dynamic barrier. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a precision navigation and timing system that uses a network of low orbit earth satellites as a timing source. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having an augmented reality system that uses a machine learning and/or artificial intelligence system for providing a simulated environment. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a virtual reality system that uses a machine learning and/or artificial intelligence system for providing a simulated environment. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a customer relationship management system for managing communications with current and/or potential customers. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a remote surgery system having a system for providing haptic feedback related to a surgical procedure. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a remote driving system for controlling a remote vehicle and having a system for providing haptic feedback related to driving of the vehicle. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having a remote machine operation system for controlling a remote machine and having a system for providing haptic feedback related to machine operation. In embodiments, provided herein is a self-contained 5G mobile telecommunications and edge computing platform having a low earth orbit satellite system for backhaul operation integrated with a software defined networking system and having inter-satellite links for keeping all backhaul traffic isolated in space between a base transceiver station and the core network regardless of the separation distance and having an electronic beam steering system to send targeted signals to receivers in 5G mobile devices.

In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having an application programming interface. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a restful application programming interface. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having virtual trust levels at the process level. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a process isolation system. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having partitioned kernels. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having an identity management system for identifying, authenticating, and authorizing platform subscribers. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having an authentication system having a risk-based authentication system that uses machine learning and/or artificial intelligence to determine the risk of user activity. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having an authentication system having a system for providing multi-factor context aware authentication using machine learning and/or artificial intelligence and biometric identification. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a private blockchain for storing data. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a distributed ledger system for storing data. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a compile-time checkpoint module on each call model. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a data recording and reporting system for recording data related to detected anomalies and/or generating reports related to detected anomalies. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a system for enabling clean slate reset, wherein a clean slate reset may be performed by preestablished rules or by operator command. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a smart network slicing system for segmenting the network to align with unique application requirements. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a quantum encryption system for enabling quantum encryption and decryption. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a certificate authority for issuing digital certificates. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a system for providing cyber security in space. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having secure session initiation protocol security mechanisms. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a management and orchestration system for coordinating network resources for applications and the lifecycle management of virtual network functions. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a dashboard and/or application programming interface for orchestration and management of a 5G network. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a system for identifying user information collected by a source, generating a notification and/or report related the collected user information, and sending the notification and/or report to the user. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a system for enabling a user to limit the degree to which information is shared with websites and applications. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a system for blocking data flow between specific manufacturers unless a user opts in. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a system for enabling automatic clearance of data tracking. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a machine learning and/or artificial intelligence system for providing insights to users related to data-sharing management. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a privacy-controlled container on top of the base smartphone operating system to run services and applications. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having virtualized operating system applications wherein the applications are run on a Type 1 Hypervisor having a real-time operating system. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a forced operating system software update system for automatically forcing operating system software updates on the 5G mobile devices of platform subscribers. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a device registration system for registering a user device to a specific network segment. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a multi-static radar having beam forming MIMO antennas. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a drone shield system for using a fleet of drones to form a dynamic barrier. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a precision navigation and timing system that uses a network of low orbit earth satellites as a timing source. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having an augmented reality system that uses a machine learning and/or artificial intelligence system for providing a simulated environment. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a virtual reality system that uses a machine learning and/or artificial intelligence system for providing a simulated environment. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a customer relationship management system for managing communications with current and/or potential customers. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a remote surgery system having a system for providing haptic feedback related to a surgical procedure. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a remote driving system for controlling a remote vehicle and having a system for providing haptic feedback related to driving of the vehicle. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having a remote machine operation system for controlling a remote machine and having a system for providing haptic feedback related to machine operation. In embodiments, provided herein is a self-contained 5G mobile telecommunications and edge computing platform having a low earth orbit satellite system for backhaul operation integrated with a software defined networking system, wherein multiple low earth orbit satellites form a constellation around the globe in order to provide global coverage and having an electronic beam steering system to send targeted signals to receivers in 5G mobile devices.

In embodiments, provided herein is a self-contained 5G mobile telecommunications and edge computing platform having an application programming interface. In embodiments, provided herein is a self-contained 5G mobile telecommunications and edge computing platform having an application programming interface and having a restful application programming interface. In embodiments, provided herein is a self-contained 5G mobile telecommunications and edge computing platform having an application programming interface and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having an application programming interface and having virtual trust levels at the process level. In embodiments, provided herein is a self-contained 5G mobile telecommunications and edge computing platform having an application programming interface and having a process isolation system. In embodiments, provided herein is a self-contained 5G mobile telecommunications and edge computing platform having an application programming interface and having partitioned kernels. In embodiments, provided herein is a self-contained 5G mobile telecommunications and edge computing platform having an application programming interface and having an identity management system for identifying, authenticating, and authorizing platform subscribers. In embodiments, provided herein is a self-contained 5G mobile telecommunications and edge computing platform having an application programming interface and having an authentication system having a risk-based authentication system that uses machine learning and/or artificial intelligence to determine the risk of user activity. In embodiments, provided herein is a self-contained 5G mobile telecommunications and edge computing platform having an application programming interface and having an authentication system having a system for providing multi-factor context aware authentication using machine learning and/or artificial intelligence and biometric identification. In embodiments, provided herein is a self-contained 5G mobile telecommunications and edge computing platform having an application programming interface and having a private blockchain for storing data. In embodiments, provided herein is a self-contained 5G mobile telecommunications and edge computing platform having an application programming interface and having a distributed ledger system for storing data. In embodiments, provided herein is a self-contained 5G mobile telecommunications and edge computing platform having an application programming interface and having a compile-time checkpoint module on each call model. In embodiments, provided herein is a self-contained 5G mobile telecommunications and edge computing platform having an application programming interface and having a data recording and reporting system for recording data related to detected anomalies and/or generating reports related to detected anomalies. In embodiments, provided herein is a self-contained 5G mobile telecommunications and edge computing platform having an application programming interface and having a system for enabling clean slate reset, wherein a clean slate reset may be performed by pre-established rules or by operator command. In embodiments, provided herein is a self-contained 5G mobile telecommunications and edge computing platform having an application programming interface and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having an application programming interface and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having an application programming interface and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having an application programming interface and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having an application programming interface and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having an application programming interface and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having an application programming interface and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having an application programming interface and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having an application programming interface and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having an application programming interface and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having an application programming interface and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having an application programming interface and having a smart network slicing system for segmenting the network to align with unique application requirements. In embodiments, provided herein is a self-contained 5G mobile telecommunications and edge computing platform having an application programming interface and having a quantum encryption system for enabling quantum encryption and decryption. In embodiments, provided herein is a self-contained 5G mobile telecommunications and edge computing platform having an application programming interface and having a certificate authority for issuing digital certificates. In embodiments, provided herein is a self-contained 5G mobile telecommunications and edge computing platform having an application programming interface and having a system for providing cyber security in space. In embodiments, provided herein is a self-contained 5G mobile telecommunications and edge computing platform having an application programming interface and having secure session initiation protocol security mechanisms. In embodiments, provided herein is a self-contained 5G mobile telecommunications and edge computing platform having an application programming interface and having a management and orchestration system for coordinating network resources for applications and the lifecycle management of virtual network functions. In embodiments, provided herein is a self-contained 5G mobile telecommunications and edge computing platform having an application programming interface and having a dashboard and/or application programming interface for orchestration and management of a 5G network. In embodiments, provided herein is a self-contained 5G mobile telecommunications and edge computing platform having an application programming interface and having a system for identifying user information collected by a source, generating a notification and/or report related the collected user information, and sending the notification and/or report to the user. In embodiments, provided herein is a self-contained 5G mobile telecommunications and edge computing platform having an application programming interface and having a system for enabling a user to limit the degree to which information is shared with websites and applications. In embodiments, provided herein is a self-contained 5G mobile telecommunications and edge computing platform having an application programming interface and having a system for blocking data flow between specific manufacturers unless a user opts in. In embodiments, provided herein is a self-contained 5G mobile telecommunications and edge computing platform having an application programming interface and having a system for enabling automatic clearance of data tracking. In embodiments, provided herein is a self-contained 5G mobile telecommunications and edge computing platform having an application programming interface and having a machine learning and/or artificial intelligence system for providing insights to users related to data-sharing management. In embodiments, provided herein is a self-contained 5G mobile telecommunications and edge computing platform having an application programming interface and having a privacy-controlled container on top of the base smartphone operating system to run services and applications. In embodiments, provided herein is a self-contained 5G mobile telecommunications and edge computing platform having an application programming interface and having virtualized operating system applications wherein the applications are run on a Type 1 Hypervisor having a real-time operating system. In embodiments, provided herein is a self-contained 5G mobile telecommunications and edge computing platform having an application programming interface and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having an application programming interface and having a forced operating system software update system for automatically forcing operating system software updates on the 5G mobile devices of platform subscribers. In embodiments, provided herein is a self-contained 5G mobile telecommunications and edge computing platform having an application programming interface and having a device registration system for registering a user device to a specific network segment. In embodiments, provided herein is a self-contained 5G mobile telecommunications and edge computing platform having an application programming interface and having a multi-static radar having beam forming MIMO antennas. In embodiments, provided herein is a self-contained 5G mobile telecommunications and edge computing platform having an application programming interface and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having an application programming interface and having a drone shield system for using a fleet of drones to form a dynamic barrier. In embodiments, provided herein is a self-contained 5G mobile telecommunications and edge computing platform having an application programming interface and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having an application programming interface and having a precision navigation and timing system that uses a network of low orbit earth satellites as a timing source. In embodiments, provided herein is a self-contained 5G mobile telecommunications and edge computing platform having an application programming interface and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having an application programming interface and having an augmented reality system that uses a machine learning and/or artificial intelligence system for providing a simulated environment. In embodiments, provided herein is a self-contained 5G mobile telecommunications and edge computing platform having an application programming interface and having a virtual reality system that uses a machine learning and/or artificial intelligence system for providing a simulated environment. In embodiments, provided herein is a self-contained 5G mobile telecommunications and edge computing platform having an application programming interface and having a customer relationship management system for managing communications with current and/or potential customers. In embodiments, provided herein is a self-contained 5G mobile telecommunications and edge computing platform having an application programming interface and having a remote surgery system having a system for providing haptic feedback related to a surgical procedure. In embodiments, provided herein is a self-contained 5G mobile telecommunications and edge computing platform having an application programming interface and having a remote driving system for controlling a remote vehicle and having a system for providing haptic feedback related to driving of the vehicle. In embodiments, provided herein is a self-contained 5G mobile telecommunications and edge computing platform having an application programming interface and having a remote machine operation system for controlling a remote machine and having a system for providing haptic feedback related to machine operation. In embodiments, provided herein is a self-contained 5G mobile telecommunications and edge computing platform having an application programming interface and having an electronic beam steering system to send targeted signals to receivers in 5G mobile devices.

In embodiments, provided herein is a self-contained 5G mobile telecommunications and edge computing platform having a restful application programming interface. In embodiments, provided herein is a self-contained 5G mobile telecommunications and edge computing platform having a RESTful application programming interface and having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a restful application programming interface and having virtual trust levels at the process level. In embodiments, provided herein is a self-contained 5G mobile telecommunications and edge computing platform having a restful application programming interface and having a process isolation system. In embodiments, provided herein is a self-contained 5G mobile telecommunications and edge computing platform having a restful application programming interface and having partitioned kernels. In embodiments, provided herein is a self-contained 5G mobile telecommunications and edge computing platform having a restful application programming interface and having an identity management system for identifying, authenticating, and authorizing platform subscribers. In embodiments, provided herein is a self-contained 5G mobile telecommunications and edge computing platform having a restful application programming interface and having an authentication system having a risk-based authentication system that uses machine learning and/or artificial intelligence to determine the risk of user activity. In embodiments, provided herein is a self-contained 5G mobile telecommunications and edge computing platform having a restful application programming interface and having an authentication system having a system for providing multi-factor context aware authentication using machine learning and/or artificial intelligence and biometric identification. In embodiments, provided herein is a self-contained 5G mobile telecommunications and edge computing platform having a restful application programming interface and having a private blockchain for storing data. In embodiments, provided herein is a self-contained 5G mobile telecommunications and edge computing platform having a restful application programming interface and having a distributed ledger system for storing data. In embodiments, provided herein is a self-contained 5G mobile telecommunications and edge computing platform having a restful application programming interface and having a compile-time checkpoint module on each call model. In embodiments, provided herein is a self-contained 5G mobile telecommunications and edge computing platform having a restful application programming interface and having a data recording and reporting system for recording data related to detected anomalies and/or generating reports related to detected anomalies. In embodiments, provided herein is a self-contained 5G mobile telecommunications and edge computing platform having a restful application programming interface and having a system for enabling clean slate reset, wherein a clean slate reset may be performed by pre-established rules or by operator command. In embodiments, provided herein is a self-contained 5G mobile telecommunications and edge computing platform having a restful application programming interface and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a restful application programming interface and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a restful application programming interface and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a restful application programming interface and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a restful application programming interface and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a restful application programming interface and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a restful application programming interface and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a restful application programming interface and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a restful application programming interface and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a restful application programming interface and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a restful application programming interface and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a restful application programming interface and having a smart network slicing system for segmenting the network to align with unique application requirements. In embodiments, provided herein is a self-contained 5G mobile telecommunications and edge computing platform having a restful application programming interface and having a quantum encryption system for enabling quantum encryption and decryption. In embodiments, provided herein is a self-contained 5G mobile telecommunications and edge computing platform having a restful application programming interface and having a certificate authority for issuing digital certificates. In embodiments, provided herein is a self-contained 5G mobile telecommunications and edge computing platform having a restful application programming interface and having a system for providing cyber security in space. In embodiments, provided herein is a self-contained 5G mobile telecommunications and edge computing platform having a restful application programming interface and having secure session initiation protocol security mechanisms. In embodiments, provided herein is a self-contained 5G mobile telecommunications and edge computing platform having a restful application programming interface and having a management and orchestration system for coordinating network resources for applications and the lifecycle management of virtual network functions. In embodiments, provided herein is a self-contained 5G mobile telecommunications and edge computing platform having a restful application programming interface and having a dashboard and/or application programming interface for orchestration and management of a 5G network. In embodiments, provided herein is a self-contained 5G mobile telecommunications and edge computing platform having a restful application programming interface and having a system for identifying user information collected by a source, generating a notification and/or report related the collected user information, and sending the notification and/or report to the user. In embodiments, provided herein is a self-contained 5G mobile telecommunications and edge computing platform having a restful application programming interface and having a system for enabling a user to limit the degree to which information is shared with websites and applications. In embodiments, provided herein is a self-contained 5G mobile telecommunications and edge computing platform having a restful application programming interface and having a system for blocking data flow between specific manufacturers unless a user opts in. In embodiments, provided herein is a self-contained 5G mobile telecommunications and edge computing platform having a restful application programming interface and having a system for enabling automatic clearance of data tracking. In embodiments, provided herein is a self-contained 5G mobile telecommunications and edge computing platform having a restful application programming interface and having a machine learning and/or artificial intelligence system for providing insights to users related to data-sharing management. In embodiments, provided herein is a self-contained 5G mobile telecommunications and edge computing platform having a restful application programming interface and having a privacy-controlled container on top of the base smartphone operating system to run services and applications. In embodiments, provided herein is a self-contained 5G mobile telecommunications and edge computing platform having a restful application programming interface and having virtualized operating system applications wherein the applications are run on a Type 1 Hypervisor having a real-time operating system. In embodiments, provided herein is a self-contained 5G mobile telecommunications and edge computing platform having a restful application programming interface and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a restful application programming interface and having a forced operating system software update system for automatically forcing operating system software updates on the 5G mobile devices of platform subscribers. In embodiments, provided herein is a self-contained 5G mobile telecommunications and edge computing platform having a restful application programming interface and having a device registration system for registering a user device to a specific network segment. In embodiments, provided herein is a self-contained 5G mobile telecommunications and edge computing platform having a restful application programming interface and having a multi-static radar having beam forming MIMO antennas. In embodiments, provided herein is a self-contained 5G mobile telecommunications and edge computing platform having a restful application programming interface and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a restful application programming interface and having a drone shield system for using a fleet of drones to form a dynamic barrier. In embodiments, provided herein is a self-contained 5G mobile telecommunications and edge computing platform having a restful application programming interface and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a restful application programming interface and having a precision navigation and timing system that uses a network of low orbit earth satellites as a timing source. In embodiments, provided herein is a self-contained 5G mobile telecommunications and edge computing platform having a restful application programming interface and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a restful application programming interface and having an augmented reality system that uses a machine learning and/or artificial intelligence system for providing a simulated environment. In embodiments, provided herein is a self-contained 5G mobile telecommunications and edge computing platform having a restful application programming interface and having a virtual reality system that uses a machine learning and/or artificial intelligence system for providing a simulated environment. In embodiments, provided herein is a self-contained 5G mobile telecommunications and edge computing platform having a restful application programming interface and having a customer relationship management system for managing communications with current and/or potential customers. In embodiments, provided herein is a self-contained 5G mobile telecommunications and edge computing platform having a restful application programming interface and having a remote surgery system having a system for providing haptic feedback related to a surgical procedure. In embodiments, provided herein is a self-contained 5G mobile telecommunications and edge computing platform having a restful application programming interface and having a remote driving system for controlling a remote vehicle and having a system for providing haptic feedback related to driving of the vehicle. In embodiments, provided herein is a self-contained 5G mobile telecommunications and edge computing platform having a restful application programming interface and having a remote machine operation system for controlling a remote machine and having a system for providing haptic feedback related to machine operation. In embodiments, provided herein is a self-contained 5G mobile telecommunications and edge computing platform having a restful application programming interface and having an electronic beam steering system to send targeted signals to receivers in 5G mobile devices.

In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having virtual trust levels at the process level. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a process isolation system. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having partitioned kernels. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having an identity management system for identifying, authenticating, and authorizing platform subscribers. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having an authentication system having a risk-based authentication system that uses machine learning and/or artificial intelligence to determine the risk of user activity. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having an authentication system having a system for providing multi-factor context aware authentication using machine learning and/or artificial intelligence and biometric identification. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a private blockchain for storing data. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a distributed ledger system for storing data. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a compile-time checkpoint module on each call model. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a data recording and reporting system for recording data related to detected anomalies and/or generating reports related to detected anomalies. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a system for enabling clean slate reset, wherein a clean slate reset may be performed by pre-established rules or by operator command. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a smart network slicing system for segmenting the network to align with unique application requirements. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a quantum encryption system for enabling quantum encryption and decryption. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a certificate authority for issuing digital certificates. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a system for providing cyber security in space. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having secure session initiation protocol security mechanisms. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a management and orchestration system for coordinating network resources for applications and the lifecycle management of virtual network functions. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a dashboard and/or application programming interface for orchestration and management of a 5G network. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a system for identifying user information collected by a source, generating a notification and/or report related the collected user information, and sending the notification and/or report to the user. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a system for enabling a user to limit the degree to which information is shared with websites and applications. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a system for blocking data flow between specific manufacturers unless a user opts in. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a system for enabling automatic clearance of data tracking. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a machine learning and/or artificial intelligence system for providing insights to users related to data-sharing management. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a privacy-controlled container on top of the base smartphone operating system to run services and applications. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having virtualized operating system applications wherein the applications are run on a Type 1 Hypervisor having a real-time operating system. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a forced operating system software update system for automatically forcing operating system software updates on the 5G mobile devices of platform subscribers. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a device registration system for registering a user device to a specific network segment. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a multi-static radar having beam forming MIMO antennas. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a drone shield system for using a fleet of drones to form a dynamic barrier. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a precision navigation and timing system that uses a network of low orbit earth satellites as a timing source. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having an augmented reality system that uses a machine learning and/or artificial intelligence system for providing a simulated environment. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a virtual reality system that uses a machine learning and/or artificial intelligence system for providing a simulated environment. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a customer relationship management system for managing communications with current and/or potential customers. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a remote surgery system having a system for providing haptic feedback related to a surgical procedure. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a remote driving system for controlling a remote vehicle and having a system for providing haptic feedback related to driving of the vehicle. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having a remote machine operation system for controlling a remote machine and having a system for providing haptic feedback related to machine operation. In embodiments, provided herein is a self-contained 5G mobile telecommunications and edge computing platform having a smart sandbox system that uses machine learning and/or artificial intelligence for monitoring the behavior of each application server, detecting anomalies, and if an anomaly is detected, generating a measure of severity related to the anomaly, and generating an alert and/or automatically remediating the anomaly based on the measure of severity and having an electronic beam steering system to send targeted signals to receivers in 5G mobile devices.

In embodiments, provided herein is a self-contained 5G mobile telecommunications and edge computing platform having virtual trust levels at the process level. In embodiments, provided herein is a self-contained 5G mobile telecommunications and edge computing platform having virtual trust levels at the process level and having a process isolation system. In embodiments, provided herein is a self-contained 5G mobile telecommunications and edge computing platform having virtual trust levels at the process level and having partitioned kernels. In embodiments, provided herein is a self-contained 5G mobile telecommunications and edge computing platform having virtual trust levels at the process level and having an identity management system for identifying, authenticating, and authorizing platform subscribers. In embodiments, provided herein is a self-contained 5G mobile telecommunications and edge computing platform having virtual trust levels at the process level and having an authentication system having a risk-based authentication system that uses machine learning and/or artificial intelligence to determine the risk of user activity. In embodiments, provided herein is a self-contained 5G mobile telecommunications and edge computing platform having virtual trust levels at the process level and having an authentication system having a system for providing multi-factor context aware authentication using machine learning and/or artificial intelligence and biometric identification. In embodiments, provided herein is a self-contained 5G mobile telecommunications and edge computing platform having virtual trust levels at the process level and having a private blockchain for storing data. In embodiments, provided herein is a self-contained 5G mobile telecommunications and edge computing platform having virtual trust levels at the process level and having a distributed ledger system for storing data. In embodiments, provided herein is a self-contained 5G mobile telecommunications and edge computing platform having virtual trust levels at the process level and having a compile-time checkpoint module on each call model. In embodiments, provided herein is a self-contained 5G mobile telecommunications and edge computing platform having virtual trust levels at the process level and having a data recording and reporting system for recording data related to detected anomalies and/or generating reports related to detected anomalies. In embodiments, provided herein is a self-contained 5G mobile telecommunications and edge computing platform having virtual trust levels at the process level and having a system for enabling clean slate reset, wherein a clean slate reset may be performed by pre-established rules or by operator command. In embodiments, provided herein is a self-contained 5G mobile telecommunications and edge computing platform having virtual trust levels at the process level and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having virtual trust levels at the process level and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having virtual trust levels at the process level and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having virtual trust levels at the process level and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having virtual trust levels at the process level and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having virtual trust levels at the process level and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having virtual trust levels at the process level and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object;

and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having virtual trust levels at the process level and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having virtual trust levels at the process level and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having virtual trust levels at the process level and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having virtual trust levels at the process level and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having virtual trust levels at the process level and having a smart network slicing system for segmenting the network to align with unique application requirements. In embodiments, provided herein is a self-contained 5G mobile telecommunications and edge computing platform having virtual trust levels at the process level and having a quantum encryption system for enabling quantum encryption and decryption. In embodiments, provided herein is a self-contained 5G mobile telecommunications and edge computing platform having virtual trust levels at the process level and having a certificate authority for issuing digital certificates. In embodiments, provided herein is a self-contained 5G mobile telecommunications and edge computing platform having virtual trust levels at the process level and having a system for providing cyber security in space. In embodiments, provided herein is a self-contained 5G mobile telecommunications and edge computing platform having virtual trust levels at the process level and having secure session initiation protocol security mechanisms. In embodiments, provided herein is a self-contained 5G mobile telecommunications and edge computing platform having virtual trust levels at the process level and having a management and orchestration system for coordinating network resources for applications and the lifecycle management of virtual network functions. In embodiments, provided herein is a self-contained 5G mobile telecommunications and edge computing platform having virtual trust levels at the process level and having a dashboard and/or application programming interface for orchestration and management of a 5G network. In embodiments, provided herein is a self-contained 5G mobile telecommunications and edge computing platform having virtual trust levels at the process level and having a system for identifying user information collected by a source, generating a notification and/or report related the collected user information, and sending the notification and/or report to the user. In embodiments, provided herein is a self-contained 5G mobile telecommunications and edge computing platform having virtual trust levels at the process level and having a system for enabling a user to limit the degree to which information is shared with websites and applications. In embodiments, provided herein is a self-contained 5G mobile telecommunications and edge computing platform having virtual trust levels at the process level and having a system for blocking data flow between specific manufacturers unless a user opts in. In embodiments, provided herein is a self-contained 5G mobile telecommunications and edge computing platform having virtual trust levels at the process level and having a system for enabling automatic clearance of data tracking. In embodiments, provided herein is a self-contained 5G mobile telecommunications and edge computing platform having virtual trust levels at the process level and having a machine learning and/or artificial intelligence system for providing insights to users related to data-sharing management. In embodiments, provided herein is a self-contained 5G mobile telecommunications and edge computing platform having virtual trust levels at the process level and having a privacy-controlled container on top of the base smartphone operating system to run services and applications. In embodiments, provided herein is a self-contained 5G mobile telecommunications and edge computing platform having virtual trust levels at the process level and having virtualized operating system applications wherein the applications are run on a Type 1 Hypervisor having a real-time operating system. In embodiments, provided herein is a self-contained 5G mobile telecommunications and edge computing platform having virtual trust levels at the process level and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having virtual trust levels at the process level and having a forced operating system software update system for automatically forcing operating system software updates on the 5G mobile devices of platform subscribers. In embodiments, provided herein is a self-contained 5G mobile telecommunications and edge computing platform having virtual trust levels at the process level and having a device registration system for registering a user device to a specific network segment. In embodiments, provided herein is a self-contained 5G mobile telecommunications and edge computing platform having virtual trust levels at the process level and having a multi-static radar having beam forming MIMO antennas. In embodiments, provided herein is a self-contained 5G mobile telecommunications and edge computing platform having virtual trust levels at the process level and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having virtual trust levels at the process level and having a drone shield system for using a fleet of drones to form a dynamic barrier. In embodiments, provided herein is a self-contained 5G mobile telecommunications and edge computing platform having virtual trust levels at the process level and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having virtual trust levels at the process level and having a precision navigation and timing system that uses a network of low orbit earth satellites as a timing source. In embodiments, provided herein is a self-contained 5G mobile telecommunications and edge computing platform having virtual trust levels at the process level and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having virtual trust levels at the process level and having an augmented reality system that uses a machine learning and/or artificial intelligence system for providing a simulated environment. In embodiments, provided herein is a self-contained 5G mobile telecommunications and edge computing platform having virtual trust levels at the process level and having a virtual reality system that uses a machine learning and/or artificial intelligence system for providing a simulated environment. In embodiments, provided herein is a self-contained 5G mobile telecommunications and edge computing platform having virtual trust levels at the process level and having a customer relationship management system for managing communications with current and/or potential customers. In embodiments, provided herein is a self-contained 5G mobile telecommunications and edge computing platform having virtual trust levels at the process level and having a remote surgery system having a system for providing haptic feedback related to a surgical procedure. In embodiments, provided herein is a self-contained 5G mobile telecommunications and edge computing platform having virtual trust levels at the process level and having a remote driving system for controlling a remote vehicle and having a system for providing haptic feedback related to driving of the vehicle. In embodiments, provided herein is a self-contained 5G mobile telecommunications and edge computing platform having virtual trust levels at the process level and having a remote machine operation system for controlling a remote machine and having a system for providing haptic feedback related to machine operation. In embodiments, provided herein is a self-contained 5G mobile telecommunications and edge computing platform having virtual trust levels at the process level and having an electronic beam steering system to send targeted signals to receivers in 5G mobile devices.

In embodiments, provided herein is a self-contained 5G mobile telecommunications and edge computing platform having a process isolation system. In embodiments, provided herein is a self-contained 5G mobile telecommunications and edge computing platform having a process isolation system and having partitioned kernels. In embodiments, provided herein is a self-contained 5G mobile telecommunications and edge computing platform having a process isolation system and having an identity management system for identifying, authenticating, and authorizing platform subscribers. In embodiments, provided herein is a self-contained 5G mobile telecommunications and edge computing platform having a process isolation system and having an authentication system having a risk-based authentication system that uses machine learning and/or artificial intelligence to determine the risk of user activity. In embodiments, provided herein is a self-contained 5G mobile telecommunications and edge computing platform having a process isolation system and having an authentication system having a system for providing multi-factor context aware authentication using machine learning and/or artificial intelligence and biometric identification. In embodiments, provided herein is a self-contained 5G mobile telecommunications and edge computing platform having a process isolation system and having a private blockchain for storing data. In embodiments, provided herein is a self-contained 5G mobile telecommunications and edge computing platform having a process isolation system and having a distributed ledger system for storing data. In embodiments, provided herein is a self-contained 5G mobile telecommunications and edge computing platform having a process isolation system and having a compile-time checkpoint module on each call model. In embodiments, provided herein is a self-contained 5G mobile telecommunications and edge computing platform having a process isolation system and having a data recording and reporting system for recording data related to detected anomalies and/or generating reports related to detected anomalies. In embodiments, provided herein is a self-contained 5G mobile telecommunications and edge computing platform having a process isolation system and having a system for enabling clean slate reset, wherein a clean slate reset may be performed by pre-established rules or by operator command. In embodiments, provided herein is a self-contained 5G mobile telecommunications and edge computing platform having a process isolation system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a process isolation system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a process isolation system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a process isolation system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a process isolation system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a process isolation system and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a process isolation system and having an object-oriented analysis and design wherein options are provided to allow for the separation of data and meta data into separate object constructs and wherein the data as defined by its Abstract Syntax Notation (ASN) definitions/ data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a process isolation system and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a process isolation system and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a process isolation system and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a process isolation system and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a process isolation system and having a smart network slicing system for segmenting the network to align with unique application requirements. In embodiments, provided herein is a self-contained 5G mobile telecommunications and edge computing platform having a process isolation system and having a quantum encryption system for enabling quantum encryption and decryption. In embodiments, provided herein is a self-contained 5G mobile telecommunications and edge computing platform having a process isolation system and having a certificate authority for issuing digital certificates. In embodiments, provided herein is a self-contained 5G mobile telecommunications and edge computing platform having a process isolation system and having a system for providing cyber security in space. In embodiments, provided herein is a self-contained 5G mobile telecommunications and edge computing platform having a process isolation system and having secure session initiation protocol security mechanisms. In embodiments, provided herein is a self-contained 5G mobile telecommunications and edge computing platform having a process isolation system and having a management and orchestration system for coordinating network resources for applications and the lifecycle management of virtual network functions. In embodiments, provided herein is a self-contained 5G mobile telecommunications and edge computing platform having a process isolation system and having a dashboard and/or application programming interface for orchestration and management of a 5G network. In embodiments, provided herein is a self-contained 5G mobile telecommunications and edge computing platform having a process isolation system and having a system for identifying user information collected by a source, generating a notification and/or report related the collected user information, and sending the notification and/or report to the user. In embodiments, provided herein is a self-contained 5G mobile telecommunications and edge computing platform having a process isolation system and having a system for enabling a user to limit the degree to which information is shared with websites and applications. In embodiments, provided herein is a self-contained 5G mobile telecommunications and edge computing platform having a process isolation system and having a system for blocking data flow between specific manufacturers unless a user opts in. In embodiments, provided herein is a self-contained 5G mobile telecommunications and edge computing platform having a process isolation system and having a system for enabling automatic clearance of data tracking. In embodiments, provided herein is a self-contained 5G mobile telecommunications and edge computing platform having a process isolation system and having a machine learning and/or artificial intelligence system for providing insights to users related to data-sharing management. In embodiments, provided herein is a self-contained 5G mobile telecommunications and edge computing platform having a process isolation system and having a privacy-controlled container on top of the base smartphone operating system to run services and applications. In embodiments, provided herein is a self-contained 5G mobile telecommunications and edge computing platform having a process isolation system and having virtualized operating system applications wherein the applications are run on a Type 1 Hypervisor having a real-time operating system. In embodiments, provided herein is a self-contained 5G mobile telecommunications and edge computing platform having a process isolation system and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a process isolation system and having a forced operating system software update system for automatically forcing operating system software updates on the 5G mobile devices of platform subscribers. In embodiments, provided herein is a self-contained 5G mobile telecommunications and edge computing platform having a process isolation system and having a device registration system for registering a user device to a specific network segment. In embodiments, provided herein is a self-contained 5G mobile telecommunications and edge computing platform having a process isolation system and having a multi-static radar having beam forming MIMO antennas. In embodiments, provided herein is a self-contained 5G mobile telecommunications and edge computing platform having a process isolation system and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a process isolation system and having a drone shield system for using a fleet of drones to form a dynamic barrier. In embodiments, provided herein is a self-contained 5G mobile telecommunications and edge computing platform having a process isolation system and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a process isolation system and having a precision navigation and timing system that uses a network of low orbit earth satellites as a timing source. In embodiments, provided herein is a self-contained 5G mobile telecommunications and edge computing platform having a process isolation system and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a process isolation system and having an augmented reality system that uses a machine learning and/or artificial intelligence system for providing a simulated environment. In embodiments, provided herein is a self-contained 5G mobile telecommunications and edge computing platform having a process isolation system and having a virtual reality system that uses a machine learning and/or artificial intelligence system for providing a simulated environment. In embodiments, provided herein is a self-contained 5G mobile telecommunications and edge computing platform having a process isolation system and having a customer relationship management system for managing communications with current and/or potential customers. In embodiments, provided herein is a self-contained 5G mobile telecommunications and edge computing platform having a process isolation system and having a remote surgery system having a system for providing haptic feedback related to a surgical procedure. In embodiments, provided herein is a self-contained 5G mobile telecommunications and edge computing platform having a process isolation system and having a remote driving system for controlling a remote vehicle and having a system for providing haptic feedback related to driving of the vehicle. In embodiments, provided herein is a self-contained 5G mobile telecommunications and edge computing platform having a process isolation system and having a remote machine operation system for controlling a remote machine and having a system for providing haptic feedback related to machine operation. In embodiments, provided herein is a self-contained 5G mobile telecommunications and edge computing platform having a process isolation system and having an electronic beam steering system to send targeted signals to receivers in 5G mobile devices.

In embodiments, provided herein is a self-contained 5G mobile telecommunications and edge computing platform having partitioned kernels. In embodiments, provided herein is a self-contained 5G mobile telecommunications and edge computing platform having partitioned kernels and having an identity management system for identifying, authenticating, and authorizing platform subscribers. In embodiments, provided herein is a self-contained 5G mobile telecommunications and edge computing platform having partitioned kernels and having an authentication system having a risk-based authentication system that uses machine learning and/or artificial intelligence to determine the risk of user activity. In embodiments, provided herein is a self-contained 5G mobile telecommunications and edge computing platform having partitioned kernels and having an authentication system having a system for providing multi-factor context aware authentication using machine learning and/or artificial intelligence and biometric identification. In embodiments, provided herein is a self-contained 5G mobile telecommunications and edge computing platform having partitioned kernels and having a private blockchain for storing data. In embodiments, provided herein is a self-contained 5G mobile telecommunications and edge computing platform having partitioned kernels and having a distributed ledger system for storing data. In embodiments, provided herein is a self-contained 5G mobile telecommunications and edge computing platform having partitioned kernels and having a compile-time checkpoint module on each call model. In embodiments, provided herein is a self-contained 5G mobile telecommunications and edge computing platform having partitioned kernels and having a data recording and reporting system for recording data related to detected anomalies and/or generating reports related to detected anomalies. In embodiments, provided herein is a self-contained 5G mobile telecommunications and edge computing platform having partitioned kernels and having a system for enabling clean slate reset, wherein a clean slate reset may be performed by pre-established rules or by operator command. In embodiments, provided herein is a self-contained 5G mobile telecommunications and edge computing platform having partitioned kernels and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having partitioned kernels and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having partitioned kernels and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having partitioned kernels and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having partitioned kernels and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having partitioned kernels and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having partitioned kernels and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having partitioned kernels and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having partitioned kernels and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having partitioned kernels and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having partitioned kernels and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having partitioned kernels and having a smart network slicing system for segmenting the network to align with unique application requirements. In embodiments, provided herein is a self-contained 5G mobile telecommunications and edge computing platform having partitioned kernels and having a quantum encryption system for enabling quantum encryption and decryption. In embodiments, provided herein is a self-contained 5G mobile telecommunications and edge computing platform having partitioned kernels and having a certificate authority for issuing digital certificates. In embodiments, provided herein is a self-contained 5G mobile telecommunications and edge computing platform having partitioned kernels and having a system for providing cyber security in space. In embodiments, provided herein is a self-contained 5G mobile telecommunications and edge computing platform having partitioned kernels and having secure session initiation protocol security mechanisms. In embodiments, provided herein is a self-contained 5G mobile telecommunications and edge computing platform having partitioned kernels and having a management and orchestration system for coordinating network resources for applications and the lifecycle management of virtual network functions. In embodiments, provided herein is a self-contained 5G mobile telecommunications and edge computing platform having partitioned kernels and having a dashboard and/or application programming interface for orchestration and management of a 5G network. In embodiments, provided herein is a self-contained 5G mobile telecommunications and edge computing platform having partitioned kernels and having a system for identifying user information collected by a source, generating a notification and/or report related the collected user information, and sending the notification and/or report to the user. In embodiments, provided herein is a self-contained 5G mobile telecommunications and edge computing platform having partitioned kernels and having a system for enabling a user to limit the degree to which information is shared with websites and applications. In embodiments, provided herein is a self-contained 5G mobile telecommunications and edge computing platform having partitioned kernels and having a system for blocking data flow between specific manufacturers unless a user opts in. In embodiments, provided herein is a self-contained 5G mobile telecommunications and edge computing platform having partitioned kernels and having a system for enabling automatic clearance of data tracking. In embodiments, provided herein is a self-contained 5G mobile telecommunications and edge computing platform having partitioned kernels and having a machine learning and/or artificial intelligence system for providing insights to users related to data-sharing management. In embodiments, provided herein is a self-contained 5G mobile telecommunications and edge computing platform having partitioned kernels and having a privacy-controlled container on top of the base smartphone operating system to run services and applications. In embodiments, provided herein is a self-contained 5G mobile telecommunications and edge computing platform having partitioned kernels and having virtualized operating system applications wherein the applications are run on a Type 1 Hypervisor having a real-time operating system. In embodiments, provided herein is a self-contained 5G mobile telecommunications and edge computing platform having partitioned kernels and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having partitioned kernels and having a forced operating system software update system for automatically forcing operating system software updates on the 5G mobile devices of platform subscribers. In embodiments, provided herein is a self-contained 5G mobile telecommunications and edge computing platform having partitioned kernels and having a device registration system for registering a user device to a specific network segment. In embodiments, provided herein is a self-contained 5G mobile telecommunications and edge computing platform having partitioned kernels and having a multi-static radar having beam forming MIMO antennas. In embodiments, provided herein is a self-contained 5G mobile telecommunications and edge computing platform having partitioned kernels and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having partitioned kernels and having a drone shield system for using a fleet of drones to form a dynamic barrier. In embodiments, provided herein is a self-contained 5G mobile telecommunications and edge computing platform having partitioned kernels and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having partitioned kernels and having a precision navigation and timing system that uses a network of low orbit earth satellites as a timing source. In embodiments, provided herein is a self-contained 5G mobile telecommunications and edge computing platform having partitioned kernels and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having partitioned kernels and having an augmented reality system that uses a machine learning and/or artificial intelligence system for providing a simulated environment. In embodiments, provided herein is a self-contained 5G mobile telecommunications and edge computing platform having partitioned kernels and having a virtual reality system that uses a machine learning and/or artificial intelligence system for providing a simulated environment. In embodiments, provided herein is a self-contained 5G mobile telecommunications and edge computing platform having partitioned kernels and having a customer relationship management system for managing communications with current and/or potential customers. In embodiments, provided herein is a self-contained 5G mobile telecommunications and edge computing platform having partitioned kernels and having a remote surgery system having a system for providing haptic feedback related to a surgical procedure. In embodiments, provided herein is a self-contained 5G mobile telecommunications and edge computing platform having partitioned kernels and having a remote driving system for controlling a remote vehicle and having a system for providing haptic feedback related to driving of the vehicle. In embodiments, provided herein is a self-contained 5G mobile telecommunications and edge computing platform having partitioned kernels and having a remote machine operation system for controlling a remote machine and having a system for providing haptic feedback related to machine operation. In embodiments, provided herein is a self-contained 5G mobile telecommunications and edge computing platform having partitioned kernels and having an electronic beam steering system to send targeted signals to receivers in 5G mobile devices.

In embodiments, provided herein is a self-contained 5G mobile telecommunications and edge computing platform having an identity management system for identifying, authenticating, and authorizing platform subscribers. In embodiments, provided herein is a self-contained 5G mobile telecommunications and edge computing platform having an identity management system for identifying, authenticating, and authorizing platform subscribers and having an authentication system having a risk-based authentication system that uses machine learning and/or artificial intelligence to determine the risk of user activity. In embodiments, provided herein is a self-contained 5G mobile telecommunications and edge computing platform having an identity management system for identifying, authenticating, and authorizing platform subscribers and having an authentication system having a system for providing multi-factor context aware authentication using machine learning and/or artificial intelligence and biometric identification. In embodiments, provided herein is a self-contained 5G mobile telecommunications and edge computing platform having an identity management system for identifying, authenticating, and authorizing platform subscribers and having a private blockchain for storing data. In embodiments, provided herein is a self-contained 5G mobile telecommunications and edge computing platform having an identity management system for identifying, authenticating, and authorizing platform subscribers and having a distributed ledger system for storing data. In embodiments, provided herein is a self-contained 5G mobile telecommunications and edge computing platform having an identity management system for identifying, authenticating, and authorizing platform subscribers and having a compile-time checkpoint module on each call model. In embodiments, provided herein is a self-contained 5G mobile telecommunications and edge computing platform having an identity management system for identifying, authenticating, and authorizing platform subscribers and having a data recording and reporting system for recording data related to detected anomalies and/or generating reports related to detected anomalies. In embodiments, provided herein is a self-contained 5G mobile telecommunications and edge computing platform having an identity management system for identifying, authenticating, and authorizing platform subscribers and having a system for enabling clean slate reset, wherein a clean slate reset may be performed by pre-established rules or by operator command. In embodiments, provided herein is a self-contained 5G mobile telecommunications and edge computing platform having an identity management system for identifying, authenticating, and authorizing platform subscribers and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having an identity management system for identifying, authenticating, and authorizing platform subscribers and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having an identity management system for identifying, authenticating, and authorizing platform subscribers and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having an identity management system for identifying, authenticating, and authorizing platform subscribers and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having an identity management system for identifying, authenticating, and authorizing platform subscribers and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having an identity management system for identifying, authenticating, and authorizing platform subscribers and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having an identity management system for identifying, authenticating, and authorizing platform subscribers and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having an identity management system for identifying, authenticating, and authorizing platform subscribers and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having an identity management system for identifying, authenticating, and authorizing platform subscribers and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having an identity management system for identifying, authenticating, and authorizing platform subscribers and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having an identity management system for identifying, authenticating, and authorizing platform subscribers and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having an identity management system for identifying, authenticating, and authorizing platform subscribers and having a smart network slicing system for segmenting the network to align with unique application requirements. In embodiments, provided herein is a self-contained 5G mobile telecommunications and edge computing platform having an identity management system for identifying, authenticating, and authorizing platform subscribers and having a quantum encryption system for enabling quantum encryption and decryption. In embodiments, provided herein is a self-contained 5G mobile telecommunications and edge computing platform having an identity management system for identifying, authenticating, and authorizing platform subscribers and having a certificate authority for issuing digital certificates. In embodiments, provided herein is a self-contained 5G mobile telecommunications and edge computing platform having an identity management system for identifying, authenticating, and authorizing platform subscribers and having a system for providing cyber security in space. In embodiments, provided herein is a self-contained 5G mobile telecommunications and edge computing platform having an identity management system for identifying, authenticating, and authorizing platform subscribers and having secure session initiation protocol security mechanisms. In embodiments, provided herein is a self-contained 5G mobile telecommunications and edge computing platform having an identity management system for identifying, authenticating, and authorizing platform subscribers and having a management and orchestration system for coordinating network resources for applications and the lifecycle management of virtual network functions. In embodiments, provided herein is a self-contained 5G mobile telecommunications and edge computing platform having an identity management system for identifying, authenticating, and authorizing platform subscribers and having a dashboard and/or application programming interface for orchestration and management of a 5G network. In embodiments, provided herein is a self-contained 5G mobile telecommunications and edge computing platform having an identity management system for identifying, authenticating, and authorizing platform subscribers and having a system for identifying user information collected by a source, generating a notification and/or report related the collected user information, and sending the notification and/or report to the user. In embodiments, provided herein is a self-contained 5G mobile telecommunications and edge computing platform having an identity management system for identifying, authenticating, and authorizing platform subscribers and having a system for enabling a user to limit the degree to which information is shared with websites and applications. In embodiments, provided herein is a self-contained 5G mobile telecommunications and edge computing platform having an identity management system for identifying, authenticating, and authorizing platform subscribers and having a system for blocking data flow between specific manufacturers unless a user opts in. In embodiments, provided herein is a self-contained 5G mobile telecommunications and edge computing platform having an identity management system for identifying, authenticating, and authorizing platform subscribers and having a system for enabling automatic clearance of data tracking. In embodiments, provided herein is a self-contained 5G mobile telecommunications and edge computing platform having an identity management system for identifying, authenticating, and authorizing platform subscribers and having a machine learning and/or artificial intelligence system for providing insights to users related to data-sharing management. In embodiments, provided herein is a self-contained 5G mobile telecommunications and edge computing platform having an identity management system for identifying, authenticating, and authorizing platform subscribers and having a privacy-controlled container on top of the base smartphone operating system to run services and applications. In embodiments, provided herein is a self-contained 5G mobile telecommunications and edge computing platform having an identity management system for identifying, authenticating, and authorizing platform subscribers and having virtualized operating system applications wherein the applications are run on a Type 1 Hypervisor having a real-time operating system. In embodiments, provided herein is a self-contained 5G mobile telecommunications and edge computing platform having an identity management system for identifying, authenticating, and authorizing platform subscribers and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having an identity management system for identifying, authenticating, and authorizing platform subscribers and having a forced operating system software update system for automatically forcing operating system software updates on the 5G mobile devices of platform subscribers. In embodiments, provided herein is a self-contained 5G mobile telecommunications and edge computing platform having an identity management system for identifying, authenticating, and authorizing platform subscribers and having a device registration system for registering a user device to a specific network segment. In embodiments, provided herein is a self-contained 5G mobile telecommunications and edge computing platform having an identity management system for identifying, authenticating, and authorizing platform subscribers and having a multi-static radar having beam forming MIMO antennas. In embodiments, provided herein is a self-contained 5G mobile telecommunications and edge computing platform having an identity management system for identifying, authenticating, and authorizing platform subscribers and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having an identity management system for identifying, authenticating, and authorizing platform subscribers and having a drone shield system for using a fleet of drones to form a dynamic barrier. In embodiments, provided herein is a self-contained 5G mobile telecommunications and edge computing platform having an identity management system for identifying, authenticating, and authorizing platform subscribers and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having an identity management system for identifying, authenticating, and authorizing platform subscribers and having a precision navigation and timing system that uses a network of low orbit earth satellites as a timing source. In embodiments, provided herein is a self-contained 5G mobile telecommunications and edge computing platform having an identity management system for identifying, authenticating, and authorizing platform subscribers and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having an identity management system for identifying, authenticating, and authorizing platform subscribers and having an augmented reality system that uses a machine learning and/or artificial intelligence system for providing a simulated environment. In embodiments, provided herein is a self-contained 5G mobile telecommunications and edge computing platform having an identity management system for identifying, authenticating, and authorizing platform subscribers and having a virtual reality system that uses a machine learning and/or artificial intelligence system for providing a simulated environment. In embodiments, provided herein is a self-contained 5G mobile telecommunications and edge computing platform having an identity management system for identifying, authenticating, and authorizing platform subscribers and having a customer relationship management system for managing communications with current and/or potential customers. In embodiments, provided herein is a self-contained 5G mobile telecommunications and edge computing platform having an identity management system for identifying, authenticating, and authorizing platform subscribers and having a remote surgery system having a system for providing haptic feedback related to a surgical procedure. In embodiments, provided herein is a self-contained 5G mobile telecommunications and edge computing platform having an identity management system for identifying, authenticating, and authorizing platform subscribers and having a remote driving system for controlling a remote vehicle and having a system for providing haptic feedback related to driving of the vehicle. In embodiments, provided herein is a self-contained 5G mobile telecommunications and edge computing platform having an identity management system for identifying, authenticating, and authorizing platform subscribers and having a remote machine operation system for controlling a remote machine and having a system for providing haptic feedback related to machine operation. In embodiments, provided herein is a self-contained 5G mobile telecommunications and edge computing platform having an identity management system for identifying, authenticating, and authorizing platform subscribers and having an electronic beam steering system to send targeted signals to receivers in 5G mobile devices.

In embodiments, provided herein is a self-contained 5G mobile telecommunications and edge computing platform having an authentication system having a risk-based authentication system that uses machine learning and/or artificial intelligence to determine the risk of user activity. In embodiments, provided herein is a self-contained 5G mobile telecommunications and edge computing platform having an authentication system having a risk-based authentication system that uses machine learning and/or artificial intelligence to determine the risk of user activity and having an authentication system having a system for providing multi-factor context aware authentication using machine learning and/or artificial intelligence and biometric identification. In embodiments, provided herein is a self-contained 5G mobile telecommunications and edge computing platform having an authentication system having a risk-based authentication system that uses machine learning and/or artificial intelligence to determine the risk of user activity and having a private blockchain for storing data. In embodiments, provided herein is a self-contained 5G mobile telecommunications and edge computing platform having an authentication system having a risk-based authentication system that uses machine learning and/or artificial intelligence to determine the risk of user activity and having a distributed ledger system for storing data. In embodiments, provided herein is a self-contained 5G mobile telecommunications and edge computing platform having an authentication system having a risk-based authentication system that uses machine learning and/or artificial intelligence to determine the risk of user activity and having a compile-time checkpoint module on each call model. In embodiments, provided herein is a self-contained 5G mobile telecommunications and edge computing platform having an authentication system having a risk-based authentication system that uses machine learning and/or artificial intelligence to determine the risk of user activity and having a data recording and reporting system for recording data related to detected anomalies and/or generating reports related to detected anomalies. In embodiments, provided herein is a self-contained 5G mobile telecommunications and edge computing platform having an authentication system having a risk-based authentication system that uses machine learning and/or artificial intelligence to determine the risk of user activity and having a system for enabling clean slate reset, wherein a clean slate reset may be performed by pre-established rules or by operator command. In embodiments, provided herein is a self-contained 5G mobile telecommunications and edge computing platform having an authentication system having a risk-based authentication system that uses machine learning and/or artificial intelligence to determine the risk of user activity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having an authentication system having a risk-based authentication system that uses machine learning and/or artificial intelligence to determine the risk of user activity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having an authentication system having a risk-based authentication system that uses machine learning and/or artificial intelligence to determine the risk of user activity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having an authentication system having a risk-based authentication system that uses machine learning and/or artificial intelligence to determine the risk of user activity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having an authentication system having a risk-based authentication system that uses machine learning and/or artificial intelligence to determine the risk of user activity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having an authentication system having a risk-based authentication system that uses machine learning and/or artificial intelligence to determine the risk of user activity and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having an authentication system having a risk-based authentication system that uses machine learning and/or artificial intelligence to determine the risk of user activity and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having an authentication system having a risk-based authentication system that uses machine learning and/or artificial intelligence to determine the risk of user activity and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having an authentication system having a risk-based authentication system that uses machine learning and/or artificial intelligence to determine the risk of user activity and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having an authentication system having a risk-based authentication system that uses machine learning and/or artificial intelligence to determine the risk of user activity and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having an authentication system having a risk-based authentication system that uses machine learning and/or artificial intelligence to determine the risk of user activity and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having an authentication system having a risk-based authentication system that uses machine learning and/or artificial intelligence to determine the risk of user activity and having a smart network slicing system for segmenting the network to align with unique application requirements. In embodiments, provided herein is a self-contained 5G mobile telecommunications and edge computing platform having an authentication system having a risk-based authentication system that uses machine learning and/or artificial intelligence to determine the risk of user activity and having a quantum encryption system for enabling quantum encryption and decryption. In embodiments, provided herein is a self-contained 5G mobile telecommunications and edge computing platform having an authentication system having a risk-based authentication system that uses machine learning and/or artificial intelligence to determine the risk of user activity and having a certificate authority for issuing digital certificates. In embodiments, provided herein is a self-contained 5G mobile telecommunications and edge computing platform having an authentication system having a risk-based authentication system that uses machine learning and/or artificial intelligence to determine the risk of user activity and having a system for providing cyber security in space. In embodiments, provided herein is a self-contained 5G mobile telecommunications and edge computing platform having an authentication system having a risk-based authentication system that uses machine learning and/or artificial intelligence to determine the risk of user activity and having secure session initiation protocol security mechanisms. In embodiments, provided herein is a self-contained 5G mobile telecommunications and edge computing platform having an authentication system having a risk-based authentication system that uses machine learning and/or artificial intelligence to determine the risk of user activity and having a management and orchestration system for coordinating network resources for applications and the lifecycle management of virtual network functions. In embodiments, provided herein is a self-contained 5G mobile telecommunications and edge computing platform having an authentication system having a risk-based authentication system that uses machine learning and/or artificial intelligence to determine the risk of user activity and having a dashboard and/or application programming interface for orchestration and management of a 5G network. In embodiments, provided herein is a self-contained 5G mobile telecommunications and edge computing platform having an authentication system having a risk-based authentication system that uses machine learning and/or artificial intelligence to determine the risk of user activity and having a system for identifying user information collected by a source, generating a notification and/or report related the collected user information, and sending the notification and/or report to the user. In embodiments, provided herein is a self-contained 5G mobile telecommunications and edge computing platform having an authentication system having a risk-based authentication system that uses machine learning and/or artificial intelligence to determine the risk of user activity and having a system for enabling a user to limit the degree to which information is shared with websites and applications. In embodiments, provided herein is a self-contained 5G mobile telecommunications and edge computing platform having an authentication system having a risk-based authentication system that uses machine learning and/or artificial intelligence to determine the risk of user activity and having a system for blocking data flow between specific manufacturers unless a user opts in. In embodiments, provided herein is a self-contained 5G mobile telecommunications and edge computing platform having an authentication system having a risk-based authentication system that uses machine learning and/or artificial intelligence to determine the risk of user activity and having a system for enabling automatic clearance of data tracking. In embodiments, provided herein is a self-contained 5G mobile telecommunications and edge computing platform having an authentication system having a risk-based authentication system that uses machine learning and/or artificial intelligence to determine the risk of user activity and having a machine learning and/or artificial intelligence system for providing insights to users related to data-sharing management. In embodiments, provided herein is a self-contained 5G mobile telecommunications and edge computing platform having an authentication system having a risk-based authentication system that uses machine learning and/or artificial intelligence to determine the risk of user activity and having a privacy-controlled container on top of the base smartphone operating system to run services and applications. In embodiments, provided herein is a self-contained 5G mobile telecommunications and edge computing platform having an authentication system having a risk-based authentication system that uses machine learning and/or artificial intelligence to determine the risk of user activity and having virtualized operating system applications wherein the applications are run on a Type 1 Hypervisor having a real-time operating system. In embodiments, provided herein is a self-contained 5G mobile telecommunications and edge computing platform having an authentication system having a risk-based authentication system that uses machine learning and/or artificial intelligence to determine the risk of user activity and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having an authentication system having a risk-based authentication system that uses machine learning and/or artificial intelligence to determine the risk of user activity and having a forced operating system software update system for automatically forcing operating system software updates on the 5G mobile devices of platform subscribers. In embodiments, provided herein is a self-contained 5G mobile telecommunications and edge computing platform having an authentication system having a risk-based authentication system that uses machine learning and/or artificial intelligence to determine the risk of user activity and having a device registration system for registering a user device to a specific network segment. In embodiments, provided herein is a self-contained 5G mobile telecommunications and edge computing platform having an authentication system having a risk-based authentication system that uses machine learning and/or artificial intelligence to determine the risk of user activity and having a multi-static radar having beam forming MIMO antennas. In embodiments, provided herein is a self-contained 5G mobile telecommunications and edge computing platform having an authentication system having a risk-based authentication system that uses machine learning and/or artificial intelligence to determine the risk of user activity and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having an authentication system having a risk-based authentication system that uses machine learning and/or artificial intelligence to determine the risk of user activity and having a drone shield system for using a fleet of drones to form a dynamic barrier. In embodiments, provided herein is a self-contained 5G mobile telecommunications and edge computing platform having an authentication system having a risk-based authentication system that uses machine learning and/or artificial intelligence to determine the risk of user activity and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having an authentication system having a risk-based authentication system that uses machine learning and/or artificial intelligence to determine the risk of user activity and having a precision navigation and timing system that uses a network of low orbit earth satellites as a timing source. In embodiments, provided herein is a self-contained 5G mobile telecommunications and edge computing platform having an authentication system having a risk-based authentication system that uses machine learning and/or artificial intelligence to determine the risk of user activity and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having an authentication system having a risk-based authentication system that uses machine learning and/or artificial intelligence to determine the risk of user activity and having an augmented reality system that uses a machine learning and/or artificial intelligence system for providing a simulated environment. In embodiments, provided herein is a self-contained 5G mobile telecommunications and edge computing platform having an authentication system having a risk-based authentication system that uses machine learning and/or artificial intelligence to determine the risk of user activity and having a virtual reality system that uses a machine learning and/or artificial intelligence system for providing a simulated environment. In embodiments, provided herein is a self-contained 5G mobile telecommunications and edge computing platform having an authentication system having a risk-based authentication system that uses machine learning and/or artificial intelligence to determine the risk of user activity and having a customer relationship management system for managing communications with current and/or potential customers. In embodiments, provided herein is a self-contained 5G mobile telecommunications and edge computing platform having an authentication system having a risk-based authentication system that uses machine learning and/or artificial intelligence to determine the risk of user activity and having a remote surgery system having a system for providing haptic feedback related to a surgical procedure. In embodiments, provided herein is a self-contained 5G mobile telecommunications and edge computing platform having an authentication system having a risk-based authentication system that uses machine learning and/or artificial intelligence to determine the risk of user activity and having a remote driving system for controlling a remote vehicle and having a system for providing haptic feedback related to driving of the vehicle. In embodiments, provided herein is a self-contained 5G mobile telecommunications and edge computing platform having an authentication system having a risk-based authentication system that uses machine learning and/or artificial intelligence to determine the risk of user activity and having a remote machine operation system for controlling a remote machine and having a system for providing haptic feedback related to machine operation. In embodiments, provided herein is a self-contained 5G mobile telecommunications and edge computing platform having an authentication system having a risk-based authentication system that uses machine learning and/or artificial intelligence to determine the risk of user activity and having an electronic beam steering system to send targeted signals to receivers in 5G mobile devices.

In embodiments, provided herein is a self-contained 5G mobile telecommunications and edge computing platform having an authentication system having a system for providing multi-factor context aware authentication using machine learning and/or artificial intelligence and biometric identification. In embodiments, provided herein is a self-contained 5G mobile telecommunications and edge computing platform having an authentication system having a system for providing multi-factor context aware authentication using machine learning and/or artificial intelligence and biometric identification and having a private blockchain for storing data. In embodiments, provided herein is a self-contained 5G mobile telecommunications and edge computing platform having an authentication system having a system for providing multi-factor context aware authentication using machine learning and/or artificial intelligence and biometric identification and having a distributed ledger system for storing data. In embodiments, provided herein is a self-contained 5G mobile telecommunications and edge computing platform having an authentication system having a system for providing multi-factor context aware authentication using machine learning and/or artificial intelligence and biometric identification and having a compile-time checkpoint module on each call model. In embodiments, provided herein is a self-contained 5G mobile telecommunications and edge computing platform having an authentication system having a system for providing multi-factor context aware authentication using machine learning and/or artificial intelligence and biometric identification and having a data recording and reporting system for recording data related to detected anomalies and/or generating reports related to detected anomalies. In embodiments, provided herein is a self-contained 5G mobile telecommunications and edge computing platform having an authentication system having a system for providing multi-factor context aware authentication using machine learning and/or artificial intelligence and biometric identification and having a system for enabling clean slate reset, wherein a clean slate reset may be performed by pre-established rules or by operator command. In embodiments, provided herein is a self-contained 5G mobile telecommunications and edge computing platform having an authentication system having a system for providing multi-factor context aware authentication using machine learning and/or artificial intelligence and biometric identification and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having an authentication system having a system for providing multi-factor context aware authentication using machine learning and/or artificial intelligence and biometric identification and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having an authentication system having a system for providing multi-factor context aware authentication using machine learning and/or artificial intelligence and biometric identification and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having an authentication system having a system for providing multi-factor context aware authentication using machine learning and/or artificial intelligence and biometric identification and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having an authentication system having a system for providing multi-factor context aware authentication using machine learning and/or artificial intelligence and biometric identification and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having an authentication system having a system for providing multi-factor context aware authentication using machine learning and/or artificial intelligence and biometric identification and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having an authentication system having a system for providing multi-factor context aware authentication using machine learning and/or artificial intelligence and biometric identification and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having an authentication system having a system for providing multi-factor context aware authentication using machine learning and/or artificial intelligence and biometric identification and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having an authentication system having a system for providing multi-factor context aware authentication using machine learning and/or artificial intelligence and biometric identification and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having an authentication system having a system for providing multi-factor context aware authentication using machine learning and/or artificial intelligence and biometric identification and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having an authentication system having a system for providing multi-factor context aware authentication using machine learning and/or artificial intelligence and biometric identification and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having an authentication system having a system for providing multi-factor context aware authentication using machine learning and/or artificial intelligence and biometric identification and having a smart network slicing system for segmenting the network to align with unique application requirements. In embodiments, provided herein is a self-contained 5G mobile telecommunications and edge computing platform having an authentication system having a system for providing multi-factor context aware authentication using machine learning and/or artificial intelligence and biometric identification and having a quantum encryption system for enabling quantum encryption and decryption. In embodiments, provided herein is a self-contained 5G mobile telecommunications and edge computing platform having an authentication system having a system for providing multi-factor context aware authentication using machine learning and/or artificial intelligence and biometric identification and having a certificate authority for issuing digital certificates. In embodiments, provided herein is a self-contained 5G mobile telecommunications and edge computing platform having an authentication system having a system for providing multi-factor context aware authentication using machine learning and/or artificial intelligence and biometric identification and having a system for providing cyber security in space. In embodiments, provided herein is a self-contained 5G mobile telecommunications and edge computing platform having an authentication system having a system for providing multi-factor context aware authentication using machine learning and/or artificial intelligence and biometric identification and having secure session initiation protocol security mechanisms. In embodiments, provided herein is a self-contained 5G mobile telecommunications and edge computing platform having an authentication system having a system for providing multi-factor context aware authentication using machine learning and/or artificial intelligence and biometric identification and having a management and orchestration system for coordinating network resources for applications and the lifecycle management of virtual network functions. In embodiments, provided herein is a self-contained 5G mobile telecommunications and edge computing platform having an authentication system having a system for providing multi-factor context aware authentication using machine learning and/or artificial intelligence and biometric identification and having a dashboard and/or application programming interface for orchestration and management of a 5G network. In embodiments, provided herein is a self-contained 5G mobile telecommunications and edge computing platform having an authentication system having a system for providing multi-factor context aware authentication using machine learning and/or artificial intelligence and biometric identification and having a system for identifying user information collected by a source, generating a notification and/or report related the collected user information, and sending the notification and/or report to the user. In embodiments, provided herein is a self-contained 5G mobile telecommunications and edge computing platform having an authentication system having a system for providing multi-factor context aware authentication using machine learning and/or artificial intelligence and biometric identification and having a system for enabling a user to limit the degree to which information is shared with websites and applications. In embodiments, provided herein is a self-contained 5G mobile telecommunications and edge computing platform having an authentication system having a system for providing multi-factor context aware authentication using machine learning and/or artificial intelligence and biometric identification and having a system for blocking data flow between specific manufacturers unless a user opts in. In embodiments, provided herein is a self-contained 5G mobile telecommunications and edge computing platform having an authentication system having a system for providing multi-factor context aware authentication using machine learning and/or artificial intelligence and biometric identification and having a system for enabling automatic clearance of data tracking. In embodiments, provided herein is a self-contained 5G mobile telecommunications and edge computing platform having an authentication system having a system for providing multi-factor context aware authentication using machine learning and/or artificial intelligence and biometric identification and having a machine learning and/or artificial intelligence system for providing insights to users related to data-sharing management. In embodiments, provided herein is a self-contained 5G mobile telecommunications and edge computing platform having an authentication system having a system for providing multi-factor context aware authentication using machine learning and/or artificial intelligence and biometric identification and having a privacy-controlled container on top of the base smartphone operating system to run services and applications. In embodiments, provided herein is a self-contained 5G mobile telecommunications and edge computing platform having an authentication system having a system for providing multi-factor context aware authentication using machine learning and/or artificial intelligence and biometric identification and having virtualized operating system applications wherein the applications are run on a Type 1 Hypervisor having a real-time operating system. In embodiments, provided herein is a self-contained 5G mobile telecommunications and edge computing platform having an authentication system having a system for providing multi-factor context aware authentication using machine learning and/or artificial intelligence and biometric identification and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having an authentication system having a system for providing multi-factor context aware authentication using machine learning and/or artificial intelligence and biometric identification and having a forced operating system software update system for automatically forcing operating system software updates on the 5G mobile devices of platform subscribers. In embodiments, provided herein is a self-contained 5G mobile telecommunications and edge computing platform having an authentication system having a system for providing multi-factor context aware authentication using machine learning and/or artificial intelligence and biometric identification and having a device registration system for registering a user device to a specific network segment. In embodiments, provided herein is a self-contained 5G mobile telecommunications and edge computing platform having an authentication system having a system for providing multi-factor context aware authentication using machine learning and/or artificial intelligence and biometric identification and having a multi-static radar having beam forming MIMO antennas. In embodiments, provided herein is a self-contained 5G mobile telecommunications and edge computing platform having an authentication system having a system for providing multi-factor context aware authentication using machine learning and/or artificial intelligence and biometric identification and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having an authentication system having a system for providing multi-factor context aware authentication using machine learning and/or artificial intelligence and biometric identification and having a drone shield system for using a fleet of drones to form a dynamic barrier. In embodiments, provided herein is a self-contained 5G mobile telecommunications and edge computing platform having an authentication system having a system for providing multi-factor context aware authentication using machine learning and/or artificial intelligence and biometric identification and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having an authentication system having a system for providing multi-factor context aware authentication using machine learning and/or artificial intelligence and biometric identification and having a precision navigation and timing system that uses a network of low orbit earth satellites as a timing source. In embodiments, provided herein is a self-contained 5G mobile telecommunications and edge computing platform having an authentication system having a system for providing multi-factor context aware authentication using machine learning and/or artificial intelligence and biometric identification and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having an authentication system having a system for providing multi-factor context aware authentication using machine learning and/or artificial intelligence and biometric identification and having an augmented reality system that uses a machine learning and/or artificial intelligence system for providing a simulated environment. In embodiments, provided herein is a self-contained 5G mobile telecommunications and edge computing platform having an authentication system having a system for providing multi-factor context aware authentication using machine learning and/or artificial intelligence and biometric identification and having a virtual reality system that uses a machine learning and/or artificial intelligence system for providing a simulated environment. In embodiments, provided herein is a self-contained 5G mobile telecommunications and edge computing platform having an authentication system having a system for providing multi-factor context aware authentication using machine learning and/or artificial intelligence and biometric identification and having a customer relationship management system for managing communications with current and/or potential customers. In embodiments, provided herein is a self-contained 5G mobile telecommunications and edge computing platform having an authentication system having a system for providing multi-factor context aware authentication using machine learning and/or artificial intelligence and biometric identification and having a remote surgery system having a system for providing haptic feedback related to a surgical procedure. In embodiments, provided herein is a self-contained 5G mobile telecommunications and edge computing platform having an authentication system having a system for providing multi-factor context aware authentication using machine learning and/or artificial intelligence and biometric identification and having a remote driving system for controlling a remote vehicle and having a system for providing haptic feedback related to driving of the vehicle. In embodiments, provided herein is a self-contained 5G mobile telecommunications and edge computing platform having an authentication system having a system for providing multi-factor context aware authentication using machine learning and/or artificial intelligence and biometric identification and having a remote machine operation system for controlling a remote machine and having a system for providing haptic feedback related to machine operation. In embodiments, provided herein is a self-contained 5G mobile telecommunications and edge computing platform having an authentication system having a system for providing multi-factor context aware authentication using machine learning and/or artificial intelligence and biometric identification and having an electronic beam steering system to send targeted signals to receivers in 5G mobile devices.

In embodiments, provided herein is a self-contained 5G mobile telecommunications and edge computing platform having a private blockchain for storing data. In embodiments, provided herein is a self-contained 5G mobile telecommunications and edge computing platform having a private blockchain for storing data and having a distributed ledger system for storing data. In embodiments, provided herein is a self-contained 5G mobile telecommunications and edge computing platform having a private blockchain for storing data and having a compile-time checkpoint module on each call model. In embodiments, provided herein is a self-contained 5G mobile telecommunications and edge computing platform having a private blockchain for storing data and having a data recording and reporting system for recording data related to detected anomalies and/or generating reports related to detected anomalies. In embodiments, provided herein is a self-contained 5G mobile telecommunications and edge computing platform having a private blockchain for storing data and having a system for enabling clean slate reset, wherein a clean slate reset may be performed by pre-established rules or by operator command. In embodiments, provided herein is a self-contained 5G mobile telecommunications and edge computing platform having a private blockchain for storing data and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a private blockchain for storing data and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a private blockchain for storing data and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a private blockchain for storing data and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a private blockchain for storing data and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a private blockchain for storing data and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a private blockchain for storing data and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a private blockchain for storing data and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a private blockchain for storing data and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a private blockchain for storing data and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a private blockchain for storing data and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a private blockchain for storing data and having a smart network slicing system for segmenting the network to align with unique application requirements. In embodiments, provided herein is a self-contained 5G mobile telecommunications and edge computing platform having a private blockchain for storing data and having a quantum encryption system for enabling quantum encryption and decryption. In embodiments, provided herein is a self-contained 5G mobile telecommunications and edge computing platform having a private blockchain for storing data and having a certificate authority for issuing digital certificates. In embodiments, provided herein is a self-contained 5G mobile telecommunications and edge computing platform having a private blockchain for storing data and having a system for providing cyber security in space. In embodiments, provided herein is a self-contained 5G mobile telecommunications and edge computing platform having a private blockchain for storing data and having secure session initiation protocol security mechanisms. In embodiments, provided herein is a self-contained 5G mobile telecommunications and edge computing platform having a private blockchain for storing data and having a management and orchestration system for coordinating network resources for applications and the lifecycle management of virtual network functions. In embodiments, provided herein is a self-contained 5G mobile telecommunications and edge computing platform having a private blockchain for storing data and having a dashboard and/or application programming interface for orchestration and management of a 5G network. In embodiments, provided herein is a self-contained 5G mobile telecommunications and edge computing platform having a private blockchain for storing data and having a system for identifying user information collected by a source, generating a notification and/or report related the collected user information, and sending the notification and/or report to the user. In embodiments, provided herein is a self-contained 5G mobile telecommunications and edge computing platform having a private blockchain for storing data and having a system for enabling a user to limit the degree to which information is shared with websites and applications. In embodiments, provided herein is a self-contained 5G mobile telecommunications and edge computing platform having a private blockchain for storing data and having a system for blocking data flow between specific manufacturers unless a user opts in. In embodiments, provided herein is a self-contained 5G mobile telecommunications and edge computing platform having a private blockchain for storing data and having a system for enabling automatic clearance of data tracking. In embodiments, provided herein is a self-contained 5G mobile telecommunications and edge computing platform having a private blockchain for storing data and having a machine learning and/or artificial intelligence system for providing insights to users related to data-sharing management. In embodiments, provided herein is a self-contained 5G mobile telecommunications and edge computing platform having a private blockchain for storing data and having a privacy-controlled container on top of the base smartphone operating system to run services and applications. In embodiments, provided herein is a self-contained 5G mobile telecommunications and edge computing platform having a private blockchain for storing data and having virtualized operating system applications wherein the applications are run on a Type 1 Hypervisor having a real-time operating system. In embodiments, provided herein is a self-contained 5G mobile telecommunications and edge computing platform having a private blockchain for storing data and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a private blockchain for storing data and having a forced operating system software update system for automatically forcing operating system software updates on the 5G mobile devices of platform subscribers. In embodiments, provided herein is a self-contained 5G mobile telecommunications and edge computing platform having a private blockchain for storing data and having a device registration system for registering a user device to a specific network segment. In embodiments, provided herein is a self-contained 5G mobile telecommunications and edge computing platform having a private blockchain for storing data and having a multi-static radar having beam forming MIMO antennas. In embodiments, provided herein is a self-contained 5G mobile telecommunications and edge computing platform having a private blockchain for storing data and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a private blockchain for storing data and having a drone shield system for using a fleet of drones to form a dynamic barrier. In embodiments, provided herein is a self-contained 5G mobile telecommunications and edge computing platform having a private blockchain for storing data and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a private blockchain for storing data and having a precision navigation and timing system that uses a network of low orbit earth satellites as a timing source. In embodiments, provided herein is a self-contained 5G mobile telecommunications and edge computing platform having a private blockchain for storing data and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a private blockchain for storing data and having an augmented reality system that uses a machine learning and/or artificial intelligence system for providing a simulated environment. In embodiments, provided herein is a self-contained 5G mobile telecommunications and edge computing platform having a private blockchain for storing data and having a virtual reality system that uses a machine learning and/or artificial intelligence system for providing a simulated environment. In embodiments, provided herein is a self-contained 5G mobile telecommunications and edge computing platform having a private blockchain for storing data and having a customer relationship management system for managing communications with current and/or potential customers. In embodiments, provided herein is a self-contained 5G mobile telecommunications and edge computing platform having a private blockchain for storing data and having a remote surgery system having a system for providing haptic feedback related to a surgical procedure. In embodiments, provided herein is a self-contained 5G mobile telecommunications and edge computing platform having a private blockchain for storing data and having a remote driving system for controlling a remote vehicle and having a system for providing haptic feedback related to driving of the vehicle. In embodiments, provided herein is a self-contained 5G mobile telecommunications and edge computing platform having a private blockchain for storing data and having a remote machine operation system for controlling a remote machine and having a system for providing haptic feedback related to machine operation. In embodiments, provided herein is a self-contained 5G mobile telecommunications and edge computing platform having a private blockchain for storing data and having an electronic beam steering system to send targeted signals to receivers in 5G mobile devices.

In embodiments, provided herein is a self-contained 5G mobile telecommunications and edge computing platform having a distributed ledger system for storing data. In embodiments, provided herein is a self-contained 5G mobile telecommunications and edge computing platform having a distributed ledger system for storing data and having a compile-time checkpoint module on each call model. In embodiments, provided herein is a self-contained 5G mobile telecommunications and edge computing platform having a distributed ledger system for storing data and having a data recording and reporting system for recording data related to detected anomalies and/or generating reports related to detected anomalies. In embodiments, provided herein is a self-contained 5G mobile telecommunications and edge computing platform having a distributed ledger system for storing data and having a system for enabling clean slate reset, wherein a clean slate reset may be performed by pre-established rules or by operator command. In embodiments, provided herein is a self-contained 5G mobile telecommunications and edge computing platform having a distributed ledger system for storing data and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a distributed ledger system for storing data and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a distributed ledger system for storing data and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a distributed ledger system for storing data and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a distributed ledger system for storing data and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a distributed ledger system for storing data and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a distributed ledger system for storing data and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a distributed ledger system for storing data and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a distributed ledger system for storing data and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a distributed ledger system for storing data and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a distributed ledger system for storing data and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a distributed ledger system for storing data and having a smart network slicing system for segmenting the network to align with unique application requirements. In embodiments, provided herein is a self-contained 5G mobile telecommunications and edge computing platform having a distributed ledger system for storing data and having a quantum encryption system for enabling quantum encryption and decryption. In embodiments, provided herein is a self-contained 5G mobile telecommunications and edge computing platform having a distributed ledger system for storing data and having a certificate authority for issuing digital certificates. In embodiments, provided herein is a self-contained 5G mobile telecommunications and edge computing platform having a distributed ledger system for storing data and having a system for providing cyber security in space. In embodiments, provided herein is a self-contained 5G mobile telecommunications and edge computing platform having a distributed ledger system for storing data and having secure session initiation protocol security mechanisms. In embodiments, provided herein is a self-contained 5G mobile telecommunications and edge computing platform having a distributed ledger system for storing data and having a management and orchestration system for coordinating network resources for applications and the lifecycle management of virtual network functions. In embodiments, provided herein is a self-contained 5G mobile telecommunications and edge computing platform having a distributed ledger system for storing data and having a dashboard and/or application programming interface for orchestration and management of a 5G network. In embodiments, provided herein is a self-contained 5G mobile telecommunications and edge computing platform having a distributed ledger system for storing data and having a system for identifying user information collected by a source, generating a notification and/or report related the collected user information, and sending the notification and/or report to the user. In embodiments, provided herein is a self-contained 5G mobile telecommunications and edge computing platform having a distributed ledger system for storing data and having a system for enabling a user to limit the degree to which information is shared with websites and applications. In embodiments, provided herein is a self-contained 5G mobile telecommunications and edge computing platform having a distributed ledger system for storing data and having a system for blocking data flow between specific manufacturers unless a user opts in. In embodiments, provided herein is a self-contained 5G mobile telecommunications and edge computing platform having a distributed ledger system for storing data and having a system for enabling automatic clearance of data tracking. In embodiments, provided herein is a self-contained 5G mobile telecommunications and edge computing platform having a distributed ledger system for storing data and having a machine learning and/or artificial intelligence system for providing insights to users related to data-sharing management. In embodiments, provided herein is a self-contained 5G mobile telecommunications and edge computing platform having a distributed ledger system for storing data and having a privacy-controlled container on top of the base smartphone operating system to run services and applications. In embodiments, provided herein is a self-contained 5G mobile telecommunications and edge computing platform having a distributed ledger system for storing data and having virtualized operating system applications wherein the applications are run on a Type 1 Hypervisor having a real-time operating system. In embodiments, provided herein is a self-contained 5G mobile telecommunications and edge computing platform having a distributed ledger system for storing data and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a distributed ledger system for storing data and having a forced operating system software update system for automatically forcing operating system software updates on the 5G mobile devices of platform subscribers. In embodiments, provided herein is a self-contained 5G mobile telecommunications and edge computing platform having a distributed ledger system for storing data and having a device registration system for registering a user device to a specific network segment. In embodiments, provided herein is a self-contained 5G mobile telecommunications and edge computing platform having a distributed ledger system for storing data and having a multi-static radar having beam forming MIMO antennas. In embodiments, provided herein is a self-contained 5G mobile telecommunications and edge computing platform having a distributed ledger system for storing data and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a distributed ledger system for storing data and having a drone shield system for using a fleet of drones to form a dynamic barrier. In embodiments, provided herein is a self-contained 5G mobile telecommunications and edge computing platform having a distributed ledger system for storing data and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a distributed ledger system for storing data and having a precision navigation and timing system that uses a network of low orbit earth satellites as a timing source. In embodiments, provided herein is a self-contained 5G mobile telecommunications and edge computing platform having a distributed ledger system for storing data and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a distributed ledger system for storing data and having an augmented reality system that uses a machine learning and/or artificial intelligence system for providing a simulated environment. In embodiments, provided herein is a self-contained 5G mobile telecommunications and edge computing platform having a distributed ledger system for storing data and having a virtual reality system that uses a machine learning and/or artificial intelligence system for providing a simulated environment. In embodiments, provided herein is a self-contained 5G mobile telecommunications and edge computing platform having a distributed ledger system for storing data and having a customer relationship management system for managing communications with current and/or potential customers. In embodiments, provided herein is a self-contained 5G mobile telecommunications and edge computing platform having a distributed ledger system for storing data and having a remote surgery system having a system for providing haptic feedback related to a surgical procedure. In embodiments, provided herein is a self-contained 5G mobile telecommunications and edge computing platform having a distributed ledger system for storing data and having a remote driving system for controlling a remote vehicle and having a system for providing haptic feedback related to driving of the vehicle. In embodiments, provided herein is a self-contained 5G mobile telecommunications and edge computing platform having a distributed ledger system for storing data and having a remote machine operation system for controlling a remote machine and having a system for providing haptic feedback related to machine operation. In embodiments, provided herein is a self-contained 5G mobile telecommunications and edge computing platform having a distributed ledger system for storing data and having an electronic beam steering system to send targeted signals to receivers in 5G mobile devices.

In embodiments, provided herein is a self-contained 5G mobile telecommunications and edge computing platform having a compile-time checkpoint module on each call model. In embodiments, provided herein is a self-contained 5G mobile telecommunications and edge computing platform having a compile-time checkpoint module on each call model and having a data recording and reporting system for recording data related to detected anomalies and/or generating reports related to detected anomalies. In embodiments, provided herein is a self-contained 5G mobile telecommunications and edge computing platform having a compile-time checkpoint module on each call model and having a system for enabling clean slate reset, wherein a clean slate reset may be performed by pre-established rules or by operator command. In embodiments, provided herein is a self-contained 5G mobile telecommunications and edge computing platform having a compile-time checkpoint module on each call model and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a compile-time checkpoint module on each call model and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a compile-time checkpoint module on each call model and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a compile-time checkpoint module on each call model and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a compile-time checkpoint module on each call model and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a compile-time checkpoint module on each call model and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a compile-time checkpoint module on each call model and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a compile-time checkpoint module on each call model and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a compile-time checkpoint module on each call model and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a compile-time checkpoint module on each call model and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a compile-time checkpoint module on each call model and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a compile-time checkpoint module on each call model and having a smart network slicing system for segmenting the network to align with unique application requirements. In embodiments, provided herein is a self-contained 5G mobile telecommunications and edge computing platform having a compile-time checkpoint module on each call model and having a quantum encryption system for enabling quantum encryption and decryption. In embodiments, provided herein is a self-contained 5G mobile telecommunications and edge computing platform having a compile-time checkpoint module on each call model and having a certificate authority for issuing digital certificates. In embodiments, provided herein is a self-contained 5G mobile telecommunications and edge computing platform having a compile-time checkpoint module on each call model and having a system for providing cyber security in space. In embodiments, provided herein is a self-contained 5G mobile telecommunications and edge computing platform having a compile-time checkpoint module on each call model and having secure session initiation protocol security mechanisms. In embodiments, provided herein is a self-contained 5G mobile telecommunications and edge computing platform having a compile-time checkpoint module on each call model and having a management and orchestration system for coordinating network resources for applications and the lifecycle management of virtual network functions. In embodiments, provided herein is a self-contained 5G mobile telecommunications and edge computing platform having a compile-time checkpoint module on each call model and having a dashboard and/or application programming interface for orchestration and management of a 5G network. In embodiments, provided herein is a self-contained 5G mobile telecommunications and edge computing platform having a compile-time checkpoint module on each call model and having a system for identifying user information collected by a source, generating a notification and/or report related the collected user information, and sending the notification and/or report to the user. In embodiments, provided herein is a self-contained 5G mobile telecommunications and edge computing platform having a compile-time checkpoint module on each call model and having a system for enabling a user to limit the degree to which information is shared with websites and applications. In embodiments, provided herein is a self-contained 5G mobile telecommunications and edge computing platform having a compile-time checkpoint module on each call model and having a system for blocking data flow between specific manufacturers unless a user opts in. In embodiments, provided herein is a self-contained 5G mobile telecommunications and edge computing platform having a compile-time checkpoint module on each call model and having a system for enabling automatic clearance of data tracking. In embodiments, provided herein is a self-contained 5G mobile telecommunications and edge computing platform having a compile-time checkpoint module on each call model and having a machine learning and/or artificial intelligence system for providing insights to users related to data-sharing management. In embodiments, provided herein is a self-contained 5G mobile telecommunications and edge computing platform having a compile-time checkpoint module on each call model and having a privacy-controlled container on top of the base smartphone operating system to run services and applications. In embodiments, provided herein is a self-contained 5G mobile telecommunications and edge computing platform having a compile-time checkpoint module on each call model and having virtualized operating system applications wherein the applications are run on a Type 1 Hypervisor having a real-time operating system. In embodiments, provided herein is a self-contained 5G mobile telecommunications and edge computing platform having a compile-time checkpoint module on each call model and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a compile-time checkpoint module on each call model and having a forced operating system software update system for automatically forcing operating system software updates on the 5G mobile devices of platform subscribers. In embodiments, provided herein is a self-contained 5G mobile telecommunications and edge computing platform having a compile-time checkpoint module on each call model and having a device registration system for registering a user device to a specific network segment. In embodiments, provided herein is a self-contained 5G mobile telecommunications and edge computing platform having a compile-time checkpoint module on each call model and having a multi-static radar having beam forming MIMO antennas. In embodiments, provided herein is a self-contained 5G mobile telecommunications and edge computing platform having a compile-time checkpoint module on each call model and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a compile-time checkpoint module on each call model and having a drone shield system for using a fleet of drones to form a dynamic barrier. In embodiments, provided herein is a self-contained 5G mobile telecommunications and edge computing platform having a compile-time checkpoint module on each call model and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a compile-time checkpoint module on each call model and having a precision navigation and timing system that uses a network of low orbit earth satellites as a timing source. In embodiments, provided herein is a self-contained 5G mobile telecommunications and edge computing platform having a compile-time checkpoint module on each call model and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a compile-time checkpoint module on each call model and having an augmented reality system that uses a machine learning and/or artificial intelligence system for providing a simulated environment. In embodiments, provided herein is a self-contained 5G mobile telecommunications and edge computing platform having a compile-time checkpoint module on each call model and having a virtual reality system that uses a machine learning and/or artificial intelligence system for providing a simulated environment. In embodiments, provided herein is a self-contained 5G mobile telecommunications and edge computing platform having a compile-time checkpoint module on each call model and having a customer relationship management system for managing communications with current and/or potential customers. In embodiments, provided herein is a self-contained 5G mobile telecommunications and edge computing platform having a compile-time checkpoint module on each call model and having a remote surgery system having a system for providing haptic feedback related to a surgical procedure. In embodiments, provided herein is a self-contained 5G mobile telecommunications and edge computing platform having a compile-time checkpoint module on each call model and having a remote driving system for controlling a remote vehicle and having a system for providing haptic feedback related to driving of the vehicle. In embodiments, provided herein is a self-contained 5G mobile telecommunications and edge computing platform having a compile-time checkpoint module on each call model and having a remote machine operation system for controlling a remote machine and having a system for providing haptic feedback related to machine operation. In embodiments, provided herein is a self-contained 5G mobile telecommunications and edge computing platform having a compile-time checkpoint module on each call model and having an electronic beam steering system to send targeted signals to receivers in 5G mobile devices.

In embodiments, provided herein is a self-contained 5G mobile telecommunications and edge computing platform having a data recording and reporting system for recording data related to detected anomalies and/or generating reports related to detected anomalies. In embodiments, provided herein is a self-contained 5G mobile telecommunications and edge computing platform having a data recording and reporting system for recording data related to detected anomalies and/or generating reports related to detected anomalies and having a system for enabling clean slate reset, wherein a clean slate reset may be performed by pre-established rules or by operator command. In embodiments, provided herein is a self-contained 5G mobile telecommunications and edge computing platform having a data recording and reporting system for recording data related to detected anomalies and/or generating reports related to detected anomalies and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a data recording and reporting system for recording data related to detected anomalies and/or generating reports related to detected anomalies and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a data recording and reporting system for recording data related to detected anomalies and/or generating reports related to detected anomalies and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a data recording and reporting system for recording data related to detected anomalies and/or generating reports related to detected anomalies and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a data recording and reporting system for recording data related to detected anomalies and/or generating reports related to detected anomalies and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a data recording and reporting system for recording data related to detected anomalies and/or generating reports related to detected anomalies and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a data recording and reporting system for recording data related to detected anomalies and/or generating reports related to detected anomalies and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a data recording and reporting system for recording data related to detected anomalies and/or generating reports related to detected anomalies and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a data recording and reporting system for recording data related to detected anomalies and/or generating reports related to detected anomalies and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a data recording and reporting system for recording data related to detected anomalies and/or generating reports related to detected anomalies and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a data recording and reporting system for recording data related to detected anomalies and/or generating reports related to detected anomalies and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a data recording and reporting system for recording data related to detected anomalies and/or generating reports related to detected anomalies and having a smart network slicing system for segmenting the network to align with unique application requirements. In embodiments, provided herein is a self-contained 5G mobile telecommunications and edge computing platform having a data recording and reporting system for recording data related to detected anomalies and/or generating reports related to detected anomalies and having a quantum encryption system for enabling quantum encryption and decryption. In embodiments, provided herein is a self-contained 5G mobile telecommunications and edge computing platform having a data recording and reporting system for recording data related to detected anomalies and/or generating reports related to detected anomalies and having a certificate authority for issuing digital certificates. In embodiments, provided herein is a self-contained 5G mobile telecommunications and edge computing platform having a data recording and reporting system for recording data related to detected anomalies and/or generating reports related to detected anomalies and having a system for providing cyber security in space. In embodiments, provided herein is a self-contained 5G mobile telecommunications and edge computing platform having a data recording and reporting system for recording data related to detected anomalies and/or generating reports related to detected anomalies and having secure session initiation protocol security mechanisms. In embodiments, provided herein is a self-contained 5G mobile telecommunications and edge computing platform having a data recording and reporting system for recording data related to detected anomalies and/or generating reports related to detected anomalies and having a management and orchestration system for coordinating network resources for applications and the lifecycle management of virtual network functions. In embodiments, provided herein is a self-contained 5G mobile telecommunications and edge computing platform having a data recording and reporting system for recording data related to detected anomalies and/or generating reports related to detected anomalies and having a dashboard and/or application programming interface for orchestration and management of a 5G network. In embodiments, provided herein is a self-contained 5G mobile telecommunications and edge computing platform having a data recording and reporting system for recording data related to detected anomalies and/or generating reports related to detected anomalies and having a system for identifying user information collected by a source, generating a notification and/or report related the collected user information, and sending the notification and/or report to the user. In embodiments, provided herein is a self-contained 5G mobile telecommunications and edge computing platform having a data recording and reporting system for recording data related to detected anomalies and/or generating reports related to detected anomalies and having a system for enabling a user to limit the degree to which information is shared with websites and applications. In embodiments, provided herein is a self-contained 5G mobile telecommunications and edge computing platform having a data recording and reporting system for recording data related to detected anomalies and/or generating reports related to detected anomalies and having a system for blocking data flow between specific manufacturers unless a user opts in. In embodiments, provided herein is a self-contained 5G mobile telecommunications and edge computing platform having a data recording and reporting system for recording data related to detected anomalies and/or generating reports related to detected anomalies and having a system for enabling automatic clearance of data tracking. In embodiments, provided herein is a self-contained 5G mobile telecommunications and edge computing platform having a data recording and reporting system for recording data related to detected anomalies and/or generating reports related to detected anomalies and having a machine learning and/or artificial intelligence system for providing insights to users related to data-sharing management. In embodiments, provided herein is a self-contained 5G mobile telecommunications and edge computing platform having a data recording and reporting system for recording data related to detected anomalies and/or generating reports related to detected anomalies and having a privacy-controlled container on top of the base smartphone operating system to run services and applications. In embodiments, provided herein is a self-contained 5G mobile telecommunications and edge computing platform having a data recording and reporting system for recording data related to detected anomalies and/or generating reports related to detected anomalies and having virtualized operating system applications wherein the applications are run on a Type 1 Hypervisor having a real-time operating system. In embodiments, provided herein is a self-contained 5G mobile telecommunications and edge computing platform having a data recording and reporting system for recording data related to detected anomalies and/or generating reports related to detected anomalies and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a data recording and reporting system for recording data related to detected anomalies and/or generating reports related to detected anomalies and having a forced operating system software update system for automatically forcing operating system software updates on the 5G mobile devices of platform subscribers. In embodiments, provided herein is a self-contained 5G mobile telecommunications and edge computing platform having a data recording and reporting system for recording data related to detected anomalies and/or generating reports related to detected anomalies and having a device registration system for registering a user device to a specific network segment. In embodiments, provided herein is a self-contained 5G mobile telecommunications and edge computing platform having a data recording and reporting system for recording data related to detected anomalies and/or generating reports related to detected anomalies and having a multi-static radar having beam forming MIMO antennas. In embodiments, provided herein is a self-contained 5G mobile telecommunications and edge computing platform having a data recording and reporting system for recording data related to detected anomalies and/or generating reports related to detected anomalies and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a data recording and reporting system for recording data related to detected anomalies and/or generating reports related to detected anomalies and having a drone shield system for using a fleet of drones to form a dynamic barrier. In embodiments, provided herein is a self-contained 5G mobile telecommunications and edge computing platform having a data recording and reporting system for recording data related to detected anomalies and/or generating reports related to detected anomalies and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a data recording and reporting system for recording data related to detected anomalies and/or generating reports related to detected anomalies and having a precision navigation and timing system that uses a network of low orbit earth satellites as a timing source. In embodiments, provided herein is a self-contained 5G mobile telecommunications and edge computing platform having a data recording and reporting system for recording data related to detected anomalies and/or generating reports related to detected anomalies and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a data recording and reporting system for recording data related to detected anomalies and/or generating reports related to detected anomalies and having an augmented reality system that uses a machine learning and/or artificial intelligence system for providing a simulated environment. In embodiments, provided herein is a self-contained 5G mobile telecommunications and edge computing platform having a data recording and reporting system for recording data related to detected anomalies and/or generating reports related to detected anomalies and having a virtual reality system that uses a machine learning and/or artificial intelligence system for providing a simulated environment. In embodiments, provided herein is a self-contained 5G mobile telecommunications and edge computing platform having a data recording and reporting system for recording data related to detected anomalies and/or generating reports related to detected anomalies and having a customer relationship management system for managing communications with current and/or potential customers. In embodiments, provided herein is a self-contained 5G mobile telecommunications and edge computing platform having a data recording and reporting system for recording data related to detected anomalies and/or generating reports related to detected anomalies and having a remote surgery system having a system for providing haptic feedback related to a surgical procedure. In embodiments, provided herein is a self-contained 5G mobile telecommunications and edge computing platform having a data recording and reporting system for recording data related to detected anomalies and/or generating reports related to detected anomalies and having a remote driving system for controlling a remote vehicle and having a system for providing haptic feedback related to driving of the vehicle. In embodiments, provided herein is a self-contained 5G mobile telecommunications and edge computing platform having a data recording and reporting system for recording data related to detected anomalies and/or generating reports related to detected anomalies and having a remote machine operation system for controlling a remote machine and having a system for providing haptic feedback related to machine operation. In embodiments, provided herein is a self-contained 5G mobile telecommunications and edge computing platform having a data recording and reporting system for recording data related to detected anomalies and/or generating reports related to detected anomalies and having an electronic beam steering system to send targeted signals to receivers in 5G mobile devices.

In embodiments, provided herein is a self-contained 5G mobile telecommunications and edge computing platform having a system for enabling clean slate reset, wherein a clean slate reset may be performed by pre-established rules or by operator command. In embodiments, provided herein is a self-contained 5G mobile telecommunications and edge computing platform having a system for enabling clean slate reset, wherein a clean slate reset may be performed by pre-established rules or by operator command and having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having a system for enabling clean slate reset, wherein a clean slate reset may be performed by pre-established rules or by operator command and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having a system for enabling clean slate reset, wherein a clean slate reset may be performed by pre-established rules or by operator command and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having a system for enabling clean slate reset, wherein a clean slate reset may be performed by pre-established rules or by operator command and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having a system for enabling clean slate reset, wherein a clean slate reset may be performed by pre-established rules or by operator command and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having a system for enabling clean slate reset, wherein a clean slate reset may be performed by pre-established rules or by operator command and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having a system for enabling clean slate reset, wherein a clean slate reset may be performed by pre-established rules or by operator command and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having a system for enabling clean slate reset, wherein a clean slate reset may be performed by pre-established rules or by operator command and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having a system for enabling clean slate reset, wherein a clean slate reset may be performed by pre-established rules or by operator command and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having a system for enabling clean slate reset, wherein a clean slate reset may be performed by pre-established rules or by operator command and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having a system for enabling clean slate reset, wherein a clean slate reset may be performed by pre-established rules or by operator command and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a system for enabling clean slate reset, wherein a clean slate reset may be performed by pre-established rules or by operator command and having a smart network slicing system for segmenting the network to align with unique application requirements. In embodiments, provided herein is a self-contained 5G mobile telecommunications and edge computing platform having a system for enabling clean slate reset, wherein a clean slate reset may be performed by pre-established rules or by operator command and having a quantum encryption system for enabling quantum encryption and decryption. In embodiments, provided herein is a self-contained 5G mobile telecommunications and edge computing platform having a system for enabling clean slate reset, wherein a clean slate reset may be performed by pre-established rules or by operator command and having a certificate authority for issuing digital certificates. In embodiments, provided herein is a self-contained 5G mobile telecommunications and edge computing platform having a system for enabling clean slate reset, wherein a clean slate reset may be performed by pre-established rules or by operator command and having a system for providing cyber security in space. In embodiments, provided herein is a self-contained 5G mobile telecommunications and edge computing platform having a system for enabling clean slate reset, wherein a clean slate reset may be performed by pre-established rules or by operator command and having secure session initiation protocol security mechanisms. In embodiments, provided herein is a self-contained 5G mobile telecommunications and edge computing platform having a system for enabling clean slate reset, wherein a clean slate reset may be performed by pre-established rules or by operator command and having a management and orchestration system for coordinating network resources for applications and the lifecycle management of virtual network functions. In embodiments, provided herein is a self-contained 5G mobile telecommunications and edge computing platform having a system for enabling clean slate reset, wherein a clean slate reset may be performed by pre-established rules or by operator command and having a dashboard and/or application programming interface for orchestration and management of a 5G network. In embodiments, provided herein is a self-contained 5G mobile telecommunications and edge computing platform having a system for enabling clean slate reset, wherein a clean slate reset may be performed by pre-established rules or by operator command and having a system for identifying user information collected by a source, generating a notification and/or report related the collected user information, and sending the notification and/or report to the user. In embodiments, provided herein is a self-contained 5G mobile telecommunications and edge computing platform having a system for enabling clean slate reset, wherein a clean slate reset may be performed by pre-established rules or by operator command and having a system for enabling a user to limit the degree to which information is shared with websites and applications. In embodiments, provided herein is a self-contained 5G mobile telecommunications and edge computing platform having a system for enabling clean slate reset, wherein a clean slate reset may be performed by pre-established rules or by operator command and having a system for blocking data flow between specific manufacturers unless a user opts in. In embodiments, provided herein is a self-contained 5G mobile telecommunications and edge computing platform having a system for enabling clean slate reset, wherein a clean slate reset may be performed by pre-established rules or by operator command and having a system for enabling automatic clearance of data tracking. In embodiments, provided herein is a self-contained 5G mobile telecommunications and edge computing platform having a system for enabling clean slate reset, wherein a clean slate reset may be performed by pre-established rules or by operator command and having a machine learning and/or artificial intelligence system for providing insights to users related to data-sharing management. In embodiments, provided herein is a self-contained 5G mobile telecommunications and edge computing platform having a system for enabling clean slate reset, wherein a clean slate reset may be performed by pre-established rules or by operator command and having a privacy-controlled container on top of the base smartphone operating system to run services and applications. In embodiments, provided herein is a self-contained 5G mobile telecommunications and edge computing platform having a system for enabling clean slate reset, wherein a clean slate reset may be performed by pre-established rules or by operator command and having virtualized operating system applications wherein the applications are run on a Type 1 Hypervisor having a real-time operating system. In embodiments, provided herein is a self-contained 5G mobile telecommunications and edge computing platform having a system for enabling clean slate reset, wherein a clean slate reset may be performed by pre-established rules or by operator command and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a system for enabling clean slate reset, wherein a clean slate reset may be performed by pre-established rules or by operator command and having a forced operating system software update system for automatically forcing operating system software updates on the 5G mobile devices of platform subscribers. In embodiments, provided herein is a self-contained 5G mobile telecommunications and edge computing platform having a system for enabling clean slate reset, wherein a clean slate reset may be performed by pre-established rules or by operator command and having a device registration system for registering a user device to a specific network segment. In embodiments, provided herein is a self-contained 5G mobile telecommunications and edge computing platform having a system for enabling clean slate reset, wherein a clean slate reset may be performed by pre-established rules or by operator command and having a multi-static radar having beam forming MIMO antennas. In embodiments, provided herein is a self-contained 5G mobile telecommunications and edge computing platform having a system for enabling clean slate reset, wherein a clean slate reset may be performed by pre-established rules or by operator command and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a system for enabling clean slate reset, wherein a clean slate reset may be performed by pre-established rules or by operator command and having a drone shield system for using a fleet of drones to form a dynamic barrier. In embodiments, provided herein is a self-contained 5G mobile telecommunications and edge computing platform having a system for enabling clean slate reset, wherein a clean slate reset may be performed by pre-established rules or by operator command and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a system for enabling clean slate reset, wherein a clean slate reset may be performed by pre-established rules or by operator command and having a precision navigation and timing system that uses a network of low orbit earth satellites as a timing source. In embodiments, provided herein is a self-contained 5G mobile telecommunications and edge computing platform having a system for enabling clean slate reset, wherein a clean slate reset may be performed by pre-established rules or by operator command and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a system for enabling clean slate reset, wherein a clean slate reset may be performed by pre-established rules or by operator command and having an augmented reality system that uses a machine learning and/or artificial intelligence system for providing a simulated environment. In embodiments, provided herein is a self-contained 5G mobile telecommunications and edge computing platform having a system for enabling clean slate reset, wherein a clean slate reset may be performed by pre-established rules or by operator command and having a virtual reality system that uses a machine learning and/or artificial intelligence system for providing a simulated environment. In embodiments, provided herein is a self-contained 5G mobile telecommunications and edge computing platform having a system for enabling clean slate reset, wherein a clean slate reset may be performed by pre-established rules or by operator command and having a customer relationship management system for managing communications with current and/or potential customers. In embodiments, provided herein is a self-contained 5G mobile telecommunications and edge computing platform having a system for enabling clean slate reset, wherein a clean slate reset may be performed by pre-established rules or by operator command and having a remote surgery system having a system for providing haptic feedback related to a surgical procedure. In embodiments, provided herein is a self-contained 5G mobile telecommunications and edge computing platform having a system for enabling clean slate reset, wherein a clean slate reset may be performed by pre-established rules or by operator command and having a remote driving system for controlling a remote vehicle and having a system for providing haptic feedback related to driving of the vehicle. In embodiments, provided herein is a self-contained 5G mobile telecommunications and edge computing platform having a system for enabling clean slate reset, wherein a clean slate reset may be performed by pre-established rules or by operator command and having a remote machine operation system for controlling a remote machine and having a system for providing haptic feedback related to machine operation. In embodiments, provided herein is a self-contained 5G mobile telecommunications and edge computing platform having a system for enabling clean slate reset, wherein a clean slate reset may be performed by pre-established rules or by operator command and having an electronic beam steering system to send targeted signals to receivers in 5G mobile devices.

In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a smart network slicing system for segmenting the network to align with unique application requirements. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a quantum encryption system for enabling quantum encryption and decryption. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a certificate authority for issuing digital certificates. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a system for providing cyber security in space. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having secure session initiation protocol security mechanisms. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a management and orchestration system for coordinating network resources for applications and the lifecycle management of virtual network functions. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a dashboard and/or application programming interface for orchestration and management of a 5G network. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a system for identifying user information collected by a source, generating a notification and/or report related the collected user information, and sending the notification and/or report to the user. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a system for enabling a user to limit the degree to which information is shared with websites and applications. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a system for blocking data flow between specific manufacturers unless a user opts in. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a system for enabling automatic clearance of data tracking. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a machine learning and/or artificial intelligence system for providing insights to users related to data-sharing management. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a privacy-controlled container on top of the base smartphone operating system to run services and applications. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having virtualized operating system applications wherein the applications are run on a Type 1 Hypervisor having a real-time operating system. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a forced operating system software update system for automatically forcing operating system software updates on the 5G mobile devices of platform subscribers. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a device registration system for registering a user device to a specific network segment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a multi-static radar having beam forming MIMO antennas. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a drone shield system for using a fleet of drones to form a dynamic barrier. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a precision navigation and timing system that uses a network of low orbit earth satellites as a timing source. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having an augmented reality system that uses a machine learning and/or artificial intelligence system for providing a simulated environment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a virtual reality system that uses a machine learning and/or artificial intelligence system for providing a simulated environment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a customer relationship management system for managing communications with current and/or potential customers. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a remote surgery system having a system for providing haptic feedback related to a surgical procedure. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a remote driving system for controlling a remote vehicle and having a system for providing haptic feedback related to driving of the vehicle. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having a remote machine operation system for controlling a remote machine and having a system for providing haptic feedback related to machine operation. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object and having an electronic beam steering system to send targeted signals to receivers in 5G mobile devices.

In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a smart network slicing system for segmenting the network to align with unique application requirements. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a quantum encryption system for enabling quantum encryption and decryption. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a certificate authority for issuing digital certificates. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a system for providing cyber security in space. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having secure session initiation protocol security mechanisms. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a management and orchestration system for coordinating network resources for applications and the lifecycle management of virtual network functions. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a dashboard and/or application programming interface for orchestration and management of a 5G network. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a system for identifying user information collected by a source, generating a notification and/or report related the collected user information, and sending the notification and/or report to the user. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a system for enabling a user to limit the degree to which information is shared with websites and applications. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a system for blocking data flow between specific manufacturers unless a user opts in. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a system for enabling automatic clearance of data tracking. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a machine learning and/or artificial intelligence system for providing insights to users related to data-sharing management. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a privacy-controlled container on top of the base smartphone operating system to run services and applications. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having virtualized operating system applications wherein the applications are run on a Type 1 Hypervisor having a real-time operating system. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a forced operating system software update system for automatically forcing operating system software updates on the 5G mobile devices of platform subscribers. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a device registration system for registering a user device to a specific network segment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a multi-static radar having beam forming MIMO antennas. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a drone shield system for using a fleet of drones to form a dynamic barrier. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a precision navigation and timing system that uses a network of low orbit earth satellites as a timing source. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having an augmented reality system that uses a machine learning and/or artificial intelligence system for providing a simulated environment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a virtual reality system that uses a machine learning and/or artificial intelligence system for providing a simulated environment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a customer relationship management system for managing communications with current and/or potential customers. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a remote surgery system having a system for providing haptic feedback related to a surgical procedure. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a remote driving system for controlling a remote vehicle and having a system for providing haptic feedback related to driving of the vehicle. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having a remote machine operation system for controlling a remote machine and having a system for providing haptic feedback related to machine operation. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association and having an electronic beam steering system to send targeted signals to receivers in 5G mobile devices.

In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a smart network slicing system for segmenting the network to align with unique application requirements. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a quantum encryption system for enabling quantum encryption and decryption. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a certificate authority for issuing digital certificates. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a system for providing cyber security in space. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having secure session initiation protocol security mechanisms. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a management and orchestration system for coordinating network resources for applications and the lifecycle management of virtual network functions. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a dashboard and/or application programming interface for orchestration and management of a 5G network. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a system for identifying user information collected by a source, generating a notification and/or report related the collected user information, and sending the notification and/or report to the user. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a system for enabling a user to limit the degree to which information is shared with websites and applications. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a system for blocking data flow between specific manufacturers unless a user opts in. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a system for enabling automatic clearance of data tracking. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a machine learning and/or artificial intelligence system for providing insights to users related to data-sharing management. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a privacy-controlled container on top of the base smartphone operating system to run services and applications. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having virtualized operating system applications wherein the applications are run on a Type 1 Hypervisor having a real-time operating system. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a forced operating system software update system for automatically forcing operating system software updates on the 5G mobile devices of platform subscribers. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a device registration system for registering a user device to a specific network segment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a multi-static radar having beam forming MIMO antennas. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a drone shield system for using a fleet of drones to form a dynamic barrier. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a precision navigation and timing system that uses a network of low orbit earth satellites as a timing source. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having an augmented reality system that uses a machine learning and/or artificial intelligence system for providing a simulated environment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a virtual reality system that uses a machine learning and/or artificial intelligence system for providing a simulated environment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a customer relationship management system for managing communications with current and/or potential customers. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a remote surgery system having a system for providing haptic feedback related to a surgical procedure. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a remote driving system for controlling a remote vehicle and having a system for providing haptic feedback related to driving of the vehicle. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having a remote machine operation system for controlling a remote machine and having a system for providing haptic feedback related to machine operation. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the applications use the inheritance and/or association relationships to reconstitute object information, metadata and behavior execution at run time and having an electronic beam steering system to send targeted signals to receivers in 5G mobile devices.

In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a smart network slicing system for segmenting the network to align with unique application requirements. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a quantum encryption system for enabling quantum encryption and decryption. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a certificate authority for issuing digital certificates. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a system for providing cyber security in space. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having secure session initiation protocol security mechanisms. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a management and orchestration system for coordinating network resources for applications and the lifecycle management of virtual network functions. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a dashboard and/or application programming interface for orchestration and management of a 5G network. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a system for identifying user information collected by a source, generating a notification and/or report related the collected user information, and sending the notification and/or report to the user. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a system for enabling a user to limit the degree to which information is shared with websites and applications. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a system for blocking data flow between specific manufacturers unless a user opts in. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a system for enabling automatic clearance of data tracking. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a machine learning and/or artificial intelligence system for providing insights to users related to data-sharing management. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a privacy-controlled container on top of the base smartphone operating system to run services and applications. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having virtualized operating system applications wherein the applications are run on a Type 1 Hypervisor having a real-time operating system. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a forced operating system software update system for automatically forcing operating system software updates on the 5G mobile devices of platform subscribers. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a device registration system for registering a user device to a specific network segment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a multi-static radar having beam forming MIMO antennas. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a drone shield system for using a fleet of drones to form a dynamic barrier. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a precision navigation and timing system that uses a network of low orbit earth satellites as a timing source. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having an augmented reality system that uses a machine learning and/or artificial intelligence system for providing a simulated environment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a virtual reality system that uses a machine learning and/or artificial intelligence system for providing a simulated environment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a customer relationship management system for managing communications with current and/or potential customers. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a remote surgery system having a system for providing haptic feedback related to a surgical procedure. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a remote driving system for controlling a remote vehicle and having a system for providing haptic feedback related to driving of the vehicle. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having a remote machine operation system for controlling a remote machine and having a system for providing haptic feedback related to machine operation. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object are related by inheritance and/or by association; and wherein the objects are stored in separate databases and/or data stores and having an electronic beam steering system to send targeted signals to receivers in 5G mobile devices.

In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having an object-oriented analysis and design wherein options are provided to allow for the separation of data and meta data into separate object constructs and wherein the data as defined by its Abstract Syntax Notation (ASN)

definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a smart network slicing system for segmenting the network to align with unique application requirements. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a quantum encryption system for enabling quantum encryption and decryption. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a certificate authority for issuing digital certificates. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a system for providing cyber security in space. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having secure session initiation protocol security mechanisms. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a management and orchestration system for coordinating network resources for applications and the lifecycle management of virtual network functions. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a dashboard and/or application programming interface for orchestration and management of a 5G network. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a system for identifying user information collected by a source, generating a notification and/or report related the collected user information, and sending the notification and/or report to the user. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a system for enabling a user to limit the degree to which information is shared with websites and applications. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a system for blocking data flow between specific manufacturers unless a user opts in. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a system for enabling automatic clearance of data tracking. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a machine learning and/or artificial intelligence system for providing insights to users related to data-sharing management. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a privacy-controlled container on top of the base smartphone operating system to run services and applications. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having virtualized operating system applications wherein the applications are run on a Type 1 Hypervisor having a real-time operating system. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a forced operating system software update system for automatically forcing operating system software updates on the 5G mobile devices of platform subscribers. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a device registration system for registering a user device to a specific network segment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a multi-static radar having beam forming MIMO antennas. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a drone shield system for using a fleet of drones to form a dynamic barrier. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a precision navigation and timing system that uses a network of low orbit earth satellites as a timing source. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object;

and wherein the data object and meta data object relate to each other via code behavior, and wherein the executable code is kept in a separate service object, which is related to the metadata object by inheritance and/or association and having an augmented reality system that uses a machine learning and/or artificial intelligence system for providing a simulated environment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a virtual reality system that uses a machine learning and/or artificial intelligence system for providing a simulated environment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a customer relationship management system for managing communications with current and/or potential customers. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a remote surgery system having a system for providing haptic feedback related to a surgical procedure. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a remote driving system for controlling a remote vehicle and having a system for providing haptic feedback related to driving of the vehicle. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having a remote machine operation system for controlling a remote machine and having a system for providing haptic feedback related to machine operation. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association and having an electronic beam steering system to send targeted signals to receivers in 5G mobile devices.

In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a smart network slicing system for segmenting the network to align with unique application requirements. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a quantum encryption system for enabling quantum encryption and decryption. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a certificate authority for issuing digital certificates. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a system for providing cyber security in space. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having secure session initiation protocol security mechanisms. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a management and orchestration system for coordinating network resources for applications and the lifecycle management of virtual network functions. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a dashboard and/or application programming interface for orchestration and management of a 5G network. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a system for identifying user information collected by a source, generating a notification and/or report related the collected user information, and sending the notification and/or report to the user. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a system for enabling a user to limit the degree to which information is shared with websites and applications. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a system for blocking data flow between specific manufacturers unless a user opts in. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a system for enabling automatic clearance of data tracking. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a machine learning and/or artificial intelligence system for providing insights to users related to data-sharing management. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a privacy-controlled container on top of the base smartphone operating system to run services and applications. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having virtualized operating system applications wherein the applications are run on a Type 1 Hypervisor having a real-time operating system. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a forced operating system software update system for automatically forcing operating system software updates on the 5G mobile devices of platform subscribers. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a device registration system for registering a user device to a specific network segment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a multi-static radar having beam forming MIMO antennas. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a drone shield system for using a fleet of drones to form a dynamic barrier. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a precision navigation and timing system that uses a network of low orbit earth satellites as a timing source. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having an augmented reality system that uses a machine learning and/or artificial intelligence system for providing a simulated environment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a virtual reality system that uses a machine learning and/or artificial intelligence system for providing a simulated environment. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a customer relationship management system for managing communications with current and/or potential customers. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a remote surgery system having a system for providing haptic feedback related to a surgical procedure. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a remote driving system for controlling a remote vehicle and having a system for providing haptic feedback related to driving of the vehicle. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having a remote machine operation system for controlling a remote machine and having a system for providing haptic feedback related to machine operation. In embodiments, provided herein is a self-contained 5G mobile telecommunications and edge computing platform having an object-oriented analysis and design data model, and having a system for enabling the separation of data and metadata into separate objects as defined by Abstract Syntax Notation, and wherein the data is encapsulated in a data object and the metadata is encapsulated into a separate metadata object; and wherein the data object and meta data object relate to each other via code behavior, and wherein the executable code is kept in a separate service object, which is related to the metadata object by inheritance and/or association; and wherein applications are enabled to use the inheritance and/or association relationships to reconstitute object information, metadata, and behavior execution at run time and having an electronic beam steering system to send targeted signals to receivers in 5G mobile devices.

In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a smart network slicing system for segmenting the network to align with unique application requirements. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a quantum encryption system for enabling quantum encryption and decryption. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a certificate authority for issuing digital certificates. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a system for providing cyber security in space. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having secure session initiation protocol security mechanisms. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a management and orchestration system for coordinating network resources for applications and the lifecycle management of virtual network functions. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a dashboard and/or application programming interface for orchestration and management of a 5G network. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a system for identifying user information collected by a source, generating a notification and/or report related the collected user information, and sending the notification and/or report to the user. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/ data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a system for enabling a user to limit the degree to which information is shared with websites and applications. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a system for blocking data flow between specific manufacturers unless a user opts in. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a system for enabling automatic clearance of data tracking. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a machine learning and/or artificial intelligence system for providing insights to users related to data-sharing management. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a privacy-controlled container on top of the base smartphone operating system to run services and applications. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having virtualized operating system applications wherein the applications are run on a Type 1 Hypervisor having a real-time operating system. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a forced operating system software update system for automatically forcing operating system software updates on the 5G mobile devices of platform subscribers. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a device registration system for registering a user device to a specific network segment. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a multi-static radar having beam forming MIMO antennas. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a drone shield system for using a fleet of drones to form a dynamic barrier. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a precision navigation and timing system that uses a network of low orbit earth satellites as a timing source. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having an augmented reality system that uses a machine learning and/or artificial intelligence system for providing a simulated environment. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a virtual reality system that uses a machine learning and/or artificial intelligence system for providing a simulated environment. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a customer relationship management system for managing communications with current and/or potential customers. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a remote surgery system having a system for providing haptic feedback related to a surgical procedure. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a remote driving system for controlling a remote vehicle and having a system for providing haptic feedback related to driving of the vehicle. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having a remote machine operation system for controlling a remote machine and having a system for providing haptic feedback related to machine operation. In embodiments, provided herein is a self-contained 5G mobile telecommunications and edge computing platform having an object-oriented analysis and design wherein options are provided to allow for the separation of data and meta data into separate object constructs and wherein the data as defined by its Abstract Syntax Notation (ASN) definitions/data types are encapsulated in a data object; the Meta data is encapsulated into a separate object in a metadata object; and wherein the data object and metadata object relate to each other via their Code behavior where the executable code is kept in a separate object viz. a service object which is related to the metadata object by Inheritance or Association; and wherein the objects are stored in separate databases and/or data stores and having an electronic beam steering system to send targeted signals to receivers in 5G mobile devices.

In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a smart network slicing system for segmenting the network to align with unique application requirements. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a quantum encryption system for enabling quantum encryption and decryption. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a certificate authority for issuing digital certificates. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a system for providing cyber security in space. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having secure session initiation protocol security mechanisms. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a management and orchestration system for coordinating network resources for applications and the lifecycle management of virtual network functions. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a dashboard and/or application programming interface for orchestration and management of a 5G network. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a system for identifying user information collected by a source, generating a notification and/or report related the collected user information, and sending the notification and/or report to the user. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a system for enabling a user to limit the degree to which information is shared with websites and applications. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a system for blocking data flow between specific manufacturers unless a user opts in. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a system for enabling automatic clearance of data tracking. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a machine learning and/or artificial intelligence system for providing insights to users related to data-sharing management. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a privacy-controlled container on top of the base smartphone operating system to run services and applications. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having virtualized operating system applications wherein the applications are run on a Type 1 Hypervisor having a real-time operating system. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality.

In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a forced operating system software update system for automatically forcing operating system software updates on the 5G mobile devices of platform subscribers. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a device registration system for registering a user device to a specific network segment. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a multi-static radar having beam forming MIMO antennas. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a drone shield system for using a fleet of drones to form a dynamic barrier. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a precision navigation and timing system that uses a network of low orbit earth satellites as a timing source. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having an augmented reality system that uses a machine learning and/or artificial intelligence system for providing a simulated environment. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a virtual reality system that uses a machine learning and/or artificial intelligence system for providing a simulated environment. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a customer relationship management system for managing communications with current and/or potential customers. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a remote surgery system having a system for providing haptic feedback related to a surgical procedure. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a remote driving system for controlling a remote vehicle and having a system for providing haptic feedback related to driving of the vehicle. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having a remote machine operation system for controlling a remote machine and having a system for providing haptic feedback related to machine operation. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur and having an electronic beam steering system to send targeted signals to receivers in 5G mobile devices.

In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a smart network slicing system for segmenting the network to align with unique application requirements. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a quantum encryption system for enabling quantum encryption and decryption. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a certificate authority for issuing digital certificates. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a system for providing cyber security in space. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having secure session initiation protocol security mechanisms. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a management and orchestration system for coordinating network resources for applications and the lifecycle management of virtual network functions. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a dashboard and/or application programming interface for orchestration and management of a 5G network. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a system for identifying user information collected by a source, generating a notification and/or report related the collected user information, and sending the notification and/or report to the user. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a system for enabling a user to limit the degree to which information is shared with websites and applications. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a system for blocking data flow between specific manufacturers unless a user opts in. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a system for enabling automatic clearance of data tracking. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a machine learning and/or artificial intelligence system for providing insights to users related to data-sharing management. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a privacy-controlled container on top of the base smartphone operating system to run services and applications. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having virtualized operating system applications wherein the applications are run on a Type 1 Hypervisor having a real-time operating system. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a forced operating system software update system for automatically forcing operating system software updates on the 5G mobile devices of platform subscribers. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a device registration system for registering a user device to a specific network segment. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a multi-static radar having beam forming MIMO antennas. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a drone shield system for using a fleet of drones to form a dynamic barrier. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a precision navigation and timing system that uses a network of low orbit earth satellites as a timing source. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having an augmented reality system that uses a machine learning and/or artificial intelligence system for providing a simulated environment. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a virtual reality system that uses a machine learning and/or artificial intelligence system for providing a simulated environment. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a customer relationship management system for managing communications with current and/or potential customers. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a remote surgery system having a system for providing haptic feedback related to a surgical procedure. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a remote driving system for controlling a remote vehicle and having a system for providing haptic feedback related to driving of the vehicle. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having a remote machine operation system for controlling a remote machine and having a system for providing haptic feedback related to machine operation. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and wherein the objects can be kept in-line within the code and having an electronic beam steering system to send targeted signals to receivers in 5G mobile devices.

In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a smart network slicing system for segmenting the network to align with unique application requirements. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a quantum encryption system for enabling quantum encryption and decryption. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a certificate authority for issuing digital certificates. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a system for providing cyber security in space. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having secure session initiation protocol security mechanisms. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a management and orchestration system for coordinating network resources for applications and the lifecycle management of virtual network functions. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a dashboard and/or application programming interface for orchestration and management of a 5G network. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a system for identifying user information collected by a source, generating a notification and/or report related the collected user information, and sending the notification and/or report to the user. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a system for enabling a user to limit the degree to which information is shared with websites and applications. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a system for blocking data flow between specific manufacturers unless a user opts in. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a system for enabling automatic clearance of data tracking. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a machine learning and/or artificial intelligence system for providing insights to users related to data-sharing management. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a privacy-controlled container on top of the base smartphone operating system to run services and applications. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having virtualized operating system applications wherein the applications are run on a Type 1 Hypervisor having a real-time operating system. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a forced operating system software update system for automatically forcing operating system software updates on the 5G mobile devices of platform subscribers. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a device registration system for registering a user device to a specific network segment. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a multi-static radar having beam forming MIMO antennas. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a drone shield system for using a fleet of drones to form a dynamic barrier. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a precision navigation and timing system that uses a network of low orbit earth satellites as a timing source. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having an augmented reality system that uses a machine learning and/or artificial intelligence system for providing a simulated environment. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a virtual reality system that uses a machine learning and/or artificial intelligence system for providing a simulated environment. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a customer relationship management system for managing communications with current and/or potential customers. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a remote surgery system having a system for providing haptic feedback related to a surgical procedure. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a remote driving system for controlling a remote vehicle and having a system for providing haptic feedback related to driving of the vehicle. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having a remote machine operation system for controlling a remote machine and having a system for providing haptic feedback related to machine operation. In embodiments, provided herein is a self-contained 5G mobile telecommunications and edge computing platform having an object-oriented analysis and design data model; and having a system to automatically decompose and separate data into atomic sub objects such that a single execution object requires that all atomic sub objects to be reconstituted at run-time in order for code execution to occur, and having a system for enabling the separation of object types and for enabling compile time and run-time reference resolution of the inheritance and association relationships and having an electronic beam steering system to send targeted signals to receivers in 5G mobile devices.

In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a smart network slicing system for segmenting the network to align with unique application requirements. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a quantum encryption system for enabling quantum encryption and decryption. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a certificate authority for issuing digital certificates. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a system for providing cyber security in space. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having secure session initiation protocol security mechanisms. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a management and orchestration system for coordinating network resources for applications and the lifecycle management of virtual network functions. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a dashboard and/or application programming interface for orchestration and management of a 5G network. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a system for identifying user information collected by a source, generating a notification and/or report related the collected user information, and sending the notification and/or report to the user. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a system for enabling a user to limit the degree to which information is shared with websites and applications. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a system for blocking data flow between specific manufacturers unless a user opts in. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a system for enabling automatic clearance of data tracking. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a machine learning and/or artificial intelligence system for providing insights to users related to data-sharing management. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a privacy-controlled container on top of the base smartphone operating system to run services and applications. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having virtualized operating system applications wherein the applications are run on a Type 1 Hypervisor having a real-time operating system. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a forced operating system software update system for automatically forcing operating system software updates on the 5G mobile devices of platform subscribers. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a device registration system for registering a user device to a specific network segment. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a multi-static radar having beam forming MIMO antennas. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a drone shield system for using a fleet of drones to form a dynamic barrier. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a precision navigation and timing system that uses a network of low orbit earth satellites as a timing source. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having an augmented reality system that uses a machine learning and/or artificial intelligence system for providing a simulated environment. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a virtual reality system that uses a machine learning and/or artificial intelligence system for providing a simulated environment. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a customer relationship management system for managing communications with current and/or potential customers. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a remote surgery system having a system for providing haptic feedback related to a surgical procedure. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a remote driving system for controlling a remote vehicle and having a system for providing haptic feedback related to driving of the vehicle. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having a remote machine operation system for controlling a remote machine and having a system for providing haptic feedback related to machine operation. In embodiments, provided herein is a self-contained 5G mobile telecommunications and edge computing platform having a data tagging system for tagging data with an access permission level, wherein all access is denied unless all policies are obeyed by the access request and/or requestor; and wherein all rejections are posted to the organization if the policy is under the organization's control, or to the user if the policy requires user authorization; and wherein a denial of access based on user level authorization causes a notification to be sent asynchronously to the user; and wherein the notification includes request details; and wherein and the requestor is notified of the denial and updated when the denial is resolved or the request is terminated and having an electronic beam steering system to send targeted signals to receivers in 5G mobile devices.

In embodiments, provided herein is a self-contained 5G mobile telecommunications and edge computing platform having a smart network slicing system for segmenting the network to align with unique application requirements. In embodiments, provided herein is a self-contained 5G mobile telecommunications and edge computing platform having a smart network slicing system for segmenting the network to align with unique application requirements and having a quantum encryption system for enabling quantum encryption and decryption. In embodiments, provided herein is a self-contained 5G mobile telecommunications and edge computing platform having a smart network slicing system for segmenting the network to align with unique application requirements and having a certificate authority for issuing digital certificates. In embodiments, provided herein is a self-contained 5G mobile telecommunications and edge computing platform having a smart network slicing system for segmenting the network to align with unique application requirements and having a system for providing cyber security in space. In embodiments, provided herein is a self-contained 5G mobile telecommunications and edge computing platform having a smart network slicing system for segmenting the network to align with unique application requirements and having secure session initiation protocol security mechanisms. In embodiments, provided herein is a self-contained 5G mobile telecommunications and edge computing platform having a smart network slicing system for segmenting the network to align with unique application requirements and having a management and orchestration system for coordinating network resources for applications and the lifecycle management of virtual network functions. In embodiments, provided herein is a self-contained 5G mobile telecommunications and edge computing platform having a smart network slicing system for segmenting the network to align with unique application requirements and having a dashboard and/or application programming interface for orchestration and management of a 5G network. In embodiments, provided herein is a self-contained 5G mobile telecommunications and edge computing platform having a smart network slicing system for segmenting the network to align with unique application requirements and having a system for identifying user information collected by a source, generating a notification and/or report related the collected user information, and sending the notification and/or report to the user. In embodiments, provided herein is a self-contained 5G mobile telecommunications and edge computing platform having a smart network slicing system for segmenting the network to align with unique application requirements and having a system for enabling a user to limit the degree to which information is shared with websites and applications. In embodiments, provided herein is a self-contained 5G mobile telecommunications and edge computing platform having a smart network slicing system for segmenting the network to align with unique application requirements and having a system for blocking data flow between specific manufacturers unless a user opts in. In embodiments, provided herein is a self-contained 5G mobile telecommunications and edge computing platform having a smart network slicing system for segmenting the network to align with unique application requirements and having a system for enabling automatic clearance of data tracking. In embodiments, provided herein is a self-contained 5G mobile telecommunications and edge computing platform having a smart network slicing system for segmenting the network to align with unique application requirements and having a machine learning and/or artificial intelligence system for providing insights to users related to data-sharing management. In embodiments, provided herein is a self-contained 5G mobile telecommunications and edge computing platform having a smart network slicing system for segmenting the network to align with unique application requirements and having a privacy-controlled container on top of the base smartphone operating system to run services and applications. In embodiments, provided herein is a self-contained 5G mobile telecommunications and edge computing platform having a smart network slicing system for segmenting the network to align with unique application requirements and having virtualized operating system applications wherein the applications are run on a Type 1 Hypervisor having a real-time operating system. In embodiments, provided herein is a self-contained 5G mobile telecommunications and edge computing platform having a smart network slicing system for segmenting the network to align with unique application requirements and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a smart network slicing system for segmenting the network to align with unique application requirements and having a forced operating system software update system for automatically forcing operating system software updates on the 5G mobile devices of platform subscribers. In embodiments, provided herein is a self-contained 5G mobile telecommunications and edge computing platform having a smart network slicing system for segmenting the network to align with unique application requirements and having a device registration system for registering a user device to a specific network segment. In embodiments, provided herein is a self-contained 5G mobile telecommunications and edge computing platform having a smart network slicing system for segmenting the network to align with unique application requirements and having a multi-static radar having beam forming MIMO antennas. In embodiments, provided herein is a self-contained 5G mobile telecommunications and edge computing platform having a smart network slicing system for segmenting the network to align with unique application requirements and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a smart network slicing system for segmenting the network to align with unique application requirements and having a drone shield system for using a fleet of drones to form a dynamic barrier. In embodiments, provided herein is a self-contained 5G mobile telecommunications and edge computing platform having a smart network slicing system for segmenting the network to align with unique application requirements and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a smart network slicing system for segmenting the network to align with unique application requirements and having a precision navigation and timing system that uses a network of low orbit earth satellites as a timing source. In embodiments, provided herein is a self-contained 5G mobile telecommunications and edge computing platform having a smart network slicing system for segmenting the network to align with unique application requirements and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a smart network slicing system for segmenting the network to align with unique application requirements and having an augmented reality system that uses a machine learning and/or artificial intelligence system for providing a simulated environment. In embodiments, provided herein is a self-contained 5G mobile telecommunications and edge computing platform having a smart network slicing system for segmenting the network to align with unique application requirements and having a virtual reality system that uses a machine learning and/or artificial intelligence system for providing a simulated environment. In embodiments, provided herein is a self-contained 5G mobile telecommunications and edge computing platform having a smart network slicing system for segmenting the network to align with unique application requirements and having a customer relationship management system for managing communications with current and/or potential customers. In embodiments, provided herein is a self-contained 5G mobile telecommunications and edge computing platform having a smart network slicing system for segmenting the network to align with unique application requirements and having a remote surgery system having a system for providing haptic feedback related to a surgical procedure. In embodiments, provided herein is a self-contained 5G mobile telecommunications and edge computing platform having a smart network slicing system for segmenting the network to align with unique application requirements and having a remote driving system for controlling a remote vehicle and having a system for providing haptic feedback related to driving of the vehicle. In embodiments, provided herein is a self-contained 5G mobile telecommunications and edge computing platform having a smart network slicing system for segmenting the network to align with unique application requirements and having a remote machine operation system for controlling a remote machine and having a system for providing haptic feedback related to machine operation. In embodiments, provided herein is a self-contained 5G mobile telecommunications and edge computing platform having a smart network slicing system for segmenting the network to align with unique application requirements and having an electronic beam steering system to send targeted signals to receivers in 5G mobile devices.

In embodiments, provided herein is a self-contained 5G mobile telecommunications and edge computing platform having a quantum encryption system for enabling quantum encryption and decryption. In embodiments, provided herein is a self-contained 5G mobile telecommunications and edge computing platform having a quantum encryption system for enabling quantum encryption and decryption and having a certificate authority for issuing digital certificates. In embodiments, provided herein is a self-contained 5G mobile telecommunications and edge computing platform having a quantum encryption system for enabling quantum encryption and decryption and having a system for providing cyber security in space. In embodiments, provided herein is a self-contained 5G mobile telecommunications and edge computing platform having a quantum encryption system for enabling quantum encryption and decryption and having secure session initiation protocol security mechanisms. In embodiments, provided herein is a self-contained 5G mobile telecommunications and edge computing platform having a quantum encryption system for enabling quantum encryption and decryption and having a management and orchestration system for coordinating network resources for applications and the lifecycle management of virtual network functions. In embodiments, provided herein is a self-contained 5G mobile telecommunications and edge computing platform having a quantum encryption system for enabling quantum encryption and decryption and having a dashboard and/or application programming interface for orchestration and management of a 5G network. In embodiments, provided herein is a self-contained 5G mobile telecommunications and edge computing platform having a quantum encryption system for enabling quantum encryption and decryption and having a system for identifying user information collected by a source, generating a notification and/or report related the collected user information, and sending the notification and/or report to the user. In embodiments, provided herein is a self-contained 5G mobile telecommunications and edge computing platform having a quantum encryption system for enabling quantum encryption and decryption and having a system for enabling a user to limit the degree to which information is shared with websites and applications. In embodiments, provided herein is a self-contained 5G mobile telecommunications and edge computing platform having a quantum encryption system for enabling quantum encryption and decryption and having a system for blocking data flow between specific manufacturers unless a user opts in. In embodiments, provided herein is a self-contained 5G mobile telecommunications and edge computing platform having a quantum encryption system for enabling quantum encryption and decryption and having a system for enabling automatic clearance of data tracking. In embodiments, provided herein is a self-contained 5G mobile telecommunications and edge computing platform having a quantum encryption system for enabling quantum encryption and decryption and having a machine learning and/or artificial intelligence system for providing insights to users related to data-sharing management. In embodiments, provided herein is a self-contained 5G mobile telecommunications and edge computing platform having a quantum encryption system for enabling quantum encryption and decryption and having a privacy-controlled container on top of the base smartphone operating system to run services and applications. In embodiments, provided herein is a self-contained 5G mobile telecommunications and edge computing platform having a quantum encryption system for enabling quantum encryption and decryption and having virtualized operating system applications wherein the applications are run on a Type 1 Hypervisor having a real-time operating system. In embodiments, provided herein is a self-contained 5G mobile telecommunications and edge computing platform having a quantum encryption system for enabling quantum encryption and decryption and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a quantum encryption system for enabling quantum encryption and decryption and having a forced operating system software update system for automatically forcing operating system software updates on the 5G mobile devices of platform subscribers. In embodiments, provided herein is a self-contained 5G mobile telecommunications and edge computing platform having a quantum encryption system for enabling quantum encryption and decryption and having a device registration system for registering a user device to a specific network segment. In embodiments, provided herein is a self-contained 5G mobile telecommunications and edge computing platform having a quantum encryption system for enabling quantum encryption and decryption and having a multi-static radar having beam forming MIMO antennas. In embodiments, provided herein is a self-contained 5G mobile telecommunications and edge computing platform having a quantum encryption system for enabling quantum encryption and decryption and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a quantum encryption system for enabling quantum encryption and decryption and having a drone shield system for using a fleet of drones to form a dynamic barrier. In embodiments, provided herein is a self-contained 5G mobile telecommunications and edge computing platform having a quantum encryption system for enabling quantum encryption and decryption and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a quantum encryption system for enabling quantum encryption and decryption and having a precision navigation and timing system that uses a network of low orbit earth satellites as a timing source. In embodiments, provided herein is a self-contained 5G mobile telecommunications and edge computing platform having a quantum encryption system for enabling quantum encryption and decryption and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a quantum encryption system for enabling quantum encryption and decryption and having an augmented reality system that uses a machine learning and/or artificial intelligence system for providing a simulated environment. In embodiments, provided herein is a self-contained 5G mobile telecommunications and edge computing platform having a quantum encryption system for enabling quantum encryption and decryption and having a virtual reality system that uses a machine learning and/or artificial intelligence system for providing a simulated environment. In embodiments, provided herein is a self-contained 5G mobile telecommunications and edge computing platform having a quantum encryption system for enabling quantum encryption and decryption and having a customer relationship management system for managing communications with current and/or potential customers. In embodiments, provided herein is a self-contained 5G mobile telecommunications and edge computing platform having a quantum encryption system for enabling quantum encryption and decryption and having a remote surgery system having a system for providing haptic feedback related to a surgical procedure. In embodiments, provided herein is a self-contained 5G mobile telecommunications and edge computing platform having a quantum encryption system for enabling quantum encryption and decryption and having a remote driving system for controlling a remote vehicle and having a system for providing haptic feedback related to driving of the vehicle. In embodiments, provided herein is a self-contained 5G mobile telecommunications and edge computing platform having a quantum encryption system for enabling quantum encryption and decryption and having a remote machine operation system for controlling a remote machine and having a system for providing haptic feedback related to machine operation. In embodiments, provided herein is a self-contained 5G mobile telecommunications and edge computing platform having a quantum encryption system for enabling quantum encryption and decryption and having an electronic beam steering system to send targeted signals to receivers in 5G mobile devices.

In embodiments, provided herein is a self-contained 5G mobile telecommunications and edge computing platform having a certificate authority for issuing digital certificates. In embodiments, provided herein is a self-contained 5G mobile telecommunications and edge computing platform having a certificate authority for issuing digital certificates and having a system for providing cyber security in space. In embodiments, provided herein is a self-contained 5G mobile telecommunications and edge computing platform having a certificate authority for issuing digital certificates and having secure session initiation protocol security mechanisms. In embodiments, provided herein is a self-contained 5G mobile telecommunications and edge computing platform having a certificate authority for issuing digital certificates and having a management and orchestration system for coordinating network resources for applications and the lifecycle management of virtual network functions. In embodiments, provided herein is a self-contained 5G mobile telecommunications and edge computing platform having a certificate authority for issuing digital certificates and having a dashboard and/or application programming interface for orchestration and management of a 5G network. In embodiments, provided herein is a self-contained 5G mobile telecommunications and edge computing platform having a certificate authority for issuing digital certificates and having a system for identifying user information collected by a source, generating a notification and/or report related the collected user information, and sending the notification and/or report to the user. In embodiments, provided herein is a self-contained 5G mobile telecommunications and edge computing platform having a certificate authority for issuing digital certificates and having a system for enabling a user to limit the degree to which information is shared with websites and applications. In embodiments, provided herein is a self-contained 5G mobile telecommunications and edge computing platform having a certificate authority for issuing digital certificates and having a system for blocking data flow between specific manufacturers unless a user opts in. In embodiments, provided herein is a self-contained 5G mobile telecommunications and edge computing platform having a certificate authority for issuing digital certificates and having a system for enabling automatic clearance of data tracking. In embodiments, provided herein is a self-contained 5G mobile telecommunications and edge computing platform having a certificate authority for issuing digital certificates and having a machine learning and/or artificial intelligence system for providing insights to users related to data-sharing management. In embodiments, provided herein is a self-contained 5G mobile telecommunications and edge computing platform having a certificate authority for issuing digital certificates and having a privacy-controlled container on top of the base smartphone operating system to run services and applications. In embodiments, provided herein is a self-contained 5G mobile telecommunications and edge computing platform having a certificate authority for issuing digital certificates and having virtualized operating system applications wherein the applications are run on a Type 1 Hypervisor having a real-time operating system. In embodiments, provided herein is a self-contained 5G mobile telecommunications and edge computing platform having a certificate authority for issuing digital certificates and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a certificate authority for issuing digital certificates and having a forced operating system software update system for automatically forcing operating system software updates on the 5G mobile devices of platform subscribers. In embodiments, provided herein is a self-contained 5G mobile telecommunications and edge computing platform having a certificate authority for issuing digital certificates and having a device registration system for registering a user device to a specific network segment. In embodiments, provided herein is a self-contained 5G mobile telecommunications and edge computing platform having a certificate authority for issuing digital certificates and having a multi-static radar having beam forming MIMO antennas. In embodiments, provided herein is a self-contained 5G mobile telecommunications and edge computing platform having a certificate authority for issuing digital certificates and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a certificate authority for issuing digital certificates and having a drone shield system for using a fleet of drones to form a dynamic barrier. In embodiments, provided herein is a self-contained 5G mobile telecommunications and edge computing platform having a certificate authority for issuing digital certificates and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a certificate authority for issuing digital certificates and having a precision navigation and timing system that uses a network of low orbit earth satellites as a timing source. In embodiments, provided herein is a self-contained 5G mobile telecommunications and edge computing platform having a certificate authority for issuing digital certificates and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a certificate authority for issuing digital certificates and having an augmented reality system that uses a machine learning and/or artificial intelligence system for providing a simulated environment. In embodiments, provided herein is a self-contained 5G mobile telecommunications and edge computing platform having a certificate authority for issuing digital certificates and having a virtual reality system that uses a machine learning and/or artificial intelligence system for providing a simulated environment. In embodiments, provided herein is a self-contained 5G mobile telecommunications and edge computing platform having a certificate authority for issuing digital certificates and having a customer relationship management system for managing communications with current and/or potential customers. In embodiments, provided herein is a self-contained 5G mobile telecommunications and edge computing platform having a certificate authority for issuing digital certificates and having a remote surgery system having a system for providing haptic feedback related to a surgical procedure. In embodiments, provided herein is a self-contained 5G mobile telecommunications and edge computing platform having a certificate authority for issuing digital certificates and having a remote driving system for controlling a remote vehicle and having a system for providing haptic feedback related to driving of the vehicle. In embodiments, provided herein is a self-contained 5G mobile telecommunications and edge computing platform having a certificate authority for issuing digital certificates and having a remote machine operation system for controlling a remote machine and having a system for providing haptic feedback related to machine operation. In embodiments, provided herein is a self-contained 5G mobile telecommunications and edge computing platform having a certificate authority for issuing digital certificates and having an electronic beam steering system to send targeted signals to receivers in 5G mobile devices.

In embodiments, provided herein is a self-contained 5G mobile telecommunications and edge computing platform having a system for providing cyber security in space. In embodiments, provided herein is a self-contained 5G mobile telecommunications and edge computing platform having a system for providing cyber security in space and having secure session initiation protocol security mechanisms. In embodiments, provided herein is a self-contained 5G mobile telecommunications and edge computing platform having a system for providing cyber security in space and having a management and orchestration system for coordinating network resources for applications and the lifecycle management of virtual network functions. In embodiments, provided herein is a self-contained 5G mobile telecommunications and edge computing platform having a system for providing cyber security in space and having a dashboard and/or application programming interface for orchestration and management of a 5G network. In embodiments, provided herein is a self-contained 5G mobile telecommunications and edge computing platform having a system for providing cyber security in space and having a system for identifying user information collected by a source, generating a notification and/or report related the collected user information, and sending the notification and/or report to the user. In embodiments, provided herein is a self-contained 5G mobile telecommunications and edge computing platform having a system for providing cyber security in space and having a system for enabling a user to limit the degree to which information is shared with websites and applications. In embodiments, provided herein is a self-contained 5G mobile telecommunications and edge computing platform having a system for providing cyber security in space and having a system for blocking data flow between specific manufacturers unless a user opts in. In embodiments, provided herein is a self-contained 5G mobile telecommunications and edge computing platform having a system for providing cyber security in space and having a system for enabling automatic clearance of data tracking. In embodiments, provided herein is a self-contained 5G mobile telecommunications and edge computing platform having a system for providing cyber security in space and having a machine learning and/or artificial intelligence system for providing insights to users related to data-sharing management. In embodiments, provided herein is a self-contained 5G mobile telecommunications and edge computing platform having a system for providing cyber security in space and having a privacy-controlled container on top of the base smartphone operating system to run services and applications. In embodiments, provided herein is a self-contained 5G mobile telecommunications and edge computing platform having a system for providing cyber security in space and having virtualized operating system applications wherein the applications are run on a Type 1 Hypervisor having a real-time operating system. In embodiments, provided herein is a self-contained 5G mobile telecommunications and edge computing platform having a system for providing cyber security in space and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a system for providing cyber security in space and having a forced operating system software update system for automatically forcing operating system software updates on the 5G mobile devices of platform subscribers. In embodiments, provided herein is a self-contained 5G mobile telecommunications and edge computing platform having a system for providing cyber security in space and having a device registration system for registering a user device to a specific network segment. In embodiments, provided herein is a self-contained 5G mobile telecommunications and edge computing platform having a system for providing cyber security in space and having a multi-static radar having beam forming MIMO antennas. In embodiments, provided herein is a self-contained 5G mobile telecommunications and edge computing platform having a system for providing cyber security in space and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a system for providing cyber security in space and having a drone shield system for using a fleet of drones to form a dynamic barrier. In embodiments, provided herein is a self-contained 5G mobile telecommunications and edge computing platform having a system for providing cyber security in space and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a system for providing cyber security in space and having a precision navigation and timing system that uses a network of low orbit earth satellites as a timing source. In embodiments, provided herein is a self-contained 5G mobile telecommunications and edge computing platform having a system for providing cyber security in space and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a system for providing cyber security in space and having an augmented reality system that uses a machine learning and/or artificial intelligence system for providing a simulated environment. In embodiments, provided herein is a self-contained 5G mobile telecommunications and edge computing platform having a system for providing cyber security in space and having a virtual reality system that uses a machine learning and/or artificial intelligence system for providing a simulated environment. In embodiments, provided herein is a self-contained 5G mobile telecommunications and edge computing platform having a system for providing cyber security in space and having a customer relationship management system for managing communications with current and/or potential customers. In embodiments, provided herein is a self-contained 5G mobile telecommunications and edge computing platform having a system for providing cyber security in space and having a remote surgery system having a system for providing haptic feedback related to a surgical procedure. In embodiments, provided herein is a self-contained 5G mobile telecommunications and edge computing platform having a system for providing cyber security in space and having a remote driving system for controlling a remote vehicle and having a system for providing haptic feedback related to driving of the vehicle. In embodiments, provided herein is a self-contained 5G mobile telecommunications and edge computing platform having a system for providing cyber security in space and having a remote machine operation system for controlling a remote machine and having a system for providing haptic feedback related to machine operation. In embodiments, provided herein is a self-contained 5G mobile telecommunications and edge computing platform having a system for providing cyber security in space and having an electronic beam steering system to send targeted signals to receivers in 5G mobile devices.

In embodiments, provided herein is a self-contained 5G mobile telecommunications and edge computing platform having secure session initiation protocol security mechanisms. In embodiments, provided herein is a self-contained 5G mobile telecommunications and edge computing platform having secure session initiation protocol security mechanisms and having a management and orchestration system for coordinating network resources for applications and the lifecycle management of virtual network functions. In embodiments, provided herein is a self-contained 5G mobile telecommunications and edge computing platform having secure session initiation protocol security mechanisms and having a dashboard and/or application programming interface for orchestration and management of a 5G network. In embodiments, provided herein is a self-contained 5G mobile telecommunications and edge computing platform having secure session initiation protocol security mechanisms and having a system for identifying user information collected by a source, generating a notification and/or report related the collected user information, and sending the notification and/or report to the user. In embodiments, provided herein is a self-contained 5G mobile telecommunications and edge computing platform having secure session initiation protocol security mechanisms and having a system for enabling a user to limit the degree to which information is shared with websites and applications. In embodiments, provided herein is a self-contained 5G mobile telecommunications and edge computing platform having secure session initiation protocol security mechanisms and having a system for blocking data flow between specific manufacturers unless a user opts in. In embodiments, provided herein is a self-contained 5G mobile telecommunications and edge computing platform having secure session initiation protocol security mechanisms and having a system for enabling automatic clearance of data tracking. In embodiments, provided herein is a self-contained 5G mobile telecommunications and edge computing platform having secure session initiation protocol security mechanisms and having a machine learning and/or artificial intelligence system for providing insights to users related to data-sharing management. In embodiments, provided herein is a self-contained 5G mobile telecommunications and edge computing platform having secure session initiation protocol security mechanisms and having a privacy-controlled container on top of the base smartphone operating system to run services and applications. In embodiments, provided herein is a self-contained 5G mobile telecommunications and edge computing platform having secure session initiation protocol security mechanisms and having virtualized operating system applications wherein the applications are run on a Type 1 Hypervisor having a real-time operating system. In embodiments, provided herein is a self-contained 5G mobile telecommunications and edge computing platform having secure session initiation protocol security mechanisms and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having secure session initiation protocol security mechanisms and having a forced operating system software update system for automatically forcing operating system software updates on the 5G mobile devices of platform subscribers. In embodiments, provided herein is a self-contained 5G mobile telecommunications and edge computing platform having secure session initiation protocol security mechanisms and having a device registration system for registering a user device to a specific network segment. In embodiments, provided herein is a self-contained 5G mobile telecommunications and edge computing platform having secure session initiation protocol security mechanisms and having a multi-static radar having beam forming MIMO antennas. In embodiments, provided herein is a self-contained 5G mobile telecommunications and edge computing platform having secure session initiation protocol security mechanisms and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having secure session initiation protocol security mechanisms and having a drone shield system for using a fleet of drones to form a dynamic barrier. In embodiments, provided herein is a self-contained 5G mobile telecommunications and edge computing platform having secure session initiation protocol security mechanisms and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having secure session initiation protocol security mechanisms and having a precision navigation and timing system that uses a network of low orbit earth satellites as a timing source. In embodiments, provided herein is a self-contained 5G mobile telecommunications and edge computing platform having secure session initiation protocol security mechanisms and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having secure session initiation protocol security mechanisms and having an augmented reality system that uses a machine learning and/or artificial intelligence system for providing a simulated environment. In embodiments, provided herein is a self-contained 5G mobile telecommunications and edge computing platform having secure session initiation protocol security mechanisms and having a virtual reality system that uses a machine learning and/or artificial intelligence system for providing a simulated environment. In embodiments, provided herein is a self-contained 5G mobile telecommunications and edge computing platform having secure session initiation protocol security mechanisms and having a customer relationship management system for managing communications with current and/or potential customers. In embodiments, provided herein is a self-contained 5G mobile telecommunications and edge computing platform having secure session initiation protocol security mechanisms and having a remote surgery system having a system for providing haptic feedback related to a surgical procedure. In embodiments, provided herein is a self-contained 5G mobile telecommunications and edge computing platform having secure session initiation protocol security mechanisms and having a remote driving system for controlling a remote vehicle and having a system for providing haptic feedback related to driving of the vehicle. In embodiments, provided herein is a self-contained 5G mobile telecommunications and edge computing platform having secure session initiation protocol security mechanisms and having a remote machine operation system for controlling a remote machine and having a system for providing haptic feedback related to machine operation. In embodiments, provided herein is a self-contained 5G mobile telecommunications and edge computing platform having secure session initiation protocol security mechanisms and having an electronic beam steering system to send targeted signals to receivers in 5G mobile devices.

In embodiments, provided herein is a self-contained 5G mobile telecommunications and edge computing platform having a management and orchestration system for coordinating network resources for applications and the lifecycle management of virtual network functions. In embodiments, provided herein is a self-contained 5G mobile telecommunications and edge computing platform having a management and orchestration system for coordinating network resources for applications and the lifecycle management of virtual network functions and having a dashboard and/or application programming interface for orchestration and management of a 5G network. In embodiments, provided herein is a self-contained 5G mobile telecommunications and edge computing platform having a management and orchestration system for coordinating network resources for applications and the lifecycle management of virtual network functions and having a system for identifying user information collected by a source, generating a notification and/or report related the collected user information, and sending the notification and/or report to the user. In embodiments, provided herein is a self-contained 5G mobile telecommunications and edge computing platform having a management and orchestration system for coordinating network resources for applications and the lifecycle management of virtual network functions and having a system for enabling a user to limit the degree to which information is shared with websites and applications. In embodiments, provided herein is a self-contained 5G mobile telecommunications and edge computing platform having a management and orchestration system for coordinating network resources for applications and the lifecycle management of virtual network functions and having a system for blocking data flow between specific manufacturers unless a user opts in. In embodiments, provided herein is a self-contained 5G mobile telecommunications and edge computing platform having a management and orchestration system for coordinating network resources for applications and the lifecycle management of virtual network functions and having a system for enabling automatic clearance of data tracking. In embodiments, provided herein is a self-contained 5G mobile telecommunications and edge computing platform having a management and orchestration system for coordinating network resources for applications and the lifecycle management of virtual network functions and having a machine learning and/or artificial intelligence system for providing insights to users related to data-sharing management. In embodiments, provided herein is a self-contained 5G mobile telecommunications and edge computing platform having a management and orchestration system for coordinating network resources for applications and the lifecycle management of virtual network functions and having a privacy-controlled container on top of the base smartphone operating system to run services and applications. In embodiments, provided herein is a self-contained 5G mobile telecommunications and edge computing platform having a management and orchestration system for coordinating network resources for applications and the lifecycle management of virtual network functions and having virtualized operating system applications wherein the applications are run on a Type 1 Hypervisor having a real-time operating system. In embodiments, provided herein is a self-contained 5G mobile telecommunications and edge computing platform having a management and orchestration system for coordinating network resources for applications and the lifecycle management of virtual network functions and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a management and orchestration system for coordinating network resources for applications and the lifecycle management of virtual network functions and having a forced operating system software update system for automatically forcing operating system software updates on the 5G mobile devices of platform subscribers. In embodiments, provided herein is a self-contained 5G mobile telecommunications and edge computing platform having a management and orchestration system for coordinating network resources for applications and the lifecycle management of virtual network functions and having a device registration system for registering a user device to a specific network segment. In embodiments, provided herein is a self-contained 5G mobile telecommunications and edge computing platform having a management and orchestration system for coordinating network resources for applications and the lifecycle management of virtual network functions and having a multi-static radar having beam forming MIMO antennas. In embodiments, provided herein is a self-contained 5G mobile telecommunications and edge computing platform having a management and orchestration system for coordinating network resources for applications and the lifecycle management of virtual network functions and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a management and orchestration system for coordinating network resources for applications and the lifecycle management of virtual network functions and having a drone shield system for using a fleet of drones to form a dynamic barrier. In embodiments, provided herein is a self-contained 5G mobile telecommunications and edge computing platform having a management and orchestration system for coordinating network resources for applications and the lifecycle management of virtual network functions and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a management and orchestration system for coordinating network resources for applications and the lifecycle management of virtual network functions and having a precision navigation and timing system that uses a network of low orbit earth satellites as a timing source. In embodiments, provided herein is a self-contained 5G mobile telecommunications and edge computing platform having a management and orchestration system for coordinating network resources for applications and the lifecycle management of virtual network functions and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a management and orchestration system for coordinating network resources for applications and the lifecycle management of virtual network functions and having an augmented reality system that uses a machine learning and/or artificial intelligence system for providing a simulated environment. In embodiments, provided herein is a self-contained 5G mobile telecommunications and edge computing platform having a management and orchestration system for coordinating network resources for applications and the lifecycle management of virtual network functions and having a virtual reality system that uses a machine learning and/or artificial intelligence system for providing a simulated environment. In embodiments, provided herein is a self-contained 5G mobile telecommunications and edge computing platform having a management and orchestration system for coordinating network resources for applications and the lifecycle management of virtual network functions and having a customer relationship management system for managing communications with current and/or potential customers. In embodiments, provided herein is a self-contained 5G mobile telecommunications and edge computing platform having a management and orchestration system for coordinating network resources for applications and the lifecycle management of virtual network functions and having a remote surgery system having a system for providing haptic feedback related to a surgical procedure. In embodiments, provided herein is a self-contained 5G mobile telecommunications and edge computing platform having a management and orchestration system for coordinating network resources for applications and the lifecycle management of virtual network functions and having a remote driving system for controlling a remote vehicle and having a system for providing haptic feedback related to driving of the vehicle. In embodiments, provided herein is a self-contained 5G mobile telecommunications and edge computing platform having a management and orchestration system for coordinating network resources for applications and the lifecycle management of virtual network functions and having a remote machine operation system for controlling a remote machine and having a system for providing haptic feedback related to machine operation. In embodiments, provided herein is a self-contained 5G mobile telecommunications and edge computing platform having a management and orchestration system for coordinating network resources for applications and the lifecycle management of virtual network functions and having an electronic beam steering system to send targeted signals to receivers in 5G mobile devices.

In embodiments, provided herein is a self-contained 5G mobile telecommunications and edge computing platform having a dashboard and/or application programming interface for orchestration and management of a 5G network. In embodiments, provided herein is a self-contained 5G mobile telecommunications and edge computing platform having a dashboard and/or application programming interface for orchestration and management of a 5G network and having a system for identifying user information collected by a source, generating a notification and/or report related the collected user information, and sending the notification and/or report to the user. In embodiments, provided herein is a self-contained 5G mobile telecommunications and edge computing platform having a dashboard and/or application programming interface for orchestration and management of a 5G network and having a system for enabling a user to limit the degree to which information is shared with websites and applications. In embodiments, provided herein is a self-contained 5G mobile telecommunications and edge computing platform having a dashboard and/or application programming interface for orchestration and management of a 5G network and having a system for blocking data flow between specific manufacturers unless a user opts in. In embodiments, provided herein is a self-contained 5G mobile telecommunications and edge computing platform having a dashboard and/or application programming interface for orchestration and management of a 5G network and having a system for enabling automatic clearance of data tracking. In embodiments, provided herein is a self-contained 5G mobile telecommunications and edge computing platform having a dashboard and/or application programming interface for orchestration and management of a 5G network and having a machine learning and/or artificial intelligence system for providing insights to users related to data-sharing management. In embodiments, provided herein is a self-contained 5G mobile telecommunications and edge computing platform having a dashboard and/or application programming interface for orchestration and management of a 5G network and having a privacy-controlled container on top of the base smartphone operating system to run services and applications. In embodiments, provided herein is a self-contained 5G mobile telecommunications and edge computing platform having a dashboard and/or application programming interface for orchestration and management of a 5G network and having virtualized operating system applications wherein the applications are run on a Type 1 Hypervisor having a real-time operating system. In embodiments, provided herein is a self-contained 5G mobile telecommunications and edge computing platform having a dashboard and/or application programming interface for orchestration and management of a 5G network and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a dashboard and/or application programming interface for orchestration and management of a 5G network and having a forced operating system software update system for automatically forcing operating system software updates on the 5G mobile devices of platform subscribers. In embodiments, provided herein is a self-contained 5G mobile telecommunications and edge computing platform having a dashboard and/or application programming interface for orchestration and management of a 5G network and having a device registration system for registering a user device to a specific network segment. In embodiments, provided herein is a self-contained 5G mobile telecommunications and edge computing platform having a dashboard and/or application programming interface for orchestration and management of a 5G network and having a multi-static radar having beam forming MIMO antennas. In embodiments, provided herein is a self-contained 5G mobile telecommunications and edge computing platform having a dashboard and/or application programming interface for orchestration and management of a 5G network and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a dashboard and/or application programming interface for orchestration and management of a 5G network and having a drone shield system for using a fleet of drones to form a dynamic barrier. In embodiments, provided herein is a self-contained 5G mobile telecommunications and edge computing platform having a dashboard and/or application programming interface for orchestration and management of a 5G network and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a dashboard and/or application programming interface for orchestration and management of a 5G network and having a precision navigation and timing system that uses a network of low orbit earth satellites as a timing source. In embodiments, provided herein is a self-contained 5G mobile telecommunications and edge computing platform having a dashboard and/or application programming interface for orchestration and management of a 5G network and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a dashboard and/or application programming interface for orchestration and management of a 5G network and having an augmented reality system that uses a machine learning and/or artificial intelligence system for providing a simulated environment. In embodiments, provided herein is a self-contained 5G mobile telecommunications and edge computing platform having a dashboard and/or application programming interface for orchestration and management of a 5G network and having a virtual reality system that uses a machine learning and/or artificial intelligence system for providing a simulated environment. In embodiments, provided herein is a self-contained 5G mobile telecommunications and edge computing platform having a dashboard and/or application programming interface for orchestration and management of a 5G network and having a customer relationship management system for managing communications with current and/or potential customers. In embodiments, provided herein is a self-contained 5G mobile telecommunications and edge computing platform having a dashboard and/or application programming interface for orchestration and management of a 5G network and having a remote surgery system having a system for providing haptic feedback related to a surgical procedure. In embodiments, provided herein is a self-contained 5G mobile telecommunications and edge computing platform having a dashboard and/or application programming interface for orchestration and management of a 5G network and having a remote driving system for controlling a remote vehicle and having a system for providing haptic feedback related to driving of the vehicle. In embodiments, provided herein is a self-contained 5G mobile telecommunications and edge computing platform having a dashboard and/or application programming interface for orchestration and management of a 5G network and having a remote machine operation system for controlling a remote machine and having a system for providing haptic feedback related to machine operation. In embodiments, provided herein is a self-contained 5G mobile telecommunications and edge computing platform having a dashboard and/or application programming interface for orchestration and management of a 5G network and having an electronic beam steering system to send targeted signals to receivers in 5G mobile devices.

In embodiments, provided herein is a self-contained 5G mobile telecommunications and edge computing platform having a system for identifying user information collected by a source, generating a notification and/or report related the collected user information, and sending the notification and/or report to the user. In embodiments, provided herein is a self-contained 5G mobile telecommunications and edge computing platform having a system for identifying user information collected by a source, generating a notification and/or report related the collected user information, and sending the notification and/or report to the user and having a system for enabling a user to limit the degree to which information is shared with websites and applications. In embodiments, provided herein is a self-contained 5G mobile telecommunications and edge computing platform having a system for identifying user information collected by a source, generating a notification and/or report related the collected user information, and sending the notification and/or report to the user and having a system for blocking data flow between specific manufacturers unless a user opts in. In embodiments, provided herein is a self-contained 5G mobile telecommunications and edge computing platform having a system for identifying user information collected by a source, generating a notification and/or report related the collected user information, and sending the notification and/or report to the user and having a system for enabling automatic clearance of data tracking. In embodiments, provided herein is a self-contained 5G mobile telecommunications and edge computing platform having a system for identifying user information collected by a source, generating a notification and/or report related the collected user information, and sending the notification and/or report to the user and having a machine learning and/or artificial intelligence system for providing insights to users related to data-sharing management. In embodiments, provided herein is a self-contained 5G mobile telecommunications and edge computing platform having a system for identifying user information collected by a source, generating a notification and/or report related the collected user information, and sending the notification and/or report to the user and having a privacy-controlled container on top of the base smartphone operating system to run services and applications. In embodiments, provided herein is a self-contained 5G mobile telecommunications and edge computing platform having a system for identifying user information collected by a source, generating a notification and/or report related the collected user information, and sending the notification and/or report to the user and having virtualized operating system applications wherein the applications are run on a Type 1 Hypervisor having a real-time operating system. In embodiments, provided herein is a self-contained 5G mobile telecommunications and edge computing platform having a system for identifying user information collected by a source, generating a notification and/or report related the collected user information, and sending the notification and/or report to the user and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a system for identifying user information collected by a source, generating a notification and/or report related the collected user information, and sending the notification and/or report to the user and having a forced operating system software update system for automatically forcing operating system software updates on the 5G mobile devices of platform subscribers. In embodiments, provided herein is a self-contained 5G mobile telecommunications and edge computing platform having a system for identifying user information collected by a source, generating a notification and/or report related the collected user information, and sending the notification and/or report to the user and having a device registration system for registering a user device to a specific network segment. In embodiments, provided herein is a self-contained 5G mobile telecommunications and edge computing platform having a system for identifying user information collected by a source, generating a notification and/or report related the collected user information, and sending the notification and/or report to the user and having a multi-static radar having beam forming MIMO antennas. In embodiments, provided herein is a self-contained 5G mobile telecommunications and edge computing platform having a system for identifying user information collected by a source, generating a notification and/or report related the collected user information, and sending the notification and/or report to the user and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a system for identifying user information collected by a source, generating a notification and/or report related the collected user information, and sending the notification and/or report to the user and having a drone shield system for using a fleet of drones to form a dynamic barrier. In embodiments, provided herein is a self-contained 5G mobile telecommunications and edge computing platform having a system for identifying user information collected by a source, generating a notification and/or report related the collected user information, and sending the notification and/or report to the user and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a system for identifying user information collected by a source, generating a notification and/or report related the collected user information, and sending the notification and/or report to the user and having a precision navigation and timing system that uses a network of low orbit earth satellites as a timing source. In embodiments, provided herein is a self-contained 5G mobile telecommunications and edge computing platform having a system for identifying user information collected by a source, generating a notification and/or report related the collected user information, and sending the notification and/or report to the user and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a system for identifying user information collected by a source, generating a notification and/or report related the collected user information, and sending the notification and/or report to the user and having an augmented reality system that uses a machine learning and/or artificial intelligence system for providing a simulated environment. In embodiments, provided herein is a self-contained 5G mobile telecommunications and edge computing platform having a system for identifying user information collected by a source, generating a notification and/or report related the collected user information, and sending the notification and/or report to the user and having a virtual reality system that uses a machine learning and/or artificial intelligence system for providing a simulated environment. In embodiments, provided herein is a self-contained 5G mobile telecommunications and edge computing platform having a system for identifying user information collected by a source, generating a notification and/or report related the collected user information, and sending the notification and/or report to the user and having a customer relationship management system for managing communications with current and/or potential customers. In embodiments, provided herein is a self-contained 5G mobile telecommunications and edge computing platform having a system for identifying user information collected by a source, generating a notification and/or report related the collected user information, and sending the notification and/or report to the user and having a remote surgery system having a system for providing haptic feedback related to a surgical procedure. In embodiments, provided herein is a self-contained 5G mobile telecommunications and edge computing platform having a system for identifying user information collected by a source, generating a notification and/or report related the collected user information, and sending the notification and/or report to the user and having a remote driving system for controlling a remote vehicle and having a system for providing haptic feedback related to driving of the vehicle. In embodiments, provided herein is a self-contained 5G mobile telecommunications and edge computing platform having a system for identifying user information collected by a source, generating a notification and/or report related the collected user information, and sending the notification and/or report to the user and having a remote machine operation system for controlling a remote machine and having a system for providing haptic feedback related to machine operation. In embodiments, provided herein is a self-contained 5G mobile telecommunications and edge computing platform having a system for identifying user information collected by a source, generating a notification and/or report related the collected user information, and sending the notification and/or report to the user and having an electronic beam steering system to send targeted signals to receivers in 5G mobile devices.

In embodiments, provided herein is a self-contained 5G mobile telecommunications and edge computing platform having a system for enabling a user to limit the degree to which information is shared with websites and applications. In embodiments, provided herein is a self-contained 5G mobile telecommunications and edge computing platform having a system for enabling a user to limit the degree to which information is shared with websites and applications and having a system for blocking data flow between specific manufacturers unless a user opts in. In embodiments, provided herein is a self-contained 5G mobile telecommunications and edge computing platform having a system for enabling a user to limit the degree to which information is shared with websites and applications and having a system for enabling automatic clearance of data tracking. In embodiments, provided herein is a self-contained 5G mobile telecommunications and edge computing platform having a system for enabling a user to limit the degree to which information is shared with websites and applications and having a machine learning and/or artificial intelligence system for providing insights to users related to data-sharing management. In embodiments, provided herein is a self-contained 5G mobile telecommunications and edge computing platform having a system for enabling a user to limit the degree to which information is shared with websites and applications and having a privacy-controlled container on top of the base smartphone operating system to run services and applications. In embodiments, provided herein is a self-contained 5G mobile telecommunications and edge computing platform having a system for enabling a user to limit the degree to which information is shared with websites and applications and having virtualized operating system applications wherein the applications are run on a Type 1 Hypervisor having a real-time operating system. In embodiments, provided herein is a self-contained 5G mobile telecommunications and edge computing platform having a system for enabling a user to limit the degree to which information is shared with websites and applications and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a system for enabling a user to limit the degree to which information is shared with websites and applications and having a forced operating system software update system for automatically forcing operating system software updates on the 5G mobile devices of platform subscribers. In embodiments, provided herein is a self-contained 5G mobile telecommunications and edge computing platform having a system for enabling a user to limit the degree to which information is shared with websites and applications and having a device registration system for registering a user device to a specific network segment. In embodiments, provided herein is a self-contained 5G mobile telecommunications and edge computing platform having a system for enabling a user to limit the degree to which information is shared with websites and applications and having a multi-static radar having beam forming MIMO antennas. In embodiments, provided herein is a self-contained 5G mobile telecommunications and edge computing platform having a system for enabling a user to limit the degree to which information is shared with websites and applications and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a system for enabling a user to limit the degree to which information is shared with websites and applications and having a drone shield system for using a fleet of drones to form a dynamic barrier. In embodiments, provided herein is a self-contained 5G mobile telecommunications and edge computing platform having a system for enabling a user to limit the degree to which information is shared with websites and applications and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a system for enabling a user to limit the degree to which information is shared with websites and applications and having a precision navigation and timing system that uses a network of low orbit earth satellites as a timing source. In embodiments, provided herein is a self-contained 5G mobile telecommunications and edge computing platform having a system for enabling a user to limit the degree to which information is shared with websites and applications and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a system for enabling a user to limit the degree to which information is shared with websites and applications and having an augmented reality system that uses a machine learning and/or artificial intelligence system for providing a simulated environment. In embodiments, provided herein is a self-contained 5G mobile telecommunications and edge computing platform having a system for enabling a user to limit the degree to which information is shared with websites and applications and having a virtual reality system that uses a machine learning and/or artificial intelligence system for providing a simulated environment. In embodiments, provided herein is a self-contained 5G mobile telecommunications and edge computing platform having a system for enabling a user to limit the degree to which information is shared with websites and applications and having a customer relationship management system for managing communications with current and/or potential customers. In embodiments, provided herein is a self-contained 5G mobile telecommunications and edge computing platform having a system for enabling a user to limit the degree to which information is shared with websites and applications and having a remote surgery system having a system for providing haptic feedback related to a surgical procedure. In embodiments, provided herein is a self-contained 5G mobile telecommunications and edge computing platform having a system for enabling a user to limit the degree to which information is shared with websites and applications and having a remote driving system for controlling a remote vehicle and having a system for providing haptic feedback related to driving of the vehicle. In embodiments, provided herein is a self-contained 5G mobile telecommunications and edge computing platform having a system for enabling a user to limit the degree to which information is shared with websites and applications and having a remote machine operation system for controlling a remote machine and having a system for providing haptic feedback related to machine operation. In embodiments, provided herein is a self-contained 5G mobile telecommunications and edge computing platform having a system for enabling a user to limit the degree to which information is shared with websites and applications and having an electronic beam steering system to send targeted signals to receivers in 5G mobile devices.

In embodiments, provided herein is a self-contained 5G mobile telecommunications and edge computing platform having a system for blocking data flow between specific manufacturers unless a user opts in. In embodiments, provided herein is a self-contained 5G mobile telecommunications and edge computing platform having a system for blocking data flow between specific manufacturers unless a user opts in and having a system for enabling automatic clearance of data tracking. In embodiments, provided herein is a self-contained 5G mobile telecommunications and edge computing platform having a system for blocking data flow between specific manufacturers unless a user opts in and having a machine learning and/or artificial intelligence system for providing insights to users related to data-sharing management. In embodiments, provided herein is a self-contained 5G mobile telecommunications and edge computing platform having a system for blocking data flow between specific manufacturers unless a user opts in and having a privacy-controlled container on top of the base smartphone operating system to run services and applications. In embodiments, provided herein is a self-contained 5G mobile telecommunications and edge computing platform having a system for blocking data flow between specific manufacturers unless a user opts in and having virtualized operating system applications wherein the applications are run on a Type 1 Hypervisor having a real-time operating system. In embodiments, provided herein is a self-contained 5G mobile telecommunications and edge computing platform having a system for blocking data flow between specific manufacturers unless a user opts in and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a system for blocking data flow between specific manufacturers unless a user opts in and having a forced operating system software update system for automatically forcing operating system software updates on the 5G mobile devices of platform subscribers. In embodiments, provided herein is a self-contained 5G mobile telecommunications and edge computing platform having a system for blocking data flow between specific manufacturers unless a user opts in and having a device registration system for registering a user device to a specific network segment. In embodiments, provided herein is a self-contained 5G mobile telecommunications and edge computing platform having a system for blocking data flow between specific manufacturers unless a user opts in and having a multi-static radar having beam forming MIMO antennas. In embodiments, provided herein is a self-contained 5G mobile telecommunications and edge computing platform having a system for blocking data flow between specific manufacturers unless a user opts in and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a system for blocking data flow between specific manufacturers unless a user opts in and having a drone shield system for using a fleet of drones to form a dynamic barrier. In embodiments, provided herein is a self-contained 5G mobile telecommunications and edge computing platform having a system for blocking data flow between specific manufacturers unless a user opts in and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a system for blocking data flow between specific manufacturers unless a user opts in and having a precision navigation and timing system that uses a network of low orbit earth satellites as a timing source. In embodiments, provided herein is a self-contained 5G mobile telecommunications and edge computing platform having a system for blocking data flow between specific manufacturers unless a user opts in and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a system for blocking data flow between specific manufacturers unless a user opts in and having an augmented reality system that uses a machine learning and/or artificial intelligence system for providing a simulated environment. In embodiments, provided herein is a self-contained 5G mobile telecommunications and edge computing platform having a system for blocking data flow between specific manufacturers unless a user opts in and having a virtual reality system that uses a machine learning and/or artificial intelligence system for providing a simulated environment. In embodiments, provided herein is a self-contained 5G mobile telecommunications and edge computing platform having a system for blocking data flow between specific manufacturers unless a user opts in and having a customer relationship management system for managing communications with current and/or potential customers. In embodiments, provided herein is a self-contained 5G mobile telecommunications and edge computing platform having a system for blocking data flow between specific manufacturers unless a user opts in and having a remote surgery system having a system for providing haptic feedback related to a surgical procedure. In embodiments, provided herein is a self-contained 5G mobile telecommunications and edge computing platform having a system for blocking data flow between specific manufacturers unless a user opts in and having a remote driving system for controlling a remote vehicle and having a system for providing haptic feedback related to driving of the vehicle. In embodiments, provided herein is a self-contained 5G mobile telecommunications and edge computing platform having a system for blocking data flow between specific manufacturers unless a user opts in and having a remote machine operation system for controlling a remote machine and having a system for providing haptic feedback related to machine operation. In embodiments, provided herein is a self-contained 5G mobile telecommunications and edge computing platform having a system for blocking data flow between specific manufacturers unless a user opts in and having an electronic beam steering system to send targeted signals to receivers in 5G mobile devices.

In embodiments, provided herein is a self-contained 5G mobile telecommunications and edge computing platform having a system for enabling automatic clearance of data tracking. In embodiments, provided herein is a self-contained 5G mobile telecommunications and edge computing platform having a system for enabling automatic clearance of data tracking and having a machine learning and/or artificial intelligence system for providing insights to users related to data-sharing management. In embodiments, provided herein is a self-contained 5G mobile telecommunications and edge computing platform having a system for enabling automatic clearance of data tracking and having a privacy-controlled container on top of the base smartphone operating system to run services and applications. In embodiments, provided herein is a self-contained 5G mobile telecommunications and edge computing platform having a system for enabling automatic clearance of data tracking and having virtualized operating system applications wherein the applications are run on a Type 1 Hypervisor having a real-time operating system. In embodiments, provided herein is a self-contained 5G mobile telecommunications and edge computing platform having a system for enabling automatic clearance of data tracking and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a system for enabling automatic clearance of data tracking and having a forced operating system software update system for automatically forcing operating system software updates on the 5G mobile devices of platform subscribers. In embodiments, provided herein is a self-contained 5G mobile telecommunications and edge computing platform having a system for enabling automatic clearance of data tracking and having a device registration system for registering a user device to a specific network segment. In embodiments, provided herein is a self-contained 5G mobile telecommunications and edge computing platform having a system for enabling automatic clearance of data tracking and having a multi-static radar having beam forming MIMO antennas. In embodiments, provided herein is a self-contained 5G mobile telecommunications and edge computing platform having a system for enabling automatic clearance of data tracking and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a system for enabling automatic clearance of data tracking and having a drone shield system for using a fleet of drones to form a dynamic barrier. In embodiments, provided herein is a self-contained 5G mobile telecommunications and edge computing platform having a system for enabling automatic clearance of data tracking and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a system for enabling automatic clearance of data tracking and having a precision navigation and timing system that uses a network of low orbit earth satellites as a timing source. In embodiments, provided herein is a self-contained 5G mobile telecommunications and edge computing platform having a system for enabling automatic clearance of data tracking and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a system for enabling automatic clearance of data tracking and having an augmented reality system that uses a machine learning and/or artificial intelligence system for providing a simulated environment. In embodiments, provided herein is a self-contained 5G mobile telecommunications and edge computing platform having a system for enabling automatic clearance of data tracking and having a virtual reality system that uses a machine learning and/or artificial intelligence system for providing a simulated environment. In embodiments, provided herein is a self-contained 5G mobile telecommunications and edge computing platform having a system for enabling automatic clearance of data tracking and having a customer relationship management system for managing communications with current and/or potential customers. In embodiments, provided herein is a self-contained 5G mobile telecommunications and edge computing platform having a system for enabling automatic clearance of data tracking and having a remote surgery system having a system for providing haptic feedback related to a surgical procedure. In embodiments, provided herein is a self-contained 5G mobile telecommunications and edge computing platform having a system for enabling automatic clearance of data tracking and having a remote driving system for controlling a remote vehicle and having a system for providing haptic feedback related to driving of the vehicle. In embodiments, provided herein is a self-contained 5G mobile telecommunications and edge computing platform having a system for enabling automatic clearance of data tracking and having a remote machine operation system for controlling a remote machine and having a system for providing haptic feedback related to machine operation. In embodiments, provided herein is a self-contained 5G mobile telecommunications and edge computing platform having a system for enabling automatic clearance of data tracking and having an electronic beam steering system to send targeted signals to receivers in 5G mobile devices.

In embodiments, provided herein is a self-contained 5G mobile telecommunications and edge computing platform having a machine learning and/or artificial intelligence system for providing insights to users related to data-sharing management. In embodiments, provided herein is a self-contained 5G mobile telecommunications and edge computing platform having a machine learning and/or artificial intelligence system for providing insights to users related to data-sharing management and having a privacy-controlled container on top of the base smartphone operating system to run services and applications. In embodiments, provided herein is a self-contained 5G mobile telecommunications and edge computing platform having a machine learning and/or artificial intelligence system for providing insights to users related to data-sharing management and having virtualized operating system applications wherein the applications are run on a Type 1 Hypervisor having a real-time operating system. In embodiments, provided herein is a self-contained 5G mobile telecommunications and edge computing platform having a machine learning and/or artificial intelligence system for providing insights to users related to data-sharing management and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a machine learning and/or artificial intelligence system for providing insights to users related to data-sharing management and having a forced operating system software update system for automatically forcing operating system software updates on the 5G mobile devices of platform subscribers. In embodiments, provided herein is a self-contained 5G mobile telecommunications and edge computing platform having a machine learning and/or artificial intelligence system for providing insights to users related to data-sharing management and having a device registration system for registering a user device to a specific network segment. In embodiments, provided herein is a self-contained 5G mobile telecommunications and edge computing platform having a machine learning and/or artificial intelligence system for providing insights to users related to data-sharing management and having a multi-static radar having beam forming MIMO antennas. In embodiments, provided herein is a self-contained 5G mobile telecommunications and edge computing platform having a machine learning and/or artificial intelligence system for providing insights to users related to data-sharing management and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a machine learning and/or artificial intelligence system for providing insights to users related to data-sharing management and having a drone shield system for using a fleet of drones to form a dynamic barrier. In embodiments, provided herein is a self-contained 5G mobile telecommunications and edge computing platform having a machine learning and/or artificial intelligence system for providing insights to users related to data-sharing management and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a machine learning and/or artificial intelligence system for providing insights to users related to data-sharing management and having a precision navigation and timing system that uses a network of low orbit earth satellites as a timing source. In embodiments, provided herein is a self-contained 5G mobile telecommunications and edge computing platform having a machine learning and/or artificial intelligence system for providing insights to users related to data-sharing management and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a machine learning and/or artificial intelligence system for providing insights to users related to data-sharing management and having an augmented reality system that uses a machine learning and/or artificial intelligence system for providing a simulated environment. In embodiments, provided herein is a self-contained 5G mobile telecommunications and edge computing platform having a machine learning and/or artificial intelligence system for providing insights to users related to data-sharing management and having a virtual reality system that uses a machine learning and/or artificial intelligence system for providing a simulated environment. In embodiments, provided herein is a self-contained 5G mobile telecommunications and edge computing platform having a machine learning and/or artificial intelligence system for providing insights to users related to data-sharing management and having a customer relationship management system for managing communications with current and/or potential customers. In embodiments, provided herein is a self-contained 5G mobile telecommunications and edge computing platform having a machine learning and/or artificial intelligence system for providing insights to users related to data-sharing management and having a remote surgery system having a system for providing haptic feedback related to a surgical procedure. In embodiments, provided herein is a self-contained 5G mobile telecommunications and edge computing platform having a machine learning and/or artificial intelligence system for providing insights to users related to data-sharing management and having a remote driving system for controlling a remote vehicle and having a system for providing haptic feedback related to driving of the vehicle. In embodiments, provided herein is a self-contained 5G mobile telecommunications and edge computing platform having a machine learning and/or artificial intelligence system for providing insights to users related to data-sharing management and having a remote machine operation system for controlling a remote machine and having a system for providing haptic feedback related to machine operation. In embodiments, provided herein is a self-contained 5G mobile telecommunications and edge computing platform having a machine learning and/or artificial intelligence system for providing insights to users related to data-sharing management and having an electronic beam steering system to send targeted signals to receivers in 5G mobile devices.

In embodiments, provided herein is a self-contained 5G mobile telecommunications and edge computing platform having a privacy-controlled container on top of the base smartphone operating system to run services and applications. In embodiments, provided herein is a self-contained 5G mobile telecommunications and edge computing platform having a privacy-controlled container on top of the base smartphone operating system to run services and applications and having virtualized operating system applications wherein the applications are run on a Type 1 Hypervisor having a real-time operating system. In embodiments, provided herein is a self-contained 5G mobile telecommunications and edge computing platform having a privacy-controlled container on top of the base smartphone operating system to run services and applications and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a self-contained 5G mobile telecommunications and edge computing platform having a privacy-controlled container on top of the base smartphone operating system to run services and applications and having a forced operating system software update system for automatically forcing operating system software updates on the 5G mobile devices of platform subscribers. In embodiments, provided herein is a self-contained 5G mobile telecommunications and edge computing platform having a privacy-controlled container on top of the base smartphone operating system to run services and applications and having a device registration system for registering a user device to a specific network segment. In embodiments, provided herein is a self-contained 5G mobile telecommunications and edge computing platform having a privacy-controlled container on top of the base smartphone operating system to run services and applications and having a multi-static radar having beam forming MIMO antennas. In embodiments, provided herein is a self-contained 5G mobile telecommunications and edge computing platform having a privacy-controlled container on top of the base smartphone operating system to run services and applications and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a privacy-controlled container on top of the base smartphone operating system to run services and applications and having a drone shield system for using a fleet of drones to form a dynamic barrier. In embodiments, provided herein is a self-contained 5G mobile telecommunications and edge computing platform having a privacy-controlled container on top of the base smartphone operating system to run services and applications and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a privacy-controlled container on top of the base smartphone operating system to run services and applications and having a precision navigation and timing system that uses a network of low orbit earth satellites as a timing source. In embodiments, provided herein is a self-contained 5G mobile telecommunications and edge computing platform having a privacy-controlled container on top of the base smartphone operating system to run services and applications and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a privacy-controlled container on top of the base smartphone operating system to run services and applications and having an augmented reality system that uses a machine learning and/or artificial intelligence system for providing a simulated environment. In embodiments, provided herein is a self-contained 5G mobile telecommunications and edge computing platform having a privacy-controlled container on top of the base smartphone operating system to run services and applications and having a virtual reality system that uses a machine learning and/or artificial intelligence system for providing a simulated environment. In embodiments, provided herein is a self-contained 5G mobile telecommunications and edge computing platform having a privacy-controlled container on top of the base smartphone operating system to run services and applications and having a customer relationship management system for managing communications with current and/or potential customers. In embodiments, provided herein is a self-contained 5G mobile telecommunications and edge computing platform having a privacy-controlled container on top of the base smartphone operating system to run services and applications and having a remote surgery system having a system for providing haptic feedback related to a surgical procedure. In embodiments, provided herein is a self-contained 5G mobile telecommunications and edge computing platform having a privacy-controlled container on top of the base smartphone operating system to run services and applications and having a remote driving system for controlling a remote vehicle and having a system for providing haptic feedback related to driving of the vehicle. In embodiments, provided herein is a self-contained 5G mobile telecommunications and edge computing platform having a privacy-controlled container on top of the base smartphone operating system to run services and applications and having a remote machine operation system for controlling a remote machine and having a system for providing haptic feedback related to machine operation. In embodiments, provided herein is a self-contained 5G mobile telecommunications and edge computing platform having a privacy-controlled container on top of the base smartphone operating system to run services and applications and having an electronic beam steering system to send targeted signals to receivers in 5G mobile devices.

In embodiments, provided herein is a 5G mobile device having virtualized operating system applications wherein the applications are run on a Type 1 Hypervisor having a real-time operating system. In embodiments, provided herein is a 5G mobile device having virtualized operating system applications wherein the applications are run on a Type 1 Hypervisor having a real-time operating system and having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a 5G mobile device having virtualized operating system applications wherein the applications are run on a Type 1 Hypervisor having a real-time operating system and having a forced operating system software update system for automatically forcing operating system software updates on the 5G mobile devices of platform subscribers. In embodiments, provided herein is a 5G mobile device having virtualized operating system applications wherein the applications are run on a Type 1 Hypervisor having a real-time operating system and having a device registration system for registering a user device to a specific network segment. In embodiments, provided herein is a 5G mobile device having virtualized operating system applications wherein the applications are run on a Type 1 Hypervisor having a real-time operating system and having a multi-static radar having beam forming MIMO antennas. In embodiments, provided herein is a 5G mobile device having virtualized operating system applications wherein the applications are run on a Type 1 Hypervisor having a real-time operating system and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a 5G mobile device having virtualized operating system applications wherein the applications are run on a Type 1 Hypervisor having a real-time operating system and having a drone shield system for using a fleet of drones to form a dynamic barrier. In embodiments, provided herein is a 5G mobile device having virtualized operating system applications wherein the applications are run on a Type 1 Hypervisor having a real-time operating system and having a global payload delivery system that generates, deploys, and delivers electronic attack radio frequency and compute payloads through the low earth orbit satellite backhaul network. In embodiments, provided herein is a 5G mobile device having virtualized operating system applications wherein the applications are run on a Type 1 Hypervisor having a real-time operating system and having a precision navigation and timing system that uses a network of low orbit earth satellites as a timing source. In embodiments, provided herein is a 5G mobile device having virtualized operating system applications wherein the applications are run on a Type 1 Hypervisor having a real-time operating system and having a drone in communication with a wearable device, and wherein the drone triages and directs an autonomous ambulance to the wearable user for transport, diagnosis, and/or treatment via telemedicine. In embodiments, provided herein is a 5G mobile device having virtualized operating system applications wherein the applications are run on a Type 1 Hypervisor having a real-time operating system and having an augmented reality system that uses a machine learning and/or artificial intelligence system for providing a simulated environment. In embodiments, provided herein is a 5G mobile device having virtualized operating system applications wherein the applications are run on a Type 1 Hypervisor having a real-time operating system and having a virtual reality system that uses a machine learning and/or artificial intelligence system for providing a simulated environment. In embodiments, provided herein is a 5G mobile device having virtualized operating system applications wherein the applications are run on a Type 1 Hypervisor having a real-time operating system and having a customer relationship management system for managing communications with current and/or potential customers. In embodiments, provided herein is a 5G mobile device having virtualized operating system applications wherein the applications are run on a Type 1 Hypervisor having a real-time operating system and having a remote surgery system having a system for providing haptic feedback related to a surgical procedure. In embodiments, provided herein is a 5G mobile device having virtualized operating system applications wherein the applications are run on a Type 1 Hypervisor having a real-time operating system and having a remote driving system for controlling a remote vehicle and having a system for providing haptic feedback related to driving of the vehicle. In embodiments, provided herein is a 5G mobile device having virtualized operating system applications wherein the applications are run on a Type 1 Hypervisor having a real-time operating system and having a remote machine operation system for controlling a remote machine and having a system for providing haptic feedback related to machine operation. In embodiments, provided herein is a 5G mobile device having virtualized operating system applications wherein the applications are run on a Type 1 Hypervisor having a real-time operating system and having an electronic beam steering system to send targeted signals to receivers in 5G mobile devices.

In embodiments, provided herein is a 5G mobile device having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality. In embodiments, provided herein is a 5G mobile device having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality and having a forced operating system software update system for automatically forcing operating system software updates on the 5G mobile devices of platform subscribers. In embodiments, provided herein is a 5G mobile device having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality and having a device registration system for registering a user device to a specific network segment. In embodiments, provided herein is a 5G mobile device having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality and having a multi-static radar having beam forming MIMO antennas. In embodiments, provided herein is a 5G mobile device having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a 5G mobile device having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality and having a drone shield system for using a fleet of drones to form a dynamic barrier. In embodiments, provided herein is a 5G mobile device having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality and having a global payload delivery system that generates, deploys, and delivers electronic attack radio frequency and compute payloads through the low earth orbit satellite backhaul network. In embodiments, provided herein is a 5G mobile device having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality and having a precision navigation and timing system that uses a network of low orbit earth satellites as a timing source. In embodiments, provided herein is a 5G mobile device having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality and having a drone in communication with a wearable device, and wherein the drone triages and directs an autonomous ambulance to the wearable user for transport, diagnosis, and/or treatment via telemedicine. In embodiments, provided herein is a 5G mobile device having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality and having an augmented reality system that uses a machine learning and/or artificial intelligence system for providing a simulated environment. In embodiments, provided herein is a 5G mobile device having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality and having a virtual reality system that uses a machine learning and/or artificial intelligence system for providing a simulated environment. In embodiments, provided herein is a 5G mobile device having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality and having a customer relationship management system for managing communications with current and/or potential customers. In embodiments, provided herein is a 5G mobile device having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality and having a remote surgery system having a system for providing haptic feedback related to a surgical procedure. In embodiments, provided herein is a 5G mobile device having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality and having a remote driving system for controlling a remote vehicle and having a system for providing haptic feedback related to driving of the vehicle. In embodiments, provided herein is a 5G mobile device having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality and having a remote machine operation system for controlling a remote machine and having a system for providing haptic feedback related to machine operation. In embodiments, provided herein is a 5G mobile device having virtualized operating system applications and wherein the applications are run on a Type 1 Hypervisor having a real-time operating system and having a machine learning and/or artificial intelligence system to predict user behavior in order to manage and/or prioritize network requirements and/or operating system functionality and having an electronic beam steering system to send targeted signals to receivers in 5G mobile devices.

In embodiments, provided herein is a 5G mobile device having a forced operating system software update system for automatically forcing operating system software updates on the 5G mobile devices of platform subscribers. In embodiments, provided herein is a 5G mobile device having a forced operating system software update system for automatically forcing operating system software updates on the 5G mobile devices of platform subscribers and having a device registration system for registering a user device to a specific network segment. In embodiments, provided herein is a 5G mobile device having a forced operating system software update system for automatically forcing operating system software updates on the 5G mobile devices of platform subscribers and having a multi-static radar having beam forming MIMO antennas. In embodiments, provided herein is a 5G mobile device having a forced operating system software update system for automatically forcing operating system software updates on the 5G mobile devices of platform subscribers and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a 5G mobile device having a forced operating system software update system for automatically forcing operating system software updates on the 5G mobile devices of platform subscribers and having a drone shield system for using a fleet of drones to form a dynamic barrier. In embodiments, provided herein is a 5G mobile device having a forced operating system software update system for automatically forcing operating system software updates on the 5G mobile devices of platform subscribers and having a global payload delivery system that generates, deploys, and delivers electronic attack radio frequency and compute payloads through the low earth orbit satellite backhaul network. In embodiments, provided herein is a 5G mobile device having a forced operating system software update system for automatically forcing operating system software updates on the 5G mobile devices of platform subscribers and having a precision navigation and timing system that uses a network of low orbit earth satellites as a timing source. In embodiments, provided herein is a 5G mobile device having a forced operating system software update system for automatically forcing operating system software updates on the 5G mobile devices of platform subscribers and having a drone in communication with a wearable device, and wherein the drone triages and directs an autonomous ambulance to the wearable user for transport, diagnosis, and/or treatment via telemedicine. In embodiments, provided herein is a 5G mobile device having a forced operating system software update system for automatically forcing operating system software updates on the 5G mobile devices of platform subscribers and having an augmented reality system that uses a machine learning and/or artificial intelligence system for providing a simulated environment. In embodiments, provided herein is a 5G mobile device having a forced operating system software update system for automatically forcing operating system software updates on the 5G mobile devices of platform subscribers and having a virtual reality system that uses a machine learning and/or artificial intelligence system for providing a simulated environment. In embodiments, provided herein is a 5G mobile device having a forced operating system software update system for automatically forcing operating system software updates on the 5G mobile devices of platform subscribers and having a customer relationship management system for managing communications with current and/or potential customers. In embodiments, provided herein is a 5G mobile device having a forced operating system software update system for automatically forcing operating system software updates on the 5G mobile devices of platform subscribers and having a remote surgery system having a system for providing haptic feedback related to a surgical procedure. In embodiments, provided herein is a 5G mobile device having a forced operating system software update system for automatically forcing operating system software updates on the 5G mobile devices of platform subscribers and having a remote driving system for controlling a remote vehicle and having a system for providing haptic feedback related to driving of the vehicle. In embodiments, provided herein is a 5G mobile device having a forced operating system software update system for automatically forcing operating system software updates on the 5G mobile devices of platform subscribers and having a remote machine operation system for controlling a remote machine and having a system for providing haptic feedback related to machine operation. In embodiments, provided herein is a 5G mobile device having a forced operating system software update system for automatically forcing operating system software updates on the 5G mobile devices of platform subscribers and having an electronic beam steering system to send targeted signals to receivers in 5G mobile devices.

In embodiments, provided herein is a self-contained 5G mobile telecommunications and edge computing platform having a device registration system for registering a user device to a specific network segment. In embodiments, provided herein is a self-contained 5G mobile telecommunications and edge computing platform having a device registration system for registering a user device to a specific network segment and having a multi-static radar having beam forming MIMO antennas. In embodiments, provided herein is a self-contained 5G mobile telecommunications and edge computing platform having a device registration system for registering a user device to a specific network segment and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a device registration system for registering a user device to a specific network segment and having a drone shield system for using a fleet of drones to form a dynamic barrier. In embodiments, provided herein is a self-contained 5G mobile telecommunications and edge computing platform having a device registration system for registering a user device to a specific network segment and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a device registration system for registering a user device to a specific network segment and having a precision navigation and timing system that uses a network of low orbit earth satellites as a timing source. In embodiments, provided herein is a self-contained 5G mobile telecommunications and edge computing platform having a device registration system for registering a user device to a specific network segment and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a device registration system for registering a user device to a specific network segment and having an augmented reality system that uses a machine learning and/or artificial intelligence system for providing a simulated environment. In embodiments, provided herein is a self-contained 5G mobile telecommunications and edge computing platform having a device registration system for registering a user device to a specific network segment and having a virtual reality system that uses a machine learning and/or artificial intelligence system for providing a simulated environment. In embodiments, provided herein is a self-contained 5G mobile telecommunications and edge computing platform having a device registration system for registering a user device to a specific network segment and having a customer relationship management system for managing communications with current and/or potential customers. In embodiments, provided herein is a self-contained 5G mobile telecommunications and edge computing platform having a device registration system for registering a user device to a specific network segment and having a remote surgery system having a system for providing haptic feedback related to a surgical procedure. In embodiments, provided herein is a self-contained 5G mobile telecommunications and edge computing platform having a device registration system for registering a user device to a specific network segment and having a remote driving system for controlling a remote vehicle and having a system for providing haptic feedback related to driving of the vehicle. In embodiments, provided herein is a self-contained 5G mobile telecommunications and edge computing platform having a device registration system for registering a user device to a specific network segment and having a remote machine operation system for controlling a remote machine and having a system for providing haptic feedback related to machine operation. In embodiments, provided herein is a self-contained 5G mobile telecommunications and edge computing platform having a device registration system for registering a user device to a specific network segment and having an electronic beam steering system to send targeted signals to receivers in 5G mobile devices.

In embodiments, provided herein is a self-contained 5G mobile telecommunications and edge computing platform having a multi-static radar having beam forming MIMO antennas. In embodiments, provided herein is a self-contained 5G mobile telecommunications and edge computing platform having a multi-static radar having beam forming MIMO antennas and having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a multi-static radar having beam forming MIMO antennas and having a drone shield system for using a fleet of drones to form a dynamic barrier. In embodiments, provided herein is a self-contained 5G mobile telecommunications and edge computing platform having a multi-static radar having beam forming MIMO antennas and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a multi-static radar having beam forming MIMO antennas and having a precision navigation and timing system that uses a network of low orbit earth satellites as a timing source. In embodiments, provided herein is a self-contained 5G mobile telecommunications and edge computing platform having a multi-static radar having beam forming MIMO antennas and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a multi-static radar having beam forming MIMO antennas and having an augmented reality system that uses a machine learning and/or artificial intelligence system for providing a simulated environment. In embodiments, provided herein is a self-contained 5G mobile telecommunications and edge computing platform having a multi-static radar having beam forming MIMO antennas and having a virtual reality system that uses a machine learning and/or artificial intelligence system for providing a simulated environment. In embodiments, provided herein is a self-contained 5G mobile telecommunications and edge computing platform having a multi-static radar having beam forming MIMO antennas and having a customer relationship management system for managing communications with current and/or potential customers. In embodiments, provided herein is a self-contained 5G mobile telecommunications and edge computing platform having a multi-static radar having beam forming MIMO antennas and having a remote surgery system having a system for providing haptic feedback related to a surgical procedure. In embodiments, provided herein is a self-contained 5G mobile telecommunications and edge computing platform having a multi-static radar having beam forming MIMO antennas and having a remote driving system for controlling a remote vehicle and having a system for providing haptic feedback related to driving of the vehicle. In embodiments, provided herein is a self-contained 5G mobile telecommunications and edge computing platform having a multi-static radar having beam forming MIMO antennas and having a remote machine operation system for controlling a remote machine and having a system for providing haptic feedback related to machine operation. In embodiments, provided herein is a self-contained 5G mobile telecommunications and edge computing platform having a multi-static radar having beam forming MIMO antennas and having an electronic beam steering system to send targeted signals to receivers in 5G mobile devices.

In embodiments, provided herein is a self-contained 5G mobile telecommunications and edge computing platform having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas. In embodiments, provided herein is a self-contained 5G mobile telecommunications and edge computing platform having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas and having a drone shield system for using a fleet of drones to form a dynamic barrier. In embodiments, provided herein is a self-contained 5G mobile telecommunications and edge computing platform having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas and having a precision navigation and timing system that uses a network of low orbit earth satellites as a timing source. In embodiments, provided herein is a self-contained 5G mobile telecommunications and edge computing platform having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas and having an augmented reality system that uses a machine learning and/or artificial intelligence system for providing a simulated environment. In embodiments, provided herein is a self-contained 5G mobile telecommunications and edge computing platform having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas and having a virtual reality system that uses a machine learning and/or artificial intelligence system for providing a simulated environment. In embodiments, provided herein is a self-contained 5G mobile telecommunications and edge computing platform having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas and having a customer relationship management system for managing communications with current and/or potential customers. In embodiments, provided herein is a self-contained 5G mobile telecommunications and edge computing platform having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas and having a remote surgery system having a system for providing haptic feedback related to a surgical procedure. In embodiments, provided herein is a self-contained 5G mobile telecommunications and edge computing platform having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas and having a remote driving system for controlling a remote vehicle and having a system for providing haptic feedback related to driving of the vehicle. In embodiments, provided herein is a self-contained 5G mobile telecommunications and edge computing platform having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas and having a remote machine operation system for controlling a remote machine and having a system for providing haptic feedback related to machine operation. In embodiments, provided herein is a self-contained 5G mobile telecommunications and edge computing platform having a system for drone detection and tracking, wherein a sensor system is configured to detect drones, and if a drone is detected, the drone is identified by an edge computing system using machine learning and/or artificial intelligence and tracked using a multi-static radar having beam forming MIMO antennas and having an electronic beam steering system to send targeted signals to receivers in 5G mobile devices.

In embodiments, provided herein is a self-contained 5G mobile telecommunications and edge computing platform having a drone shield system for using a fleet of drones to form a dynamic barrier. In embodiments, provided herein is a self-contained 5G mobile telecommunications and edge computing platform having a drone shield system for using a fleet of drones to form a dynamic barrier and having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a drone shield system for using a fleet of drones to form a dynamic barrier and having a precision navigation and timing system that uses a network of low orbit earth satellites as a timing source. In embodiments, provided herein is a self-contained 5G mobile telecommunications and edge computing platform having a drone shield system for using a fleet of drones to form a dynamic barrier and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a drone shield system for using a fleet of drones to form a dynamic barrier and having an augmented reality system that uses a machine learning and/or artificial intelligence system for providing a simulated environment. In embodiments, provided herein is a self-contained 5G mobile telecommunications and edge computing platform having a drone shield system for using a fleet of drones to form a dynamic barrier and having a virtual reality system that uses a machine learning and/or artificial intelligence system for providing a simulated environment. In embodiments, provided herein is a self-contained 5G mobile telecommunications and edge computing platform having a drone shield system for using a fleet of drones to form a dynamic barrier and having a customer relationship management system for managing communications with current and/or potential customers. In embodiments, provided herein is a self-contained 5G mobile telecommunications and edge computing platform having a drone shield system for using a fleet of drones to form a dynamic barrier and having a remote surgery system having a system for providing haptic feedback related to a surgical procedure. In embodiments, provided herein is a self-contained 5G mobile telecommunications and edge computing platform having a drone shield system for using a fleet of drones to form a dynamic barrier and having a remote driving system for controlling a remote vehicle and having a system for providing haptic feedback related to driving of the vehicle. In embodiments, provided herein is a self-contained 5G mobile telecommunications and edge computing platform having a drone shield system for using a fleet of drones to form a dynamic barrier and having a remote machine operation system for controlling a remote machine and having a system for providing haptic feedback related to machine operation. In embodiments, provided herein is a self-contained 5G mobile telecommunications and edge computing platform having a drone shield system for using a fleet of drones to form a dynamic barrier and having an electronic beam steering system to send targeted signals to receivers in 5G mobile devices.

In embodiments, provided herein is a self-contained 5G mobile telecommunications and edge computing platform having a global payload delivery system that generates, deploys, and delivers electronic attack radio frequency and compute payloads through the low earth orbit satellite backhaul network. In embodiments, provided herein is a self-contained 5G mobile telecommunications and edge computing platform having a global payload delivery system that generates, deploys, and delivers electronic attack radio frequency and compute payloads through the low earth orbit satellite backhaul network and having a precision navigation and timing system that uses a network of low orbit earth satellites as a timing source. In embodiments, provided herein is a self-contained 5G mobile telecommunications and edge computing platform having a global payload delivery system that generates, deploys, and delivers electronic attack radio frequency and compute payloads through the low earth orbit satellite backhaul network and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a global payload delivery system that generates, deploys, and delivers electronic attack radio frequency and compute payloads through the low earth orbit satellite backhaul network and having an augmented reality system that uses a machine learning and/or artificial intelligence system for providing a simulated environment. In embodiments, provided herein is a self-contained 5G mobile telecommunications and edge computing platform having a global payload delivery system that generates, deploys, and delivers electronic attack radio frequency and compute payloads through the low earth orbit satellite backhaul network and having a virtual reality system that uses a machine learning and/or artificial intelligence system for providing a simulated environment. In embodiments, provided herein is a self-contained 5G mobile telecommunications and edge computing platform having a global payload delivery system that generates, deploys, and delivers electronic attack radio frequency and compute payloads through the low earth orbit satellite backhaul network and having a customer relationship management system for managing communications with current and/or potential customers. In embodiments, provided herein is a self-contained 5G mobile telecommunications and edge computing platform having a global payload delivery system that generates, deploys, and delivers electronic attack radio frequency and compute payloads through the low earth orbit satellite backhaul network and having a remote surgery system having a system for providing haptic feedback related to a surgical procedure. In embodiments, provided herein is a self-contained 5G mobile telecommunications and edge computing platform having a global payload delivery system that generates, deploys, and delivers electronic attack radio frequency and compute payloads through the low earth orbit satellite backhaul network and having a remote driving system for controlling a remote vehicle and having a system for providing haptic feedback related to driving of the vehicle. In embodiments, provided herein is a self-contained 5G mobile telecommunications and edge computing platform having a global payload delivery system that generates, deploys, and delivers electronic attack radio frequency and compute payloads through the low earth orbit satellite backhaul network and having a remote machine operation system for controlling a remote machine and having a system for providing haptic feedback related to machine operation. In embodiments, provided herein is a self-contained 5G mobile telecommunications and edge computing platform having a global payload delivery system that generates, deploys, and delivers electronic attack radio frequency and compute payloads through the low earth orbit satellite backhaul network and having an electronic beam steering system to send targeted signals to receivers in 5G mobile devices.

In embodiments, provided herein is a self-contained 5G mobile telecommunications and edge computing platform having a precision navigation and timing system that uses a network of low orbit earth satellites as a timing source. In embodiments, provided herein is a self-contained 5G mobile telecommunications and edge computing platform having a precision navigation and timing system that uses a network of low orbit earth satellites as a timing source and having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a precision navigation and timing system that uses a network of low orbit earth satellites as a timing source and having an augmented reality system that uses a machine learning and/or artificial intelligence system for providing a simulated environment. In embodiments, provided herein is a self-contained 5G mobile telecommunications and edge computing platform having a precision navigation and timing system that uses a network of low orbit earth satellites as a timing source and having a virtual reality system that uses a machine learning and/or artificial intelligence system for providing a simulated environment. In embodiments, provided herein is a self-contained 5G mobile telecommunications and edge computing platform having a precision navigation and timing system that uses a network of low orbit earth satellites as a timing source and having a customer relationship management system for managing communications with current and/or potential customers. In embodiments, provided herein is a self-contained 5G mobile telecommunications and edge computing platform having a precision navigation and timing system that uses a network of low orbit earth satellites as a timing source and having a remote surgery system having a system for providing haptic feedback related to a surgical procedure. In embodiments, provided herein is a self-contained 5G mobile telecommunications and edge computing platform having a precision navigation and timing system that uses a network of low orbit earth satellites as a timing source and having a remote driving system for controlling a remote vehicle and having a system for providing haptic feedback related to driving of the vehicle. In embodiments, provided herein is a self-contained 5G mobile telecommunications and edge computing platform having a precision navigation and timing system that uses a network of low orbit earth satellites as a timing source and having a remote machine operation system for controlling a remote machine and having a system for providing haptic feedback related to machine operation. In embodiments, provided herein is a self-contained 5G mobile telecommunications and edge computing platform having a precision navigation and timing system that uses a network of low orbit earth satellites as a timing source and having an electronic beam steering system to send targeted signals to receivers in 5G mobile devices.

In embodiments, provided herein is a self-contained 5G mobile telecommunications and edge computing platform having a drone in communication with a wearable device, and wherein the drone triages and directs an autonomous ambulance to the wearable user for transport, diagnosis, and/or treatment via telemedicine. In embodiments, provided herein is a self-contained 5G mobile telecommunications and edge computing platform having a drone in communication with a wearable device, and wherein the drone triages and directs an autonomous ambulance to the wearable user for transport, diagnosis, and/or treatment via telemedicine and having an augmented reality system that uses a machine learning and/or artificial intelligence system for providing a simulated environment. In embodiments, provided herein is a self-contained 5G mobile telecommunications and edge computing platform having a drone in communication with a wearable device, and wherein the drone triages and directs an autonomous ambulance to the wearable user for transport, diagnosis, and/or treatment via telemedicine and having a virtual reality system that uses a machine learning and/or artificial intelligence system for providing a simulated environment. In embodiments, provided herein is a self-contained 5G mobile telecommunications and edge computing platform having a drone in communication with a wearable device, and wherein the drone triages and directs an autonomous ambulance to the wearable user for transport, diagnosis, and/or treatment via telemedicine and having a customer relationship management system for managing communications with current and/or potential customers. In embodiments, provided herein is a self-contained 5G mobile telecommunications and edge computing platform having a drone in communication with a wearable device, and wherein the drone triages and directs an autonomous ambulance to the wearable user for transport, diagnosis, and/or treatment via telemedicine and having a remote surgery system having a system for providing haptic feedback related to a surgical procedure. In embodiments, provided herein is a self-contained 5G mobile telecommunications and edge computing platform having a drone in communication with a wearable device, and wherein the drone triages and directs an autonomous ambulance to the wearable user for transport, diagnosis, and/or treatment via telemedicine and having a remote driving system for controlling a remote vehicle and having a system for providing haptic feedback related to driving of the vehicle. In embodiments, provided herein is a self-contained 5G mobile telecommunications and edge computing platform having a drone in communication with a wearable device, and wherein the drone triages and directs an autonomous ambulance to the wearable user for transport, diagnosis, and/or treatment via telemedicine and having a remote machine operation system for controlling a remote machine and having a system for providing haptic feedback related to machine operation. In embodiments, provided herein is a self-contained 5G mobile telecommunications and edge computing platform having a drone in communication with a wearable device, and wherein the drone triages and directs an autonomous ambulance to the wearable user for transport, diagnosis, and/or treatment via telemedicine and having an electronic beam steering system to send targeted signals to receivers in 5G mobile devices.

In embodiments, provided herein is a self-contained 5G mobile telecommunications and edge computing platform having an augmented reality system that uses a machine learning and/or artificial intelligence system for providing a simulated environment. In embodiments, provided herein is a self-contained 5G mobile telecommunications and edge computing platform having an augmented reality system that uses a machine learning and/or artificial intelligence system for providing a simulated environment and having a virtual reality system that uses a machine learning and/or artificial intelligence system for providing a simulated environment. In embodiments, provided herein is a self-contained 5G mobile telecommunications and edge computing platform having an augmented reality system that uses a machine learning and/or artificial intelligence system for providing a simulated environment and having a customer relationship management system for managing communications with current and/or potential customers. In embodiments, provided herein is a self-contained 5G mobile telecommunications and edge computing platform having an augmented reality system that uses a machine learning and/or artificial intelligence system for providing a simulated environment and having a remote surgery system having a system for providing haptic feedback related to a surgical procedure. In embodiments, provided herein is a self-contained 5G mobile telecommunications and edge computing platform having an augmented reality system that uses a machine learning and/or artificial intelligence system for providing a simulated environment and having a remote driving system for controlling a remote vehicle and having a system for providing haptic feedback related to driving of the vehicle. In embodiments, provided herein is a self-contained 5G mobile telecommunications and edge computing platform having an augmented reality system that uses a machine learning and/or artificial intelligence system for providing a simulated environment and having a remote machine operation system for controlling a remote machine and having a system for providing haptic feedback related to machine operation. In embodiments, provided herein is a self-contained 5G mobile telecommunications and edge computing platform having an augmented reality system that uses a machine learning and/or artificial intelligence system for providing a simulated environment and having an electronic beam steering system to send targeted signals to receivers in 5G mobile devices.

In embodiments, provided herein is a self-contained 5G mobile telecommunications and edge computing platform having a virtual reality system that uses a machine learning and/or artificial intelligence system for providing a simulated environment. In embodiments, provided herein is a self-contained 5G mobile telecommunications and edge computing platform having a virtual reality system that uses a machine learning and/or artificial intelligence system for providing a simulated environment and having a customer relationship management system for managing communications with current and/or potential customers. In embodiments, provided herein is a self-contained 5G mobile telecommunications and edge computing platform having a virtual reality system that uses a machine learning and/or artificial intelligence system for providing a simulated environment and having a remote surgery system having a system for providing haptic feedback related to a surgical procedure. In embodiments, provided herein is a self-contained 5G mobile telecommunications and edge computing platform having a virtual reality system that uses a machine learning and/or artificial intelligence system for providing a simulated environment and having a remote driving system for controlling a remote vehicle and having a system for providing haptic feedback related to driving of the vehicle. In embodiments, provided herein is a self-contained 5G mobile telecommunications and edge computing platform having a virtual reality system that uses a machine learning and/or artificial intelligence system for providing a simulated environment and having a remote machine operation system for controlling a remote machine and having a system for providing haptic feedback related to machine operation. In embodiments, provided herein is a self-contained 5G mobile telecommunications and edge computing platform having a virtual reality system that uses a machine learning and/or artificial intelligence system for providing a simulated environment and having an electronic beam steering system to send targeted signals to receivers in 5G mobile devices.

In embodiments, provided herein is a self-contained 5G mobile telecommunications and edge computing platform having a customer relationship management system for managing communications with current and/or potential customers. In embodiments, provided herein is a self-contained 5G mobile telecommunications and edge computing platform having a customer relationship management system for managing communications with current and/or potential customers and having a remote surgery system having a system for providing haptic feedback related to a surgical procedure. In embodiments, provided herein is a self-contained 5G mobile telecommunications and edge computing platform having a customer relationship management system for managing communications with current and/or potential customers and having a remote driving system for controlling a remote vehicle and having a system for providing haptic feedback related to driving of the vehicle. In embodiments, provided herein is a self-contained 5G mobile telecommunications and edge computing platform having a customer relationship management system for managing communications with current and/or potential customers and having a remote machine operation system for controlling a remote machine and having a system for providing haptic feedback related to machine operation. In embodiments, provided herein is a self-contained 5G mobile telecommunications and edge computing platform having a customer relationship management system for managing communications with current and/or potential customers and having an electronic beam steering system to send targeted signals to receivers in 5G mobile devices.

In embodiments, provided herein is a self-contained 5G mobile telecommunications and edge computing platform having a remote surgery system having a system for providing haptic feedback related to a surgical procedure. In embodiments, provided herein is a self-contained 5G mobile telecommunications and edge computing platform having a remote surgery system having a system for providing haptic feedback related to a surgical procedure and having a remote driving system for controlling a remote vehicle and having a system for providing haptic feedback related to driving of the vehicle. In embodiments, provided herein is a self-contained 5G mobile telecommunications and edge computing platform having a remote surgery system having a system for providing haptic feedback related to a surgical procedure and having a remote machine operation system for controlling a remote machine and having a system for providing haptic feedback related to machine operation. In embodiments, provided herein is a self-contained 5G mobile telecommunications and edge computing platform having a remote surgery system having a system for providing haptic feedback related to a surgical procedure and having an electronic beam steering system to send targeted signals to receivers in 5G mobile devices.

In embodiments, provided herein is a self-contained 5G mobile telecommunications and edge computing platform having a remote driving system for controlling a remote vehicle and having a system for providing haptic feedback related to driving of the vehicle. In embodiments, provided herein is a self-contained 5G mobile telecommunications and edge computing platform having a remote driving system for controlling a remote vehicle and having a system for providing haptic feedback related to driving of the vehicle and having a remote machine operation system for controlling a remote machine and having a system for providing haptic feedback related to machine operation. In embodiments, provided herein is a self-contained 5G mobile telecommunications and edge computing platform having a remote driving system for controlling a remote vehicle and having a system for providing haptic feedback related to driving of the vehicle and having an electronic beam steering system to send targeted signals to receivers in 5G mobile devices.

In embodiments, provided herein is a self-contained 5G mobile telecommunications and edge computing platform having a remote machine operation system for controlling a remote machine and having a system for providing haptic feedback related to machine operation. In embodiments, provided herein is a self-contained 5G mobile telecommunications and edge computing platform having a remote machine operation system for controlling a remote machine and having a system for providing haptic feedback related to machine operation and having an electronic beam steering system to send targeted signals to receivers in 5G mobile devices.

In embodiments, provided herein is a self-contained 5G mobile telecommunications and edge computing platform having an electronic beam steering system to send targeted signals to receivers in 5G mobile devices.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like, including a central processing unit (CPU), a general processing unit (GPU), a logic board, a chip (e.g., a graphics chip, a video processing chip, a data compression chip, or the like), a chipset, a controller, a system-on-chip (e.g., an RF system on chip, an AI system on chip, a video processing system on chip, or others), an integrated circuit, an application specific integrated circuit (ASIC), a field programmable gate array (FPGA), an approximate computing processor, a quantum computing processor, a parallel computing processor, a neural network processor, or other type of processor. The processor may be or may include a signal processor, digital processor, data processor, embedded processor, microprocessor or any variant such as a co-processor (math co-processor, graphic co-processor, communication co-processor, video co-processor, AI co-processor, and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, network-attached storage, server-based storage, and the like.

A processor may include one or more cores that may enhance speed and performance of a multiprocessor. In embodiments, the process may be a dual core processor, quad core processors, other chip-level multiprocessor and the like that combine two or more independent cores (sometimes called a die).

The methods and systems described herein may be deployed in part or in whole through a machine that executes computer software on a server, client, firewall, gateway, hub, router, switch, infrastructure-as-a-service, platform-as-a-service, or other such computer and/or networking hardware or system. The software may be associated with a server that may include a file server, print server, domain server, internet server, intranet server, cloud server, infrastructure-as-a-service server, platform-as-a-service server, web server, and other variants such as secondary server, host server, distributed server, failover server, backup server, server farm, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for the execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network with multiple cells. The cellular network may either be frequency division multiple access (FDMA) network, code division multiple access (CDMA) network or Orthogonal Frequency Division Multiple Access (OFDMA) network or any commercial e.g. Carrier Sense Multiple Access with Collision Avoidance (CSMA/CA) as used by WiFi or Bluetooth or military waveform. The cellular network may include mobile devices, cell sites, base stations, repeaters, antennas, towers, and the like. The cell network may be a GSM, GPRS, 3G, 4G, 5G, LTE, EVDO, mesh, or other network types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic book readers, music players and the like. These devices may include, apart from other components, a storage medium such as flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, network-attached storage, network storage, NVME-accessible storage, PCIE connected storage, distributed storage, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable code using a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices, artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions. Computer software may employ virtualization, virtual machines, containers, dock facilities, portainers, and other capabilities.

Thus, in one aspect, methods described above and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "with," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. The term "set" may include a set with a single member. No language in the specification should be construed as indicating any non-claimed element as essential to the practice of the disclosure.

While the foregoing written description enables one skilled to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference as if fully set forth herein.

What is claimed is:

1. A computer-implemented method for providing low earth orbit (LEO) directed fifth generation (5G) telecommunication, the method comprising:

receiving a service request from a first location via a 5G network for transmitting data from the first location to a second location;

establishing software-defined networking (SDN) control of a control plane of the 5G network exclusively on a LEO system based on the service request;

determining and generating a pathway for the data plane from the first location to the second location based on the service request and the control of the control plane on the LEO system; and transmitting the data from the first location to the second location based on the generated pathway of the data plane.

2. The method of claim 1, wherein the LEO system is software running on one or more LEO satellites.

3. The method of claim 1, further comprising utilizing session initiation protocol (SIP) for protecting communications at signaling and at the control plane.

4. The method of claim 1, further comprising utilizing session description protocol (SDP) for providing at least one of dissemination of call model information, adaptation of call models in real time, and addition of services during a call.

5. The method of claim 1, further comprising initiating a mid-trigger event during a call between a first user device at the first location and a second user device at the second user location such that session initiation protocol (SIP) and session description protocol (SDP) are used for providing security for the mid-trigger event.

6. The method of claim 1, wherein the pathway is determined based on at least one of a white list of approved terrestrial network VIAs and a blacklist of not approved terrestrial network VIAs.

7. The method of claim 6, wherein the white list includes at least one of a common language facility identifier (CLFI), a common location language identifier (CLLI), LEO satellite identification information, and terrestrial network device identification information.

8. The method of claim 1, wherein the data transmitted from the first location to the second location is encrypted.

9. A system for providing low earth orbit (LEO) directed fifth generation (5G) telecommunication, the system comprising:

a first user device sending a service request from a first location via a 5G network for transmitting data from the first location to a second user device at a second location; and a LEO system for establishing software-defined networking (SDN) exclusive control of a control plane of the 5G network based on the service request;

wherein the LEO system determines and generates a pathway for the data plane from the first location to the second location based on the service request and the control of the control plane on the LEO system; and wherein the data is transmitted from the user device at the first location to the user device at the second location based on the generated pathway of the data plane.

10. The system of claim 9, wherein the LEO system is software running on one or more LEO satellites.

11. The system of claim 9, further comprising home serving information for a classified group of users for activating one or more services wherein a first user of the first user device and a second user of the second user are part of the classified group users such that when the first user device connects with the second user device, the one or more services are activated.

12. The system of claim 9, wherein the LEO system includes a session initiation protocol (SIP) virtual server and a session description protocol (SDP) virtual server for providing security for the transmission and other transmissions between the first user device and the second user device.

13. The system of claim 9, wherein the LEO system is configured to execute at least control portions of one or more applications by using the SDN exclusive control.

14. The system of claim 9, wherein the data transmitted from the user device at the first location to the user device at the second location is encrypted.

* * * * *